US012791274B2

(12) United States Patent
Asbach et al.

(10) Patent No.: US 12,791,274 B2
(45) Date of Patent: *Nov. 10, 2026

(54) WEAPON USAGE MONITORING SYSTEM HAVING DISCHARGE EVENT MONITORING USING IDENTIFICATION ALGORITHM

(71) Applicant: Armaments Research Company, Inc., Bethesda, MD (US)

(72) Inventors: John Asbach, Laurel, MD (US); Michael Canty, Bethesda, MD (US); Kyle William Broadway, Mount Airy, MD (US)

(73) Assignee: Armaments Research Company, Inc., Chevy Chase, MD (US)

( * ) Notice: Subject to any disclaimer, the term of this patent is extended or adjusted under 35 U.S.C. 154(b) by 801 days.

This patent is subject to a terminal disclaimer.

(21) Appl. No.: 18/195,038

(22) Filed: May 9, 2023

(65) Prior Publication Data

US 2024/0027155 A1 Jan. 25, 2024

Related U.S. Application Data

(63) Continuation of application No. 18/143,404, filed on May 4, 2023, which is a continuation of application (Continued)

(51) Int. Cl.

*F41A 17/06* (2006.01)
*F41A 19/01* (2006.01)

(Continued)

(52) U.S. Cl.

CPC ............ *F41A 17/063* (2013.01); *F41A 17/06* (2013.01); *F41A 19/01* (2013.01); *F41A 19/10* (2013.01);

(Continued)

(58) Field of Classification Search

None

See application file for complete search history.

(56) References Cited

U.S. PATENT DOCUMENTS

| | | | |
|---|---|---|---|
| 5,479,149 | A | 12/1995 | Pike |
| 6,415,542 | B1 | 7/2002 | Bates et al. |

(Continued)

FOREIGN PATENT DOCUMENTS

| | | | |
|---|---|---|---|
| CN | 110995818 | A | 4/2020 |
| EP | 1605222 | B1 | 11/2008 |

(Continued)

OTHER PUBLICATIONS

European Search Report for EP Application No. 23183671 mailed Nov. 17, 2023.

(Continued)

*Primary Examiner* — Tuan A Tran

(74) *Attorney, Agent, or Firm* — RMCK Law Group PLC

(57) ABSTRACT

A system and method for providing discharge monitoring of a firearm can include an inertial measurement unit (IMU) and an event detection module. The IMU is disposed on the firearm and senses accelerations. The event detection module receives a plurality of input signals from the IMU indicative of the accelerations. The event detection module assigns the plurality of input signals to sample event candidates at respective windows of time, creates and runs an identification algorithm at a machine learning module using the plurality of input signals. An occurrence of a shot discharge is identified based on an output of the identification algorithm.

24 Claims, 72 Drawing Sheets

Related U.S. Application Data

No. PCT/US2022/023027, filed on Apr. 1, 2022, and a continuation of application No. 17/524,302, filed on Nov. 11, 2021, now Pat. No. 11,768,047, which is a continuation of application No. 16/995,990, filed on Aug. 18, 2020, now Pat. No. 11,293,711, which is a continuation of application No. PCT/US2019/055925, filed on Oct. 11, 2019, said application No. 17/524,302 is a continuation of application No. 16/460,348, filed on Jul. 2, 2019, now Pat. No. 11,408,699, which is a continuation of application No. PCT/US2018/015615, filed on Jan. 27, 2018.

(60) Provisional application No. 63/455,852, filed on Mar. 30, 2023, provisional application No. 63/216,037, filed on Jun. 29, 2021, provisional application No. 63/169,283, filed on Apr. 1, 2021, provisional application No. 62/745,028, filed on Oct. 12, 2018, provisional application No. 62/451,620, filed on Jan. 27, 2017.

(51) Int. Cl.

| | |
|---|---|
| ***F41A 19/10*** | (2006.01) |
| ***F41A 21/48*** | (2006.01) |
| ***F41A 31/00*** | (2006.01) |
| ***F41C 23/16*** | (2006.01) |
| ***F41C 27/04*** | (2006.01) |
| ***F41G 3/00*** | (2006.01) |
| ***F41G 3/04*** | (2006.01) |
| ***F41G 3/14*** | (2006.01) |
| ***F41G 3/16*** | (2006.01) |
| ***F41G 3/26*** | (2006.01) |
| ***G01S 19/54*** | (2010.01) |
| ***G06F 17/40*** | (2006.01) |
| ***H04N 5/28*** | (2006.01) |
| ***H04N 23/66*** | (2023.01) |
| *G01S 19/13* | (2010.01) |

(52) U.S. Cl.

CPC .............. *F41A 21/48* (2013.01); *F41A 31/00* (2013.01); *F41C 23/16* (2013.01); *F41C 27/04* (2013.01); *F41G 3/04* (2013.01); *F41G 3/142* (2013.01); *F41G 3/165* (2013.01); *G01S 19/54* (2013.01); *H04N 5/28* (2013.01); *H04N 23/66* (2023.01); *G01S 19/13* (2013.01)

(56) References Cited

U.S. PATENT DOCUMENTS

| | | | | |
|---|---|---|---|---|
| 6,497,169 | B1 | 12/2002 | Khosla | |
| 6,785,996 | B2 | 9/2004 | Danner et al. | |
| 6,823,621 | B2 | 11/2004 | Gotfried | |
| 6,882,128 | B1 | 4/2005 | Rahmel et al. | |
| 6,899,539 | B1 * | 5/2005 | Stallman | F41H 13/00 345/157 |
| 7,100,437 | B2 * | 9/2006 | Johnson | F41A 19/01 73/167 |
| 7,142,644 | B2 | 11/2006 | Lockwood | |
| 7,143,644 | B2 * | 12/2006 | Johnson | F41A 19/01 73/167 |
| 7,188,444 | B2 | 3/2007 | Danner et al. | |
| 7,353,034 | B2 | 4/2008 | Haney | |
| 7,499,713 | B2 | 3/2009 | Gasbarro et al. | |
| 7,602,329 | B2 | 10/2009 | Manderville et al. | |
| 8,016,594 | B2 * | 9/2011 | Ferris | F41A 33/00 434/21 |
| 8,046,946 | B2 * | 11/2011 | Packer | F41A 19/01 42/1.01 |
| 8,069,605 | B2 * | 12/2011 | Fressola | H05C 1/06 42/1.08 |
| 8,334,766 | B2 | 12/2012 | Terán-Matus et al. | |
| 8,339,257 | B2 * | 12/2012 | Cazanas | F41A 19/01 367/136 |
| 8,353,121 | B2 | 1/2013 | Clark et al. | |
| 8,387,295 | B2 * | 3/2013 | Glock | F41A 19/01 42/1.02 |
| 8,563,908 | B1 | 10/2013 | Lew et al. | |
| 8,597,025 | B2 | 12/2013 | Belenkii et al. | |
| 8,686,576 | B1 * | 4/2014 | Smith | F03G 7/08 290/1 R |
| 8,706,440 | B2 * | 4/2014 | McNelis | F41A 19/01 434/21 |
| 8,720,092 | B2 | 5/2014 | Beretta et al. | |
| 8,726,556 | B1 | 5/2014 | Willingham | |
| 8,733,006 | B2 * | 5/2014 | Williams | F41A 19/01 42/1.01 |
| 8,739,672 | B1 | 6/2014 | Kelly | |
| 8,783,575 | B2 | 7/2014 | Finlayson et al. | |
| 8,818,829 | B2 | 8/2014 | Delia et al. | |
| 8,826,575 | B2 * | 9/2014 | Ufer | F41A 19/01 42/1.03 |
| 8,947,252 | B2 | 2/2015 | Wilson | |
| 9,115,944 | B2 | 8/2015 | Arif et al. | |
| 9,200,870 | B1 | 12/2015 | Theel | |
| 9,395,132 | B2 | 7/2016 | Stewart et al. | |
| 9,470,485 | B1 * | 10/2016 | Kley | F42C 19/0807 |
| 9,564,043 | B2 * | 2/2017 | Sanders | F41C 33/029 |
| 9,605,926 | B1 * | 3/2017 | Means | F41J 5/14 |
| 9,677,840 | B2 * | 6/2017 | Rublowsky | A63F 13/213 |
| 9,728,095 | B1 | 8/2017 | Baxter | |
| 9,752,840 | B1 * | 9/2017 | Betro | H04W 4/029 |
| 9,816,783 | B1 * | 11/2017 | Means | F41J 9/08 |
| 9,886,833 | B2 | 2/2018 | Noland et al. | |
| 9,897,407 | B2 * | 2/2018 | Kramer | H04N 5/77 |
| 9,945,640 | B2 | 4/2018 | Lyren et al. | |
| 9,958,228 | B2 * | 5/2018 | Stewart | F41C 33/029 |
| 9,998,895 | B1 * | 6/2018 | Schuler | H04W 4/02 |
| 10,036,608 | B2 * | 7/2018 | Hunt | F41A 33/06 |
| 10,107,583 | B2 | 10/2018 | Stewart et al. | |
| 10,302,397 | B1 | 5/2019 | Means et al. | |
| 10,330,414 | B2 | 6/2019 | Gering | |
| 10,340,960 | B2 | 7/2019 | Armstrong et al. | |
| 10,354,169 | B1 | 7/2019 | Law et al. | |
| 10,359,250 | B2 | 7/2019 | Carlson | |
| 10,362,278 | B1 | 7/2019 | Palazzolo et al. | |
| 10,386,143 | B2 | 8/2019 | Jones et al. | |
| 10,403,123 | B2 | 9/2019 | Hodge | |
| 10,436,534 | B2 * | 10/2019 | Stewart | H04W 4/029 |
| 10,495,398 | B2 * | 12/2019 | Kramer | F41A 17/063 |
| 10,502,531 | B2 | 12/2019 | Almagor et al. | |
| 10,578,403 | B2 | 3/2020 | Kapogianis et al. | |
| 10,657,614 | B2 | 5/2020 | Clawson | |
| 10,810,862 | B2 | 10/2020 | Hodge | |
| 10,852,088 | B2 | 12/2020 | Urwin-Wright et al. | |
| 10,869,159 | B1 | 12/2020 | Nguyen | |
| 10,890,415 | B2 * | 1/2021 | Kapogianis | F41A 17/063 |
| 10,922,992 | B2 * | 2/2021 | Kur | G06F 3/013 |
| 11,041,685 | B2 | 6/2021 | Black et al. | |
| 11,060,813 | B2 | 7/2021 | Black et al. | |
| 11,131,522 | B2 * | 9/2021 | Stewart | F41C 33/029 |
| 11,156,419 | B1 | 10/2021 | Wang et al. | |
| 11,293,710 | B2 | 4/2022 | Deng et al. | |
| 11,371,809 | B1 | 6/2022 | Lo | |
| 11,454,470 | B2 | 9/2022 | Mcclellan et al. | |
| 11,561,058 | B2 | 1/2023 | Canty et al. | |
| 11,566,861 | B2 | 1/2023 | Weiss et al. | |
| 11,680,774 | B2 | 6/2023 | Wichner | |
| 11,740,044 | B2 | 8/2023 | Wang et al. | |
| 2002/0115444 | A1 | 8/2002 | Yu et al. | |
| 2003/0028536 | A1 | 2/2003 | Singh et al. | |
| 2004/0200109 | A1 | 10/2004 | Vasquez | |
| 2005/0119801 | A1 | 6/2005 | Florentin et al. | |
| 2007/0115955 | A1 | 5/2007 | Byer et al. | |
| 2007/0244673 | A1 | 10/2007 | Khosla et al. | |
| 2008/0282595 | A1 | 11/2008 | Clark et al. | |
| 2009/0037374 | A1 | 2/2009 | Delia et al. | |
| 2010/0196859 | A1 | 8/2010 | Saugen et al. | |

(56) References Cited

U.S. PATENT DOCUMENTS

| | | | | |
|---|---|---|---|---|
| 2010/0221685 | A1 | 9/2010 | Carter | |
| 2010/0250319 | A1 | 9/2010 | Khosla et al. | |
| 2010/0272443 | A1 | 10/2010 | Hunt | |
| 2010/0315235 | A1 | 12/2010 | Adegoke et al. | |
| 2010/0324859 | A1 | 12/2010 | McNelis et al. | |
| 2011/0162245 | A1 | 7/2011 | Kamal et al. | |
| 2011/0173869 | A1 | 7/2011 | Uhm | |
| 2011/0207089 | A1 | 8/2011 | Lagettie et al. | |
| 2011/0271822 | A1 | 11/2011 | Myr | |
| 2012/0062388 | A1* | 3/2012 | Wilson | G01S 5/06 705/317 |
| 2012/0183928 | A1 | 7/2012 | Finlayson et al. | |
| 2012/0231423 | A1 | 9/2012 | Reardon et al. | |
| 2013/0193645 | A1 | 8/2013 | Kazakov et al. | |
| 2013/0337415 | A1 | 12/2013 | Huet | |
| 2014/0023995 | A1 | 1/2014 | Jones et al. | |
| 2014/0167954 | A1 | 6/2014 | Johnson et al. | |
| 2014/0290109 | A1 | 10/2014 | Stewart et al. | |
| 2014/0295380 | A1 | 10/2014 | Amis et al. | |
| 2014/0378088 | A1* | 12/2014 | Goel | H04W 4/029 455/404.2 |
| 2015/0285599 | A1 | 10/2015 | Downing | |
| 2015/0300786 | A1* | 10/2015 | Downing | F41G 3/04 235/404 |
| 2016/0025462 | A1 | 1/2016 | Downing et al. | |
| 2016/0033221 | A1 | 2/2016 | Schmehl et al. | |
| 2016/0169603 | A1 | 6/2016 | Stewart et al. | |
| 2016/0173832 | A1 | 6/2016 | Stewart et al. | |
| 2016/0232774 | A1 | 8/2016 | Noland et al. | |
| 2016/0305740 | A1 | 10/2016 | O'donnell et al. | |
| 2017/0051993 | A1 | 2/2017 | Imbriano et al. | |
| 2017/0061781 | A1 | 3/2017 | Ware et al. | |
| 2017/0074617 | A1 | 3/2017 | Stewart et al. | |
| 2017/0146319 | A1 | 5/2017 | Lyren | |
| 2017/0160041 | A1 | 6/2017 | Stewart et al. | |
| 2017/0241727 | A1* | 8/2017 | Stewart | F41A 17/08 |
| 2017/0248388 | A1 | 8/2017 | Young et al. | |
| 2017/0284754 | A1 | 10/2017 | Chakraborty et al. | |
| 2018/0051950 | A1 | 2/2018 | Gering | |
| 2018/0274876 | A1 | 9/2018 | Stewart et al. | |
| 2018/0306548 | A1 | 10/2018 | Hunt | |
| 2018/0374380 | A1 | 12/2018 | Ford | |
| 2019/0003804 | A1 | 1/2019 | Deng et al. | |
| 2019/0197369 | A1 | 6/2019 | Law et al. | |
| 2019/0281259 | A1 | 9/2019 | Palazzolo | |
| 2020/0003511 | A1 | 1/2020 | Deng et al. | |
| 2020/0003512 | A1 | 1/2020 | Deng et al. | |
| 2020/0011629 | A1 | 1/2020 | Deng et al. | |
| 2020/0117900 | A1 | 4/2020 | Deng et al. | |
| 2020/0143649 | A1 | 5/2020 | Coonley et al. | |
| 2020/0202136 | A1 | 6/2020 | Shrestha et al. | |
| 2020/0202184 | A1 | 6/2020 | Shrestha et al. | |
| 2020/0232737 | A1 | 7/2020 | McClellan et al. | |
| 2020/0333096 | A1 | 10/2020 | Galie et al. | |
| 2020/0355454 | A1 | 11/2020 | Deng et al. | |
| 2020/0355455 | A1 | 11/2020 | Deng et al. | |
| 2020/0355456 | A1 | 11/2020 | Deng et al. | |
| 2020/0355457 | A1 | 11/2020 | Deng et al. | |
| 2020/0378708 | A1 | 12/2020 | Deng et al. | |
| 2020/0386499 | A1 | 12/2020 | Deng et al. | |
| 2021/0010771 | A1 | 1/2021 | Deng et al. | |
| 2021/0071972 | A1 | 3/2021 | Deng et al. | |
| 2021/0080207 | A1 | 3/2021 | Deng et al. | |
| 2021/0104148 | A1 | 4/2021 | Hodge | |
| 2021/0116197 | A1 | 4/2021 | Deng et al. | |
| 2021/0164752 | A1* | 6/2021 | Stewart | H04N 7/188 |
| 2021/0180898 | A1 | 6/2021 | Deng et al. | |
| 2021/0207907 | A1 | 7/2021 | Deng et al. | |
| 2021/0207908 | A1 | 7/2021 | Deng et al. | |
| 2021/0207909 | A1 | 7/2021 | Deng et al. | |
| 2021/0207910 | A1 | 7/2021 | Deng et al. | |
| 2021/0207911 | A1 | 7/2021 | Deng et al. | |
| 2021/0207912 | A1 | 7/2021 | Deng et al. | |
| 2021/0389071 | A1 | 12/2021 | Sitrick et al. | |
| 2021/0389080 | A1 | 12/2021 | Mcmillan et al. | |
| 2022/0214124 | A1 | 7/2022 | Leonhardt et al. | |
| 2022/0412684 | A1 | 12/2022 | Staiger et al. | |
| 2023/0038950 | A1 | 2/2023 | Abreo | |
| 2023/0046334 | A1 | 2/2023 | Arbouw et al. | |

FOREIGN PATENT DOCUMENTS

| | | | |
|---|---|---|---|
| GB | 2397914 | A | 8/2004 |
| RU | 2416778 | C2 | 4/2011 |
| WO | 2008048116 | A1 | 4/2008 |
| WO | 2008147820 | A1 | 12/2008 |
| WO | 2018140835 | A1 | 8/2018 |

OTHER PUBLICATIONS

International Search Report and Written Opinion for International Application No. PCT/US2022/023027 mailed Jun. 21, 2022.

European Search Report for EP Application No. 23183669.3 mailed Jan. 25, 2024.

European Search Report for EP Application No. 2318674.3 mailed Jan. 29, 2024.

European Search Report for EP Application No. 22782284.8 mailed Jan. 27, 2025.

U.S. Appl. No. 17/524,302, filed Nov. 11, 2021.

Henthorn, T et al., "International Infantry & Joint Services Small Arms Systems Symposium, Exhibition & Firing Demonstration" (2009), Las Vegas, NV, May 2009—https://apps.dtic.mil/sti/tr/pdf/AD1008961.pdf.

European Search Report for EP Application No. 18744231 mailed Oct. 16, 2020.

European Search Report for EP Application No. 19871033 mailed Jun. 2, 2022.

International Search Report and Written Opinion for International Application No. PCT/US2019/055925 mailed Feb. 5, 2020.

International Search Report and Written Opinion for International Application No. PCT/US22/23027 mailed Jun. 21, 2022.

Extended European Search Report for EP Application No. 23183687.5 mailed Jan. 22, 2024.

* cited by examiner

WEAPON USAGE MONITORING SYSTEM HAVING DISCHARGE EVENT MONITORING USING IDENTIFICATION ALGORITHM

CROSS-REFERENCE TO RELATED APPLICATIONS

This application is a continuation of U.S. application Ser. No. 18/143,404 filed May 4, 2023, which claims priority to U.S. Provisional Application No. 63/455,852 filed on Mar. 30, 2023. U.S. application Ser. No. 18/143,404 filed May 4, 2023 is a continuation of International Application No. PCT/US2022/023027 filed on Apr. 1, 2022, which claims the benefit of U.S. Patent Application Nos. 63/169,283 filed on Apr. 1, 2021 and 63/216,037 filed on Jun. 29, 2021. U.S. application Ser. No. 18/143,404 filed May 4, 2023 is a continuation of U.S. patent Ser. No. 17/524,302 filed on Nov. 11, 2021, which is a continuation of U.S. patent application Ser. No. 16/995,990, filed Aug. 18, 2020, and published on Dec. 3, 2020 as U.S. Patent Publication 2020/0378708 which is a bypass continuation of International Patent Application No. PCT/US2019/055925, filed Oct. 11, 2019, and published on Apr. 16, 2020, as Publication No. WO/2020/077254, which claims the benefit of U.S. Provisional Patent Application Ser. No. 62/745,028, filed Oct. 12, 2018. U.S. patent Ser. No. 17/524,302 is also a continuation of U.S. patent application Ser. No. 16/599,976 filed Oct. 11, 2019, and published on Apr. 16, 2020 as U.S. Patent Publication 2020/0117900. U.S. application Ser. No. 18/143,404 filed May 4, 2023 is a continuation of U.S. patent Ser. No. 17/524,302 is also a continuation of U.S. patent application Ser. No. 16/460,348 filed Jul. 2, 2019, and published on Jan. 2, 2020 as U.S. Patent Publication 2020/0003512, which is a bypass continuation of International Patent Application No. PCT/US2018/015614, filed Jan. 27, 2018, and published on Aug. 2, 2018, as Publication No. WO/2018/140835, which claims the benefit of U.S. Provisional Patent Application Ser. No. 62/451,620, filed Jan. 27, 2017. Each of the above-identified applications are hereby incorporated by reference as if fully set forth in its entirety.

BACKGROUND

Typically, firearm tracking systems have been very limited, often requiring complex manufacturing steps in order to enable a determination of whether a weapon has been used. These systems typically have issues with reliability, have poor performance (e.g., short battery life), lack the ability to add new features, and suffer other limitations. Separately, systems for providing remote support to firearm users are also typically very limited. For example, a remote support user monitoring a deployment of firearm users within a deployment location, such as a combat zone, relies on the information reported to him or her in order to make appropriate decisions regarding providing support for those users. However, these conventional systems require a remote support user to manually analyze information about the firearm users and to manually determine how to support those firearm users, which may, in at least some cases, take more time than is available. For example, during an active fire fight between firearm users and hostile combatants, the amount of time it takes to determine to deploy reinforcements, deliver additional ammunition, or otherwise support the firearm users can dictate the success of the engagement. Accordingly, a need exists for improved systems that involve recording and tracking activities of individuals, including more advanced methods and systems for tracking discharges from firearms and more advanced methods for monitoring conditions of firearms, other assets, and users within a deployment location and automating actions to perform for remotely supporting those firearm users, such as in preparation for, during, and/or after an engagement with a hostile threat.

SUMMARY

A method for determining a discharge event of a firearm includes receiving, by an event detection module, a plurality of input signals over a sample window of time from a first inertial measurement unit (IMU) configured on the firearm. The plurality of input signals are assigned to sample event candidates at respective windows of time. An identification algorithm is created and ran at a machine learning module of the event detection module using the plurality of input signals. An occurrence of a shot discharge is identified at the machine learning module based on an output of the identification algorithm.

In embodiments, a safety selector switch signal is received by the event detection module from a safety selector switch sensor configured on the firearm, the safety selector switch signal corresponding to a position of the safety switch. The identifying is further based on the safety selector switch signal. A trigger actuation signal is received by the event detection module from a trigger pull sensor assembly configured on the firearm, the trigger pull sensor signal corresponding to a position of a trigger of the firearm. An audio signal is received by the event detection module from an audio sensor configured on the firearm. The identifying is further based on the audio input signal. A pressure input signal is received by the event detection module from a pressure sensor configured on the firearm. The identifying is further based on the pressure input signal. A magnetic field signal is received by the event detection module from a magnetometer configured on the firearm. The identifying is further based on the magnetic field signal. A thermal input signal can be received by a thermal sensor configured on the firearm. The identification algorithm can be confirmed to determine whether a temperature threshold has been exceeded based on the thermal input signal and generate an alert indicative of the temperature threshold being exceeded.

In embodiments, a second plurality of input signals can be received by the event detection module over the sample window of time from a second IMU configured on the firearm, wherein the first IMU is configured for a first gravity sensitivity and the second IMU is configured for a second gravity sensitivity, wherein the first and second sensitivities are distinct. The first gravity sensitivity is +/−16G and the second gravity sensitivity is +/−200G. The plurality of input signals include acceleration and rotation input signals from the first IMU. Respective acceleration and rotation input signals are assigned to sample event candidates at respective windows of time of the sample window of time. The acceleration signals of the sampled event candidates are compared to a discharge acceleration template that represents a confirmed weapon discharge event. A subset of accepted accelerations are identified from the sampled event candidates that satisfy the discharge acceleration template. A first rotation input signal from the sample window of time associated with each accepted acceleration in the subset is compared to a first rotation template that represents a confirmed weapon discharge event. A determination is made whether the sampled event candidate is a discharge event based on satisfying both the discharge acceleration template and the first rotation template.

In examples, receiving the plurality of input signals comprises receiving a first acceleration input signal along a first axis, a second acceleration input signal along a second axis and a third acceleration input signal along a third axis. A first rotation input signal around the first axis, a second rotation input signal around the second axis and a third acceleration input signal around the third axis are received. A combined acceleration plot representing a combination of the first, second and third acceleration input signals is generated, wherein the discharge acceleration template is compared to the combined acceleration plot. The first rotation input signal corresponds to a first rotation of the firearm around the first axis. The first axis is generally transverse to an axis of a barrel of the firearm, wherein the first rotation around the first axis corresponds to a barrel of the firearm rotating initially (i) in a first direction around the first axis resulting from a shot being fired; and subsequently (ii) in a second opposite direction around the first axis resulting from rebound of the firearm after the shot is fired.

In other examples, a second rotation input signal is compared with a second rotation template, distinct from the first rotation template and that represents a confirmed weapon discharge event, the second rotation input signal taken from the sample window of time associated with each accepted acceleration, wherein the second rotation input signal corresponds to a second rotation of the firearm around the second axis. The second axis is generally parallel to an axis of the barrel of the firearm, wherein the second rotation around the second axis corresponds to a barrel of the firearm rotating as a result from a bullet rotating while translating within the barrel during discharge. Determining can further be based on satisfying the second rotation template.

A system for providing discharge monitoring of a firearm can include an inertial measurement unit (IMU) and an event detection module. The IMU is disposed on the firearm and senses accelerations. The event detection module receives a plurality of input signals from the IMU indicative of the accelerations. The event detection module assigns the plurality of input signals to sample event candidates at respective windows of time, creates and runs an identification algorithm at a machine learning module using the plurality of input signals. An occurrence of a shot discharge is identified based on an output of the identification algorithm.

In examples, the safety selector switch sends a safety selector switch signal indicative of a position of a safety selector on the firearm. The event detection module identifies the occurrence of a shot discharge further based on the safety selector switch signal. A trigger pull sensor assembly can send a trigger actuation signal indicative of a position of a trigger on the firearm. The event detection module identifies the occurrence of a shot discharge further based on the trigger actuation signal. The trigger pull sensor assembly senses mechanical movement of a trigger of the firearm, the trigger pull sensor communicates a trigger actuation signal to the signal processing module corresponding to a position of the trigger, wherein the event detection signal is further based on the trigger actuation signal. The trigger pull sensor assembly can further include a contact sensor disposed on the grip housing configured to move between a depressed position and an extended position, a grip screw that threadably mates to a body of the firearm, the grip screw defining a pocket that at least partially receives the contact sensor, and a plunger assembly disposed in the grip screw and that mechanically communicates motion of the trigger into motion of the contact sensor.

In examples, movement of the contact sensor between the depressed position and the extended position causes a circuit in the event detection module to change status indicative of actuation of the trigger. The contact sensor is biased toward the extended position by a contact sensor biasing member. The plunger assembly can further include a trigger side plunger that engages the trigger, a sensor side plunger that engages the contact sensor; and a plunger biasing member disposed intermediate the trigger side plunger and the sensor side plunger and that biases the trigger side plunger toward the plunger and biases the sensor side plunger toward the contact sensor. Rotation of the trigger causes the plunger assembly to translate away from the contact sensor such that the bias of the contact sensor biasing member overcomes the bias of the plunger biasing member such that the contact sensor moves from the depressed position to the extended position

BRIEF DESCRIPTION OF THE FIGURES

The detailed description of some embodiments of the present disclosure is made below with reference to the accompanying figures, wherein like numerals represent corresponding parts of the figures.

DETAILED DESCRIPTION

Figure 1:
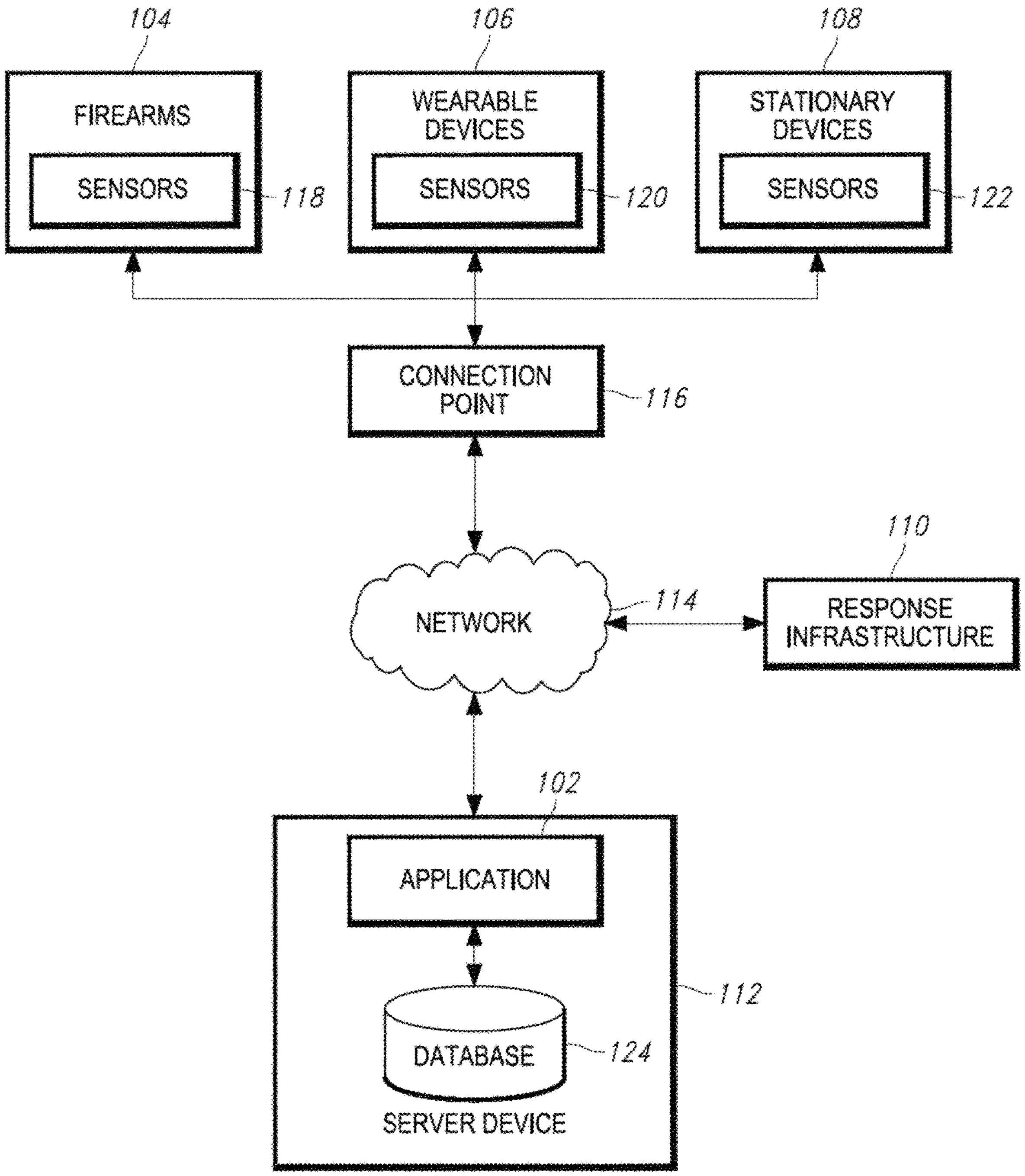
FIG. 1 is a diagrammatic view of a firearm monitoring and remote support system in accordance with embodiments of the present disclosure.

By way of example, and referring to FIG. 1, an embodiment of firearm monitoring and remote support system 100 includes firearm monitoring and remote support application 102 which processes signals received from one or more of firearms 104, wearable devices 106, or stationary devices 108 to detect and assess threats against users of firearms 104. For example, the signals received from firearms 104, wearable devices 106, and/or stationary devices 108 can be processed to determine whether and how to respond to a threat against the users of firearms 104, including by automating a deployment of response infrastructure 110 to a location of or proximate to the users of firearms 104. Application 102 is run, executed, interpreted, or otherwise operated at server device 112, which communicates, directly or indirectly, with firearms 104, wearable devices 106, and/or stationary devices 108 using network 114 and connection point 116.

The application 102 is software for monitoring users within a deployment location. The users are humans or non-human entities (e.g., mobile or stationary robots). The users operate firearms 104 and wear wearable devices 106. In embodiments, the users may operate stationary devices 108. Alternatively, stationary devices 108 may be operated without action by the users. A user may be mobile or stationary, for example, based on whether they are human or non-human and/or based on a directive of the user. For example, a user who operates a sniper rifle or other heavy powered weaponry or machinery may in some cases be considered a stationary user. The deployment location is a geographic region including one or more terrain types and may be wholly developed (e.g., a city or other urban environment area), partially developed (e.g., a relatively small or rural living area), or wholly undeveloped (e.g., a mountainous, forested, desert, or other natural area). In particular, the deployment location represents a location to which one or more users are deployed. For example, the one or more users may be deployed to identify, address, or otherwise neutralize a hostile threat. In another example, the one or more users may be deployed to rescue hostages or otherwise assist civilians or friendly forces.

The signals received from firearms 104, wearable devices 106, and/or stationary devices 108 represent sensor information measured for firearms 104, wearable devices 106, and/or stationary devices 108. Firearms 104 include sensors 118, wearable devices 106 include sensors 120, and stationary devices 108 include sensors 122. Sensors 118, sensors 120, and sensors 122 include hardware sensors used to measure aspects of firearms 104, wearable devices 106, and stationary devices 108, respectively. For example, sensors 118, sensors 120, and sensors 122 may each include one or more of an accelerometer, a gyroscope, a magnetometer, a geolocation sensor, a moisture sensor, a pressure sensor, or the like. Sensors 118, sensors 120, and sensors 122 may each be embodied in inertial measurement units included within or otherwise coupled to firearms 104, wearable devices 106, and stationary devices 108, respectively. In embodiments, sensors 118, sensors 120, and sensors 122 may each include the same sensors. In embodiments, sensors 118, sensors 120, and sensors 122 may include partially or wholly different sensors.

The signals received from firearms 104, wearable devices 106, and/or stationary devices 108 are processed to monitor the status of firearms 104, wearable devices 106, and/or stationary devices 108. Application 102 can monitor the status of firearms 104, wearable devices 106, and/or stationary devices 108 by using the signals to update position and/or orientation information for firearms 104, wearable devices 106, and/or stationary devices 108, and/or for users thereof. The updated position and/or orientation information can provide details regarding current use of firearms 104, wearable devices 106, and/or stationary devices 108, for example, to indicate use states of firearms 104, wearable devices 106, and/or stationary devices 108 and/or to indicate how firearms 104, wearable devices 106, and/or stationary devices 108 are being used within the deployment region.

Monitoring the status of firearms 104 may include generating and/or updating information for visualizing or otherwise representing a cone of fire for firearms 104. A cone of fire, or cone, is or refers to an expected area of potential fire for a firearm 104. The endpoint of the sector of a cone represents a current location of a firearm 104. The remaining portion of the cone represents a potential area which, provided the firearm 104 remains stationary at the location represented by the endpoint of the sector), projectiles from the firearm 104 may be fired. The cones for firearms 104 may be visually represented by application 102, for example, within one or more GUIs generated and output by application 102. In embodiments, the size and layout of a cone can be defined based on one or both of the type of a firearm 104 corresponding to the cone or the skill of the user of the firearm 104. In embodiments, the size and layout of the cone can be determined using the errors in measurements from the IMU and GPS to represent the potential locations in which the projectile from the firearm may impact. By way of these examples, the shape of the cone of fire can be arbitrarily capped by the effective range of fire for the firearm and the round being used. In embodiments, the cone of fire can then be capped or otherwise set to a predetermined size and shape by the pre-determined skill rating associated with the skill of the user. In embodiments, larger caliber firearms may have an increased effective range of fire. As such, the bullet itself can have the potential to go well beyond the drawn cone of fire. For example, a larger firearm may have a longer cone than a smaller firearm. In another example, a skilled user who is capable of accurate marksmanship may have a smaller (e.g., narrower) cone than one who is less accurate, such as because the skilled user is statistically expected to more accurately hit a target. In yet another example, where learning models (e.g., of a machine learning system) determine that the user tends to fire too much to the left or right, the cone for that user can be accordingly projected. The application 102 monitors the status of firearms 104 including by performing real-time updates to cones corresponding to firearms 104. For example, where a GUI of application 102 visually represents users within a deployment location and shows cones, application 102 can automatically update locations and orientations of the cones, for example, based on signals received from firearms 104.

The signals received from firearms 104, wearable devices 106, and/or stationary devices 108 are further processed to detect threats within the deployment region, including by analyzing whether and/or how to respond to those detected threats. Application 102 can detect threats within the deployment region by using the signals received from firearms 104, wearable devices 106, and/or stationary devices 108 to determine whether users thereof are exposed to a threat or may become exposed to a threat. For example, the signals may be used to determine that firearms 104 have been drawn or otherwise moved into a readied position, for example, to prepare to engage a threat. In another example, the signals may be used to determine that firearms 104 are actively engaging a threat, for example, based on a detected firing of firearms 104 and/or based on a coalescence of cones of multiple firearms 104. In yet another example, the signals may be used to determine that ammunition supplies for some or all firearms 104 are running low or depleted. In yet another example, the signals may be used to automate a response to the threat, for example, by deploying reinforcements to assist in engaging the threat, by deploying additional ammunition resources to the deployment location, or otherwise.

The threat may be a human or non-human (e.g., robotic, vehicular, non-human animal, etc.) hostile which presents or may present a risk of harm to users of firearms 104, wearable devices 106, and/or stationary devices 108. For example, the threat may be one or more enemy combatants who possess weapons or other means to present a risk of harm to the users of firearms 104, wearable devices 106, and/or stationary devices 108, to civilians, or to other persons or assets friendly to the users of firearms 104, wearable devices 106, and/or stationary devices 108. In another example, the threat may be one or more robots or animals trained to attack the users of firearms 104, wearable devices 106, and/or stationary devices 108. The threat may alternatively be or refer to a condition or situation which presents a risk of harm to the users of firearms 104, wearable devices 106, and/or stationary devices 108, to civilians, or to other persons or assets friendly to the users of firearms 104, wearable devices 106, and/or stationary devices 108. For example, the threat may be or relate to a terrain element which presents a risk of bodily harm or obstructs a traveling path of the users of firearms 104, wearable devices 106, and/or stationary devices 108. In some cases, the threat may refer to terrain elements which are naturally occurring. In other cases, the threat may refer to terrain elements which present a risk of harm or obstruction because of actions taken by a hostile.

In response to a detected threat, application 102 may in some cases cause a deployment of response infrastructure 110 to the deployment location. Response infrastructure 110 includes or otherwise refers to assets or personnel used to assist in addressing the detected threat. For example, response infrastructure 110 may be or include unmanned aerial vehicles (UAVs) or other aircraft. The UAVs or other aircraft may be configured to drop ammunition re-supplies within the deployment location, for example, in response to application 102 determining that current ammunition supplies of one or more users of firearms 104 are running low or depleted before, during, or after an engagement with a detected threat. In another example, response infrastructure 110 may be or include transport vehicles used to transport reinforcements within the deployment location, for example, in response to application 102 determining that additional manpower is required or would be beneficial for engaging the detected threat. Response infrastructure 110 may be deployed to a location of connection point 116, for example, which may be known or determined using a geolocation sensor included within or otherwise coupled to connection point 116. Alternatively, a different location to which response infrastructure 110 is deployed may be determined by application 102.

In embodiments, response infrastructure 110 may refer to components, assets, or other matter rather than to specific infrastructure used to transport or otherwise deploy those components, assets, or other matter within the deployment location. For example, response infrastructure 110 may refer to firearms, ammunition, medical equipment, or other assets which can be deployed using a UAV, another aircraft, or another delivery mechanism. In embodiments, response infrastructure 110 may refer to locations, components, assets, or other matter which may not travel to the deployment location. For example, response infrastructure 110 may include or otherwise refer to one or more locations at which asset inventories (e.g., firearm, ammunition, medical, or other inventory stocks) are stored and/or to hardware or other machinery or assets at those locations.

Application 102 may process the signals received from firearms 104, wearable devices 106, and/or stationary devices 108 against information stored within database 124 to monitor firearms 104, wearable devices 106, and/or stationary devices 108 and/or to detect and analyze a threat. Database 124 stores information relating to firearms 104, wearable devices 106, and/or stationary devices 108. For example, the information relating to a firearm 104 stored within database 124 may include information about the firearm type, maximum amount of ammunition within a magazine, firing rate, maximum firing range, maintenance status, sensors included or coupled, or the like. Database 124 may also store information indirectly relating to a firearm 104, for example, information relating to ammunition types, inventory information (e.g., in a stockpile or warehouse from which reserves can be deployed for use in response to a detected threat), connected or connectable devices (e.g., wearable devices 106), or the like. Database 124 may also store information relating to users of firearms 104, for example, user information including names, ranks, years of service, skill levels, notable achievements, numbers of deployments, numbers of engagements, weapons currently possessed in the deployment location, ammunition stocks present in the deployment location, numbers of shots fired since arrival at the in the deployment location, health information, threat engagement information, or the like. In embodiments, information stored within database 124 relating to firearms may be retrieved from manufacturers, distributors, or other vendors of those firearms. For example, where access is available, application programming interface (API) calls can be made to retrieve the information from external systems which the manufacturers, distributors, or other vendors use to store such information. The information stored within database 124 may be included in a knowledgebase accessed by application 102. For example, the knowledgebase can represent a collection of knowledge associated with assets used by or with system 100, for example, for detecting and analyzing threats.

Connection point 116 is used to facilitate communications between firearms 104, wearable devices 106, and/or stationary devices 108 and network 114. Network 114 may be a network of computers (e.g., a local area network (LAN), a wide area network (WAN), a virtual private network (VPN), a peer-to-peer (P2P) network, or an intranet), or a network of networks (e.g., the Internet), or another network (e.g., a cellular network). Connection point 116 is a device configured to communicate over network 114. Connection point 116 may communicate with firearms 104, wearable devices 106, and/or stationary devices 108 over Ethernet, transmission control protocol (TCP), Internet protocol (IP), power line communication, Wi-Fi, Bluetooth®, infrared, radio frequency (RF), general packet radio services (GPRS), global system for mobile communications (GSM), frequency-division multiple access (FDMA), code-division multiple access (CDMA), evolution-data optimized (EVDO), Z-Wave, ZigBee, 3G, 4G, 5G, another protocol, or a combination thereof. In embodiments, connection point 116 may be a router, beacon, wireless connection point (e.g., a Wi-Fi connection point), lighting system, camera, or other network-connected devices.

In embodiments, connection point 116 may be one of a number of connection points deployed within the deployment location. For example, each connection point may be configured to facilitate communications for certain ones of firearms 104, wearable devices 106, and/or stationary devices 108. In another example, bandwidth limitations or other constraints may reduce the connection strength or status between connection point 116 and ones of firearms 104, wearable devices 106, and/or stationary devices 108, in which case other connection points located elsewhere in the deployment location may be leveraged for redundancies and back-up communication mechanisms.

In embodiments, connection point 116 may be included in or otherwise use a mesh network to facilitate communications between server device 112 and one or more of firearms 104, wearable devices 106, or stationary devices 108 over network 114. The mesh network may be or represent a network of connections between firearms 104, wearable devices 106, stationary devices 108, connection points (e.g., connection point 116), and/or other devices, such as response infrastructure 110, mobile robots, or the like. The mesh network may form part of a large mesh network, allowing devices, such as firearms and mobile robots, to communicate directly with one another, rather than having to first connect through a centralized network communication hub, or as a supplement to communication by one or more devices to such a hub.

In embodiments, application 102 processes signals received from assets other than firearms 104, wearable devices 106, and/or stationary devices 108. For example, instead of or in addition to signals received from firearms 104, wearable devices 106, and/or stationary devices 108, application 102 can process signals received from one or more of vehicles, mortars, and/or other trackable assets. Each of the vehicles, mortars, and/or other trackable assets may include one or more sensors, which may be the same or different from one or more of sensors 118, sensors 120, and/or sensors 122.

In embodiments, some or all users within a deployment location may be underground. In such a case, system 100 can use geolocation systems (e.g., a global navigation satellite system, for example, the global positioning system (GPS), the global navigation satellite system (GLONASS), the BeiDou navigation satellite system (BDS), Galileo, or the like) to track subterranean locations of users. In some such embodiments, assets such as body cameras, heads-up displays, or the like may be used to supplement subterranean tracking of users.

In embodiments, server device 112 may be part of a cloud computing infrastructure. For example, application 102 may be or represent functionality of a software-as-a-service (SaaS) or platform-as-a-service (PaaS) cloud system. In such embodiments, application 102 may be a single- or multi-instance software application run using one or more web servers, application servers, hypervisors, or the like. In such embodiments, server device 112 may be or include a hardware server (e.g., a computing device), a software server (e.g., a web server and/or a virtual server), or both. For example, where server device 112 is or includes a hardware server, server device may be a computing device located in a rack, such as of a data center.

In embodiments, connection point 116 may use or otherwise include an efficient architecture and components for low power consumption, including energy harvesting mechanisms, such as harvesting the energy of motion of firearms 104 and/or wearable devices 106 or energy from the recoil of firearms 104 to provide power for storage and/or reporting of data to the application 102. The energy harvesting mechanisms may also be configured to harvest local energy in the RF domain or other appropriate local electromagnetic signals of sufficient strength.

In embodiments, sensors 120 of wearable devices 106 may include or otherwise integrate with physiological monitors. A heart rate band or monitor can be an indicator of a distressed situation creating a notification. In embodiments, wearable devices 106 may integrate the Emergency Response Data communications architecture. In embodiments, wearable devices 106 may include body cameras which capture images and/or video. In such embodiments, sensors 120 of wearable devices 106 may include image sensors.

In embodiments, application 102 generates geofence-based alerts. For example, the geofence capability can be implemented around a warehouse where weapons are stored to track weapons for inventory control or threatening situations. In another example, the geofence capability can be implemented around a central area within the deployment location, for example, the connection point 116.

In embodiments, application 102 integrates with mobile device technology. Application 102 can send critical messages in a timely manner, such as through an app installed on a mobile phone or other mobile computing devices of a user of firearm 104. The app may be directly connected to dispatchers, such as allowing the caller to request assistance.

Figure 2:
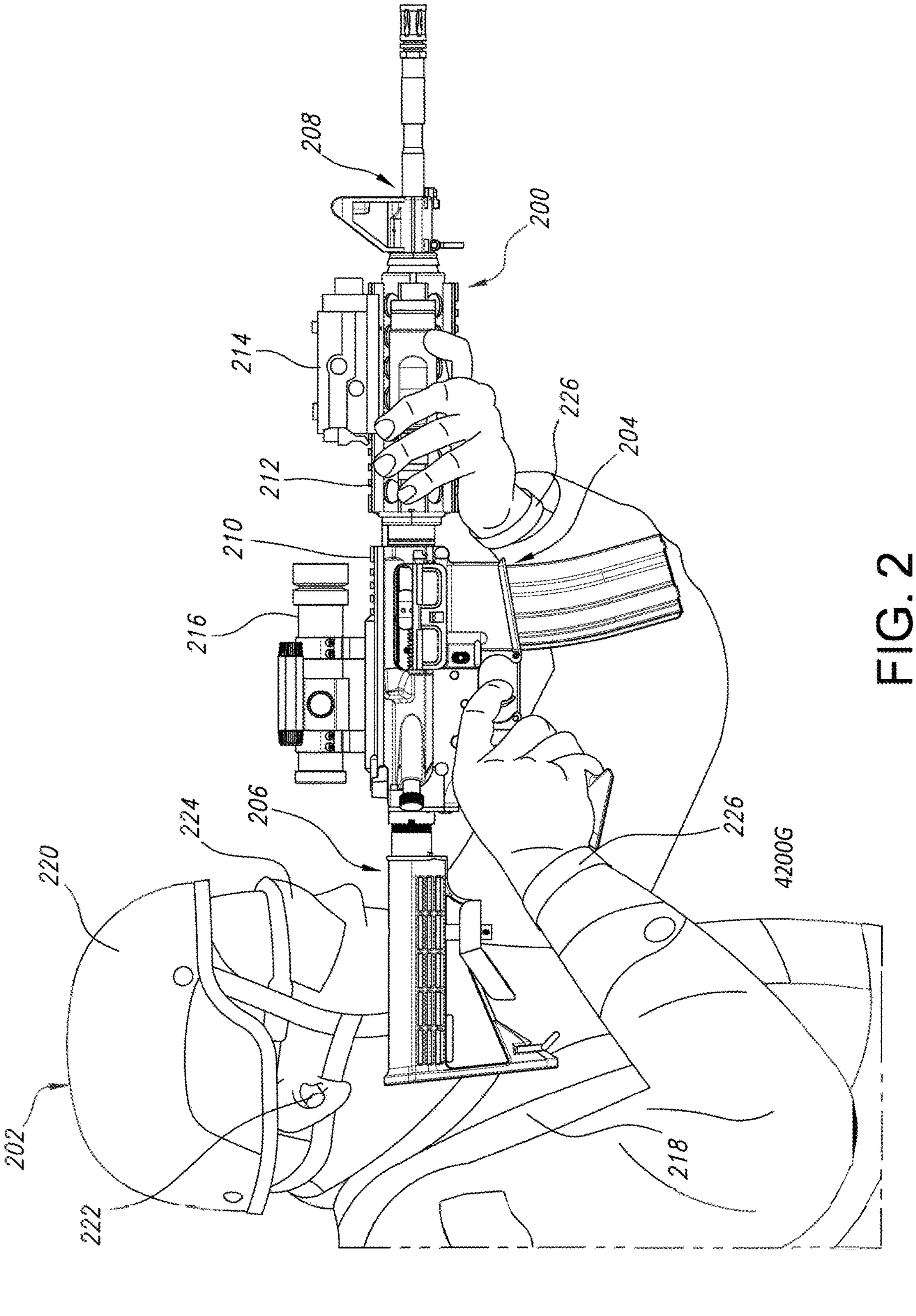
FIG. 2 is a side perspective view of a firearm in use in accordance with the embodiments of the present disclosure.

Referring to FIG. 2, firearm 200 is one of firearms 104 used in connection with system 100 and user 202 is the user of firearm 200. In the example shown, firearm 200 is depicted as an assault rifle. However, firearms which may be used in connection with a firearm monitoring and remote support system in accordance with the embodiments of this disclosure may be of other firearm types. For example, types of the firearms 104 other than assault rifles may include, but are not limited to, pistols, revolvers, shotguns, other rifles, or the like. Although the following discussion regarding firearm 200 is with respect to the structure of an assault rifle particularly, similar discussion with respect to other firearm types is understood, and it will be understood from the following discussion how sensors may be used with other firearm types.

In particular, the illustration of FIG. 2 is intended to describe locations of firearm 200 at which various sensors or other components may be included or coupled. Examples of sensors or other components which may be included in or coupled to the various locations shown include, but are not limited to, an IMU (e.g., including an accelerometer and/or a gyroscope), a geolocation sensor, a force connector, a power input, a battery charger, a laser, a regulator, a serial communication system component, a flash memory, a network interface, a programmable hardware unit, or the like.

Firearm 200 includes one or more structures for performing or facilitating operations typical of a firearm, for example, for storing ammunition, firing one or more projectiles from the ammunition, controlling the storage and firing of ammunition, and more. In embodiments, firearm 200 can include an action structure, a stock structure, and a barrel structure. In embodiments, firearm 200 can include one or more rails. A rail may, for example, be located on one or more of, or proximate to one or more of, the action structure, the stock structure, or the barrel structure.

The action structure is or refers to the structure of components which are used to handle and propel ammunition during firing. For example, the action structure may include one or more components which are used to load, lock, fire, extract, and/or eject ammunition or shells thereof. Depending on the particular type of firearm, the action structure may use a break action mechanism, a bolt action mechanism, a lever action mechanism, or another action mechanism. The action structure may include a charging handle used to move a hammer to a ready position for firing. The action structure may include a forward assist component that moves a bolt fully forward in the event a return spring fails to do so. The action structure may include a gas operating system which directs energy for operating a locked breech of the action mechanism. The action structure may include a hammer that strikes a firing pin or other component of the action mechanism to cause the combustion or compression which fires a projectile from the barrel structure of the firearm. The action structure may include an ejection port which uses forced gas or other energy resulting from the combustion or compression to eject an ammunition shell from the barrel structure of the firearm after the projectile thereof has been fired. The action structure may also include components other than those described above.

The stock structure is or refers to a structure of components which provide support to the action structure and/or to the barrel structure. In embodiments, the stock structure includes a butt and a fore-end. The butt and the fore-end may be included in a one-piece stock structure or in a two-piece stock structure. The butt includes a grip and a comb. The grip is a component which may be held by a user of the firearm during the operation of the firearm. The comb is a portion of the butt which supports a portion of a body of the user of the firearm during the operation of the firearm. A hook may be coupled to the butt of the stock structure, for example, to support a portion of a body of the user of the firearm during the operation of the firearm. The butt may be solid. Alternatively, the butt may be collapsible or telescoping. The fore-end may include a handguard for protecting a hand of a user of the firearm from heat generated at the barrel structure of the firearm during the operation of the firearm. The fore-end may in some cases include a portion of the action structure of the firearm. For example, the fore-end may include a pump component for a pump action shotgun or other pump action firearm. The stock structure may also include a trigger unit, which includes a trigger engaged by a user of the firearm and may also include a safety for selectively disengaging the operation of the trigger. The stock structure may also include a magazine well which receives a magazine and directs a projectile from a cartridge inserted in the magazine to a chamber of the barrel structure. In embodiments, the trigger unit and/or the magazine well may be included in the stock structure. In embodiments, the grip may be included in a portion of the stock structure other than the butt. In embodiments, the grip may be included in a component in contact with the stock structure instead of in the stock structure itself.

The barrel structure is or refers to a structure of components through which a projectile is fired, for example, using combustion or compression. In embodiments, the barrel structure includes a chamber, a muzzle, and a bore. The chamber is a cavity in which an ammunition cartridge is inserted and in which a projectile is stored until it is fired. The muzzle is the portion of the barrel structure through which a projectile is fired, and which is located at an end of the barrel structure opposite to the chamber. The muzzle may, in embodiments, include a coupling element, which may, for example, be or include a threaded engagement or another engagement. An accessory device for use with the firearm may be coupled to the coupling element on the muzzle or another portion of the barrel structure. For example, the accessory device may be coupled by a coupling element located above the muzzle when the firearm is oriented for normal operation. In such a case, for example, the accessory device may be a sight, a scope, or another accessory. In another example, the accessory device may be coupled by a coupling element located in front of the muzzle when the firearm is oriented for normal operation. In such a case, for example, the accessory device may be a flash hider, a suppressor, or another accessory. The bore is the hollow length of the barrel structure through which a projectile travels when fired. An internal surface of the bore may, in embodiments, be smooth or grooved to control or otherwise enable a projection of a projectile from the chamber to a location outside of the muzzle during firing.

A rail is or refers to a structure to which one or more accessories may be coupled for use during the operation of the firearm. A rail includes an interface mechanism for permanently or removably coupling accessories to the firearm. The interface mechanism may allow for one or more of slidable engagement of an accessory, slotted engagement of an accessory, threaded engagement of an accessory, snap-fit engagement of an accessory, friction-fit engagement of an accessory, or the like. The rail may be a Dovetail rail, a Weaver rail, a Warsaw Pact rail, a Picatinny rail, a KeyMod rail, a M-LOK rail, or a UIT rail, although other styles of rail are possible. In embodiments, the particular form of the interface mechanism may depend upon the style of the rail. A rail as used with a firearm according to the embodiments of this disclosure may be coupled to a surface of an action structure of a firearm (e.g., above an ejection port), a surface of a barrel structure of a firearm (e.g., above the chamber or a portion of the muzzle), or a surface of a stock structure of a firearm (e.g., above a handguard). Although a rail typically is located on an upper surface of a firearm structure with respect to an orientation of the firearm during use, in embodiments, a rail as disclosed herein may be located on another surface, or on a combination of surfaces, of one or more firearm structures. Examples of accessories which may be coupled to a rail include, without limitation, scopes, sights (e.g., laser sights, iron sights, reflector sights, holographic sights, or the like), tactical lights, and vertical forward grips.

In embodiments, components described above as being included in the action structure, as being included in the stock structure or being in contact with the stock structure, or as being included in the barrel structure, may instead be included in one of a lower receiver unit of the firearm or an upper receiver unit of the firearm. In embodiments, components described herein as being included in the stock structure may instead be included in the lower receiver unit and/or the upper receiver unit, or both. In embodiments, one or more rails and/or components coupled to rails as described above may be included in the lower receiver unit and/or the upper receiver unit.

Firearm 200 includes action structure 204, stock structure 206, and barrel structure 208. Action structure 204 is shown as including charging handle, bolt, and ejection port. Stock structure 206 is shown as including grip, comb, handguard, trigger unit, magazine well, and magazine. Barrel structure 208 is shown as including muzzle, accessory device (e.g., a suppressor), and accessory device (e.g., a sight assembly). Firearm 200 further includes first rail 210 and second rail 212. Each of the rails 210 and 212 includes an interface mechanism for permanently or removably coupling one or more accessories to firearm 200. For example, first accessory 214 (e.g., a laser sight and/or tactical light) is coupled to rail 212 and second accessory 216 (e.g., a scope) is coupled to rail 210. In embodiments, other components and/or other numbers of components may be coupled to rail 210 and/or to rail 212. In embodiments, action structure 204, stock structure 206, and barrel structure 208 may include components other than or in addition to what is shown in FIG. 2.

In embodiments, a firearm used in connection with a firearm monitoring and remote support system in accordance with the embodiments of the present disclosure can include structures other than an action structure, a stock structure, a barrel structure, and/or one or more rails. For example, in embodiments, such a firearm can include a cylinder structure including multiple chambers for storing a projectile to be fired. For example, the firearm may be a revolver or another firearm with a structure for rotating multiple chambers into alignment with the bore of the barrel structure. In another example, in embodiments, such a firearm may omit the stock structure. For example, the firearm may be a pistol or other handgun in which components such as the grip and/or trigger are coupled to the rest of the firearm by a structure other than a stock structure. In another example, in embodiments, such a firearm may include a stock structure that omits the butt. For example, the firearm may be a pistol or other handgun which includes a stock structure that structurally supports the action structure and/or the barrel structure, but in which contact with the user is intended to be limited to the grip. It is to be understood that other firearm embodiments as are currently known or which are later developed may be used to implement or otherwise integrate one or more of the methods and systems disclosed herein.

Assets used in connection with a firearm monitoring and remote support system in accordance with the embodiments of the present disclosure may be located within or otherwise positioned with respect to certain structures and/or certain components of structures used in connection with firearm 200. Examples of such structures are shown in FIG. 2 as wearable devices worn by user 202 of firearm 200. The examples include outerwear 218, helmet 220, earpiece 222, eyeglasses 224, and wristbands 226. Outerwear 218 may be or include a vest, a jacket, a shirt, or another wearable item. Helmet 220 may be a helmet or another head covering or combination of head coverings. Earpiece 222 is an in-ear device for receiving audio from a remote source. In embodiments, earpiece 222 may include a microphone for recording audio for transmission to another in-ear device or to a remote source. In embodiments, earpiece 222 may be a hearing guard, such as a plug for blocking the ear canal of user 202. In such an embodiment, earpiece 222 may omit audio communication functionality. Eyeglasses 224 are a cover for one or both eyes of user 202. Wristbands 226 are wearable devices worn around the wrists of user 202. Although one wristband 226 is shown on each arm of user 202, in embodiments, user 202 may wear a wristband 226 on only one arm, or user 202 may wear more than one wristbands 226 on one or both arms. In embodiments, one or more of outerwear 218, helmet 220, earpiece 222, eyeglasses 224, or wristbands 226 may be embodied in a form factor other than what is shown as described. For example, one or both of wristbands 226 may be embodied as rings worn on fingers of user 202, as devices worn around a neck of user 202, as pins coupled to outerwear 218, or another form factor, or a combination thereof. In embodiments, outerwear 218 may be or include clothing or other wearable items which are not located worn as outerwear. For example, outerwear 218 may be or include an undershirt, a vest worn underneath outerwear, or another wearable item.

In embodiments, assets other than wearable devices used in connection with a firearm monitoring and remote support system in accordance with the embodiments of the present disclosure may be located within or otherwise positioned with respect to certain structures and/or certain components of structures used in connection with firearm 200. Although not shown in FIG. 2, examples of such other assets include mobile devices (e.g., cell phones, tablet computers, personal digital assistants (PDAs), mobile connection points, or the like) which may be possessed by the user and/or permanently or removably coupled to other assets (e.g., firearms, wearable devices, stationary devices, stationary connection points, or the like).

While examples of particular structures of a firearm and particular components of structures of a firearm are disclosed herein, such disclosure is not limiting as to the possible structures of components of structures of a firearm or as to the possible locations or positionings of components used by the methods and systems disclosed herein with respect to those structures or those components of structures. Accordingly, it is to be understood that components used by one or more of the methods and systems disclosed herein may be located or positioned in other locations or positions in or about a firearm, regardless of the particular structures disclosed herein by example.

Figure 3:
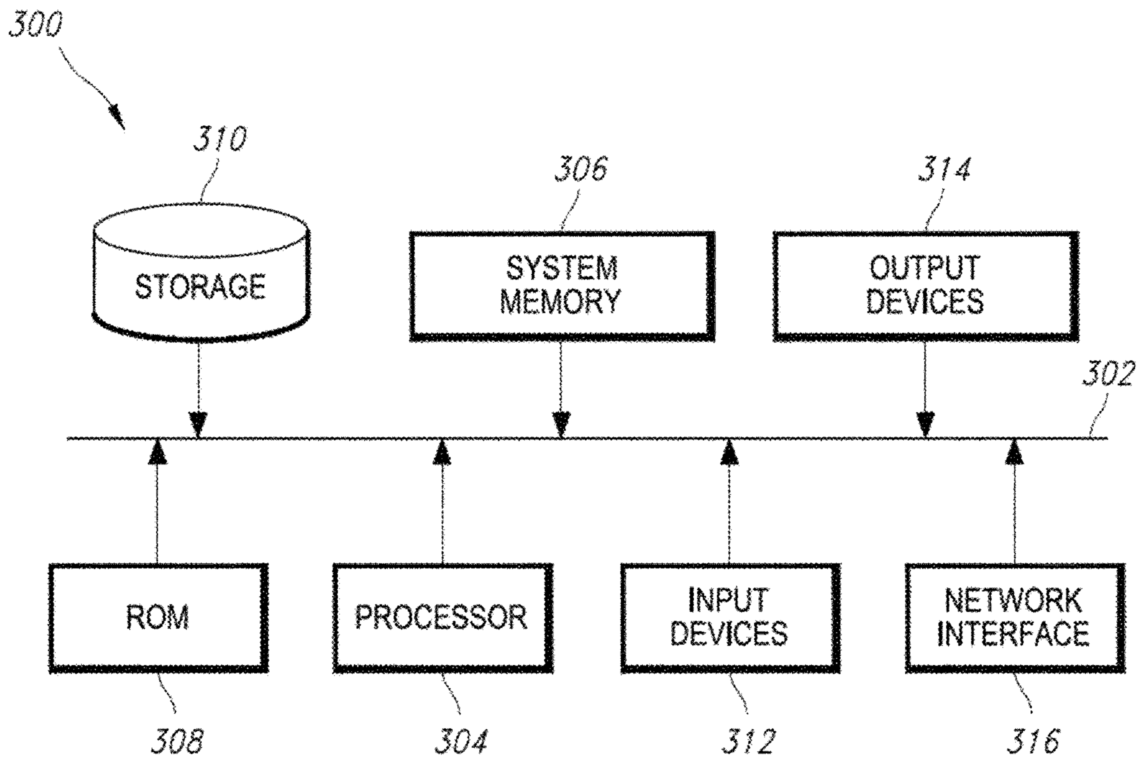
FIG. 3 is a diagrammatic view of an internal configuration of a computing device in accordance with embodiments of the present disclosure.

Referring to FIG. 3, computing device 300 is or refers to one or more of: server device 112; an electronic system within or otherwise coupled to a firearm 104, a wearable device 106, a stationary device 108, or response infrastructure 110; or another computer, phone, PDA, or other sort of electronic device used in connection with system 100.

Computing device 300 includes various types of computer readable media and interfaces for various other types of computer readable media. Computing device 300 includes bus 302, processing unit(s) 304, system memory 306, read-only memory (ROM) 308, permanent storage device 310, input devices 312, output devices 314, and network interface 316.

Bus 302 collectively represents all system, peripheral, and chipset buses that communicatively connect the numerous internal devices of the computing device 300. For instance, bus 302 communicatively connects processing unit(s) 304 with ROM 308, system memory 306, and permanent storage device 310. From these various memory units, processing unit(s) 304 retrieves instructions to execute and data to process in order to execute the many processes disclosed herein. The Processing unit(s) 304 may be or include a single processor or a multi-core processor in different embodiments. In embodiments, the system memory 306 could also be used as a buffer for data before the data is transmitted from the user. In embodiments, the system memory 306 could also be used as a buffer for data before being sent to storage, especially in situations where the data cannot be transmitted from the user.

ROM 308 stores static data and instructions that are needed by processing unit(s) 304 and other modules of computing device 300. Permanent storage device 310, on the other hand, is a read-and-write memory device. The Permanent storage device 310 is a nonvolatile memory unit that stores instructions and data even when computing device 300 is off. Some embodiments disclosed herein may use a mass-storage device (such as a magnetic or optical disk and its corresponding disk drive) as permanent storage device 310.

Other embodiments use a removable storage device (such as a floppy disk or a flash drive) as permanent storage device 310. Like permanent storage device 310, system memory 306 is a read-and-write memory device. However, unlike storage device 310, system memory 306 is a volatile read-and-write memory, such as random access memory (RAM). System memory 306 stores some of the instructions and data that the processor needs at runtime. In some embodiments, processes are stored in system memory 306, permanent storage device 310, and/or ROM 308. For example, the various memory units include instructions for processing appearance alterations of displayable characters in accordance with some embodiments. From these various memory units, processing unit(s) 304 retrieves instructions to execute and data to process in order to execute the various processes of disclosed herein.

Bus 302 also connects to input devices 312 and output devices 314. Input devices 312 enable the person to communicate information and select commands to computing device 300. Input devices 312 include alphanumeric keyboards and pointing devices (also called cursor control devices). Output devices 314 display images generated by computing device 300. Output devices 314 include printers and display devices, such as cathode ray tubes (CRTs), liquid crystal displays (LCDs), or light-emitting diodes (LEDs). Some embodiments include devices such as a touchscreen that functions as both input devices 312 and output devices 314.

Bus 302 also couples computing device 300 to network interface 316 for connecting computing device 300 to a network (e.g., network 114). In this manner, the computing device 300 can be a part of a network of computers (e.g., a LAN, a WAN, a VPN, a P2P network, or an intranet), a network of networks (e.g., the Internet), or another network (e.g., a cellular network). Any or all components of computing device 300 may be used in conjunction with the various embodiments of the present disclosure. For example, network interface 316 can enable communications over Ethernet, TCP, IP, power line communication, Wi-Fi, Bluetooth®, infrared, RF, GPRS, GSM, FDMA, CDMA, EVDO, Z-Wave, ZigBee, 3G, 4G, 5G, another protocol, or a combination thereof.

Figure 4:
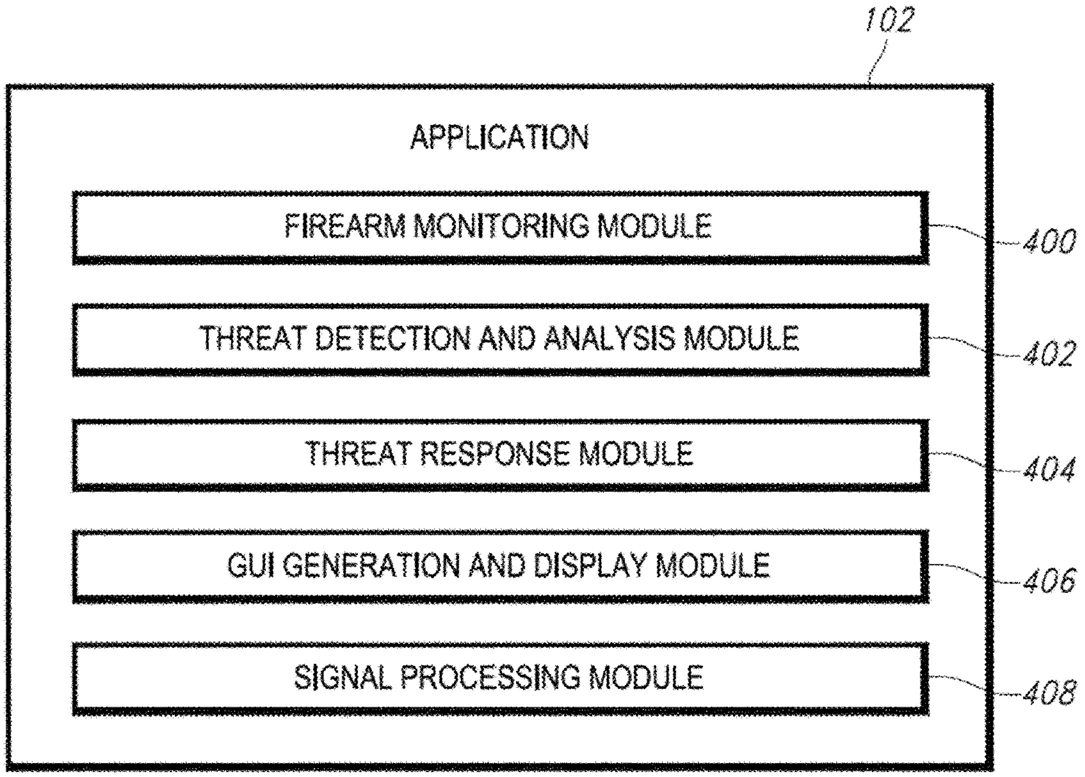
FIG. 4 is a diagrammatic view of various system subcomponents of software used for firearm monitoring and remote support in accordance with embodiments of the present disclosure.

Referring to FIG. 4, the functionality of application 102 is further described. Application 102 includes software modules used for monitoring firearms and other assets within a deployment location (e.g., wearable devices and/or stationary devices). The software modules include firearm monitoring module 400, threat detection and analysis module 402, threat response module 404, GUI generation and display module 406, and signal processing module 408.

Firearm monitoring module 400 monitors firearms (e.g., firearms 104), deployed to a deployment location. Firearm monitoring module 400 monitors the users, firearms, and other assets based on measurements recorded using sensors included within or otherwise coupled to the firearms and other assets (e.g., sensors 118). For example, the firearm monitoring module 400 can process the measurements recorded using the sensors to determine changes in a position and/or orientation of a firearm and/or to determine motion of the firearm. For example, the measurements recorded using the sensors may include or otherwise be indicative of one or more of a change in orientation of a firearm, a vibration of the firearm, recoil resulting from a firing of the firearm, pressure applied to all or a portion of the firearm (e.g., to a trigger mechanism or grip), changes in contents of a magazine of the firearm, heat and/or light changes at a muzzle of the firearm (e.g., indicating a firing of the firearm), or the like.

In embodiments, firearm monitoring module 400 monitors users of firearms (e.g., users of firearms 104) and/or other assets (e.g., wearable devices 106 and stationary devices 108). Firearm monitoring module 400 monitors the users and/or other assets based on measurements recorded using sensors included within or otherwise coupled to the other assets (e.g., sensors 122) and sensors included in assets worn by the users (e.g., sensors 120). For example, the firearm monitoring module 400 can process the measurements recorded using the sensors to determine changes in a position and/or orientation of a user and/or other asset and/or to determine motion of the user and/or other assets. For example, the measurements recorded using the sensors may include or otherwise be indicative of one or more of a sudden motion of the user, a speed and/or direction of motion of the user, a vibration measured based on a firing of a firearm of the user, sudden changes in an amount of light detected around the user, or the like.

The output of firearm monitoring module 400 can be used to update information representing real-time position and orientation of firearms in a deployment location. For example, as will be described below, the output of firearm monitoring module 400 can be used by GUI generation display module 406 to update one or more GUIs to change a visual representation of one or more firearms based on the real-time position and orientation of the firearms. In another example, as will be described below, the output of firearm monitoring module 400 can be used by threat detection and analysis module 402 to detect a threat within the deployment location and/or to analyze whether a threat detected within the deployment location requires a threat response.

In embodiments, firearm monitoring module 400 includes functionality for monitoring firearm maintenance. With such firearm maintenance monitoring, the application 102 may provide (e.g., to the user of a firearm, to remote support personnel using the application 102, or to other personnel) data on the number of rounds discharged and which firearm components need maintenance or replacement. The firearm maintenance monitoring functionality of firearm monitoring module 400 can include generating an alert indicative of maintenance requirements determined based on the monitoring, for example, to notify the user of the firearm, remote support personnel, or other personnel.

In embodiments, firearm monitoring module 400 includes functionality for alerting a user of a firearm should the firearm is pointed at another user (e.g., in the same group or otherwise). For example, each user may have a tracking system (e.g., included in the firearm, a wearable device worn by the user, or another asset). The firearm monitoring module 400 can detect when a firearm of one user is pointed at another user with such a tracking system. In some such embodiments, firearm monitoring module 400 may also alert the user should the firearm be pointed at other weaponry (e.g., another firearm or another weapon), another deployed asset, another predefined target, raised quickly in a geo-defined zone, or the like. This may, for example, help avoid friendly fire (e.g., potentially resulting in fratricide) situations.

Firearm monitoring module 400 includes functionality for identifying discharges and counting shots, discharges, and other operations of firearms. In embodiments, an external device attached to a firearm can register when a shot is fired. The discharge has a unique, detectable, physical profile (e.g., a discharge has recoil that has a particular motion profile, sound profile, and the like). A recoil measuring system may use an IMU, including or combined with motion-detecting/sensing elements, including one or more accelerometers, gyros, magnetometers, and the like. In embodiments, a map is developed based on analyses of discharge events to the map the entire motion sequence caused by a typical discharge. That motion profile, which may be unique to each weapon platform and user, can be stored and used as a basis for comparing future sensed data to determine whether a discharge event has occurred. Similar profiling can be used for each weapon type to determine whether the firearm has been raised to an aiming position or out of the holster position.

In embodiments, a firearm may include an infrared gate in front of the ejection port. This gate can track disconnects when the weapon is fired, such as when the shell is engaged and breaks the gate. In embodiments, a firearm may include a hall-effect sensor to measure the motion of an internal part. In embodiments, firearm monitoring module 400 can capture the discharge profile of a given weapon by using an IMU. The discharge profile may have unique inertial characteristics when a weapon is discharged, such as based on the geometry, distribution of weight, specified ammunition, and the like, so that a discharge can be profiled and identified based on a series of movements that are measured by the IMU. In embodiments, firearm monitoring module 400 can capture the discharge profile of a given weapon by using a sensor to monitor the position of the trigger so that when the trigger is pulled, we can assume a discharge and verify with the IMU or other correlating data or use that to identify misfire or dry fire scenario.

In embodiments, firearm monitoring module 400 includes an activity monitor which will indicate events such as when the gun is elevated and being pointed. In embodiments, firearm monitoring module 400 measures the parameters of the recoil and parameters of pre-shot movement. This allows an analysis of changes over time to determine the status of the weapon. The firearm monitoring module 400 can also capture movements and determine whether the user is handling the weapon properly.

In embodiments, firearm monitoring module 400 provides alternatives for monitoring discharges, such as cameras, or augments those other monitoring systems. The methods and systems disclosed herein may include image recognition, which can identify the flash of a muzzle or for the slide rocking back. The system may also have acoustic abilities and may provide sound recognition.

Threat detection and analysis module 402 uses sensor measurements, existing knowledge, and/or trained machine learning models related to users, firearms, other assets, and/or conditions within a deployment location to detect whether a threat exists within the deployment location and to analyze the severity of detected threats. The sensor measurements, existing knowledge, and/or trained machine learning models are taken as inputs to threat detection and analysis module 402. Threat detection and analysis module 402 outputs data indicating one or more of a detected threat, a threat severity, or no threat detected. The sensor measurements can include measurements recorded using one or more of sensors 118, sensors 120, or sensors 122. For example, measurements recorded using one or more of sensors 118, sensors 120, or sensors 122 may include, without limitation, information indicating changes in the orientation of a firearm, changes in a movement speed of a user, biometric information (e.g., increase in user pulse, increase in user sweat levels, increase in user eye movement, or the like), changes in how a user grips or otherwise holds a firearm, image or video data (e.g., captured using a user body camera, a camera on a UAV or other aircraft, a camera of a stationary device, a camera of another vehicle, or another camera) showing hostiles or persons who appear to be hostiles, or the like.

In embodiments, the sensor measurements can include information output from firearm monitoring module 400. For example, the firearm monitoring module 400 can process measurements recorded using one or more of sensors 118, sensors 120, or sensors 122 and provide the processed measurements to threat detection and analysis module 402. In such an embodiment, the processed measurements may include additional information added by firearm monitoring module 400, for example, representing previous monitoring data corresponding to one or more of sensors 118, sensors 120, or sensors 122.

The knowledge used by threat detection and analysis module 402 includes information stored within a knowledgebase of system 100. For example, the knowledgebase can be represented by or otherwise include or refer to information stored within database 124, which can be accessed by application 102. The information within the knowledgebase can be processed against the sensor measurements, for example, to compare the sensor measurements to established thresholds or other known conditions associated with threat detection. As will be described below, the machine learning models used by threat detection and analysis module 402 are models (e.g., of a deep learning neural network or another machine learning or machine intelligence approach) which have been trained using one or more data sets (e.g., including information within the knowledgebase and/or information collected from past deployments of users using sensors such as sensors 118, sensors 120, and/or sensors 122).

Threat detection and analysis module 402 can use a rule-based approach to detect and analyze threats. In embodiments, different inputs may be assigned or otherwise attributed different score values. For example, a firearm discharge being detected may have a higher score than a change in firearm orientation detection. In another example, a change in firearm orientation detection may have a higher score than a user motion detection. A rule used by threat detection and analysis module 402 can compare score totals calculating by adding scores for various present inputs against one or more thresholds configured for indicating a threat. A threat can be detected where the calculated score total meets or exceeds one or more of the thresholds. In embodiments, a rule used by threat detection and analysis module 402 can indicate that the detection of a condition (e.g., based on one or more of the sensor measurements) indicates a detected threat. For example, where the sensor measurements indicate that multiple firearms are being discharged at the same time, threat detection and analysis module 402 can use that information alone to determine that a potential threat exists.

Threat detection and analysis module 402 analyzes the input information not only to detect a threat, but also to determine a severity of a detected threat. For example, a detected threat which appears to relate to the presence of a single hostile combatant may be considered less severe than a detected threat which appears to relate to the presence of multiple hostile combatants. In another example, a detected threat which appears to relate to the presence of enemy tanks, mortars, or other heavy machinery or heavy-powered weaponry may be considered more severe than a detected threat which appears to relate to the presence of hostile combatants armed only with handguns or assault rifles. The detection of a threat, along with the severity of the detected threat, are used to determine an appropriate response to the detected threat, for example, using threat response module 404. Determining the severity of a threat may include analyzing some or all of the input information used to detect the treat. For example, for a given threat, a threat severity may be low when input information indicates that the users who will engage the threat have what is expected to be an adequate amount of ammunition for engaging the threat, but high when the input information indicates that those users do not have an adequate amount of ammunition. In another example, for a given threat, a threat severity may be low when the number of users who will engage the threat is greater than the number of hostile combatants detected, but high when the number of users who will engage the threat is less than the number of hostile combatants detected.

Threat detection and analysis module 402 thus considers the types and number of firearms possessed by each engaged user, the amount of unused ammunition remaining in possession of each such engaged user, the amount of ammunition already used during the engagement by each such user, the number of engaged users, the locations of the engaged users (e.g., in relation to each other, to the hostiles, and/or to the geography), and the like. Threat detection and analysis module 402 further considers the number of hostiles, the locations of the hostiles (e.g., in relation to each other, to the users, and/or to the geography), the types of firearms used by the hostiles (including the expected ammunition stocks and possible reserves therefor), the number of firearms used by the hostiles, an amount of time for which the firearms of the users have been firing at the users, and the like.

In embodiments, system 100 can prompt a user of a firearm for input verifying that a threat exists. For example, where threat detection and analysis module 402 detects a potential threat with low confidence, a signal may be transmitted to a personal computing device of a user within the deployment location to verify whether a threat is present in the deployment location. The user may respond in one or more ways to verify the potential threat. For example, the personal computing device may include a button or other hardware interface which may be toggled in response to the request for verification to indicate whether the threat exists. In another example, the personal computing device or a wearable device may include a microphone. The user can speak into the microphone to verify whether the threat exists. Other options for verifying a threat are possible, as will be understood. In embodiments, a mode of the safety on the firearm can be detected and can be a further option for verifying a threat such that one of the modes (e.g., safe, semi, full-auto, locked) can be an additional metric when assessing the threat detection.

In embodiments, system 100 may allow a user (e.g., of a firearm and/or of a remote dashboard) to validate a threat using the firearm, for example, during in a live combat situation. For example, application 102 may establish or otherwise be used to establish a pressure signature to validate the threat. The threat may be validated by application 102 (e.g., by threat detection and analysis module 402) by comparing the pressure signature against a range of pressure signatures, for example from no pressure to extreme pressure.

The pressure signature may be established by collecting information, such as information from sensors, for example, sensors 118, sensors 120, sensors 122, and/or other sensors, such as multi-modal sensors 1060. Combinations of sensors may include combinations of wearable and firearm sensors, combinations of the firearm and fixed sensors, for example, Internet of Things (IoT) sensors, and the like. A sensor equipped firearm may include a pressure sensor, for example, to determine a grip profile using information such as threat ID, shot accuracy, engagement, alert information and tactical information. Information collected from a sensor equipped firearm may include discharge information, motion information, rate of motion information, orientation information and the like. The rate of motion information, for example, may include movement information related to speed, threat identification and shot accuracy. Movement information may also be related to an event identifier for events, such as events associated with weapons and people. Events associated with firearms may include events indicating the firearm has fallen, is outside of a pre-designated distance from its owner, in an unauthorized area and the like. Events associated with people may include events indicating a person is in an unauthorized area, the maneuvering speed of the person and the like.

In embodiments, determining the pressure signature may also include determining a firearm-specific candidate action of a first firearm user, from at least a portion of the collected information. The candidate action may be compared with other firearm users, for example, other firearm users proximal to the first firearm user or other firearm users associated with the first firearm user. The collected information, candidate action or actions, and action comparison result may then be stored in a data structure that represents the pressure signature. The collected information, candidate action or actions, and action comparison result may also be filtered or weighted based on specified criteria, prior to being stored in the data structure that represents the pressure signature.

Threat response module 404 determines an action to be performed in response to a detected threat based on the detected threat and based on the severity of the detected threat. The action determined using threat response module 404 may be based on the threat detected. As such, the threat response module 404 can use information, qualities, characteristics, or other aspects of the detected threat (e.g., identified, determined, or otherwise produced using threat detection and analysis module 402) to determine the action to perform in response to the detected threat. Examples of actions which may be determined using threat response module 404 include, but are not limited to, delivery of additional ammunition to one or more users within the deployment location, request for reinforcements within the deployment location to assist in engaging the threat, delivery of new firearms or other weaponry (e.g., weaponry which is heavier or otherwise more powerful than is currently possessed by the users within the deployment location) to one or more users within the deployment location, delivery of medical equipment to one or more users within the deployment location, request for medical personnel within the deployment location (e.g., with or without medical equipment), delivery of new communications tools within the deployment location, transmissions of notifications to nearby connection points (e.g., to notify another group of users as to the existence of the threat detection or engagement), or the like.

The threat response module 404 can use a rule-based approach to determine an appropriate threat response. In embodiments, the rule-based approach used by threat response module 404 may be the same rule-based approach as may be used by threat detection and analysis module 402. In embodiments, the rule-based approach used by threat response module 404 may be an extension of the rule-based approach used by threat detection and analysis module 402. The rule-based approach used by threat response module 404 can indicate to determine certain threat responses based on certain detected threats and/or based on certain severities of detected threats. For example, a rule can indicate to deliver additional ammunition (e.g., by UAV or otherwise) when a detected threat includes multiple hostile combatants and the associated threat severity is high. In another example, a rule can indicate to request reinforcements to arrive at the deployment location within some specified or unspecified amount of time when a detected threat includes a number of hostile combatants which is higher than a number of engaging users and the skill levels of the engaging users do not meet a threshold.

In embodiments, the action determined using threat response module 404 can include or otherwise indicate a combination of actions to be performed in response to a detected threat. For example, where threat detection and analysis module 402 determines that a given user will run out of ammunition before the end of an engagement with a number of hostiles and that the number of hostiles exceeds the number of users in the group that includes the given user, threat response module 404 can determine the action to be performed in response to the detected threat as delivering additional ammunition to the given user (e.g., by UAV delivery or otherwise) and calling for reinforcements to assist the group of users in engaging the number of hostiles.

GUI generation and display module 406 generates, updates, and renders or displays GUIs. A GUI generated using GUI generation and display module 406 can comprise part of a software GUI constituting data that reflect information ultimately destined for display on a hardware device, for example, a client device or other computing device which communicates with server device 112 or another computing device running, executing, interpreting, or otherwise operating application 102. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a GUI or another GUI on a display that can be used to generate pixel information. A structured data output of one device can be provided to an input of the hardware display so that the elements provided on the hardware display screen represent the underlying structure of the output data. Instructions for displaying or otherwise rendering a GUI generated using GUI generation and display module 406 can be communicated from server device 112 to a client device or another computing device which communicates with server device 112.

GUIs which may be generated, updated, and rendered or displayed using GUI generation and display module 406 include a deployment location GUI, a remote support dashboard GUI, a user and firearm GUI, and others. The deployment location GUI includes a two-dimensional top-down geographic view of the deployment location including icons indicating positions and orientations of users and/or of firearms or other assets within the deployment location and further including cones for the users, firearms, or other assets. The top-down geographic view may, for example, represent a real-time satellite feed imaging the deployment location. Alternatively, the top-down geographic view may represent terrain, topographic, roadway, or other map views of the deployment location.

The remote support dashboard GUI includes views for displaying and enabling user interaction with information relating to users, firearms, and/or other assets deployed to the deployment region. For example, the remote support dashboard GUI may include a dashboard view which displays one or more of lists of users, lists of firearms possessed by the users, stock of ammunition possessed by the users, lists of potential or actual threats detected within the deployment location, alerts corresponding to detected threats, alerts corresponding to detections of firearms being fired, or the like. In another example, the remote support dashboard view may include a validation view which presents requests, actions, or other information for review and/or approval by a user of application 102. The validation view may, for example, display notifications relating to automated responses taken based on detected threats. In embodiments, where a response is presented for user approval before execution, the validation view may present a request to approve a response.

The user and firearm GUI include views indicating real-time position and orientation information for users and firearms used thereby. For example, the user and firearm GUI may include a three-dimensional firearm orientation view which updates in real-time based on signals received from a firearm to show an orientation of the firearm, for example, with respect to a surface on which a user of the firearm is standing or otherwise located. In another example, the user and firearm GUI may include a two-dimensional recoil tracking view which updates in real-time based on signals received from a firearm to show how the firearm moves over time based on recoil from firings of the firearm. In yet another example, the user and firearm GUI may include a view showing real-time video or image feeds captured using a body camera of a user.

In embodiments, two or more GUIs, or views from two or more GUIs, may be combined into a single GUI which is rendered or displayed. For example, some or all views of the user and firearm GUI may be included in the deployment location GUI, for example, to enable the simultaneous display of multiple monitors. For example, as will be described below with respect to FIG. 6, a deployment location GUI may include a top-down geographic view, a three-dimensional firearm orientation view, a two-dimensional recoil tracking view, and a user body camera feed view. In this way, a remote user of application 102 can simultaneously view real-time information regarding user hostile engagement or detection within the deployment location and individual or group firearm monitoring information.

Signal processing module 408 processes signals received, directly or indirectly, from assets within a deployment location. The signal processing module 408 can receive and process signals from firearms 104, wearable devices 106, stationary devices 108, and/or other assets. Processing signals using signal processing module 408 includes preparing data included within those signals for use with other modules of application 102. For example, signal processing module 408 can process a signal to prepare the signal for use by one or more of firearm monitoring module 400, threat detection and analysis module 402, or GUI generation and display module 406. For example, a signal received at application 102 may be received in a compressed form. The signal processing module 108 processes the signal including by decompressing the signal to restore the data included in the signal to an uncompressed form. In another example, a signal received at application 102 may include noise, for example, introduced during the recording of sensor measurements (e.g., by motion of a user, vibrations to which a sensor is exposed, or another noise source). The signal processing module 408 can denoise the signal before making the signal available to one or more of firearm monitoring module 400, threat detection and analysis module 402, or GUI generation and display module 406.

In embodiments, signal processing module 408 can receive and process batches of signals. For example, rather than receiving a sequence of individual signals, signal processing module 408 can receive a batch of signals generated, identified, or otherwise collected (e.g., using connection point 116) for transmission to server device 112 for use with application 102. For example, a batch of signals may represent signals collected within a defined time interval (e.g., within a five second period or less). For example, connection point 116, or another component which collects signals from assets deployed within a deployment location, can use timestamps for the signals to coordinate batching of signals for transmission to server device 112. In another example, a batch of signals may represent signals relating to common asset types or from a specific asset or group of assets. For example, connection point 116, or another component which collects signals from assets deployed within a deployment location, can determine the type of asset from which a signal is collected (e.g., based on pre-processing performed against the signal and/or based on a channel of communication used to collect the signal) and can coordinate batching of signals for transmission to server device 112 by grouping the signals by asset type.

In embodiments, application 102 includes inventory control functionality. For example, the inventory control functionality can include monitoring stores of asset inventory (e.g., firearms, ammunition, wearable devices, stationary devices, and/or other assets) within one or more locations. The inventory control functionality can be used to track when assets are taken out of an inventory store (e.g., for use in arming a user during a deployment). The inventory control functionality can also be used to track inventory usage, for example, to assist in determining when resupply orders are needed. In some such embodiments, the inventory control functionality of application 102 can include functionality for automating resupply orders of some or all asset inventories, for example, based on the monitoring of the assets within one or more locations of the inventory stores and/or within one or more deployment locations.

In embodiments, application 102 includes predictive functionality. In some such embodiments, the predictive functionality of application 102 can include functionality for determining an action to be performed even in the absence of a detected threat. For example, the predictive functionality of application 102 can include a predictive resupply module that predicts a need to resupply ammunition based on the number of shots taken using one or more firearms. The predictive functionality of application 102 can include generating an alert indicative of the action to be performed, for example, to notify a user of the firearm, remote support personnel, or other personnel. In embodiments, which include such predictive resupply module and inventory control functionality, the inventory control functionality can account for inventory of rounds used with the predictive resupply module that tracks the amount of ammunition used and alerts when the inventory and shots fired do not match indicating a loss of ammunition.

In other such embodiments, the predictive functionality of application 102 can include functionality for predicting maintenance or other states of assets within a deployment location. For example, the predictive maintenance can include predicting a maintenance requirement and/or status of a firearm based on a number of shots taken, based on recoil parameters (e.g., showing degradation of performance as recoil patterns shift over time), and/or based on other criteria. The predictive functionality of application 102 can include generating an alert indicative of the predicted maintenance requirement and/or status, for example, to notify a user of the firearm, remote support personnel, or other personnel.

Beneficially, the firearm usage monitoring system may provide maintenance alerts and confirmation of maintenance performed on a firearm without user input. In embodiments, the firearm usage monitoring system is configured to monitor round count and fatigue (e.g., heat flux and temperature buildup from discharge events) to determine when replacement of consumable or degradable components is likely. Beneficially, the firearm usage monitoring system may include supply chain information (e.g., deployed inventories or inventories at depot, resupply, or global resupply) to alert a resupply need or automatically resupply components. In embodiments, sensors on the firearm 104 are configured to monitor the noise, vibration, and harshness signature (NVH) to determine potential failure modes (e.g., NVH increase indicative of overheating event) and/or maintenance (e.g., NVH decrease indicative of component replacement or cleaning).

In embodiments, application 102 can use machine learning functionality (e.g., implemented as one or more machine learning modules of application 102) for training and/or inference. For example, the machine learning functionality of application 102 can be used to train application 102 based on information input to or output from one or more of modules 400-408. In another example, the machine learning functionality of application 102 can perform inference against information input to or output from one or more of modules 400-408. In yet another example, the machine learning functionality of application 102 can perform both the training and the inference described above.

In embodiments, the machine learning functionality of application 102 can include algorithms for determining recoil of firearms 104 and other behaviors or characteristics of system 100. For example, in embodiments, the machine learning functionality of application 102 includes identification algorithms to determine the complex motion associated with the discharge of a particular type of weapon. Embodiments may include feeding IMU data collected upon gripping, movement, and discharge of weapons into the machine learning functionality of application 102, for example, so that the machine learning functionality of application 102 can learn the parameters of each with respect to enough training events that it can rapidly and accurately identify new events based on new IMU data, such as collected in real time. In embodiments, the machine learning functionality of application 102 can be trained to learn to identify a threatening situation when the grip is engaged and the firearm is pointed, when the motion has increased indicating a pursuit, and when it is not in motion (e.g., placed in sleep mode). More complex patterns can be learned, such as determining what patterns tend to lead to accidents, dangerous incidents, higher quality training, and the like.

In an example of learning and utilization of a complex pattern, the machine learning functionality of application 102 can be used to determine firearm movements that may indicate a discharge from a firearm is imminent. In this example, the machine learning functionality of application 102 may, for example, detect motion and orientation data from sensors, such as from sensors on the firearm, sensors in a mesh network (e.g., including other firearms), or other assets (e.g., sensors within wearable devices, multi-modal sensors, etc.) of the human user of the firearm, which in turn may be used by the machine learning functionality of application 102 to facilitate a threat response. In embodiments, a threat response may include an automatic threat response, such as by one or more machines that are teamed with the human user of the firearm.

In another example of learning and utilization of a complex pattern, the machine learning functionality of application 102 can consider information stored within a knowledgebase or other data store (e.g., of database 124 or another source). For example, the information may relate to past engagements of users, whether or not involving the same users as are currently deployed within a given deployment location. The information may, for example, relate to one or more of a user skill level, firearm type, amount of ammunition used in engagements based on user skill level and/or firearm type, numbers of engagements of users, numbers of threats or otherwise of hostile combatants or weaponry engaged, number of users in a group which engaged a threat, number of firearms possessed per user of such a group, or the like.

In embodiments, the machine learning functionality of application 102 may determine combinations of data, such as motion, orientation and multi-modal sensor information that are indicative of imminent discharge of the firearm. The machine learning functionality of application 102 may also receive other inputs or generate information to combine with the sensor information, such as an indication of a firearm state. Firearm states may include combat states, training states, wartime states, peacetime states, civilian states, military states, first responder states, incident response states, emergency states, military contractor states, on-call states, and the like. Firearm states may be states from one or more than one firearm, for example, a set of firearms associated with a group of soldiers in the same section of a battlefield or a set of police officers in a region.

Combinations of data may allow the machine learning system to recognize, determine, classify, or predict information, such as about environments, objects, image content, whether a person is friendly or adversary, structures, landscapes, human and human gestures, facial indicators, voices, and locations, among others. Example combinations may include combinations of data from topography and physiological monitors, ISR, and structure recognition combinations, as well as combinations of human and machine physical states. Combinations of data may also be tactical combinations. Tactical combinations may combine data from devices on a battlefield, information about other sectors of fire, and the like and may include firearms and other weapons, vehicles, body armor and other wearable elements, and the like (collectively referred to herein as "battlefield of things") devices including, for example, remotely operated units such as Common Remotely Operated Weapon Stations (CROWS) or other remote controlled firearms that may be configured with heavier calibers and higher lethality.

Objects that may be recognized by machine learning may include weapons, man-made objects, natural objects, and the like. Structures may include doors, stairs, walls, drop-offs, and the like. Human gestures may be detected, interpreted and understood by the machine learning system, while facial indicators could be indicators of mood, intent, and the like. The machine learning functionality of application 102 may use thresholds to assist with determination and recognition process. For example, combinations of data exceeding specified levels may provide a high degree of confidence that the recognition process is accurate.

In embodiments, the machine learning functionality of application 102, teamed with the human user of a firearm, may be operated autonomously, for example, in response to a determined intent of the human user of the firearm teamed with the machine learning functionality of application 102. The machine learning functionality of application 102 may be used to detect gestures of the human firearm user, for example, by capturing and analyzing data from sensors that detect conditions of the human, as well as firearm sensors. Sensors that detect conditions of the human may include multi-modal sensors and multi-modal wearable sensors. Gestures may include pointing gestures, threat identification gestures, target acquisition gestures, signaling gestures and the like.

In embodiments, conditions recognized by the machine learning functionality of application 102 or sensed in order to facilitate training of the machine learning functionality of application 102 may include conditions indicative of human states, such as stress and other physiological states. Conditions indicative of human states and captured by sensors for analysis by the firearm usage monitoring system may include heart rate conditions, for example, physical state relationships, blood pressure conditions, body temperature, galvanic skin response, heat flux, moisture, chemistry (for example glucose levels), muscle states and neurological states. Various biological conditions or biosensors may be indicative of threats, such as heart rate conditions, body temperature, moisture (such as indicating excessive perspiration), blood pressure, galvanic skin response, and others. Firearm sensors may be multi-modal firearm sensors and may include sensors that detect motion, orientation and discharge state of the firearm.

In embodiments, the FAMS implements machine learning algorithms to form a motion-analysis model. Training data may be collected and curated from a set of data recorded by the FUMS. The training set may be formed by cleaning, organizing, and labeling the data. The cleaning includes, for example, removing duplicative data, removing data that does not include the target action, and removing false-positive data. The organizing includes associating connected data from different sources. For example, the data may be structured such that sensor and other recorded information related to a single firearm is grouped together. The recorded information may be from the firearm and coupled devices or external sources where the firearm is identifiable (e.g., surveillance video). The labeling includes assigning meaningful tags to the grouped data, such as "discharge," "no discharge," "intentional," "unintentional," "misfire," "jam," "overheat," "maintenance," and other relevant labels. Information that is temporally proximate to the desired labels is also included within the training set. In some examples, the temporally proximate data includes data from 10 minutes, 5 minutes, 3 minutes, 1 minute, or 30 seconds prior to occurrence of the labeled event and data from 1 second, 5 seconds, 30 seconds, 1 minute, 3 minutes, or 5 minutes after the labeled event. The training set is then provided to a machine learning algorithm to form an analysis model that is configured to be used in real-time to predict events during usage of the firearm (e.g., discharge or jamming). It can be shown that with pre-determined time intervals after a discharge event based on the weapon and its ammunition can provide a 99.7% identification rate. In embodiments, the training set is further used to form a training model configured to clean, organize, and/or label data to form one or more updated training sets. Beneficially, such models and training may be extended to learning and analysis of non-discharge patterns, such as determining movement patterns indicative of user conditions including abnormal gait, injuries, over encumbrance, cognitive impairment, and exhaustion.

Analyzing the data by application 102 (e.g., by firearm monitoring module 400, threat detection and analysis module 402, threat response module 404, GUI generation and display module 406, signal processing module 408, or another software module of application 102) may produce a set of candidate intents of the human firearm user or of another individual in proximity to the firearm user (such as where camera information, voice information, and the like is available). The candidate intents may, in embodiments, be combined with physical and operation machine state information to select one or more action plans. The machine teamed with the human user of the firearm may then execute and adjust the selected action plan based on updated intents, machine states, and environmental factors. Machine state factors may include physical factors, operational factors, orientation factors, tactile/force factors, and the like.

Environmental factors may include weather factors, location data factors, altitude factors, topography factors, video factors and the like. Weather factors may include temperature, humidity, wind speed, wind direction and precipitation factors, among others. Location data factors may include streaming data, as well as data acquired from geolocation services (e.g., using a global navigation satellite system, for example, GPS, GLONASS, BDS, Galileo, or the like) and beacons, connection points or the like, as well as through cellular. Topography factors may include data and observations, while video factors may include both live and archived video feeds. The action plan may also be formed from a set of predetermined action steps, for example, action steps that each satisfy human teaming criteria selected to coordinate with at least one of the candidate intents. Actions steps may also be arranged into action plans by sets of rules.

In embodiments, the machine learning functionality of application 102 may be trained to recognize and distinguish between non-combat activities and combat activities. For example, the machine learning functionality of application 102 may be trained to recognize celebratory situations such as dancing scenarios and fist bump scenarios separate from other human machine learning scenarios in much more threatening and complex environments. In other examples, the machine learning functionality of application 102 may be trained to distinguish between celebratory fire and threatening fire. By way of these examples, the machine learning functionality of application 102 may learn the movements of the users of system 100, for example, by translating and detecting their motion and comparing the identified motions in context with a deployment location in comparison with trained examples, confidence in those examples, corrections to past activity, and the like to assist, anticipate, protect, support, and facilitate the needs of the users in the theater more quickly and more safely.

In embodiments, the machine learning functionality of application 102 may manage a coordinated team of human users of firearms and at least one machine. In this embodiment, the machine learning functionality of application 102 may receive as inputs at least one sensory input about a human and at least one sensory input about a machine that is part of the team coordinated with the human. The machine learning functionality of application 102 may then automatically, using machine learning, determine the occurrence of an event, such as a pre-discharge event, a discharge event, a post-discharge event (including a post discharge adverse event) or other events. Post discharge adverse events may include injury to the human or occurrence of damage to the machine, such as subsequent to the detection of a firearm discharge event by the system.

In embodiments, application 102 (e.g., using firearm monitoring module 400 or another module) may track with a global navigation satellite system (e.g., GPS). In embodiments, application 102 includes network reporting facility, such as through a Bluetooth® or other short- or long-range discharge report to a centralized server.

The functions of the system sub-components shown in FIG. 4 can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include one or more of: source code; object code; machine code, such as is produced by a compiler; or files including higher-level code that are executed by a computer, an electronic component, or a microprocessor using an interpreter.

Figure 5:
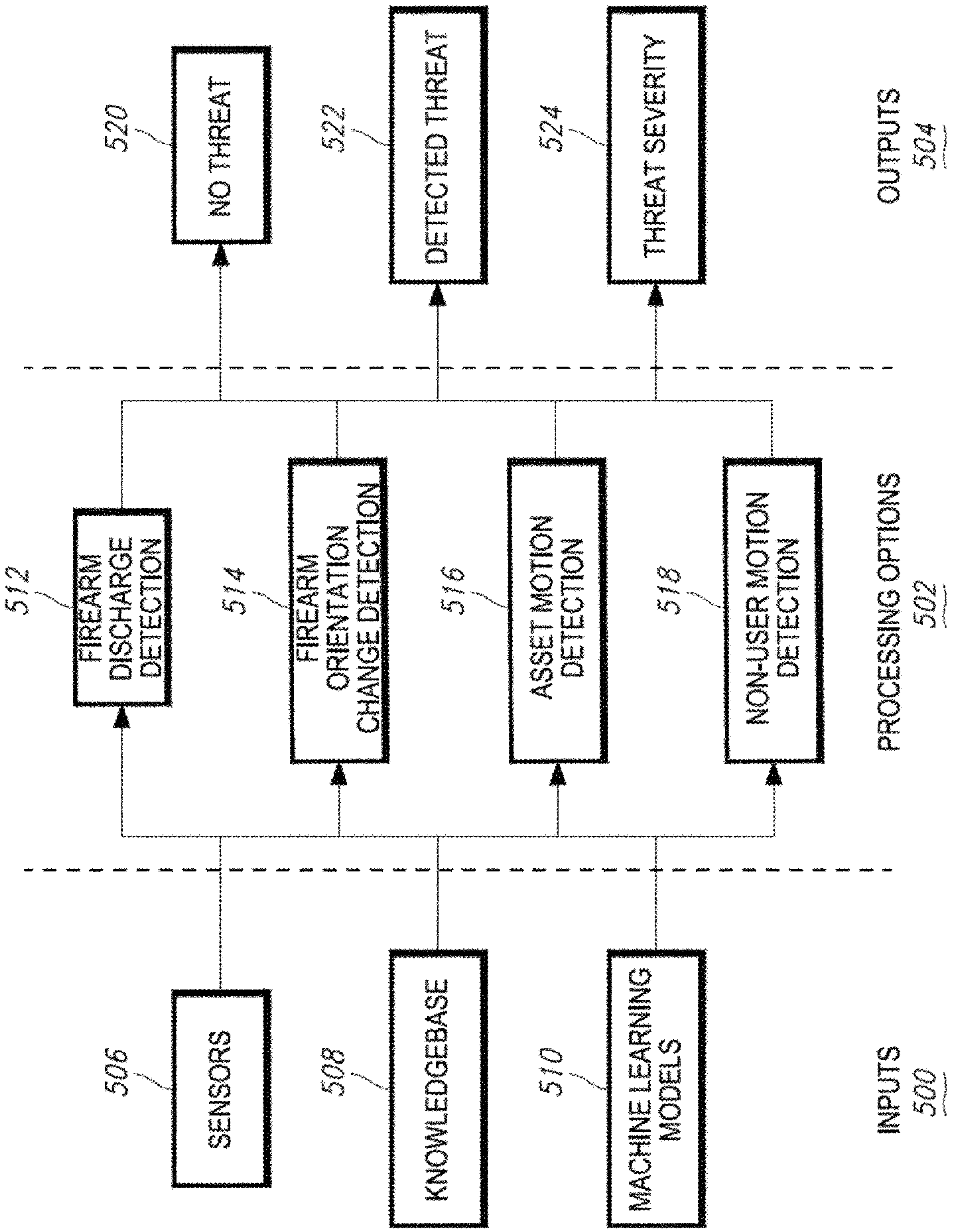
FIG. 5 is a diagrammatic view of various inputs, processing options, and outputs for threat detection and analysis in accordance with embodiments of the present disclosure.

Referring to FIG. 5, inputs 500, processing options 502, and outputs 504 related to threat detection and analysis functionality of system 100 are shown by example. Inputs 500, processing options 502, and outputs 504 may, for example, refer to functionality of threat detection and analysis module 402. Inputs 500 shown by example include sensors 506, knowledgebase 508, and machine learning models 510. Processing options 502 shown by example include firearm discharge detection 512, firearm orientation change detection 514, asset motion detection 516, and non-user motion detection 518. Outputs 504 shown by example include no threat 520, detected threat 522, and threat severity 524. One or more inputs 500 may be used to determine one or more outputs 504 using one or more processing options 502.

Figure 6:
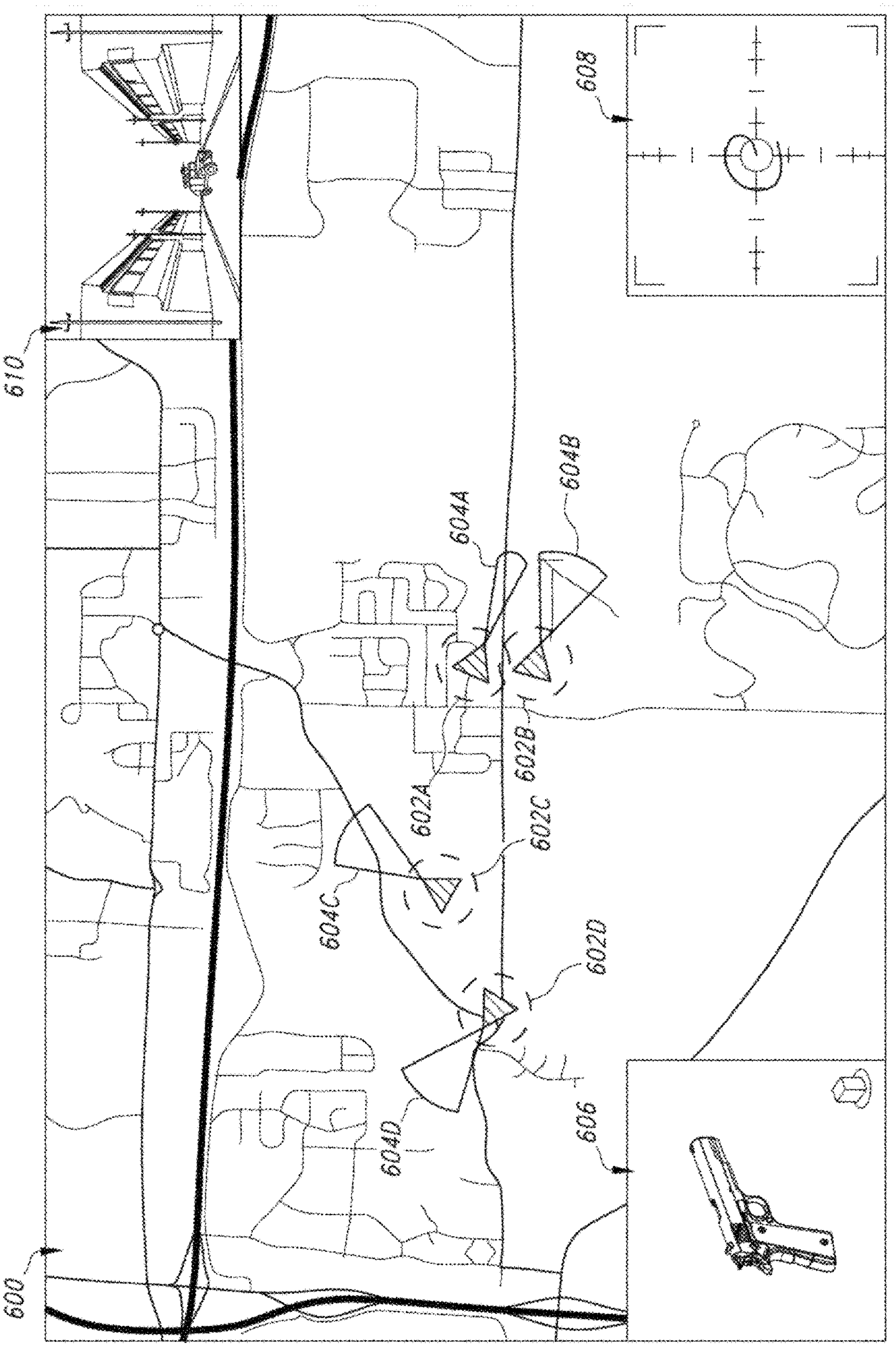
FIGS. 6-11 are illustrations of GUIs of software of a firearm monitoring and remote support system in accordance with embodiments of the present disclosure.

Referring to FIGS. 6-10, example GUIs of application 102 are shown. The GUIs shown in FIGS. 6-10 may, for example, be GUIs generated and displayed using GUI generation and display module 406. In FIG. 6, top-down geographic view 600 representing a satellite-view visualization of a deployment location is shown. Users 602A-D are shown at particular locations within the deployment location, for example, based on geolocation sensors included within or coupled to firearms or other mobile assets of users 602A-D. Cones of fire 604A-D are shown as projecting outwardly from respective ones of users 602A-D in directions in which firearms of those ones of users 602A-D are pointing. In particular, cones of fire 604A-D are shown in FIG. 6 as non-overlapping. As will be understood, depending on the orientations of firearms of users visually represented within top-down geographic view 600, cones of fire may be non-overlapping, partially overlapping, or wholly overlapping. The greater the overlap and the greater numbers of overlap indicate a higher likelihood of a present threat since the firearms are being aimed at a common location. Top-down geographic view 600 is populated with icons showing exact locations of firearms 104. In embodiments, the icons can include all personnel and/or status information for the firearms. In embodiments, the icons can include a button or other user interface element used to zoom in on the location of a firearm (e.g., to drill down on data associated with the firearm).

Also in FIG. 6, three-dimensional firearm orientation view 606, two-dimensional recoil tracking view 608, and user body camera feed view 610 are shown. Three-dimensional firearm orientation view 606 represents a visualization of a firearm of a user (e.g., one of users 602A-D) with real-time updates based on the specific orientation of the firearm. Two-dimensional recoil tracking view 608 represents a visualization showing real-time changes over time of an orientation of a barrel or other portion of a firearm based on recoil resulting from firing the firearm. In embodiments, the visualization showing real-time changes over time of an orientation of a barrel or other portion of a firearm can also be based on other displaying motions such as transitioning to different targets, over or under adjustment for target transitions, pre-shot and post-shot movement or jitter. User body camera feed view 610 represents a real-time video stream from a camera or other imaging device worn by a user or otherwise included within or coupled to an asset on a user. In embodiments, one or more of three-dimensional firearm orientation view 606, two-dimensional recoil tracking view 608, or user body camera feed view 610 may not be included in the GUI which includes top-down geographic view 600. In embodiments, the GUI which includes top-down geographic view 600 may include views other than three-dimensional firearm orientation view 606, two-dimensional recoil tracking view 608, and user body camera feed view 610.

In embodiments, top-down geographic view 600 or a GUI which includes top-down geographic view 600 can display notifications providing details about one or more of users 602A-D, cones of fire 604A-D, or information relating to one or more of views 606, 608, or 610/For example, the notifications can indicate information regarding movements of a firearm relative to a user thereof, for example, as "weapon aimed," "weapon holstered," "weapon separated from the user," and the like.

In embodiments, information about some or all of users 602A-D may be displayed in the GUI. The information may, for example, include or relate to names, ranks, years of service, skill levels, weapons present, ammunition stocks present, numbers of shots fired since arrival at the location shown, health information, threat engagement information, or the like, or a combination thereof. In some such embodiments, the information may be displayed in the GUI by default. In other such embodiments, the information may be displayed in response to an interaction by a remote user of the GUI. For example, information for a given user may be displayed as a prompt in response to the remote dashboard user selecting that given user within the GUI.

In embodiments, information representative of sensor measurements recorded using some or all of the sensors within the deployment location may be displayed in the GUI. The information may, for example, include or relate to sensor types, measurements, flags which indicate that the measurements represent actionable information (e.g., a trigger sensor measurement indicates that the user's finger is on the trigger and/or that the trigger has been toggled, such that a threat engagement is underway), or the like, or a combination thereof. In some such embodiments, the information may be displayed in the GUI by default. In other such embodiments, the information may be displayed in response to an interaction by a remote user of the GUI. For example, information for a given firearm within the deployment location may be displayed as a prompt in response to the remote user of the GUI selecting that given firearm or the user thereof within the GUI. In embodiments, some or all of the projections or orientation views can be shown in three-dimensional renderings.

Figure 7:
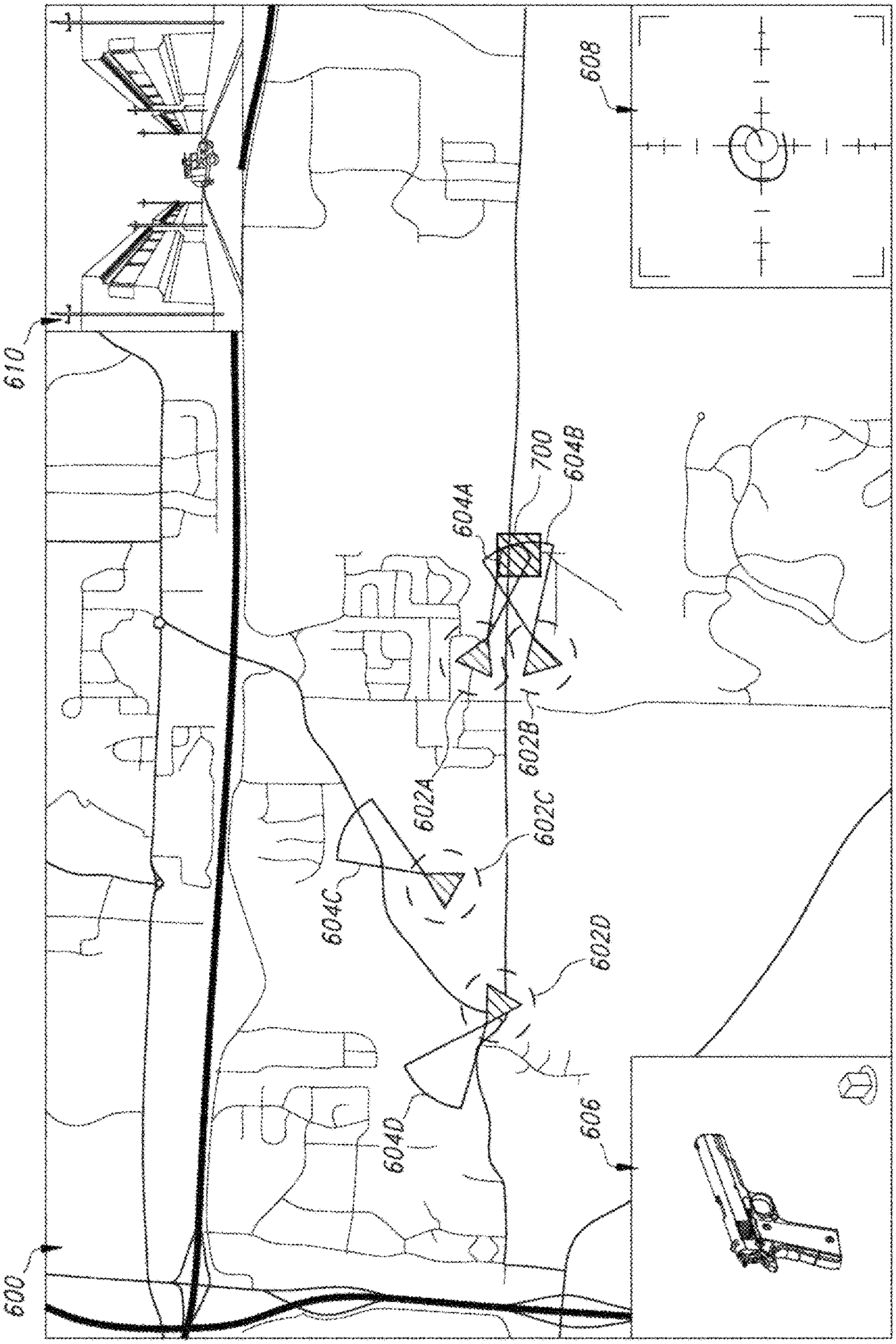

In FIG. 7, top-down geographic view 600 of FIG. 6 is shown. Here, the cones for the firearms of the users visually represented in the top-down geographic view are shown as coalescing. For example, whereas the positions and orientations of cones of fire 604A-B and corresponding users 602A-B in FIG. 6 were based on first sensor information collected at a first time, the positions and orientations of cones of fire 604A-B and corresponding users 602A-B in FIG. 7 are based on second sensor information collected at a second time after the first time. The GUI including top-down geographic view 600 as shown in FIG. 7 has thus been updated as compared to how that GUI appears in FIG. 6. The coalescence (e.g., partial or whole overlap) of multiple one of cones of fire 604A-B is used to detect a threat 700. For example, the coalescence of the multiple cones of fire 604A-B may indicate that multiple users 602A-B associated with those cones of fire 604A-B are actively drawing their firearms on, or otherwise towards, threat 700. In embodiments, a coalescence of cones of fire can be visually represented in top-down geographic view 600 by changing an appearance of the coalescing cones. For example, coalesced cones can be changed to visually appear in a different color (e.g., from white to red), with shading, with different border line thickness, or in another emphasizing manner. In embodiments, a severity of a detected threat may be visually represented in top-down geographic view 600. For example, a higher severity may be visually represented at the icon of threat 700, for example, by changing a color, shading, border thickness, or other aspect of the icon of threat 700.

Figure 8:
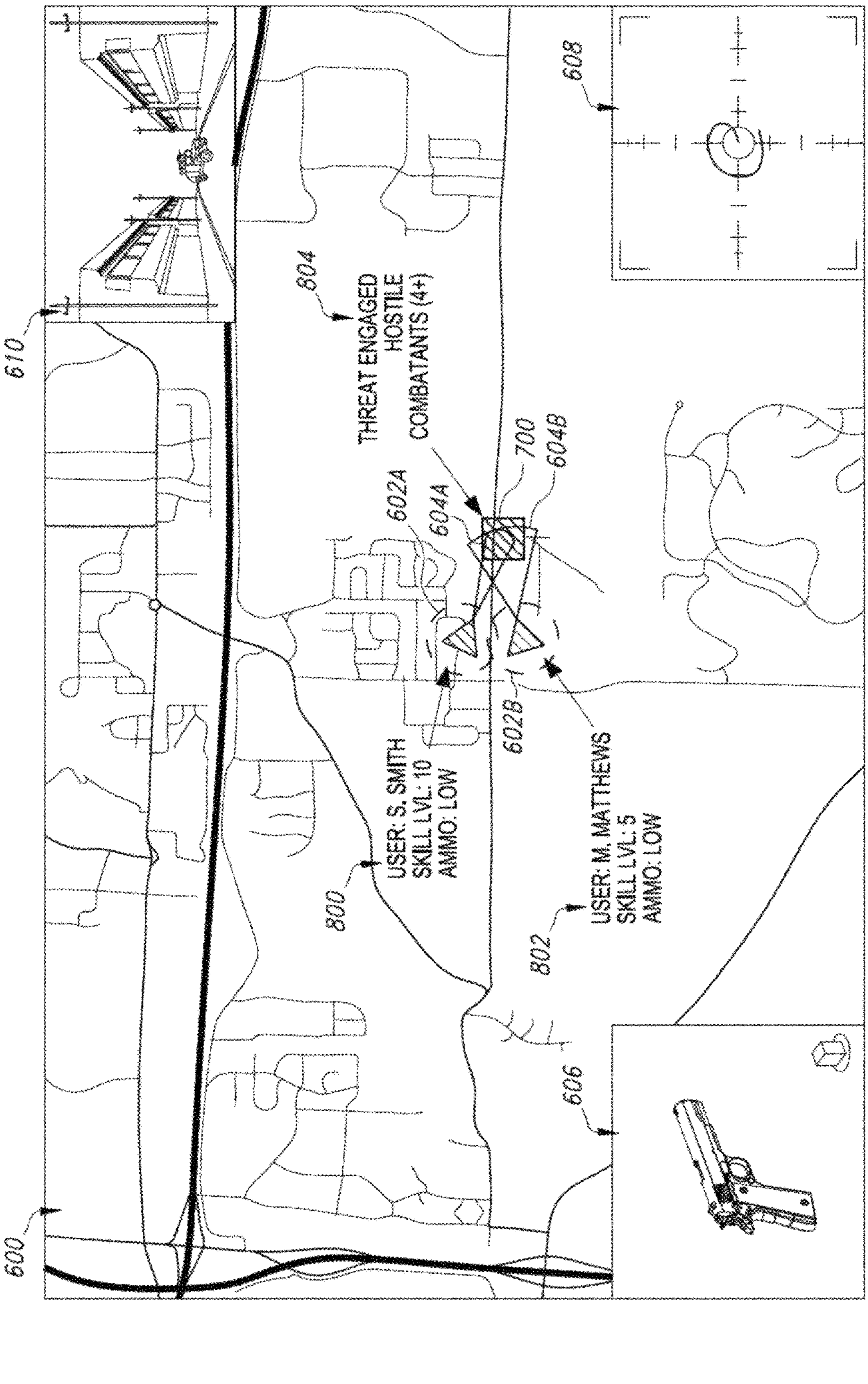

In FIG. 8, the top-down geographic view 600 of FIG. 6 is again shown, but with visual prompts 800 and 802 representing information relating to users 602A and 602B, respectively, and visual prompt 804 representing information relating to threat 700. Prompt 800 visually represents within top-down geographic view 600 that user 602A is named S. Smith, is skill level ten, and has low ammunition supply. Prompt 802 visually represents within top-down geographic view 600 that user 602B is named M. Matthews, is skill level five, and has low ammunition supply. Prompt 804 visually represents within top-down geographic view 600 that threat 700 is an actively engaged threat and includes four or more hostiles. In embodiments, one or more of visual prompts 800, 802, or 804 is automatically shown in the GUI which includes top-down geographic view 600. In embodiments, one or more of visual prompts 800, 802, or 804 is shown in the GUI which includes top-down geographic view 600 in response to selection by a user of application 102 (e.g., a remote support user) of one or more of user 602A, user 602B, or hostile 700 within top-down geographic view 600. In embodiments, one or more of visual prompts 800, 802, or 804 may be visually represented within the GUI which includes top-down geographic view 600, but outside of top-down geographic view 600. For example, a separate view of that GUI may present text-based or other information about users 602A-B and/or about threat 700.

Figure 9:
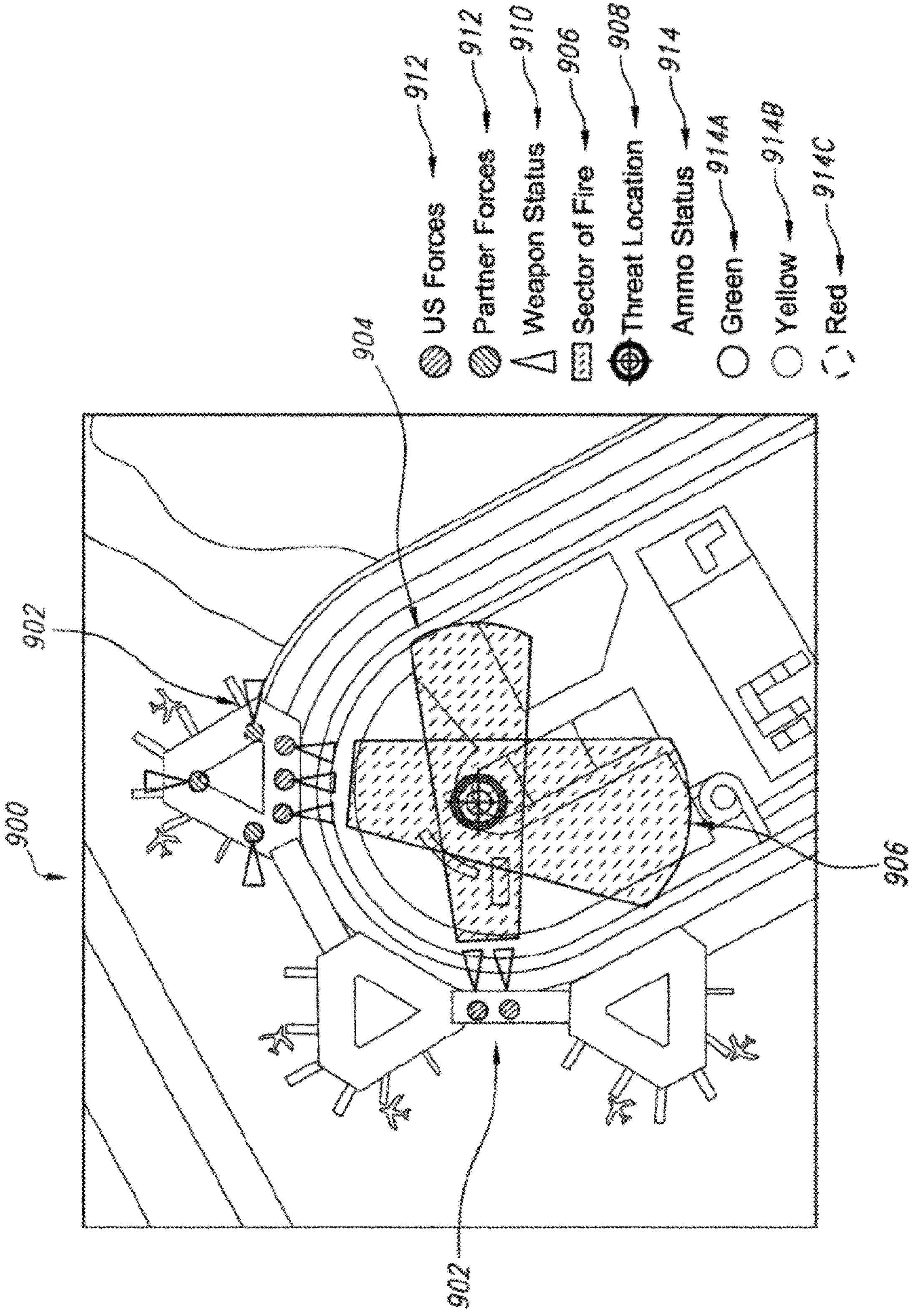

In FIG. 9, a top-down geographic view 900 different from top-down geographic view 600 is shown. Top-down geographic view 900 represents an overhead visualization of multiple users 902 engaged in live fire 904. In embodiments, top-down geographic view 900 displays information relating to one or more of sectors of fire 906, threat locations 908, weapon statuses 910, fellow and partner forces 912, or ammunition statuses 914. In embodiments, sectors of fire 906 can show the area being attacked. By way of this example, a cone of other suitable shapes can be depicted adjacent to the weapon to show the area to which live fire is directed. It will be appreciated that movements of the weapon and movements of users 902 motivate showing sectors of fire 906 in cone-like shapes rather than lines. In doing so, these sectors of fire 906 can overlay on each other when there is multiple live fire from fellow and partner forces 912 and their intersections can identify or facilitate in the identification of threat locations 908. In embodiments, weapon statuses 910 and ammunition statuses 914 can indicate whether ammunition is running low, time until exhaustion of ammunition, jammed weapon, and the like. In embodiments, top-down geographic view 900 may visually represent one or more of sectors of fire 906, threat locations 908, weapon statuses 910, fellow and partner forces 912, or ammunition statuses 914 using icons. In some such embodiments, top-down geographic view 900 or a GUI which includes top-down geographic view 900 may include a legend of those icons. In embodiments, ammunition statuses 914 may be visually represented in different ways based on the status. For example, an ammunition status indicative of the user having a sufficient ammunition inventory may be shown by green ammunition status 914A. In another example, an ammunition status indicative of the user having an ammunition inventory which is running low (e.g., lower than a threshold, which may be configurable or defined based on the firearm type or otherwise) may be shown by yellow ammunition status 914B. In yet another example, an ammunition status indicative of the user having an ammunition inventory which is depleted or nearly depleted may be shown by red ammunition status 914C.

Figure 10:
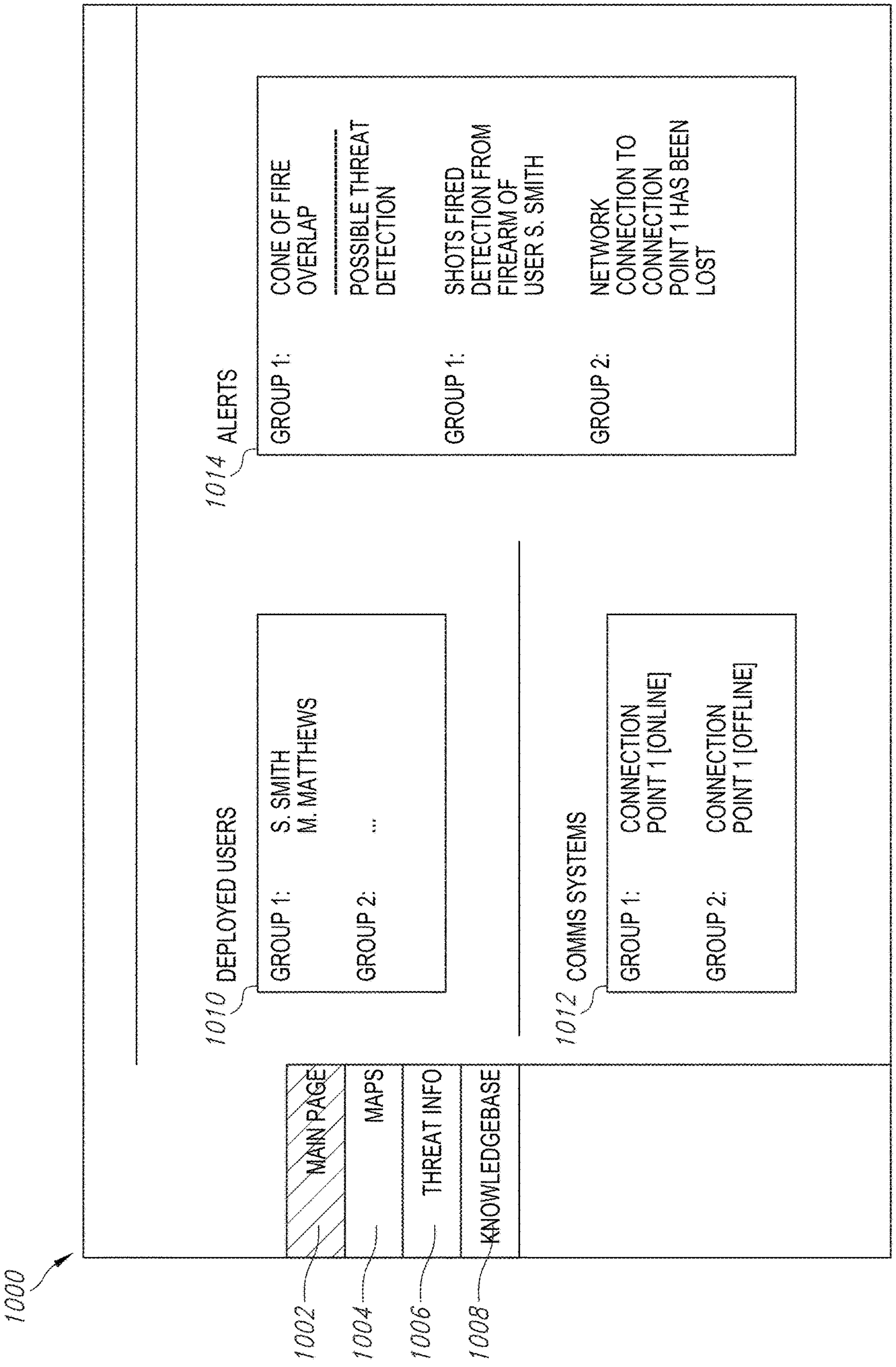

In FIG. 10, first dashboard view 1000 representing a visualization of an example of a first page of a dashboard of application 102 is shown. Application front-end includes pages corresponding to tabs 1002, 1004, 1006, and 1008. Tab 1002 corresponds to a main page (e.g., the first page shown in FIG. 10), Tab 1004 corresponds to a maps page (e.g., for displaying a GUI with top-down geographic view 600 shown in any of FIGS. 6-9). Tab 1006 corresponds to a threats page (e.g., described below with respect to FIG. 11). Tab 1008 corresponds to a knowledgebase (e.g., representing data stored in database 124). First dashboard view 1000 includes user interface elements 1010, 1012, and 1014 for reporting information about system 100. Element 1010 reports a list of users currently deployed within a deployment location (e.g., users 60A-B). Element 1012 reports a list of communication systems in use. Element 1014 reports a list of alerts for the attention of a user of the dashboard.

In embodiments, as in the example shown in FIG. 10, the information reported using elements 1010, 1012, and 1014 is organized by groups of users. However, in embodiments, such information may be organized by individual user or in another manner. In embodiments, element 1012 may include status information for connections between application 102 and connection points deployed within deployment locations.

Figure 11:
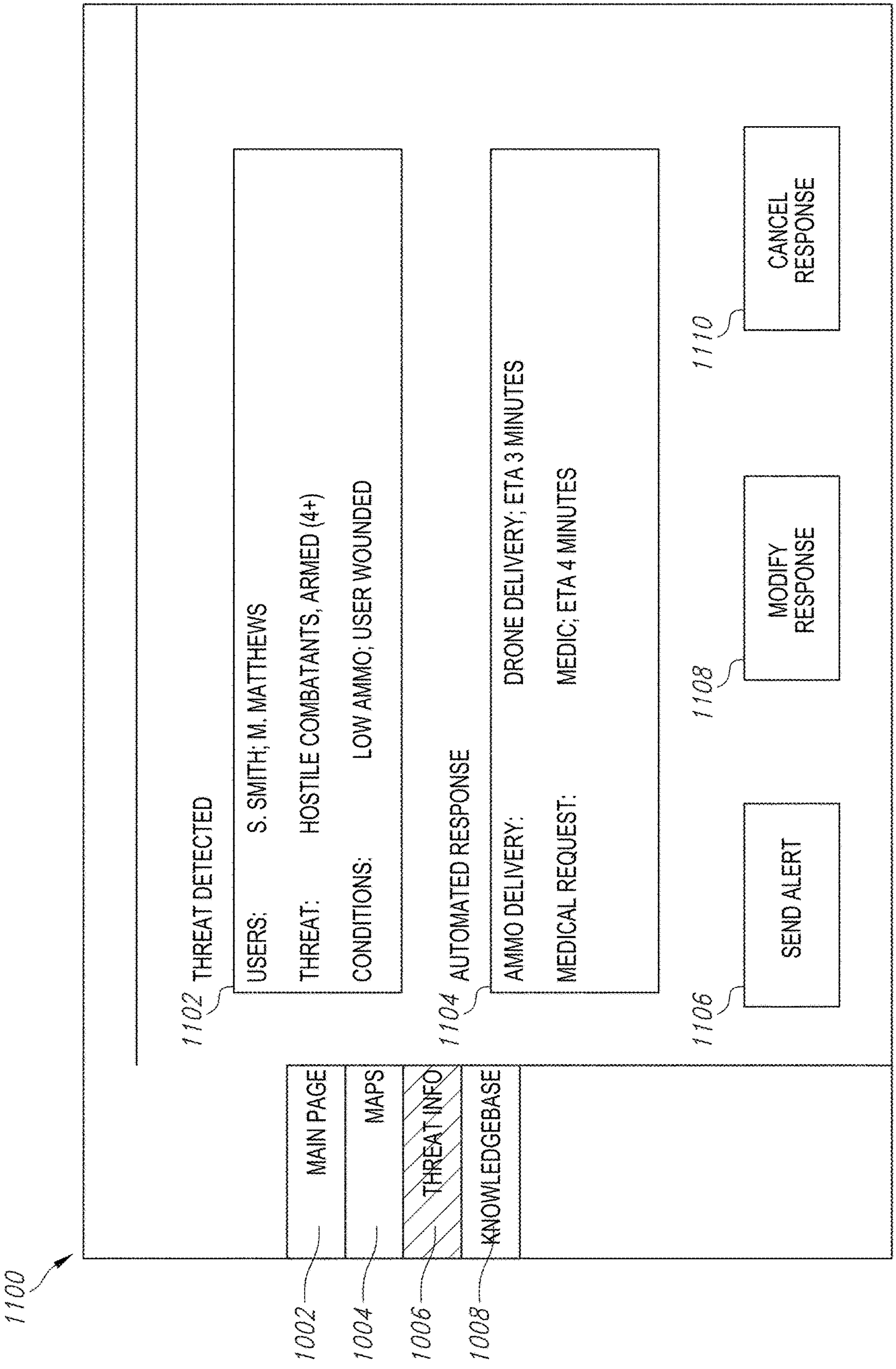

In FIG. 11, second dashboard view 1100 representing a visualization of an example of a second page of the dashboard of application 102 is shown. In the example shown, the second page as shown in FIG. 11 is the threats page corresponding to tab 1006. Second dashboard view 1100 includes user interface elements 1102, 1104, 1106, 1108, and 1110. Elements 1102 and 1104 are used for reporting information about system 100. Elements 1106, 1108, and 1110 are interactive elements which can be toggled (e.g., clicked) by a user of the dashboard. Element 1102 reports a list of detected threats, including information about users affected by the threats, predictions of what the threats are, and conditions faced by the users in addressing the threats. Element 1104 reports a list of automated responses taken based on the detected threats, including methods of performance and estimated times for performance. Element 1106 is a button allowing a user of the dashboard to send an alert relating to the threats reported in element 1102 and/or the responses reported in element 1104, for example, to users deployed within the deployment location related to the detected threats or to others (e.g., remote managers or other personnel). Element 1108 is a button allowing a user of the dashboard to modify an automated response reported in element 1104, for example, if he or she believes different support would be useful or based on communications from the users engaged in addressing the threat (e.g., after the detection of the threat). Element 1110 is a button allowing a user of the dashboard to cancel an automated response reported in element 1104, for example, if he or she believes support is no longer necessary or based on communications from the users engaged in addressing the threat (e.g., after the detection of the threat and/or after a portion of the automated response is performed).

In embodiments, threats and responses reported within second dashboard view 1100 may correspond to any of a number of user groups registered with system 100. In embodiments, threats and responses reported within second dashboard view 1100 may correspond to individual groups. In embodiments, threats and responses reported within second dashboard view 1100 may correspond to individual users. In embodiments, the responses reported within element 1104 are not automated. In such embodiments, the second dashboard view 1100 includes a user interface element for the user to interact with to verify or otherwise approve a proposed response.

In embodiments, the number and/or types of elements included within a GUI or within a view of a GUI (e.g., a GUI as shown in any of FIGS. 6-11) can be controlled based on the type of GUI or the type of view within the GUI. For example, when top-down geographic view 600 becomes too dense with overlapping icons, the GUI which includes top-down geographic view 600 may automatically update to visually represent a new icon symbolizing multiple units within the area shown. For example, referring to FIG. 6, users 602A-B may be combined into a user group and visually represented using a single icon rather than the two separate icons shown.

In embodiments, the dashboard of application 102 may include GUIs and/or views other than what is shown in FIGS. 10 and 11. For example, the dashboard of application 102 may include communication and mapping features, such as to track the location of all weapons in real-time, to highlight relevant events (such as weapons being gripped, weapons being raised, or weapons that have been discharged). In some such embodiments, the dashboard of application 102 may include the GUIs shown in any of FIGS. 6-9 (e.g., accessible via tab 1004 or another tab or user interface element). In another example, the dashboard may provide access information from other systems, such as making available camera views, such as ones that are triggered by activation of body cameras or on-site cameras from within the deployment location or from the dashboard. In embodiments, the dashboard includes a GUI and/or view for separating users into groups/echelons with designated permissions. For example, the dashboard may include different GUIs and/or views for each of one or more of ground units, officers, military personnel, an investigator/compliance officer, and the like.

Figure 12:
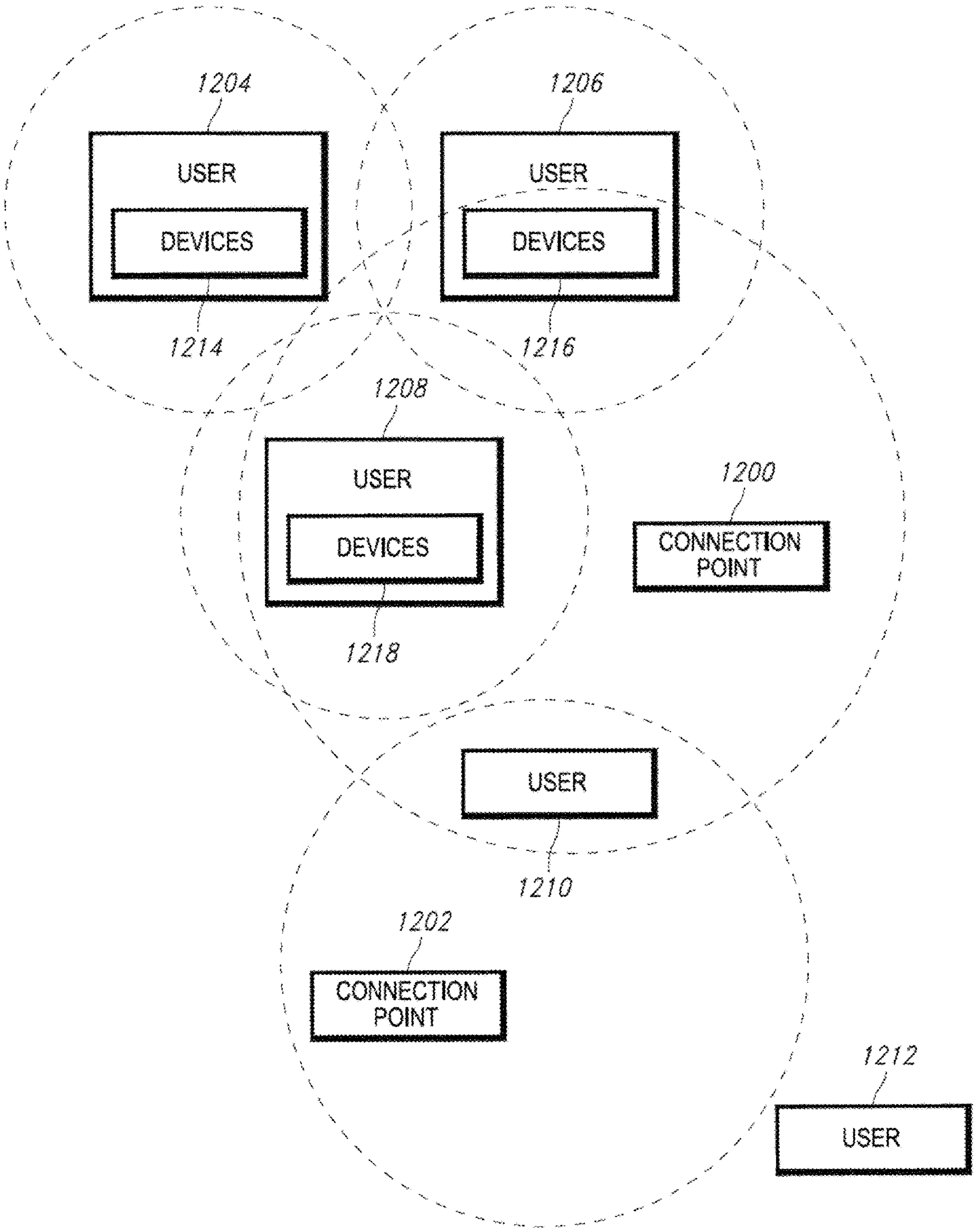
FIG. 12 is an illustration of a mesh network system in accordance with embodiments of the present disclosure.

Referring to FIG. 12, a mesh network usable with system 100 is shown. The mesh network is made up of a number of network devices, including connection points 1200 and 1202, either of which may, for example, be connection point 116. The mesh network is used by a number of users (e.g., some or all of users 1204, 1206, 1208, 1210, and 1212) to communicate information (e.g., sensor measurements) recorded for those users to the server device 112 for processing using application 102. In embodiments, some of the users, such as users 1204, 1206, and 1208, have mobile computing devices 1214, 1216, and 1218, respectively, which operate to extend the mesh network when in range of connection point 1200 or connection point 1202.

Depending on their proximity to connection point 1200 or to connection point 1202, devices associated with users 1204, 1206, 1208, 1210, and 1212 may or may not be able to connect to connection point 1200 or to connection point 1202. In the example shown, users 1208 and 1210 are standing in the range of connection point 1200 and therefore devices of users 1208 and 1210 may be able to connect to connection point 1200. Similarly, user 1210 is shown as standing in the range of connection point 1202 and the devices of user 1210 may be able to connect to connection point 1202. In embodiments, the range of the mesh network created by connection points 1200 and 1202 may be extended by mobile computing devices 1214, 1216, and 1218. For example, in such an embodiment, users 1204 and 1206 would also be within the range of connection point 1200 and therefore devices of users 1204 and 1206 may be able to connect to connection point 1200. However, because user 1212 is not within the range of either connection point 1200 or connection point 1202, and because user 1212 does not have a mobile computing device to extend the mesh network created thereby, devices associated with user 1212 are unable to connect to either connection point 1200 or connection 1202 while user 1212 remains at the location shown.

In embodiments, the mesh network may be a self-organizing and fluid mesh network that organizes and reorganizes itself based on specified data, including data filtered or weighted based on specified criteria, and/or the dynamic detection of other devices, for example with a geographic perimeter. Other devices may include deployable mesh network hubs (also known as "pucks"), beacons, wireless connection points, such as Wi-Fi connection points, lighting systems, cameras, and the like, each of which may be connection point 1200 or connection point 1202 or mobile computing device 1214, 1216, or 1218. The mesh network may also include asset management systems, crowdsourced communications, frequency scanning networking systems, cellular mesh networking systems, and/or other systems.

In embodiments, devices on the mesh network may adjust location information based on the relative movement of each other within the mesh network. In embodiments, the relative movement of devices may be reported by other devices within the mesh network over the mesh network, such as to the self-disposing devices. The relative movement of other devices may also be derived from IMUs disposed with the other devices within the mesh network.

Relative movement information may include speed, velocity, acceleration or position information, and/or event identification information. Such information may include threat identification information, shot accuracy information and the like. Event identification information may include weapon information, information indicating a person is in an unauthorized area, soldier maneuver information (e.g., speed, direction, activity, or the like), in-position information (such as for an individual or a device), rate-of-fire information, alternating fire information, maintenance required information, stoppage event information, ammunition expenditure information, fight or struggle information and the like. In embodiments, authentication information may be received from RF identification (RFID) implants, for example, implanted in the person.

In embodiments, the relative movement, such as among devices in the mesh network like firearms and other equipment may be provided relative to at least one geographic location, such as through the use of data from the IMUs or from one or more other data sources. In embodiments, location may relate to relative locations of one or more other firearms or other devices connected to the mesh network, such as the distance, direction, and/or movement of one or more other firearms or other devices relative to a given one. In such embodiments, geographic location and movement information, whether relating to a location or to another firearm or other device may be communicated to a given firearm or other systems of an individual handling a firearm over the mesh network. In embodiments, the geographic location may be an underground geographic location, where other geographic location detecting signals, such as GPS are not available. In embodiments, a combination of geographic location and relative location may be understood by the system, such as where at least one member of a mesh network has a detectable location (such as by GPS signal) and other members have locations that are determined relative to the known member, such as by detecting motion through the IMU or other non-GPS systems. It may be appreciated from these embodiments that using data from the IMU on the mesh network may allow the firearm usage monitoring system to provide discharge location information in geographic locations that may not otherwise be covered by geographic location detecting signals.

In embodiments, the mesh network connection may be a wireless mesh network connection and may be configured based on radio communication frequencies. In some situations, radio communication frequencies may be subject to interference or jamming, either intentionally or otherwise, making communication difficult or impossible when attempting to establish a connection over the compromised frequency. Interference or jamming may include radio frequency interference or jamming, optical jamming, noise, and the like. Because of the risk of jamming, and because communication reliability may be critical for the user of system 100, the firearm usage monitoring system may detect such jamming of one or more frequencies and automatically adjust the frequency of the mesh network to avoid using the compromised frequency, such as by selecting a frequency not currently subject to interference or jamming. System 100 may then establish a wireless mesh network connection with another device using the selected frequency. Jamming or interference detection may include detecting attempted signal interception and scrambling transmitted information to avoid the detected signal interception.

In embodiments, system 100 may determine discharge information related to the firing of a firearm of one of users 1204, 1206, 1208, 1210, or 1212 connected to the mesh network. The discharge information may include discharge location, direction of the discharge, a motion path of the firearm preceding discharge and/or orientation of the firearm at discharge. Orientation information may be provided by the IMU of the firearm and may include enemy area location and size information, unsafe act information, line of fire information, shift fire information, sectors of fire information, interlocking fire information, 360 perimeter security information and the like.

The discharge information may be determined from motion and location information, such as provided by devices connected to the mesh network. For example, the discharge location may be determined from geographic location data of one or more firearms connected to the mesh network and may use relative movement data provided by the other devices connected to the mesh network, for example by analyzing relative movement data that is based on resident IMU data from other firearms connected to the mesh network.

In embodiments, system 100 may perform over-the-air updates for hardware and/or software within the range of connection points 1200 and 1202 using connection points 1200 and 1202. In embodiments, devices within range of connection points 1200 and 1202 may be charged by wireless charging using connection points 1200 and 1202 as the power sources. In embodiments, connection points 1200 and 1202 may record data (such as IMU data) from devices within range thereof when those devices are in active or inactive modes (such as to flash memory) and may enable other modes, such as a sleep/hibernation mode.

In embodiments, system 100 may function in active modes, sleep modes and/or hibernation modes. In the active mode, a device (e.g., components of a firearm, a computing device such as devices 1214, 1216, 1218, or the like, or a device of another asset) may be in full power mode, such as using power for collecting readings from the IMU and GPS and transmitting them via a local protocol like BLE to an edge device. In embodiments, data can be sent in this format at relatively high data rates, such as at 30 messages/second, 50 messages/second, 100 messages/second, or the like. A sample string may include AB-FC-22-CC-B3-00-00-00-00-00-00-00-00-00-00-00-00-5E-89-5A-C0-71-3E-E6-C0-FA-18-9C-C0-00-20-75-3F-00-80-52-3E-00-00-19-3E-00-00-B4-40-67-66-00-C1-34-33-6B-C0-01-BA. The guide may be as follows: AB (header), FC-22-CC-B3-00 (millisecond timestamp), 00-00-00-00 (latitude), 00-00-00-00 (longitude), 00-00 (altitude in meters), 00 (horizontal accuracy in meters), 5E-89-5A-C0 (gyro x), 71-3E-E6-C0 (gyro y), FA-18-9C-C0 (gyro z), 00-20-75-3F (accel x), 00-80-52-3E (accel y), 00-00-19-3E (accel z), 00-00-B4-40 (mag x), 67-66-00-C1 (mag y), 34-33-6B-C0 (mag z), 01 (unit status), BA (footer). A millisecond timestamp may be used, such as in a modified UNIX timestamp, e.g., for milliseconds after 01-01-16. In embodiments, if BLE is unavailable or a message is not sent, this may be stored in the flash memory to be sent when the device enters sleep mode. The active mode may, for example, be triggered when force is applied to a force sensor. Depending on the configuration, a device may remain in the active mode for a specified time, such as two minutes after the force is no longer applied, for five minutes, for ten minutes, or the like. This timer may be reset when force is reapplied.

In embodiments, devices connected within range of connection point 1200 and/or connection point 1202 may also power down into a "sleep" mode, such as when there is no longer force applied to the device and the timer has gone down (indicating expiration of active mode). In such a sleep mode, one message may be sent at a defined period, such as once per second, such as containing the timestamp, location data, and current orientation data. A GPS module or like component of the device may enter an ATP (adaptive trickle power) state where it cycles between full power and ATP to minimize power consumption while maintaining a fix on its location. In embodiments, a location fix may be maintained consistently, regardless of power mode. In embodiments, the IMU may be polled at a low rate, such as to monitor movement. If no movement is sensed for a given time, such as five minutes, then the unit may go into another even lower power mode, referred to herein as a hibernation mode. In some such embodiments, connection points 1200 and 1202 may monitor and selectively control changes in modes of devices, for example, based on timestamps indicating connections between the devices and ones of connection points 1200 and 1202, based on signals received by connection points 1200 and/or 1202 from ones of the devices, and/or based on other criteria.

In such a hibernation mode, a device may continue to send messages (e.g., one per second), such as containing the timestamp, location data, and current orientation data. The GPS module may enter hibernation where it consumes, for example, under 1 mA of power. The IMU may still be polled at a low rate. If movement exceeds a certain threshold, the unit may go into sleep mode and the GPS module may wake up to maintain a location fix. This mode may consume, for example, under 7 mAh.

In embodiments, the firearm 104 further includes sensors 118, a communication interface, a buffer, and a controller.

The communication interface is configured to pass data between devices or components coupled thereto, such as the firearm 104 and a connected device (e.g., wearable devices 106, stationary device 108, connection point 116). The communication interface may include a suitable number of conductors, connectors, transmitters, and/or receivers to achieve desired data throughput and device connectivity. The communication interface may communicate with devices and components through wired and/or wireless telecommunication protocols, such as ethernet, transmission control protocol (TCP), Internet protocol (IP), power line communication, Wi-Fi, Bluetooth®, infrared, radio frequency (RF), general packet radio services (GPRS), global system for mobile communications (GSM), frequency-division multiple access (FDMA), code-division multiple access (CDMA), evolution-data optimized (EVDO), Z-Wave, ZigBee, 3G, 4G, 5G, another protocol, or a combination thereof.

The buffer is configured to temporarily store data received from, for example, sensors 1302 prior to transmission via a signal medium or writing to a storage medium. The buffer may be a suitable physical or virtual medium. The buffer may operate in a suitable manner, such as by implementing a first-in, first-out queue where the oldest data is the first data read out of the buffer for transmission or storage. In examples, the oldest data or subsets of data in the buffer may be overwritten by the newest data being read into the buffer. Beneficially, the buffer may provide for reduced power consumption based on implementation by optimizing compute time and transmission payload size. The buffer may be a static allocation of a suitable size or may be dynamically allocated. Beneficially, dynamic allocation allows the firearm usage monitoring system 2800 to adjust the buffer allocation based on or in response to triggering events or predetermined conditions, which thereby improves operation of the firearm usage monitoring system 2800 by optimizing resource allocation. For example, if long-term storage resources onboard the firearm 102 are approaching capacity, the size of temporary storage in the buffer may be reduced and the freed space may be used for long-term storage until connection is reestablished or the long-term-storage data is further processed and/or reduced in size.

The controller is configured to run application software that controls operation of connected components. The terms "controller," "control module," "control," "control unit," "processor" and similar terms mean Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, other components, combinations thereof, and the like to provide the described functionality. "Software," "firmware," "programs," "instructions," "routines," "code," "algorithms" and similar terms mean controller executable instruction sets including calibrations and look-up tables. In some aspects, the controller includes a central processing unit (CPU).

To appropriately control operation of coupled components, the controller may include a processor (e.g., a microprocessor) and at least one memory, at least some of which is tangible and non-transitory. The memory can store controller-executable instruction sets, and the processor can execute the controller executable instruction sets stored in the memory. The memory may be recordable medium that participates in providing computer-readable data or process instructions.

The recordable medium may take many forms, including but not limited to non-volatile media and volatile media. Non-volatile media for the controller may include, for example, optical or magnetic disks and other persistent memory. Volatile media may include, for example, dynamic random-access memory (DRAM), which may constitute a main memory. The memory of the controller may also include a solid-state medium, a floppy disk, a flexible disk, hard disk, magnetic tape, another magnetic medium, a CD-ROM, DVD, another optical medium, combinations thereof, and the like.

The controller-executable instruction sets may be transmitted by one or more transmission media, including coaxial cables, copper wire or traces, fiber optics, combinations thereof, and the like. For example, the transmission media may include a system bus that couples two or more components of the firearm monitoring system 3500, such as the controller, the communication interface, and the sensors.

The controller can be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Any algorithms required by the controller or accessible thereby may be stored in the memory and automatically executed to provide the required functionality for the relevant components, such as the buffer, the communication interface, and the sensors.

In embodiments, the application software is configured to operate the firearm 104 and/or components thereof in a plurality of states, as well as being configured to detect conditions related to such operation. The plurality of states may include, for example, one or more firearm-sleep states, one or more cloud-constrained states, one or more situational states, combinations thereof, and the like.

The one or more sleep states are configured to reduce resource impact of the firearm 104. The resource impact may include, for example, power usage, data storage, and/or data transfer. The sleep states may include, for example, a storage state, a hibernation state, a standby state, a hybrid-standby state, combinations thereof, and the like.

Beneficially, the storage state may provide reduced power consumption and a reduced resource footprint while the firearm 104 is being stored. For example, operation of components of the firearm usage monitoring system 2800 disposed on or attachable to the firearm 104 may be eliminated or significantly reduced while those components are in storage.

In aspects, the controller is configured to power down components of the firearm 104 such as sensors 1302 and storage media, wake, in response to fulfilment of a predetermined condition, a location sensor of the firearm 104, and determine a location of the firearm 104. In response to determining the firearm 104 is still in the storage location, the controller is configured to return to the powered-down state. In response to determining the firearm 104 is outside the storage location, the controller is configured to operate the firearm 104 in a data-acquiring state, such as a situational state. Optionally, the firearm usage monitoring system 2800, in response to determining the firearm 104 is still in the storage location, may further acquire data, record acquired data to a long-term storage medium onboard, transmit acquired data to a remote device prior to returning to the powered-down state, receive data from a remote device, combinations thereof, and the like.

The predetermined condition may be, for example, a predetermined period of time elapsing, detection of a mechanical event such as a switch actuation, combinations thereof, and the like. In aspects, the period of time may be a day, a week, a month. In aspects, the interval of subsequent periods of time may be increased. For example, the period of time may be a day until the firearm 104 has remained in the storage state for a week in the sleep state, then the period of time may be increased to a wake-up every week until the firearm 104 has remained in the storage state for a month, and then the period of time may be increased to a wake-up every month.

In aspects, the storage state optimizes power consumption during long-term non-use of the firearm 104 while also providing for inventory tracking and/or management of the firearm 104. Optionally, the storage state may also provide security features for the firearms 104, such as inhibiting usage of the firearm 104 and preventing firearm 104 trafficking.

Beneficially, the hybrid standby state may provide for switching from the standby state to the hibernate state without additional resource overhead.

In aspects, the controller is configured to power down components of the firearm 104, and, while entering the sleep mode, write relevant data to non-volatile memory. The controller may be further configured to monitor a condition of the firearm 104, wait a predetermined period of time, and switch, in response to the predetermined condition not being fulfilled at an end of the predetermined period of time, to a hibernation mode without writing previously acquired data to non-volatile memory. What is more, if a timestamp for entering hibernation is desired, the firearm usage monitoring system 2800 does not need to write such a time upon entering the hibernation state. Instead, the firearm usage monitoring system 2800 may write the timestamp while or after exiting the hibernation mode because the predetermined period of time is known. Beneficially, this preserves data fidelity while further reducing resources required.

The predetermined condition may be, for example, a movement sensor detecting movement above a predetermined threshold, actuation of a component of the firearm 104, geospatial movement of the firearm, combinations thereof, and the like.

Notably, the hybrid standby mode reduces resource requirements because the firearm usage monitoring system 2800 does not need to expend resources to write previously acquired data when entering hibernation mode from sleep mode. For example, the firearm 104 may proceed to shut down relevant components without establishing further network communication or expending power to prepare components of the firearm 104 for a data write.

The one or more cloud-constrained states are configured to maintain data fidelity and/or situational awareness while network connections or resources are limited or unavailable. The network conditions or resources may include, for example, communication bandwidth or interference, communication denial, resource constraint imposed by a quality-of-service goal, combinations thereof, and the like. The cloud-constrained states may include, for example, a network-constrained state, a network-blocked state, a cloud-compute-constrained state, combinations thereof, and the like.

Beneficially, the network-constrained state may optimize data transfer from the firearm 104 through the network to minimize overall bandwidth required when connectivity issues are caused by terrain, physical distance from a connection point, interposing structures, combinations thereof, and the like.

In aspects, the controller is configured to detect network-based communication constraint and switch, in response to detecting the network-based communication constraint, the firearm 104 to a network-constrained state including one or more of storing acquired data to non-volatile memory on the firearm, processing acquired data to reduce overall payload for delivery to the remote server, and adjusting communication intervals to optimize payload size for communication (e.g., increased packet size or minimized padding). The network-based communication constraint may be detected, for example, through signal loss, packet losses, latency, combinations thereof, and the like.

Increasing memory allocation for storing data acquired by the sensors may include, for example, a dynamic allocation or static allocation. The allocated block sizes may be determined based on sampling intervals of the sensors, predicted usage of the firearm 104, detected bandwidth of the network connection, combinations thereof, and the like. Beneficially, this preserves data fidelity while maintaining high-speed, low power access (e.g., values do not need to be read from storage into memory) for rapid transmission when bandwidth is available again. This further increases the longevity of flash memory on the device.

Storing the acquired data to non-volatile memory may include, for example, writing acquired data to flash memory. Beneficially, storing the acquired data to non-volatile memory maintains data fidelity during network-constrained operation.

Reducing the data to be communicated may include, for example, applying an algorithm to provide processed situational data in a smaller overall size. For example, the algorithm may filter acquired data through suitable methods such as selecting a desired timestep that is greater than the acquisition timestep and preparing for transmission only data that was acquired at the desired timestep, data of the greatest and/or least magnitude during the desired time interval, an average value (such as the mean, median, or mode) for the desired time interval, combinations thereof and the like. Beneficially, reducing the data to be communicated provides for continued situational awareness while optimizing traffic through the network from both the firearm 104 and similarly connected firearms 104. Further, connection overhead may be reduced, for example, by reducing both request and response packets and, particularly the number of packets that must be resent.

Adjusting communication intervals may include, for example, increasing the intervals for communication to an upstream connected device. The time interval may be adjusted based on data collection rate of the device, encryption protocol, communication protocol, frame size at the bottlenecked communication, combinations thereof, and the like. Beneficially, one or more of these values may be used to determine the communication interval which optimizes communication via, for example, increasing payload size and minimizing padding and message overhead (e.g., headers and footers needed to communicate the same amount of data) such that fewer packets are being communicated from the firearm 104.

Optionally network-constrained state may further include sending a message to the remote server to communicate the network-constrained state. Beneficially, the message promotes situational awareness of users and commanders because both groups may be made aware of the network-constrained state. When both groups are aware of the network-constrained state, alternative methods of communication (e.g., via an alternate frequency and/or communication media). Moreover, commanders may coordinate with additional units to support or communicate with the network-constrained user or users.

Additionally, or alternatively, the network-constrained state may further include acquiring high-priority situational data and communicating the high-priority situational data to the remote server in substantially real time. The high-priority situational data is communicated to the remote server while substantially all data acquired prior to and after acquisition of the high-priority situational data is acquired, stored, and/or processed in accordance with standard operation of the firearm 104 in the network-constrained state.

The high-priority information may include, for example, a discharge of the firearm, actuation of a user-input mechanism (e.g., button, switch, or toggle), detecting a raising and/or aiming of the firearm 104, combinations thereof, and the like.

Beneficially, the network-blocked state may provide situational awareness for commanders and users, as well as maintaining recording and/or reporting ability of firearms 104 within the network-blocked location.

In aspects, the controller is configured to detect a network-blocked condition and switch, in response to detecting the network-blocked condition, the firearm 104 to a network-blocked state including one or more of storing acquired data to non-volatile memory on the firearm, processing acquired data to reduce the storage footprint, establishing non-blocked modes of communication to the remote server, and tracking geospatial location and/or orientation using non-wireless mechanisms.

Network-blocked locations are locations where network communication is substantially interfered with or denied.

Network communications interference may occur via unintentional interruption or disruption of signals for one or more forms of wireless transmissions (e.g., wireless communication or GPS signals). For example, structures, natural formations and phenomena, or presence of other communicating devices may incidentally interrupt wireless communication to or from devices at a particular location.

Denial of network communications may occur via deliberate interruption or disruption of signals for one or more forms of wireless transmissions. For example, an actor opposing the user, such as a state, criminal actor, or hostile force, may deny network communication through active measures or passive measures.

Active measures include, for example, signal jamming or signal capturing. Signal jamming may occur, for example, by one or more devices emitting signals at one or more desired wavelengths to decrease the signal-to-noise ratio at or near those wavelengths within the area of effect. Signal capturing may occur, for example, by one or more devices configured to intercept signals emitted from a device (e.g., a stingray). The intercepted signals may be re-emitted by the device or sunk.

Passive measures include, for example, selection of materials or locations that impede wireless signals. Passive-denial materials may include, for example, a metallic or metallized material that inhibits propagation of signals therethrough (e.g., a Faraday cage). Passive-denial locations may include, for example, underground facilities.

Detecting network-blocking may include, for example, the firearm 104, stationary devices, wearable devices, the remote server, combinations thereof, and the like. In aspects, these devices may include a radio-communication system configured to receive and process wireless signals to determine network communications interference or denial. For example, a radio-communication system may be configured to receive and process signals to determine the presence of a jammer using suitable algorithms. In aspects, the radio-communication system includes a software-defined radio operatively coupled to at least one antenna and a controller. The antennas are configured to receive predetermined frequencies of wireless signals.

Additionally, or alternatively, the radio-communication system may be configured to receive and process signals to determine denial of network communications using suitable algorithms. For example, the firearm usage monitoring system 2800 may monitor communications signals between the firearm 104 and remote server, calculate a signal power level profile with respect to movement of the firearm 104, and determine, in response to the power level profile either fulfilling a predetermined model or not fulfilling predetermined models, that the firearm 104 is in a network-blocked location. In some aspects, the predetermined models may be suitable attenuation models such as a log-distance path loss model or the Hata model.

Establishing non-blocked modes of communication to the remote server may include, for example, sweeping wireless frequencies to establish communication via a non-blocked wavelength, establishing optical or wired communication with proximate devices to backhaul data, forming an ad-hoc network between firearms 104 and/or connected devices, combinations thereof, and the like.

In embodiments, the wireless-communications-blocked device or devices, such as firearms 104 or devices, may traverse communications frequencies via, for example, hopping across or sweeping through predetermined communications frequencies to establish communications over a non-blocked frequency. For example, the wireless-communications-blocked device may ascend frequencies, descend frequencies, alternatingly ascend and descend frequencies, proceed through frequencies in a known order, combinations thereof, and the like, such that the probability of establishing communications via a non-blocked channel is above a predetermined threshold. In embodiments, the probability of establishing a communication connection is above 75%, more preferably above 90%, yet more preferably above 99%.

The predetermined ranges may be, for example, one or more suitable frequency domains for communicating the desired information. In embodiments, the frequency domains include wireless-standard domains such as Wi-Fi bands, Bluetooth bands, Cellular bands, etc.

In embodiments, the wireless-communications-blocked device traverses frequencies, analyzes whether the communications signal is indicative of a jamming signal, and removes, in response to detection of the jamming signal, the frequency from the frequencies being traversed.

In embodiments, the wireless-communications-blocked device is configured to transmit data on low-bandwidth frequencies and/or short-range frequencies. Beneficially, the data transmitted on the low-bandwidth frequencies may communicate a shared frequency within the desired wireless-communications band having sufficient bandwidth to communicate the situational data.

In embodiments, the wireless-communications-blocked device begins traversing frequencies in response to a predetermined user input. For example, two users with non-blocked communications (e.g., visual, audial, or radio communications) may synchronize actuation and initiation of the algorithms for frequency traversal.

In embodiments, the wireless-communications-blocked device, is configured to establish an ad-hoc network such that device-to-device signal communication is above a predetermined signal-to-noise ratio. The ad-hoc network may be, without limitation, a mesh network or serial network. For example, a mesh network of wireless-communications-blocked devices may be formed and movement of users of those devices may be confined such that the distance between adjacent nodes is maintained below the desired threshold to maintain a signal-to-noise ratio above the desired amount.

Additionally, or alternatively, a serial network of wireless-communications-blocked devices may be formed (e.g., a "daisy chain") and movement of users of those devices may be directed such that the distance between adjacent nodes maintains a signal-to-noise ratio above the desired amount while extending range of the users into the network-blocked location. For example, a seven-member unit may establish a daisy-chain network where each user is connected to the adjacent user (e.g., user 1 is connected to user 2, user 2 is connected to users 1 and 3, user 3 is connected to user 2 and 4, user 7 is connected to user 6 and the external network, etc.). When the unit begins clearing the network-blocked location, the unit may enter until the signal-to-noise ratio of the connection between user 7 and connection to the external network (e.g., connection point) approaches or reaches a predetermined floor. At that point, user 7 may remain generally stationary while the remaining unit members continue clearing the network-blocked location until the signal-to-noise ratio of the connection between user 6 and user 7 approaches or reaches a second predetermined floor. This process may continue until the signal-to-noise ratio of the connection between user 1 and user 2 approaches or reaches a final predetermined ratio. In embodiments, the predetermined floors for signal-to-noise ratios may progressively decrease such that the available bandwidth is able to accommodate backhaul for data from all downstream devices. Beneficially, the serial network of wireless-communications-blocked devices maximizes penetration of the unit into the network blocked location while maintaining interconnectivity of devices within the unit, as well as optionally maintaining connection of the devices to the external network. Additionally, processing overhead is reduced and battery life increased by establishing the serial network described above because the nodes within the network do not need to allocate compute time or power toward detecting and establishing newer, stronger connections.

Tracking geospatial location and/or orientation using non-wireless mechanisms may include, for example, use of an IMU, electronic gyroscope, electronic accelerometer, optical tracking, combinations thereof, and the like. Beneficially, the firearm 104 may continue to track position of the user through alternate mechanisms that avoid reliance on signals from sources external to the network-blocked location, and may report this positioning to external devices through the network. In embodiments, the controller of the network-blocked device may adjust polling of the non-wireless mechanisms to provide tracking at suitable granularity. For example, the granularity may increase or decrease based on the presence or strength of the external signal source. In embodiments, the non-wireless movement sensors are polled at a first rate and, in response to the strength of the external signal source being at or below a predetermined threshold, are polled at a second rate that is higher than the first rate. The second rate is selected such that movements of the network-blocked device can be recorded and analyzed to determine a geospatial position of the user.

In embodiments, the polling rate is dynamically adjusted based, without limitation, on immediately prior movements of the user or the network-blocked device. For example, to maintain a desired level of granularity, the polling rate of a running user will have to be greater than the polling rate of a walking user. For example, if a measurement taken by the IMU is above a predetermined threshold, the controller may increase the polling rate of the sensor to thereby accurately capture the movement of the user.

In embodiments, the firearm usage monitoring system 2800 is configured to alert users of the firearms 104 or commanders of the users that the firearm 104 is entering or within a network-blocked location. Beneficially, such alerting improves situational awareness of the users and/or commanders and may, in embodiments, provide for neutralization of the signal-interference source or rerouting of users around the affected location. For example, alerting a user of the presence of a network blocked location provides for the user to repeatedly move locations and test for network blocking such that a perimeter for the network-blocked location may be determined.

Beneficially, the firearm usage monitoring system 2800 may determine the presence of a network-blocked location without orchestrating or altering movement of users. For example, the network-blocked location may be determined by the firearm usage monitoring system 2800 in response to losing connection with two or more devices (e.g., firearms 104 or wearable devices). In embodiments, the firearm usage monitoring system 2800 is configured to determine a network blocked location including detecting a loss of network communication from two or more devices within the same geolocation and determining, in response to the loss of network communication from the two or more devices, a perimeter of the network-blocked location, and, optionally, updating, in response to additional devices losing network communication and/or any of the two or more devices regaining network communication, the perimeter of the network-blocked location.

In embodiments, the perimeter is determined through signal-strength analysis. For example, the signal strength for communications from the two or more devices immediately preceding the loss of network communication may be determined and compared to models to determine interference sources. The signal strength may be determined via, for example, packet loss or other indicia of connectivity for the two or more devices.

In response to the signal strength diminishing in a pattern matching a first model, the firearm usage monitoring system 2800 determines that the interference is incidental and may geofence corresponding areas as network-blocked locations. For example, the firearm usage monitoring system 2800 may correlate the incidental interference to stored data such as schematics, maps, images, or video of structures, bystander density, terrain, combinations thereof, and the like to determine perimeters of the network-blocked locations. In response to the signal strength diminishing in a pattern matching a second model, the firearm usage monitoring system 2800 determines that the interference is from passive-denial mechanisms and geofences corresponding areas as network-blocked locations. For example, the firearm usage monitoring system 2800 may correlate the active interference to stored data, as described above, to determine perimeters of the network-blocked locations. For example, the firearm usage monitoring system 2800 may detect a rapid diminishment of signal from a user on opposite sides of a known structural element (e.g., entering a building) and determine that the building is considered a network-blocked location.

In response to the signal strength diminishing in a pattern matching a third model and/or a fourth model, the firearm usage monitoring system 2800 determines that the interference is from active-denial mechanisms, geofences corresponding areas as network-blocked locations, and, optionally, determining the location of the active-denial mechanisms. For example, the firearm usage monitoring system 2800 may use a third model to detect a falloff generally following the inverse square law from a shared point (e.g., the signal strength of the two or more devices being generally equal at a given radius) and determine the location of the active-denial mechanism at the convergence point from the two or more network-blocked devices. Additionally, or alternatively, the firearm usage monitoring system 2800 may use a fourth model to detect simultaneous signal dropping from geospatially proximate users, eliminate false-positive detection from, for example, loss of a network node, and determine an area of the active-denial mechanism. Beneficially, this area may be reduced to a location by directing actions of non-blocked users to test the perimeter of the network-blocked location.

The cloud-compute-constrained state is configured to inhibit loss of fidelity in situational awareness for commanders and/or users of the firearm usage monitoring system 2800. In embodiments, the firearm usage monitoring system 2800, when operating in the cloud-compute-constrained state, is configured to push data processing for lower-priority data toward the edge of the network so that server resources are allocated, dedicated, or otherwise available to process the highest-priority data. For example, if the firearm usage monitoring system 2800 is connected to firearms 104 within a unit engaged in a firefight and to firearms 104 within a unit patrolling a secured area, the firearm usage monitoring system 2800 may dedicate server-compute resources to processing data collected by the engaged unit while edge-compute resources (e.g., firearms 104, wearable devices, stationary devices, and connection point) process data collected by devices of the patrol unit. Beneficially, the firearm usage monitoring system 2800 may also reduce network traffic by pushing data processing of lower-priority data to the devices collecting the data such that transmission of the higher-priority data is uninhibited by interfering signals or traffic congestion.

In embodiments, the controller is configured to detect aspects, the cloud-compute-constrained state and switch, in response to detecting the cloud-compute-constrained state, the firearm 104 to a cloud-compute-constrained state including one or more of storing acquired data to non-volatile memory on the firearm, processing acquired data to reduce overall payload for delivery to the remote server, and adjusting communication intervals to optimize packet size for processing (e.g., sending larger packets to reduce processing overhead) similar to those processes discussed above. Additionally, or alternatively, the cloud-compute-constrained state may include one or more of storing acquired data to non-volatile memory on peer devices and processing, via peer devices, data acquired by the firearm 104.

The situational states are configured to provide prioritization information for data collected by the firearms 104. Additionally, or alternatively, the situational states may provide tags to data for machine learning applications to optimize model training. The situational states may include, for example, a training state, a deployed state, and an engaged state. The situational states may be determined via, for example, user actuation with the firearm usage monitoring system 2800, detection of the firearm 104 within a geofenced area, receiving signals from one or more beacons or wireless devices, duty schedule, receipt of messages from a remote server, activation of connected devices (e.g., a siren or body camera), an inertial measurement exceeding a predetermined threshold (e.g., force required during unholstering), prolonged sub-threshold actuation (e.g., holstered firearm while user is running), actuation of grip sensors combinations thereof, and the like.

The controller may operate the firearms 104 in the training state when users are engaged in a training exercise. For example, locations such as firing ranges and training fields may be outfitted with beacons such that firearms 104 entering the signal range of the beacons operate in the training mode and data collected by the firearms 104 may be labeled as training-mode data. In embodiments, the firearms 104 connect to a secondary server when operating in the training mode to transmit, store, and/or process collected data. The secondary server may include, for example, an on-site device such as a local server or deployable device. Beneficially, the training state may provide optimized network traffic and/or reduced cost operation by pushing data storage and processing toward the network edge and/or connecting to a secondary server that is separate from the remote server used, for example, during operation in the engaged state. Data collected while operating in the training state may be accessed later via an API or other data communication interface.

The controller may operate the firearms 104 in a deployed state when users are deployed to locations where the firearms 104 may be used but are not currently engaged. For example, a firearm 104 may operate in the deployed state when a user is on-duty and outside of a trusted location (e.g., an on-duty officer outside of the station or patrol vehicle). Beneficially, the deployed state may provide optimized resource allocation of the remote server by allowing for higher latency in transfer and processing of data collected by a firearm 104 in the deployed state.

The controller may operate the firearm 104 in an engaged state when the firearm 104 has been fired or when a firing event is likely. For example, the firearm 104 may operate in the engaged state in response to detecting an unholstering event, detecting an aiming action of the firearm 104, engagement of peers that are proximate to the firearm 104, detection of shots fired by another firearm, receipt of a message sent by the remote server, combinations thereof, and the like. In embodiments, the controller operates in an engaged state only when the detected event occurs outside of a trusted location (e.g., unholstering within a police station will not trigger the engaged state unless accompanied by manual actuation of the engaged state or a firing event). Beneficially, the engaged state provides for collection and transfer of high-fidelity situational data.

While the discussion of detection of conditions, detection of conditions, operation states, and corresponding mitigation or operation have been discussed with reference to the firearm 104, it should be recognized that such discussion may be applied to other components of the firearm usage monitoring system 2800, such as connection points, wearable devices, stationary devices, etc.

In embodiments, the firearm usage monitoring system 2800 provides processed data to third-party software, such as a geospatial infrastructure and military situational awareness app, for display. For example, the firearm usage monitoring system 2800 may provide firing data, target locations, engagements, aiming cones, firing cones, etc. to third-party software, such as Android Tactical Assault Kit (ATAK), Android Team Awareness Kit (ATAK), Digitally Aided Close Air Support (DACAS), Safe Strike, and other situational awareness software or applications for military, law enforcement, and first responders.

The firearm usage monitoring system 2800 may display to firearm users or commanders projected, collected, and/or analyzed information related to, without limitation, threats, team members, friendly units, bystanders or non-threatening persons, images or videos captured by users, subordinate or commanding units, objective, VIP or person of interest, exit routes, vigilance or potential threat level, combinations thereof, and the like. Threat information includes, without limitation, threat location, threat movement, threat field of view, threat firing cones, threat-controlled areas, and threat-viewable areas. Team member information includes, without limitation, team member position, team member movement, team member field of view, team member firing cones, team member aiming cones, team member ammunition status, team member mobility status, and team member support needs. Friendly unit information includes, without limitation, friendly-unit positions, friendly-unit movement, friendly-unit firing cones, friendly-unit aiming cones, friendly-unit support needs, and friendly-unit status. Information related to bystanders or non-threatening persons includes, without limitation, position, number, and/or danger to the bystanders. Images or videos captured by users includes, without limitation, images or video captured by the firearm 104, devices coupled thereto, connected devices, or support devices. Subordinate or commanding unit information includes, without limitation, position, grouping, number, ammunition, status, and support needs. Information related to objectives includes, without limitation, location, routing information, time to completion or initiation of action, and information regarding related objectives even if a user or commander is not responsible for the objective. Information related to VIP or person of interest includes, without limitation, position, exposure, movement, routing, status, and coverage. Exit route information includes, without limitation, pathing, exposure, coverage, and alternate routes. Vigilance or potential threat level information includes, without limitation, status based on substantially real-time information such as proximity to engaged units, knowledge of threats, and actions of team members or friendly units (e.g., unholstering or aiming).

The firearm usage monitoring system 2800 may communicate the information through a flat display or a tiered display. The information may be displayed automatically as an alert, automatically as a view-change, as a prompt that awaits user interaction, and in response to receipt of user input.

For example, the firearm usage monitoring system 2800 may display to a commander an initial view displaying a plurality of users grouped by units and, in response to detecting a triggering event, initiate a view change that communicates information related to the triggering event, initiate an alert that provides information related to the triggering event, or initiate a prompt that awaits input from the commander to initiate the view change.

The view changes may include, without limitation, changing the displayed location or changing the displayed tier. In embodiments, the view change includes zooming in on the position of the device detecting the triggering event. In embodiments, the view change includes changing the displayed indicia related to the device detecting the triggering event. More particularly, the displayed indicia may include an animated, alternating transition between the initial indicia and the alert indicia. The animation may continue for a predetermined period of time or await interaction with the display. In embodiments, the view change includes transitioning from displaying the units in a group to displaying the units as ungrouped in response to the triggering event occurring to a user within the group.

Events that trigger communicating the information through an alert, view change, or prompt include, for example, detection of grip events, unholstering, movement of user with firearm 104 such as repositioning (e.g., walking or intermittent running) or pursuit (e.g., prolonged running), aiming, firing, seeking cover (e.g., detection of crouching or rotational movement of user as measured by the IMU), low ammunition, weapon malfunction, or communication loss. In embodiments, the triggering events require the detected event to be repeated by two or more users within a group (such as an operational unit). In embodiments, the triggering events require the detected event to be repeated in proximity to another event. The proximity may be, for example, geographical proximity, temporal proximity, within display grouping (e.g., the current display shows multiple users as a single icon or indicia), within same peer group, or within same unit (e.g., by a member of the unit and subordinates or commanders). For example, detection of a grip event by two users within 20 feet of each other triggers the action whereas detection of a grip event by two users that are outside 300 feet away from each other does not trigger the action. Beneficially, such members optimize situational awareness by inhibiting false-positive display changes.

Grip events may be determined through suitable algorithms and mechanisms such as grip detection, holster status, movement of unholstered weapon, and aiming of the firearm 104. For example, grip detection may include use of an inertial measurement unit, capacitive member, electric field sensor, inductive sensor, shadow detection, infrared detection, conductivity sensors, resistive sensors, and other suitable technologies. In embodiments, a hand of the user will incidentally interact with the grip-detecting mechanism when the firearm 104 is grasped. For example, a sensor coupled to the trigger guard may detect contact of the user with the trigger guard (e.g., an aimed position) and a conductivity sensor coupled to the trigger to detect contact between the user with the trigger (e.g., a firing position).

Holster status may be determined by, for example, use of hall effect sensors, eddy current sensors, near-field sensors, magneto-resistive sensors, inertial measurement unit, capacitive member, electric field sensor, inductive sensor, shadow detection, infrared detection, conductivity sensors, resistive sensors, and other suitable technologies. For example, the firearm 104 may include an eddy current sensor that is actuated in response to a grip event, is disposed proximate a conductive material of the holster when the firearm 104 is properly seated within the holster and reacts to relative movement between the eddy current sensor and the conductive material.

Movement with the weapon out may be detected, for example, by use suitable mechanisms and algorithms such as those employing an inertial measurement unit or optical measurements. In embodiments, the firearm usage monitoring system 2800 is configured to detect a pattern of movement from the IMU indicative of user movement. For example, the user slowly moving with a pistol in-hand will have a periodic oscillation in a dimension following the barrel of the weapon, the user running with the pistol in-hand will have a more rapid oscillation that is pendulous in the frame of reference and generally orthogonal to the barrel, and the user moving with a rifle in hand will have an oscillation that is at an oblique angle to the barrel. Additionally, or alternatively, optical methods such as tracking objects captured between successive images may be used to track movement or, if subsequent images return out of focus, the firearm usage monitoring system 2800 may determine that the firearm 104 is moving at a rapid pace.

A firearm malfunction or ammunition state may be determined, without limitation through suitable devices and algorithms that coordinate with data collected by sensors from other devices. In embodiments, conditions indicative of a malfunction event include, without limitation, use of a sidearm by the user while having sufficient ammunition for the primary weapon, a sustained absence of fire while proximate users continue to fire, and/or detecting an abnormal firing pattern. The abnormal firing pattern may be detected, for example, through comparison to known patterns for similar firearms or to previously acquired firing patterns from the firearm.

In embodiments, connection points 1200 and 1202 provide data storage. Connection points 1200 and 1202 gather data when a connected device is gripped through minutes after the device is disengaged. If connection points 1200 and 1202 cannot transmit to server device 112 or to an edge device on the network (e.g., not available, out of range), it may store (e.g., for up to 30 days) in onboard memory (e.g., through high data rate memory). Once available, the system may restart the transmission process, so that the data is sent over.

In embodiments, system 100 provides power management capabilities. If a device connected within range of connection point 1200 and/or connection point 1202 is in motion but not in use, a low power mode (e.g., with occasional pinging) may be implemented to maintain general awareness of the location of the user. The device transmits a location every one second. If not used for a period of time, (e.g., for a half hour) the device may send one message at a defined interval, such as every second, every minute, every one-half hour, every hour, or at other intervals.

Beneficially devices of the firearm usage monitoring system can be configured to harvest energy from electromagnetic frequencies transmitted by other devices. For example, the firearm 104 may include a wireless-energy harvesting mechanism including a suitable circuit for harvesting the electromagnetic radiation. In embodiments, the wireless-energy harvesting mechanism includes a receiving antenna that is configured to receive the electromagnetic radiation, a rectifier that is configured to convert the received alternating current to direct current, and a DC-DC converter that is configured to alter voltage of the rectified current to a desired voltage. The antenna may be shared with the communications interface of the firearm 104.

In embodiments, the data collection rate is adjusted based on the amount of energy being harvested. Beneficially, such adjustment can provide improved wayfinding in network-denied environments without sacrificing battery life. For example, the increased energy output from a jammer may be harvested to provide improved battery life in network-denied environments and compensate for extra energy used in increasing data collection rates to compensate for extra energy expended in counteracting the network denial.

Figure 13:
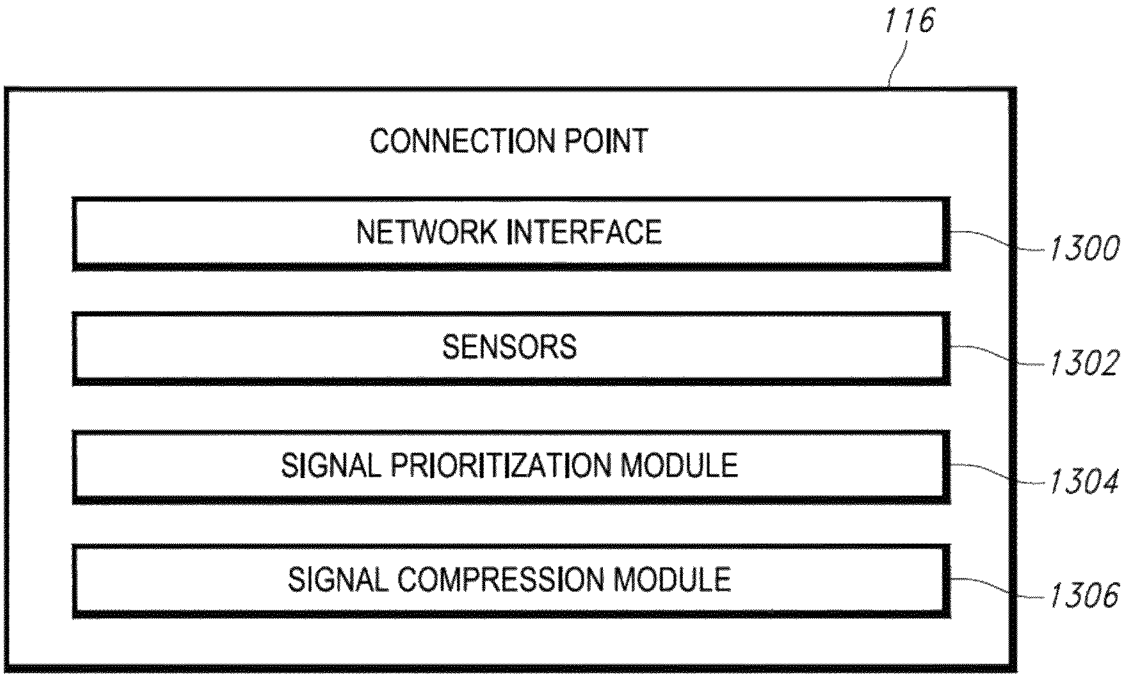
FIG. 13 is a diagrammatic view of various sub-components of a connection point in accordance with embodiments of the present disclosure.

Referring to FIG. 13, connection point 116 is shown as including network interface 1300, sensors 1302, signal prioritization module 1304, and signal compression module 1306. Network interface 1300 includes hardware and/or software for establishing connections, or otherwise for allowing connections to be established, between connection point 116 and devices within a physical range of connection point 116 and between connection point 116 and server 112 and/or one or more other computing devices used to implement the functionality of system 100. Network interface enables connection point 116 to connect to one or more of a network of computers (e.g., a LAN, a WAN, a VPN, a P2P network, or an intranet), a network of networks (e.g., the Internet), or another network (e.g., a cellular network). For example, network interface 1300 can enable communications over Ethernet, TCP, IP, power line communication, Wi-Fi, Bluetooth®, infrared, RF, GPRS, GSM, FDMA, CDMA, EVDO, Z-Wave, ZigBee, 3G, 4G, 5G, another protocol, or a combination thereof.

Sensors 1302 include one or more sensors used to record measurements relating to the use of connection point 116. Sensors 1302 may, for example, include one or more of a geolocation sensor (e.g., for connecting to GPS and/or other global navigation satellite systems), an image sensor, a vibration sensor, an audio sensor, an IMU, or the like. In embodiments, sensors 1302 are used to sense information about the environment to which connection point 116 is deployed. For example, sensors 1302 can be used to capture image, video, or audio from that environment. In another example, sensors 1302 can be used to detect vibrations within that environment (e.g., caused by natural or man-made events). In embodiments, information collected using sensors 1302 can be used to enhance, supplement, clarify, or otherwise process signals received from devices connected to connection point 116. For example, where such a signal does not include geolocation information indicating where the device form which the signal originates is located, connection point 116 can add such geolocation information to the signal before transmitting the signal to server 112. In another example, connection point 116 can add timestamp information to such a signal before transmitting it to server 112.

Signal prioritization module 1304 prioritizes channels of communication between connection point 116 and devices within a connection range of connection point 116. Bandwidth may be limited in the deployment location, for example, due to a distance between connection point 116 and a nearest network signal provider, capabilities of the connection point 116 itself, and/or another constraint. However, there may at times be a relatively large number of devices which attempt to connect to connection point 116. For example, where each user within the deployment location has a personal computing device and at least one firearm, there may be too many devices attempting to connect to connection point 116 compared to the availability of network bandwidth made available by connection point 116. In such an event, signal prioritization module 1304 can be used to prioritize connections for certain devices. For example, connections may be prioritized based on a time since a last established connection between a device and connection point 116, a type of the device, a type of signal or information thereof being communicated from the device, a distance between the device and connection point 116, information associated with a user of the device (e.g., based on user rank, skill, or the like), an amount of bandwidth required for the connection with the device, other criteria, or a combination thereof. In embodiments, connection point 116 may be configured to limit the total number of devices which may connect to it at a given time.

Signal compression module 1306 compresses signals received from devices connected to the connection point 116, for example, to prepare the signals for transmission to server 112. Signal compression module 1306 compresses the signals to reduce a bit rate at which the signals are transmitted over a network. In embodiments, signal compression module 1306 may use lossless compression technique to compress a signal. In embodiments, signal compression module 1306 may use lossy compression technique to compress a signal. In embodiments, signal compression module 1306 may use lossless/lossy hybrid compression to compress a signal, such as where a portion of a signal is processed using lossless compression and another portion of the same signal is processed using lossy compression. The type of compression used may be based on the information included in a signal. For example, information which requires high fidelity when reconstructed for viewing may be compressed using lossless compression, while other information may be compressed using lossy compression. In embodiments, connection point 116 may be configured to identify types of information which require high fidelity and compress those types of information using lossless compression. In embodiments, connection point 116 may be configured to decompressed compressed data received from server 112 or otherwise from a computing device located outside of the deployment location.

To further describe some embodiments in greater detail, reference is next made to examples of techniques which may be performed by or in connection with a firearm monitoring and remote support system, for example, system 100. The techniques include technique 1400 of FIG. 14, technique 1500 of FIG. 15, and technique 1600 of FIG. 16. Technique 1400, technique 1500, and/or technique 1600 can be executed using computing devices, such as the systems, hardware, and software described with respect to FIGS. 1-13. Technique 1400, technique 1500, and/or technique 1600 can be performed, for example, by executing a machine-readable program or other computer-executable instructions, such as routines, instructions, programs, or other code. The steps, or operations, of technique 1400, technique 1500, and/or technique 1600, or another technique, method, process, or algorithm described in connection with the embodiments disclosed herein, can be implemented directly in hardware, firmware, software executed by hardware, circuitry, or a combination thereof. For simplicity of explanation, technique 1400, technique 1500, and/or technique 1600 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 14:
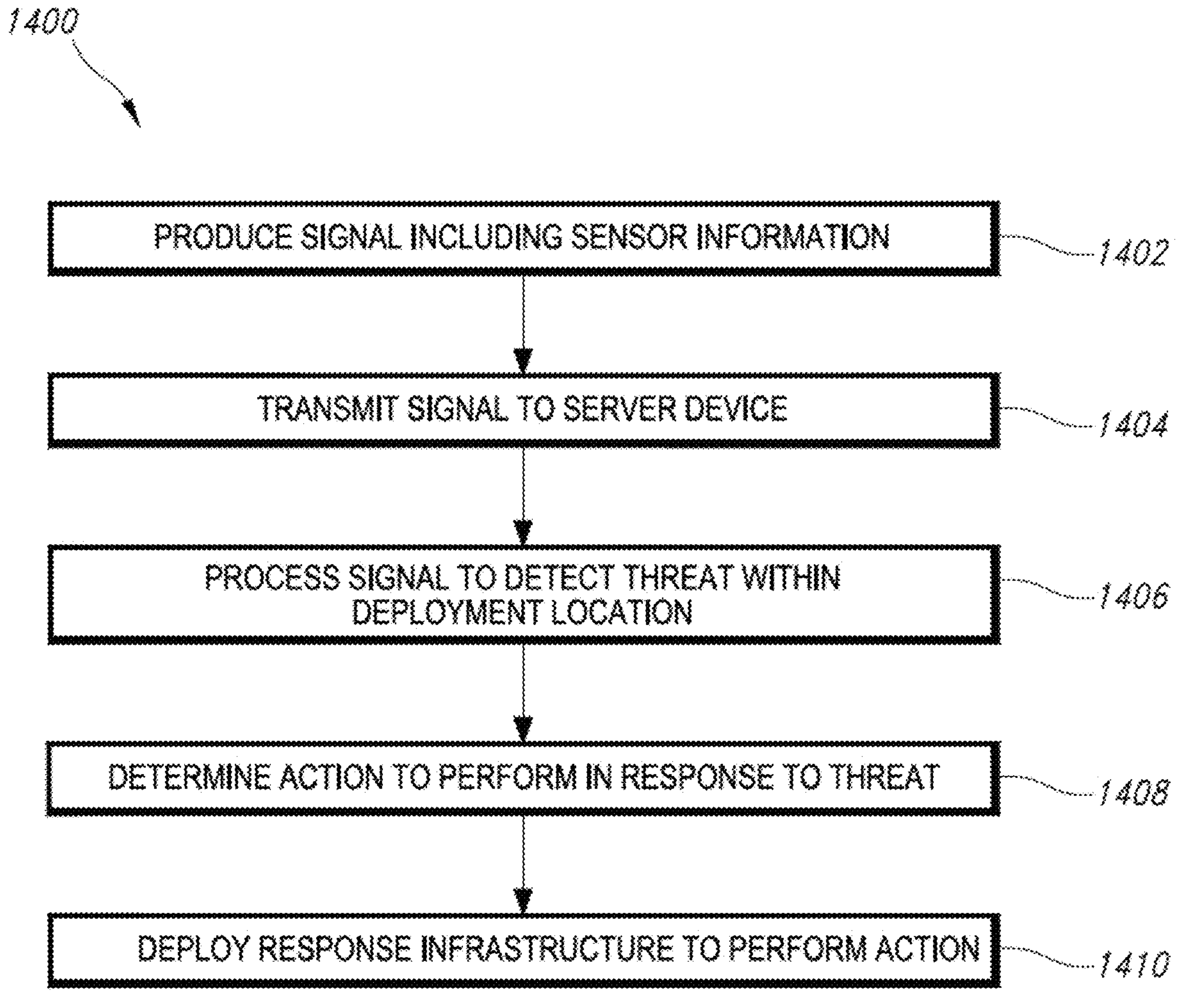
FIG. 14 is a flowchart showing a technique for threat detection and response in accordance with embodiments of the present disclosure.

Referring to FIG. 14, at 1402, a signal including sensor information is produced. The sensor information is produced using one or more sensors of a device within a deployment location. For example, the sensor information may be produced using one or more of a geolocation sensor, an image sensor, an IMU, or another sensor configured to record measurements associated with a firearm, wearable device, stationary device, robot, or another device. The signal may be produced using a processor of the device. For example, an ASIC, FPGA, or other units may receive the sensor information from the sensors used to record it and produce the signal using that sensor information.

At 1404, the signal is transmitted to a server device outside of the deployment location. The server device runs application software for providing remote support to users of devices (e.g., firearms) within the deployment location. In embodiments, the device at which the signal is produced may directly transmit the signal to the server device. In embodiments, a connection point intermediate to the device at which the signal is produced and to the server device may be used to communicate the signal from the device to the server device.

At 1406, the application software uses the sensor information included in the signal to detect a threat within the deployment location. The threat can be or include one or more hostile combatants or other sources of potential injury to person or damage to property of the users of system 100. In embodiments, detecting the threat using the restored sensor information can include processing the restored sensor information to detect a change in an orientation of the device at which the signal is produced. For example, where the device is a firearm, the restored sensor information can indicate that an orientation of the firearm has changed from one of a gripping orientation or a drawing orientation to one of a pointing orientation or a firing orientation. In embodiments, detecting the threat using the restored sensor information can include processing the restored sensor information to detect a discharge of a firearm. For example, the discharge may be detected using one or more sensors of the firearm, a wearable device worn by a user of the firearm at the time of the discharge, or another device.

In embodiments, detecting the threat can include processing restored sensor information from multiple devices. For example, sensor information received from two firearms can be used to detect the threat. The sensor information can be processed to determine a change in orientation of at least one of the two firearms. Cones of fire for each of the firearms can then be updated based on the sensor information. Responsive to a determination that the cones of fire of those firearms coalesce as a result of such updating, the coalescence can be used to detect the threat. In embodiments, the threat may be detected based on the coalescence of the cones of fire alone or based on additional information which is used to clarify the reason for the coalescence of the cones of fire. For example, imaging data captured using a camera or other asset within the deployment location can be used to verify whether a location at which the coalesced cones of fire are pointing includes a threat. In another example, sensor information indicating a firing of one or both firearms associated with the coalesced cones of fire can be used to detect the threat. In yet another example, one or more users of the firearms associated with the coalesced firearms can indicate the presence of a threat.

At 1408, an action to perform in response to the detected threat is determined. The application software can automatically determine an appropriate action to take based on the nature of the detected threat and/or based on information collected from one or more devices within the deployment location. In embodiments, the action to perform can be determined based on a severity of the detected threat. For example, a highly severe threat may call for the deployment of a large number of reinforcements to the deployment location, whereas a moderately or minimally severe threat may call for the deployment of fewer reinforcements to the deployment location.

At 1410, the application software causes a deployment of response infrastructure to perform the action. In embodiments, the application software can cause the deployment of the response infrastructure by transmitting a command, processed at a device local to the response infrastructure, to initialize the use and/or operation of the response infrastructure. In embodiments, the application software can cause the deployment of the response infrastructure by indicating a recommendation for the response infrastructure within a GUI of the application software. For example, a remote user of the application software can interact with the application software to approve or modify the recommendation.

Figure 15:
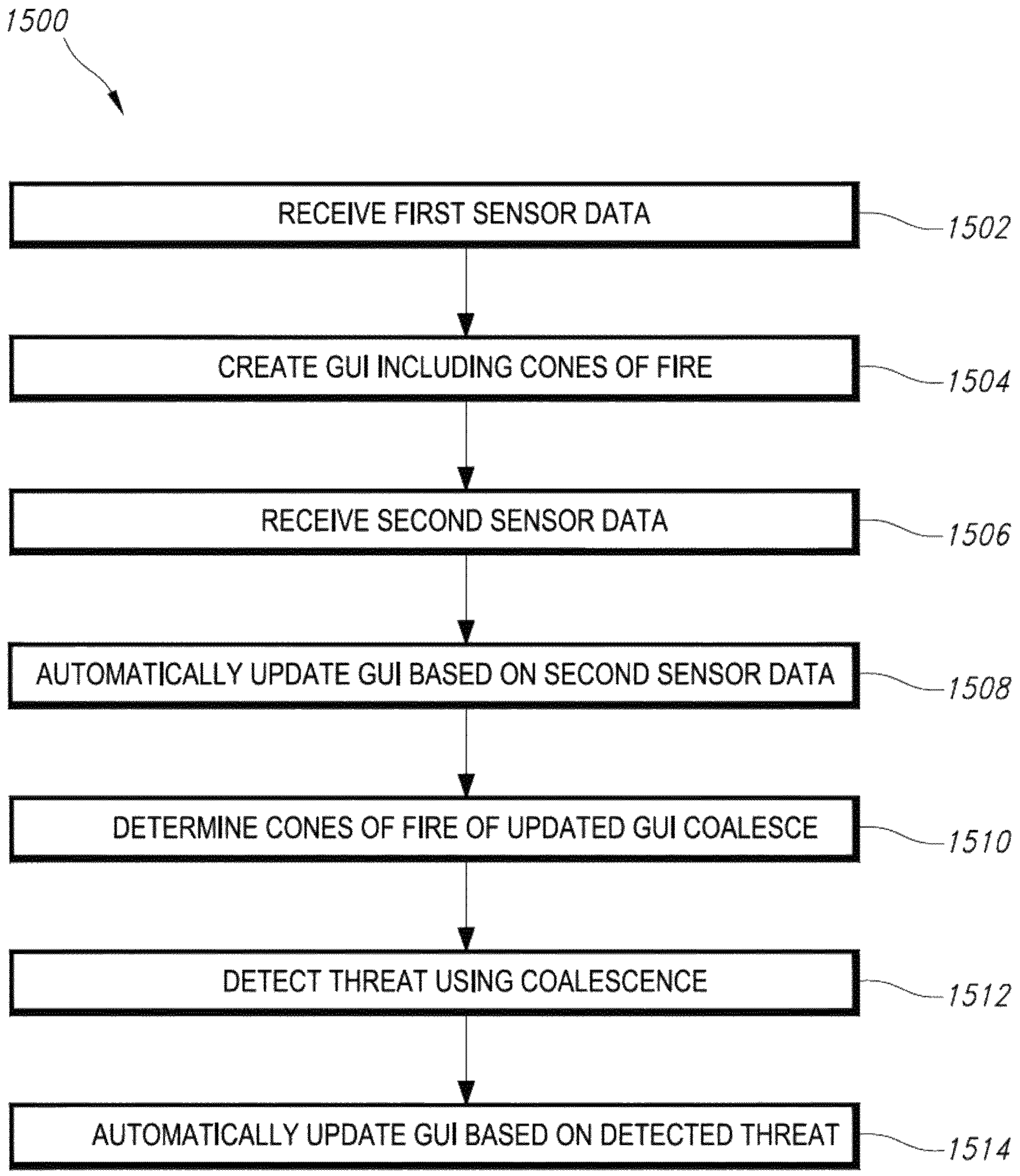
FIG. 15 is a flowchart showing a technique for GUI visualization of sensor and threat information in accordance with embodiments of the present disclosure.

Referring to FIG. 15, at 1502, first sensor information is received. The first sensor information may be received from one or more devices within a deployment location. For example, the first sensor information may be received from one or more firearms, wearable devices, stationary devices, robots, or other assets. The first sensor information includes measurements recorded using one or more sensors of the devices. For example, the first sensor information may include measurements recorded using one or more of geolocation sensors, image sensors, or IMUs. The first sensor information is received within one or more signals transmitted to a server device. For example, the one or more signals may be transmitted from a connection point intermediate to the devices and the server device.

At 1504, a GUI is generated based on the first sensor information. The GUI includes a visual representation of cones of fire for each firearm associated with the first sensor information. The cones of fire represent positions and orientations of the firearms determined based on the first sensor information. Each firearm may have a cone of fire represented within the GUI. The size of the cone of fire represented in the GUI may be based on or both of a skill of a user of the firearm or a type of the firearm. For example, a user having a higher skill level may have a narrower cone of fire to denote a greater expectation of accurate shooting by the user.

At 1506, after the GUI is generated, second sensor information is received. The second sensor information indicates a change in one or both of the position or orientation of at least one of the firearms within the deployment location. For example, the second sensor information can indicate that the orientation of one or more firearms has changed from a gripping orientation or a drawing orientation to a pointing orientation or a firing orientation, so as to denote that the firearm has been readied for use, such as to address a threat within the deployment location. In some cases, the orientations of multiple firearms may be so changed as indicated by the second sensor information.

At 1508, the GUI is automatically updated based on the second sensor information. The updating may include changing a position and/or orientation of one or more cones of fire as visually represented within the GUI based on the second sensor information. For example, changes in the orientation and/or position of the firearms as indicated in the second sensor information can be used to update the positions and orientations represented by the cones of fire for those respective firearms. In this way, the visual representations of those cones of fire within the GUI is changed.

At 1510, a determination is made that two or more cones of fire visually represented in the GUI have coalesced based on the updating from the second sensor information. A coalescence of cones of fire refers to a situation in which the cones of fire for two or more firearms are at least partially overlapping. Coalescence of cones of fire occurs when users of associated firearms have readied those firearms for firing and are pointing those firearms at a common location within the deployment location.

At 1512, a threat is detected based on the coalescence of the cones of fire. The threat can be or include one or more hostile combatants or other sources of potential injury to person or damage to property of the users of system 100. A threat may be detected based on the coalescence of the cones of fire alone or based on additional information which is used to clarify the reason for the coalescence of the cones of fire. For example, imaging data captured using a camera or other asset within the deployment location can be used to verify whether a location at which the coalesced cones of fire are pointing includes a threat. In another example, sensor information indicating a firing of one or both firearms associated with the coalesced cones of fire can be used to detect the threat. In yet another example, one or more users of the firearms associated with the coalesced firearms can indicate the presence of a threat. In yet another example, application software which generates and updates the GUI can detect the threat based on the number of coalesced cones of fire, the duration of time over which the cones of fire remain coalesced, the skill levels of the users of the firearms associated with the coalesced cones of fire, other information which may be represented within the GUI, or a combination thereof.

At 1514, the GUI is automatically updated to visually represent the detected threat. The threat may be represented using an icon which is visually distinct from icons used to represent the firearms or users thereof within the GUI. Visually representing the detected threat within the GUI may include adding an icon within a location of the cone of fire coalescence.

Figure 16:
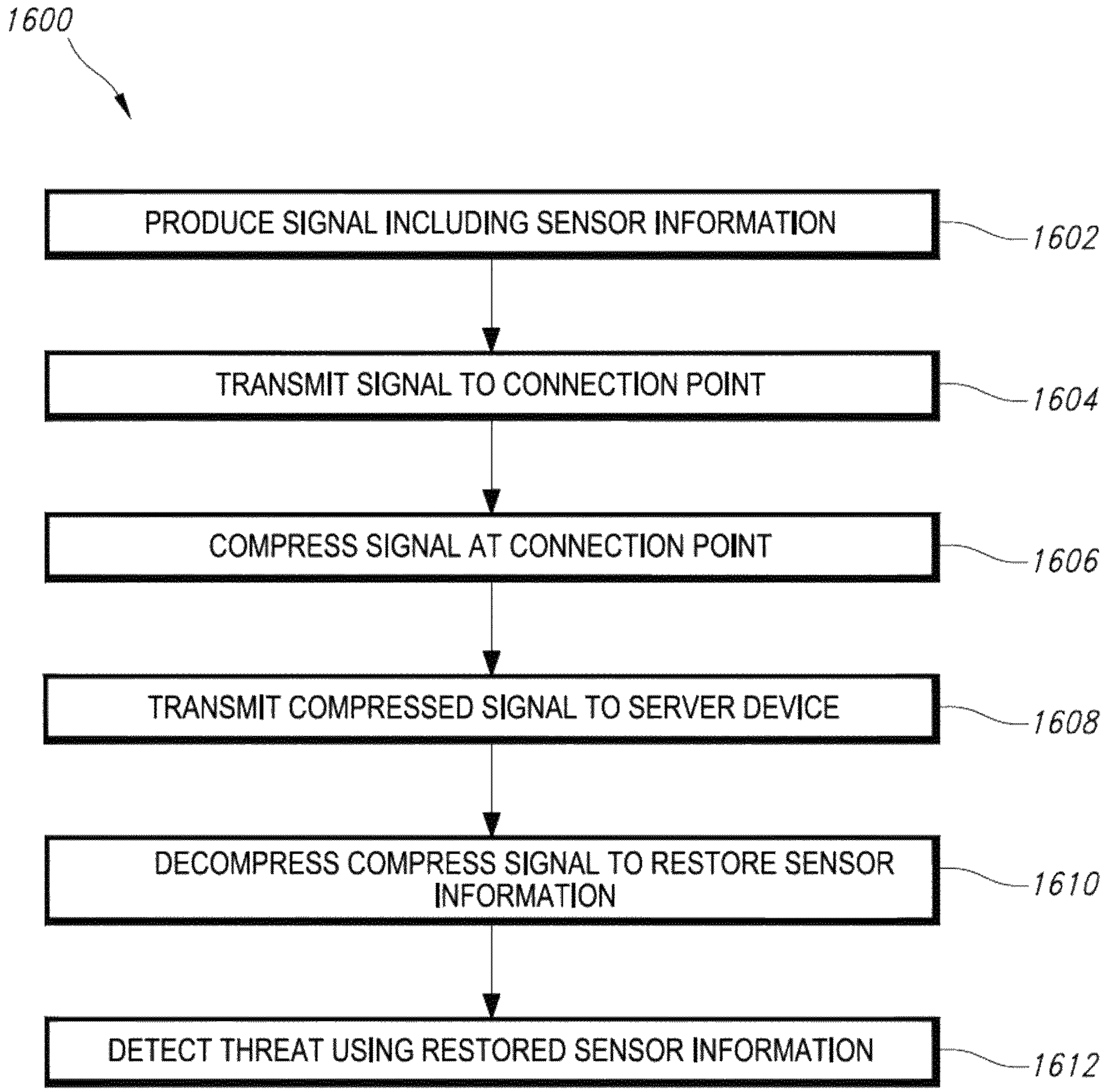
FIG. 16 is a flowchart showing a technique for compression and collection of information in accordance with embodiments of the present disclosure.

Referring to FIG. 16, at 1602, a signal including sensor information is produced. The sensor information is produced using one or more sensors of a device within a deployment location. For example, the sensor information may be produced using one or more of a geolocation sensor, an image sensor, an IMU, or another sensor configured to record measurements associated with a firearm, wearable device, stationary device, robot, or another device. The signal may be produced using a processor of the device. For example, an ASIC, FPGA, or other units may receive the sensor information from the sensors used to record it and produce the signal using that sensor information.

At 1604, the signal is transmitted to a connection point located within the deployment location. The connection point may be a device configured to communicate signals from devices within the deployment location to a remote server which processes the signals to provide monitoring and other remote support to users of the devices. In embodiments, the signal may be transmitted directly between the device and the connection point. Alternatively, in embodiments, a mobile tracking device associated with a user of the device at which the signal is produced may be used as an intermediary to communicate the signal between the device and the connection point.

At 1606, the connection point compresses the signal received from the device. In embodiments, in which the connection point receives multiple signals from the device, or in embodiments, in which the connection point receives one or more signals from multiple devices, the connection point can compress those signals into a single compressed signal. Alternatively, in such embodiments, the connection point can compress those signals into separate compressed signals. For example, where the connection point is configured for batch processing, the connection point may organize signals received (e.g., within a time interval) into one or more batches and compress each batch individually. In another example, the connection point can batch signals based on the types of devices from which they are received. The compression of one or more signals may be performed using a lossy compression technique. Alternatively, the compression of one or more signals may be performed using a lossless compression technique. As a further alternative, the compression of one or more signals may be performed using a hybrid lossy/lossless compression technique.

At 1608, the compressed signal is transmitted from the connection point to a server device. The server device is a remote server located outside of the deployment location within which the connection point and the device used to produce the signal are located.

At 1610, application software running on the server device is used to decompress the compressed signal to restore the sensor information. In embodiments, the application software determines how to decompress the compressed signal based on information (e.g., compressed syntax elements) recorded within the compressed signal. For example, one or more bits can be encoded to a header file within the compressed signal to indicate, to the decompression functionality of the application software, how to decompress the compressed signal.

At 1612, the application software uses the restored sensor information to detect a threat within the deployment location. The threat can be or include one or more hostile combatants or other sources of potential injury to person or damage to property of the users of system 100. In embodiments, detecting the threat using the restored sensor information can include processing the restored sensor information to detect a change in an orientation of the device at which the signal is produced. For example, where the device is a firearm, the restored sensor information can indicate that an orientation of the firearm has changed from one of a gripping orientation or a drawing orientation to one of a pointing orientation or a firing orientation. In embodiments, detecting the threat using the restored sensor information can include processing the restored sensor information to detect a discharge of a firearm. For example, the discharge may be detected using one or more sensors of the firearm, a wearable device worn by a user of the firearm at the time of the discharge, or another device.

In embodiments, detecting the threat can include processing restored sensor information from multiple devices. For example, sensor information received from two firearms can be used to detect the threat. The sensor information can be processed to determine a change in orientation of at least one of the two firearms. Cones of fire for each of the firearms can then be updated based on the sensor information. Responsive to a determination that the cones of fire of those firearms coalesce as a result of such updating, the coalescence can be used to detect the threat. In embodiments, the threat may be detected based on the coalescence of the cones of fire alone or based on additional information which is used to clarify the reason for the coalescence of the cones of fire. For example, imaging data captured using a camera or other asset within the deployment location can be used to verify whether a location at which the coalesced cones of fire are pointing includes a threat. In another example, sensor information indicating a firing of one or both firearms associated with the coalesced cones of fire can be used to detect the threat. In yet another example, one or more users of the firearms associated with the coalesced firearms can indicate the presence of a threat.

In embodiments, the signal may be compressed at a device other than the connection point. For example, the signal may be compressed at a mobile computing device used by a user of the device at which the signal is produced. In another example, the signal may be compressed at the device at which the signal is produced. In such an embodiment, the connection point may be used as an intermediate relay to receive the compressed signal and forward the compressed signal to the server device.

To further describe some embodiments in greater detail, reference is next made to examples of techniques which may be performed by or in connection with a firearm usage monitoring system, for example, system 100. The techniques include technique 3500 of FIG. 35, technique 3600 of FIG. 36, technique 3700 of FIG. 37, technique 3800 of FIG. 38, technique 3900 of FIG. 39, technique 4000 of FIG. 40, and technique 4100 of FIG. 41.

Technique 3500, technique 3600, technique 3700, technique 3800, technique 3900, technique 4000, and/or technique 4100 can be executed using computing devices, such as the systems, hardware, and software described above. Technique 3500, technique 3600, technique 3700, technique 3800, technique 3900, technique 4000, and/or technique 4100 can be performed, for example, by executing a machine-readable program or other computer-executable instructions, such as routines, instructions, programs, or other code. The steps, or operations, of technique 3500, technique 3600, technique 3700, technique 3800, technique 3900, technique 4000, and/or technique 4100, or another technique, method, process, or algorithm described in connection with the embodiments disclosed herein, can be implemented directly in hardware, firmware, software executed by hardware, circuitry, or a combination thereof. For simplicity of explanation, technique 3500, technique 3600, technique 3700, technique 3800, technique 3900, technique 4000, and/or technique 4100 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operation may be required to implement a technique in accordance with the disclosed subject matter.

Figure 35:
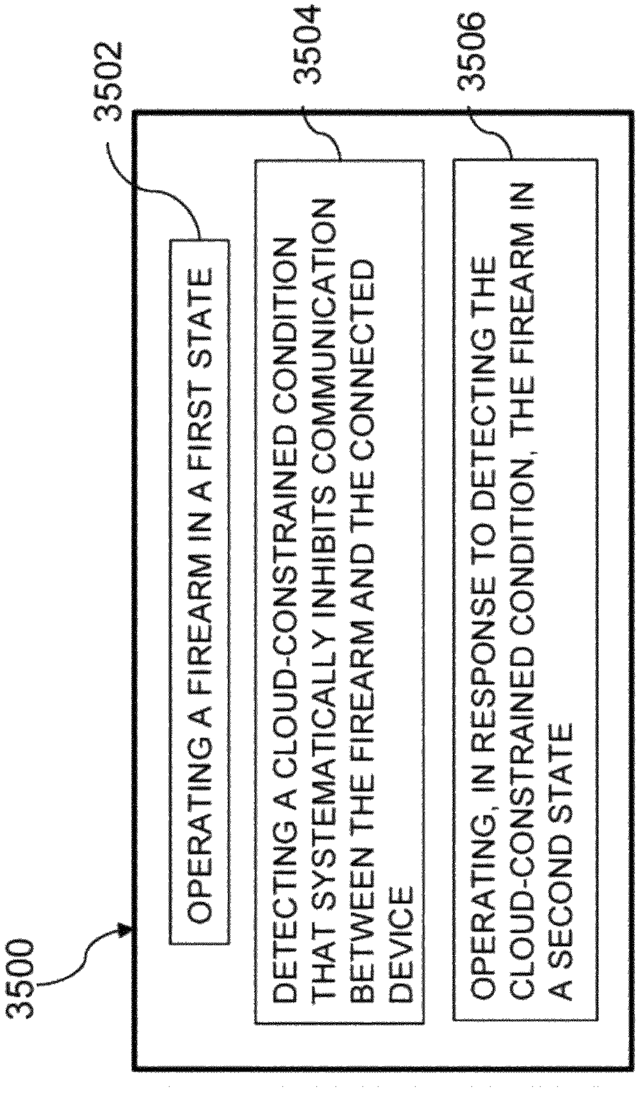
FIGS. 35, 36, 37, 38, 39, 40, and 41 are flowchart showing techniques for communicating with and monitoring firearms and user of those firearms in accordance with embodiments of the present disclosure.

Referring now to FIG. 35, at 3502, a firearm operates in a first state. The firearm includes at least one sensor configured to record information related to usage of the firearm, a communication interface configured to transmit data to a connected device, a buffer operatively coupled to the at least one sensor, and a controller operatively coupled to the buffer, the communication interface, and the at least one sensor. The buffer is configured to store the information related to usage of the firearm. The first state includes transmitting data collected by the at least one sensor to the connected device in substantially real time. At 3504, a cloud-constrained condition is detected. The cloud-constrained condition systematically inhibits communication between the firearm and the connected device. For example, the cloud-constrained condition may be caused by a physical obstruction or a network-blocking action. At 3506, the firearm is operated in a second state in response to detecting the cloud-constrained condition. The second state includes altering data transmission to maintain data fidelity. For example, data transmission intervals may be extended to reduce transfer overhead, the collected data may be processed to reduce the amount of data transmitted, the data may be stored for later transmission, etc.

Figure 36:
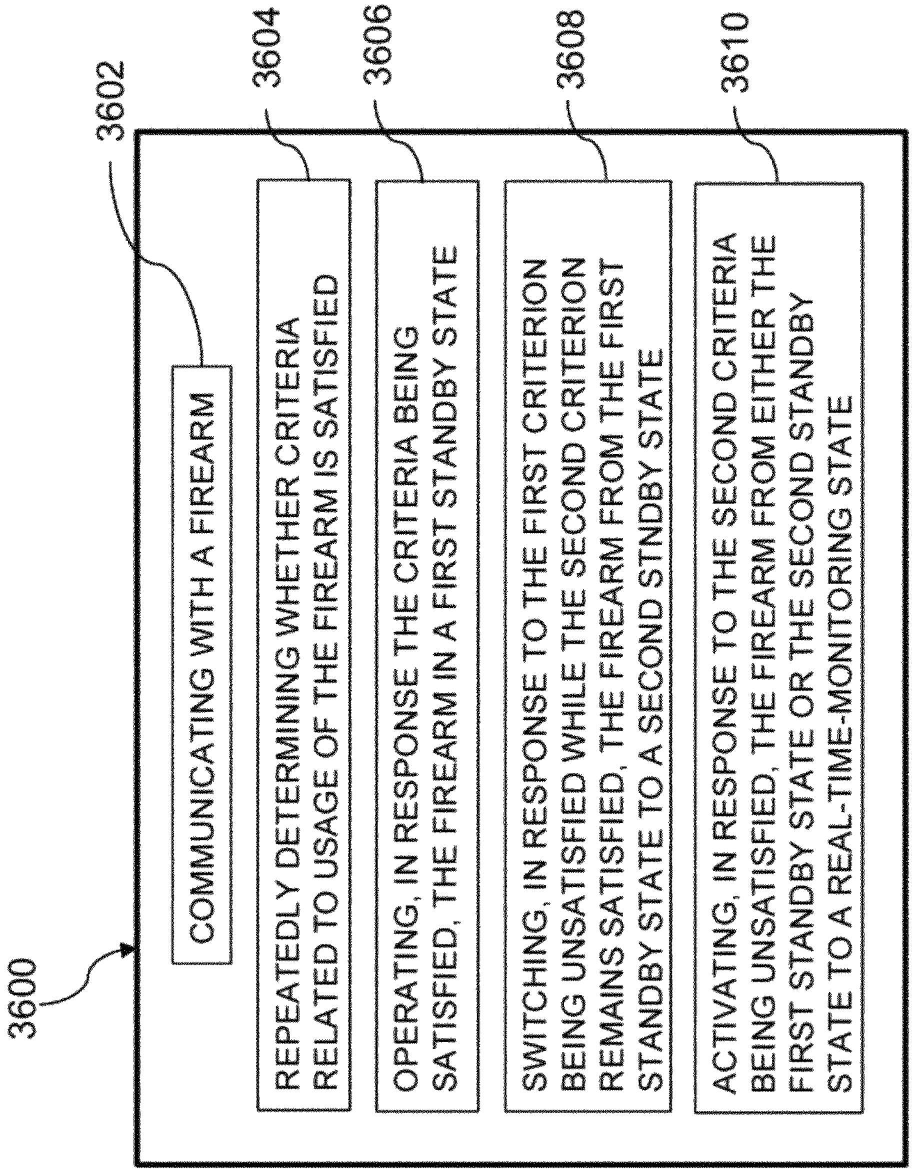

Referring now to FIG. 36, at 3602, communications are established with a firearm. The firearm includes a plurality of sensors configured to record information related to usage of the firearm, a communication interface configured to transmit data to a connected device, and a controller operatively coupled to the communication interface and the plurality of sensors. At 3604, it is repeatedly determined whether one or more criteria related to usage of the firearm are satisfied. The criteria include a first criterion and a second criterion. In some aspects, the first criterion is the firearm being holstered and the second criterion is selected from the group consisting of the firearm being geolocated within a predetermined area, movement of the firearm being below a predetermined threshold, movement of the firearm being outside of a predetermined pattern, and a user being on-duty. At 3606, the firearm is operated in a first standby state in response the criteria being satisfied. At 3608, the firearm is switched from the first standby state to a second standby state in response to the first criterion being unsatisfied while the second criterion remains satisfied. At 3610, the firearm is activated to a real-time-monitoring state from either the first standby state or the second standby state in response to the second criteria being unsatisfied. The real-time-monitoring state includes substantially real-time data transfer to the connected device of the information related to usage of the firearm.

Figure 37:
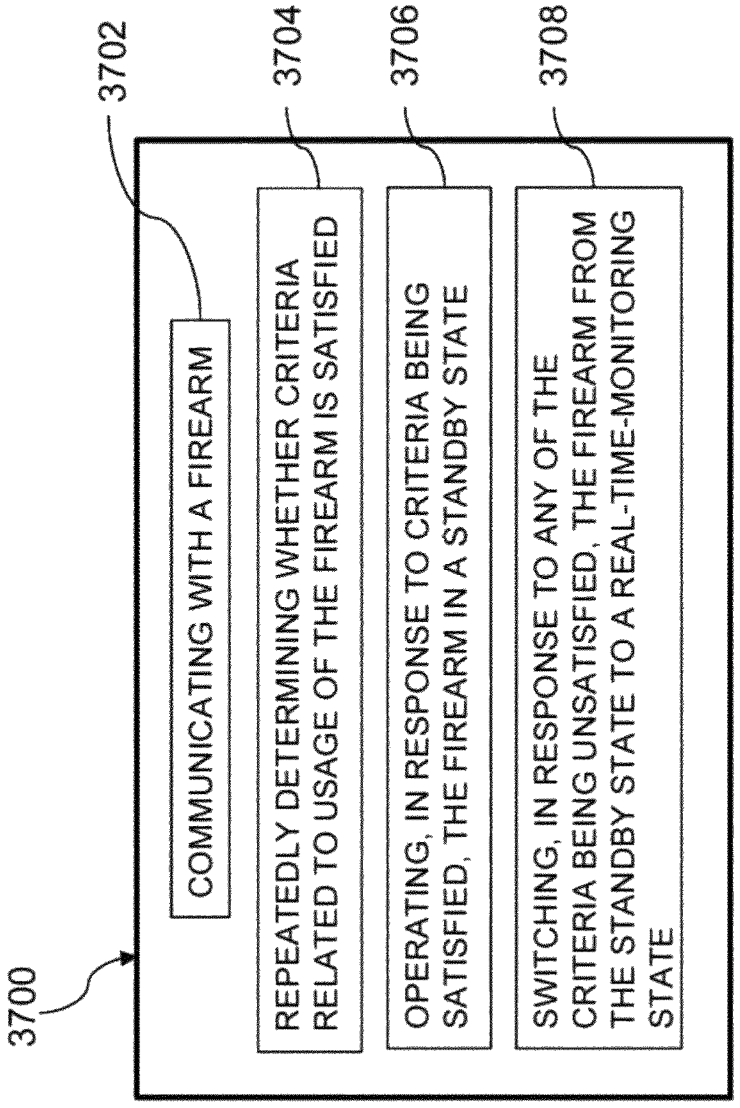

Referring now to FIG. 37, at 3702, communications are established with a firearm. The firearm includes at least one sensor configured to record information related to usage of the firearm and a controller operatively coupled to the communication interface and the at least one sensor. At 3704, a communication interface configured to transmit data to a connected device, it is repeatedly determined whether one or more criteria related to usage of the firearm are satisfied. The criteria include one or more of the firearm being geolocated within a predetermined area, the firearm being holstered, movement of the firearm being below a predetermined threshold or outside of a predetermined pattern, a user being on-duty, or contact of the user with a predetermined location on the firearm. At 3706, the firearm is operated in a standby state in response to the criteria being satisfied. At 3708, the firearm is switched from the standby state to a real-time-monitoring state in response to any of the criteria being unsatisfied. The real-time-monitoring state includes substantially real-time data transfer of the information to the connected device.

Figure 38:
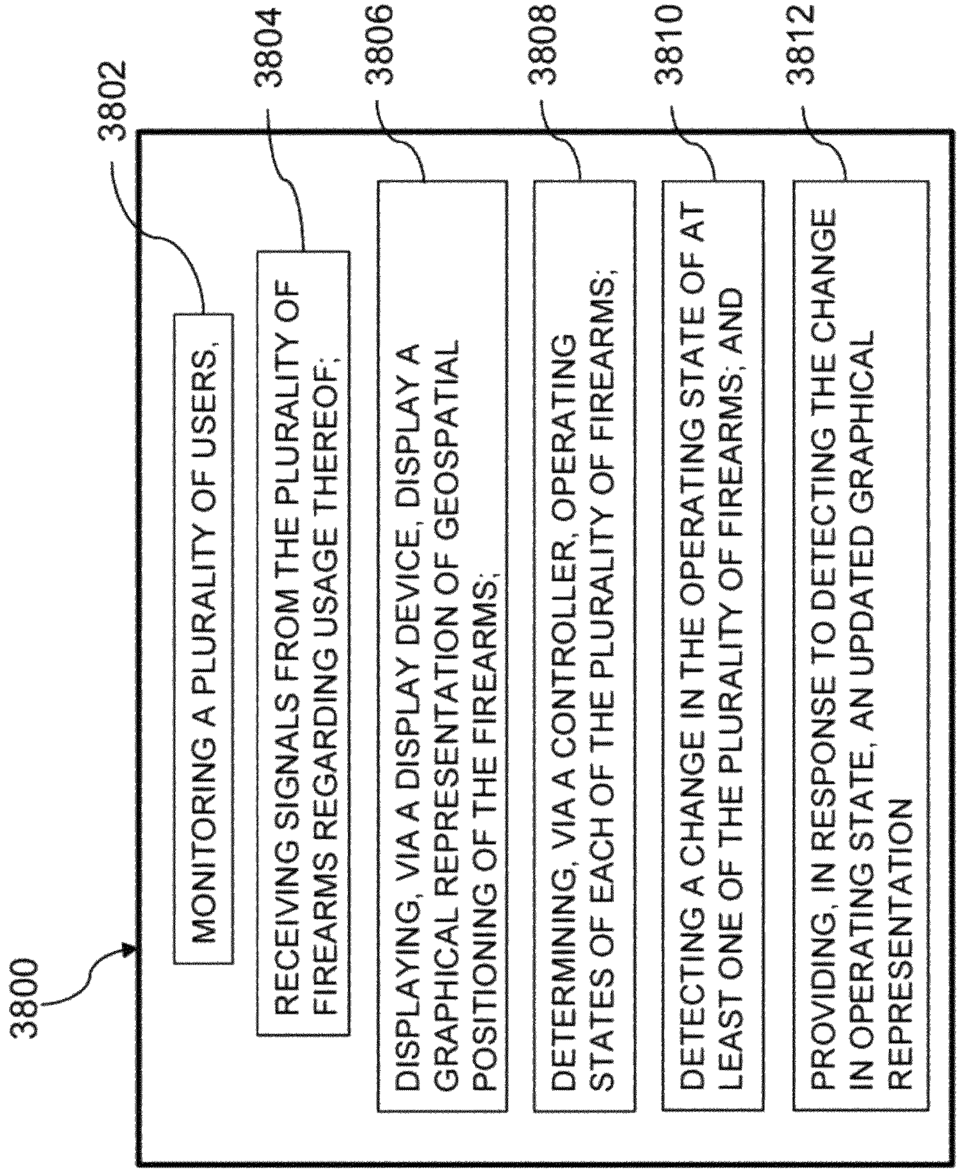

Referring now to FIG. 38, at 3802, a plurality of users is monitored. Each of the plurality of users has a respective one of a plurality of firearms. At 3804, signals are received from the plurality of firearms regarding usage thereof. At 3806, a display device displays a graphical representation of geospatial positioning of the firearms. At 3808, a controller determines operating states of each of the plurality of firearms. At 3810, the controller detects a change in the operating state of at least one of the plurality of firearms. At 3812, an updated graphical representation is provided in response to detecting the change in operating state. The updated graphical representation provides indicia of the change in the operating state.

Figure 39:
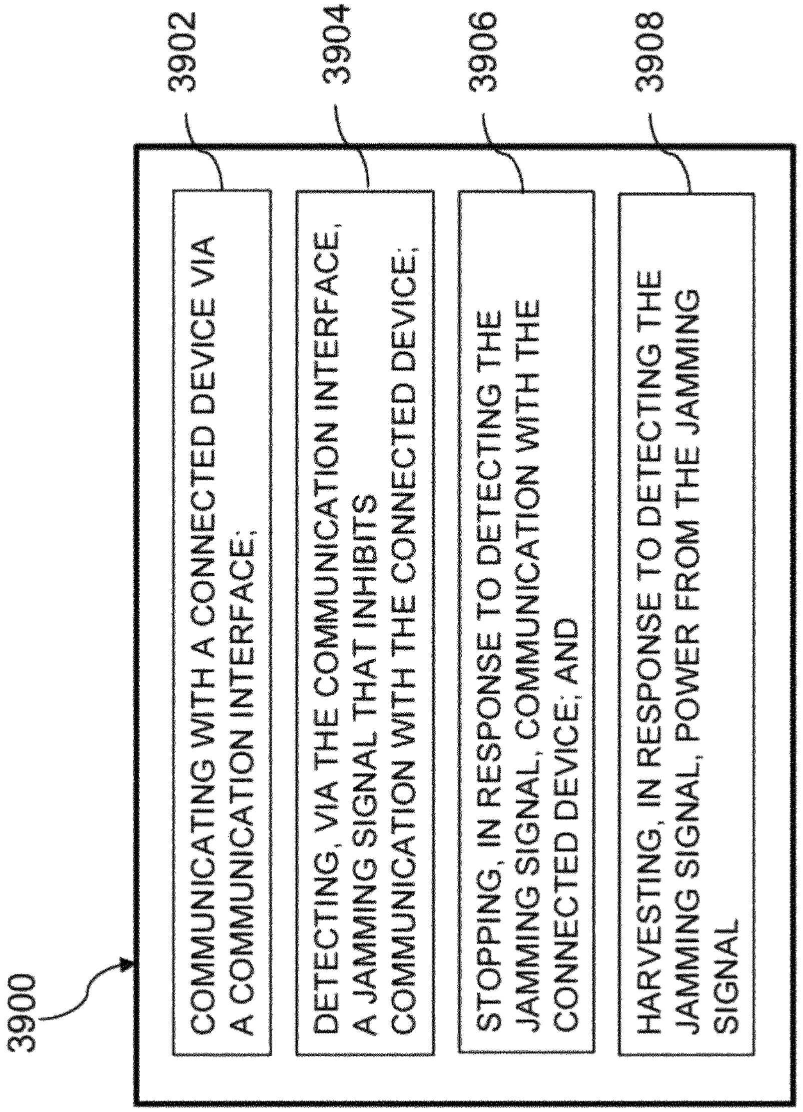

Referring now to FIG. 39, at 3902, communications are established with a connected device via a communication interface. At 3904, a jamming signal that inhibits communication with the connected device is detected using the communication interface. At 3906, in response to detecting the jamming signal, communication with the connected device is stopped. At 3908, a wireless-energy harvesting mechanism leaches power from the jamming signal in response to detection thereof. The wireless-energy harvesting mechanism includes a receiving antenna configured to receive the jamming signal, a rectifier configured to convert the received signal to direct current, and a DC-DC converter configured to alter voltage of the direct current to a desired voltage.

Figure 40:
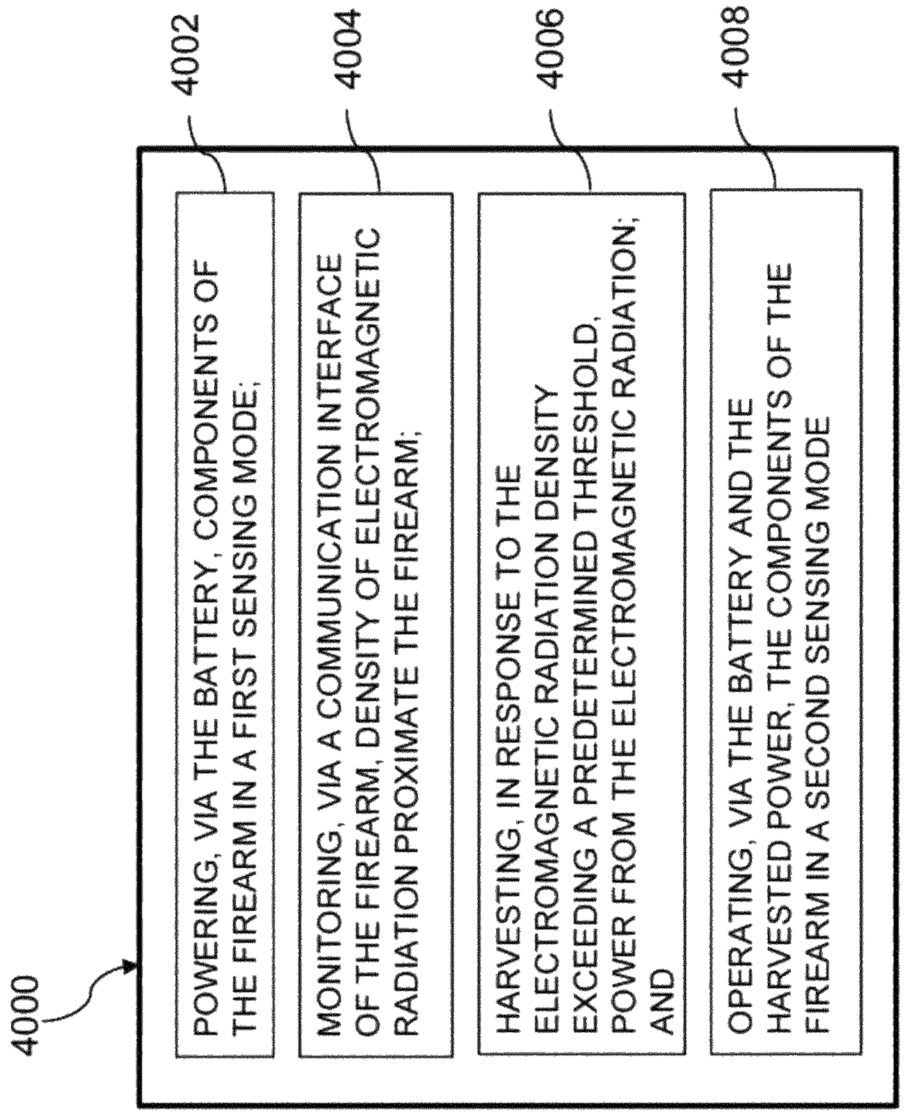

Referring now to FIG. 40, at 4002, the battery powers components of the firearm in a first sensing mode. At 4004, a communication interface of the firearm monitors electromagnetic flux proximate the firearm. At 4006, a wireless-energy harvesting mechanism leaches power from the electromagnetic radiation in response to the electromagnetic radiation density exceeding a predetermined threshold. The wireless-energy harvesting mechanism includes a receiving antenna configured to receive the jamming signal, a rectifier configured to convert the received signal to direct current, and a DC-DC converter configured to alter voltage of the direct current to a desired voltage. At 4008, operating, via the battery and the harvested power, the components of the firearm in a second sensing mode. The second sensing mode expends more energy than the first sensing mode.

Figure 41:
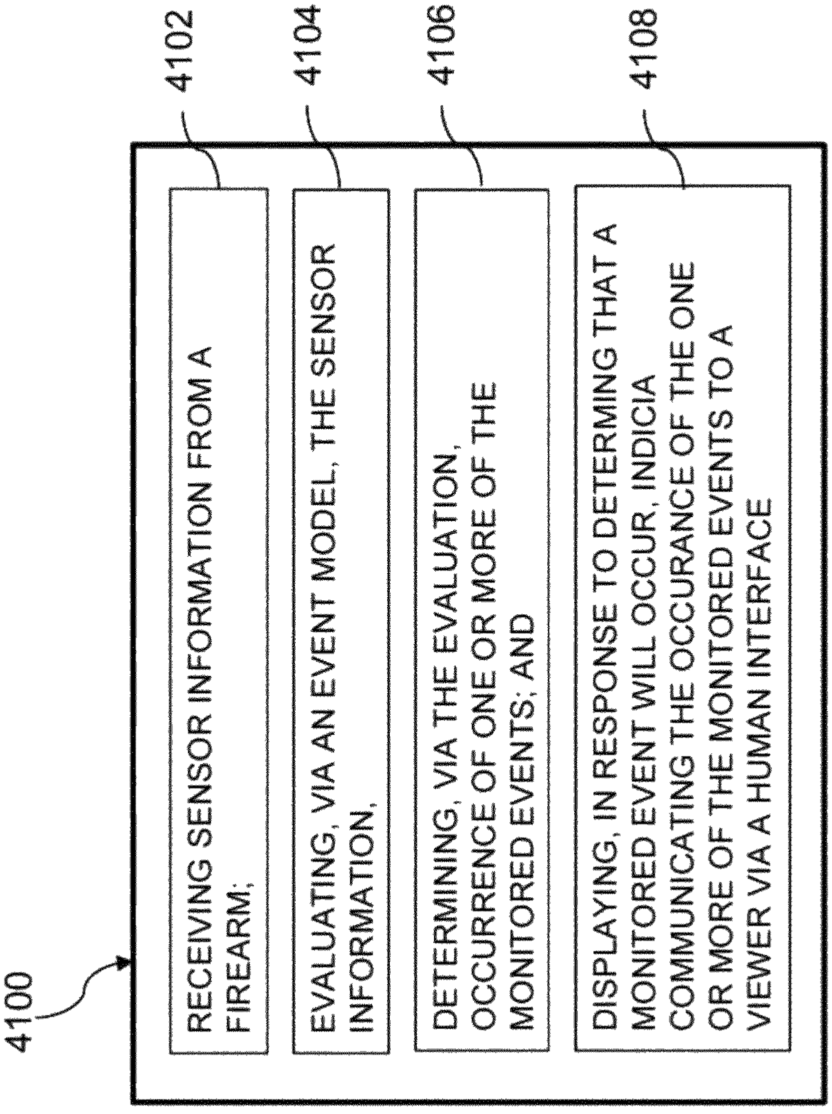

Referring now to FIG. 41, at 4102, sensor information is received from a firearm. At 4104, an event model is used to evaluate the sensor information. In embodiments, the event model is created by obtaining timestamped information from a first sensor type coupled to a firearm and a second sensor type, selecting a plurality of monitored events including a discharge event, labeling the timestamped information with the respective one or more of the monitored events in response to the timestamped information occurring contemporaneously with a respective one or more of the monitored events, grouping items of the timestamped information that are sensed temporally proximate to the monitored event by the sensor or another sensor within the sensor types with each respective item of labeled information, splitting the grouped data into a first portion and a second portion, training the event model using the first portion via machine learning, and evaluating the event model using the second portion. After the event model is trained and passes evaluation, the model may be implemented in the system or components thereof. At 4106, the evaluation determines occurrence of one or more of the monitored events. At 4108, indicia communicating the occurrence of the one or more of the monitored events are displayed to a viewer via a human interface in response to determining that a monitored event will occur.

Figure 17:
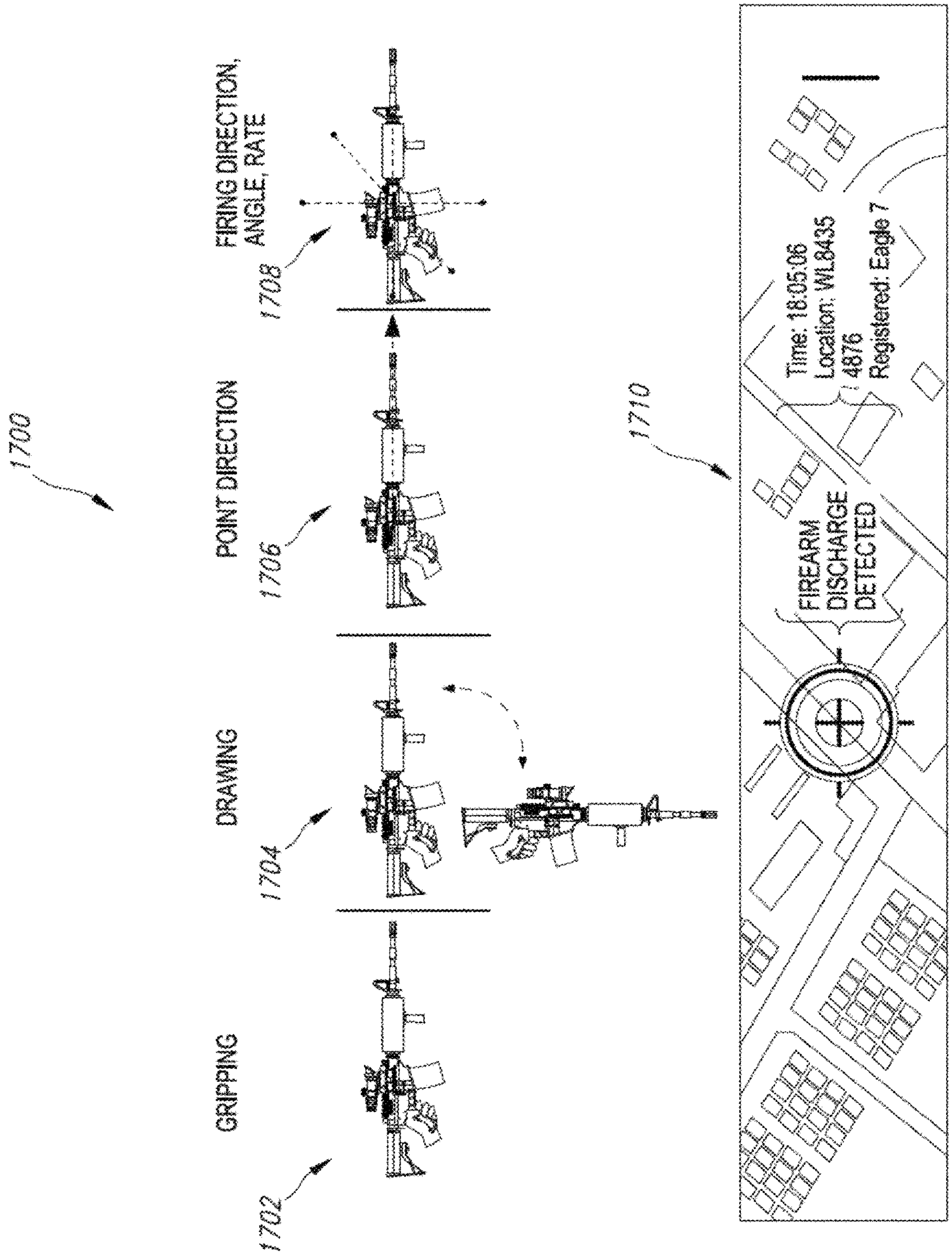
FIG. 17 is an illustration of gestures, positions and locations of a firearm indicative of or in preparation for live fire in accordance with embodiments of the present disclosure.

Referring to FIG. 17, gestures, positions and locations of a firearm indicative of or in preparation for live fire are shown. In particular, gestures and weapon orientations 1700 that can serve to as inputs and/or triggers to system 100 are shown. In embodiments, gestures and weapon orientations 1700 can include a gripping gesture and orientation 1702, a drawing gesture and orientation 1704, a pointing gesture and orientation 1706 that can be indicative of aiming the weapons, and a firing gesture and orientation 1708 that is indicative of live fire. Firing gesture and orientation 1708 can further include firing directions, angles of the weapon, rates of fire information, and the like. At each detected gesture and orientation 1700, system 100 can, in many examples, transmit a spot report 1710.

In various examples, spot report 1710 can include: unit identification, date and time information, location information, and threat/enemy activity information. In embodiments, the unit identification can identify user profiles, asset identities, and the like. In embodiments, the unit identification can also be used to determine what units (or divisions thereof) of a deployed force are associated with the weapon. By way of these examples, system 100 can verify the authenticity of the unit identification, deploy encrypted communication and other security measures to ensure secured connectivity with the weapon and its proper pairing and continued proper pairing with the user. In embodiments, the unit identification can be associated with a soldier. In embodiments, the unit identification can be associated with a police officer. In embodiments, the unit identification can be associated with a security agent, a private homeowner or business owner, a unit of a corporate security force, and the like.

In embodiments, spot report 1710 can include the location information from GPS, inertial measurement information, other mapping information, or the like. In embodiments, the location information can also include overlays from location information provided by other associated users, components, network location information, and other electromagnetic information in the vicinity. In embodiments, the location information can also include information from one or more attitude and heading reference systems from one more units deployed with the user. By way of this example, sensors on three axes can provide attitude information for aircraft, unmanned aerial vehicles, drones other deployable robots, or the like and those sensors can supply roll, pitch, and yaw, or other three axes examples to enhance location information. The sensors can include solid-state or microelectromechanical systems gyroscopes, accelerometers, and magnetometers.

In embodiments, spot report 1710 including the threat/enemy activity information can include size, location, and activity for multiple targets. By way of this example, threat/enemy activity can be determined or can be made more confident with information obtained by adjacent assets in the field. In many examples, unmanned aerial vehicles, drones, and the like may provide video overlays from the vicinity to confirm threat/enemy activity, contribute to the calculation of threat/enemy activity, and to increase confidence in reporting of threat/enemy activity and location.

In embodiments, spot report 1710 can include provisioning information about the weapon and current ammunition status. By way of these examples, the spot report can include ammunition remaining, ammunition discharge rate, prompts for resupply, and anticipated resupply needs. In many examples, the weapons can be assigned a standard stock or count of ammunition. Detection of live fire can cause the firearm usage tracking system 800 to calculate shot consumption and predict when the weapon will deplete its local ammunition. Resupply information can be automatically transmitted when predetermined levels of remaining ammunition are reached or are approaching quickly at a given rate of fire. In many examples, the weapon may be provisioned with many rounds of ammunition and levels of remaining ammunition can be included in spot reports. Once remaining ammunition levels dip below preset thresholds, resupply alerts can be sent. In addition, predictions can be presented to the user to describe when ammunition will be exhausted especially if there is currently or recently a relatively high rate of fire.

Figure 18:
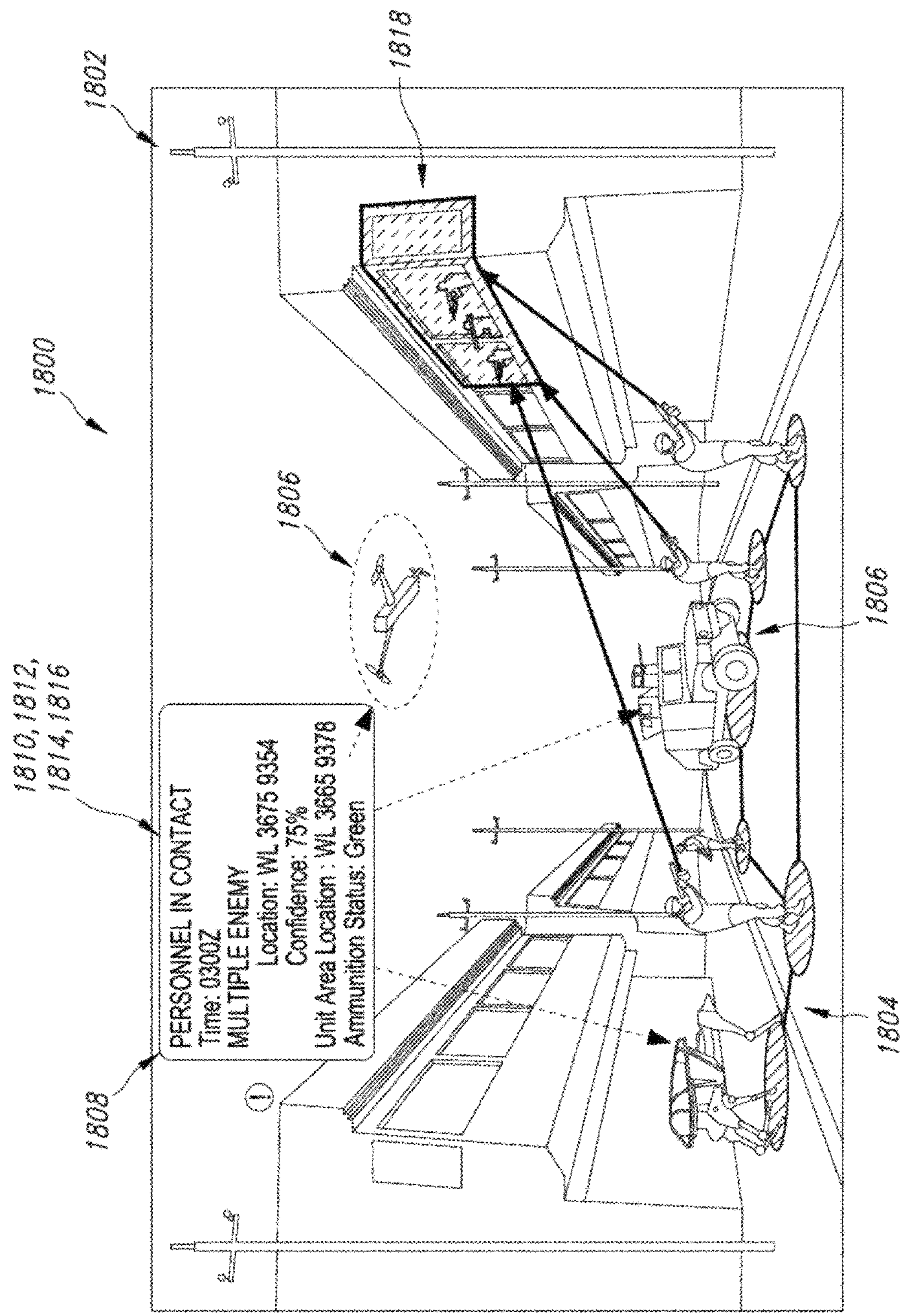
FIGS. 18-19 are illustrations of multiple users and assets engaged in live fire in accordance with embodiments of the present disclosure.

Referring to FIG. 18, a visualization of multiple users and assets engaged in live fire showing spot report information including communication statuses, unit identifiers, day and time information, location information, and assessments of enemy activity and location including confidence indicators of threat assessment is shown. In particular, a third-person visualization 1800 including a street view 1802 that shows multiple users 1804 and assets 1806 engaged in live fire is shown. In embodiments, third-person visualization 1800 includes spot report information 1808 that can include communication statuses 1810, unit identifiers 1812, day and time information 1814, location information 1816, and assessments of enemy activity and location 1818 including confidence indicators of that assessment.

Figure 19:
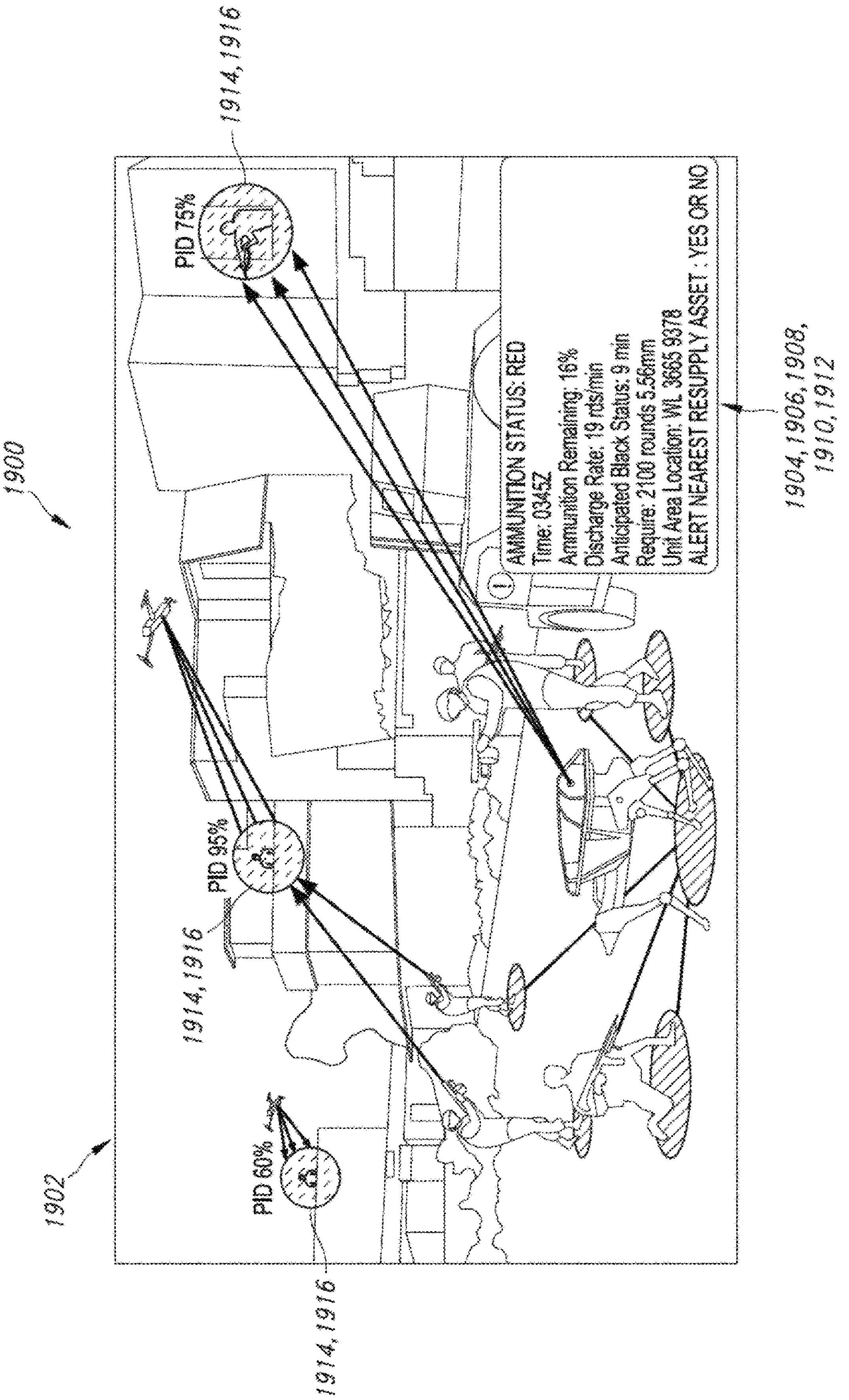

Referring to FIG. 19, a visualization of multiple users and assets engaged in live fire showing spot report information including unit identifiers, location information, ammunition remaining, ammunition discharge rate, prompts for resupply, and anticipated resupply needs are shown. In particular, a third-person visualization 1900 including an area view 1902 that shows multiple users 1904 and assets 1906 engaged in live fire is shown. In embodiments, third-person visualization 1500 includes spot report information 1908. In embodiments, spot report information 1908 includes unit identifiers 1910, location information 1912, ammunition remaining 1914, ammunition discharge rate 1916, prompts for resupply 1918, and anticipated resupply needs 1920. In embodiments, third-person visualization 1900 includes assessments 1922 of enemy activity and location. In embodiments, assessments 1922 of enemy activity and location can include confidence indicators 1924 of that assessment.

In embodiments, FIGS. 20, 21, 22, and 23 depict, embodiments of firearm usage monitoring system includes circuit board 2010 electrically coupled to battery 2012 with connecting wire 2022. The battery 2012 is electrically coupled to entry point 2014. The entry point 2014 is configured to receive a hardwire connection for either electrical power or data. The battery 2012 is mounted into first grip panel 2016. The circuit board 2010 is mounted into second grip panel 2018. The first grip panel 2016 can be joined to second grip panel 2018 on firearm 2020 to form grip 2024. The grip 2024 can contain magazine 2028 that can contain rounds 3030. The trigger 2032 can be pulled after safety 2034 is released to fire one of the rounds 2030 with firearm 2020.

Figure 25:
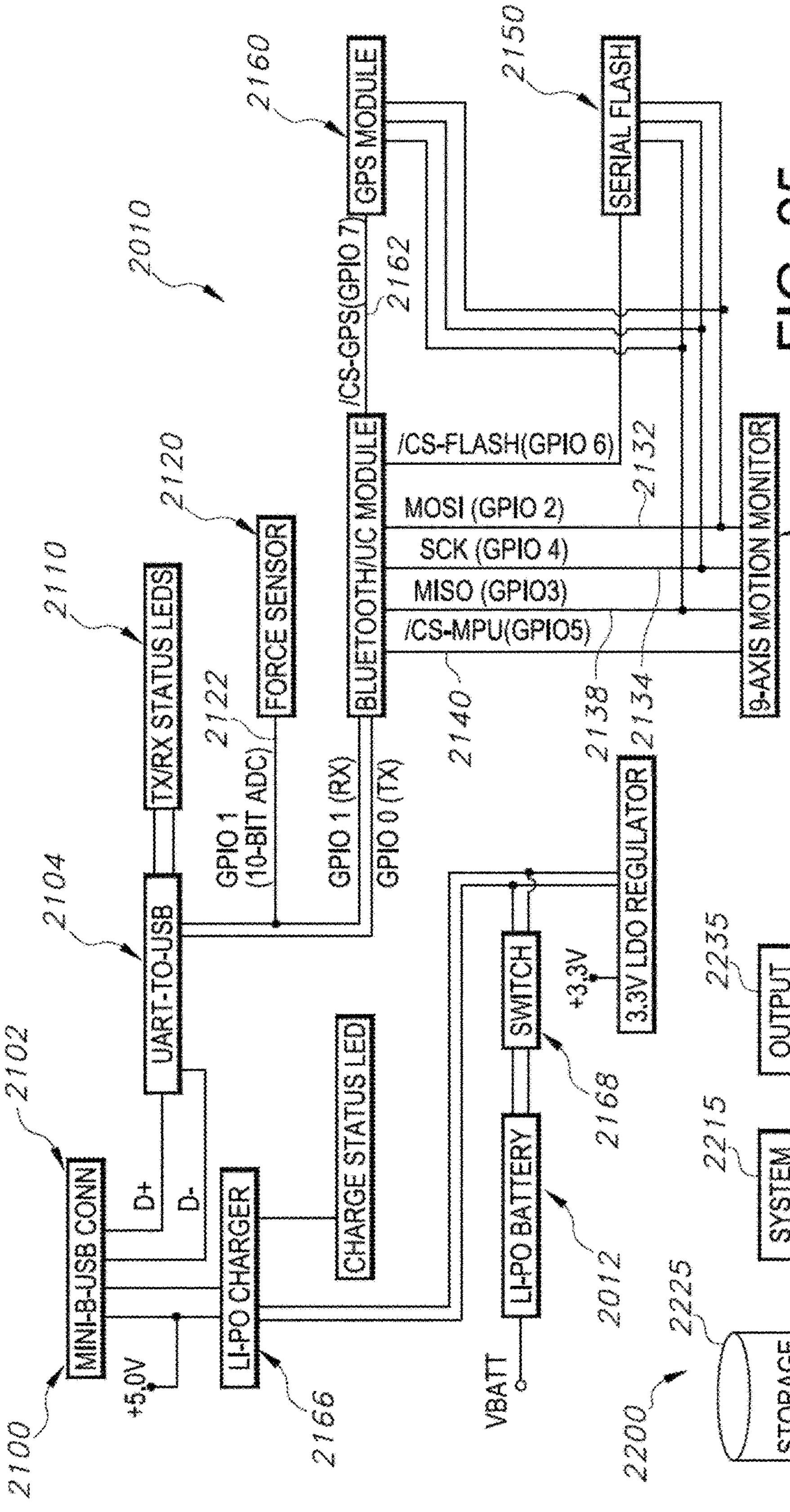
FIG. 25 and FIG. 26 are schematic views of the firearm usage monitoring system in accordance with embodiments of the present disclosure.

Turning to FIG. 25, the circuit board 2010 can be designed at a high level with functionality to promote extended battery life and facilitate more detailed data recording. The entry point 2014 can be configured as a data connection point and, in this example, is shown here as a mini-B universal service bus (USB) connector 2100, when direct connection is applicable. When connected to a USB cable this is a hard-wired data and power connection 2102. The mini-B USB connector 2100 is electrically coupled to a USB to serial universal asynchronous receiver/transmitter (UART) controller 104. This UART to USB controller 2104 comprises an integrated modem with up to 3M Baud, a virtual communications (COM) port, and a +3.3 V level converter that operates on 8 mA or so. For instance, the FT231X integrated circuit meets these specifications. In effect, the UART to USB controller 2104 provides functionality to update firmware in the remainder of the system providing for substantially greater upgrades and improvements than other devices in this field. In examples, the UART to USB controller 2104 can be electrically coupled to a transmitter/receiver status light emitting diode (LED) 110 that can indicate if a firmware update is occurring.

In examples, force sensor 2120 can be electrically coupled to a first general purpose input/output pin GPIO 1 2122. The force sensor 2120 can be a resistive based force sensor with a voltage divider for analog input. In these examples, the force sensor 2120 will typically draw less than 1 mA of current from the UART to USB controller 2104. When force is imparted on the force sensor 2120, the circuit board 2010 can wake up and begin to operate (or operate beyond minimal operation). The force sensor 2120 can be a force-sensing resistor. For instance, the FSR 2400 single zone force-sensing resistor can meet these requirements.

In examples, the UART to USB controller 2104 can be electrically coupled to a Bluetooth/uC Module 2130. The bluetooth/uC Module 2130 can be configured to send data to and receive data from the UART to USB controller 2104. In some embodiments, Bluetooth/uC Module 2130 can be an RFduino stand-alone board that can be configured with an ARM Cortex processor and Bluetooth Low-Energy 4.0 built-in. In such examples, this would typically consume 20 mA peak and 9 mA normal. It is equally possible, that the Bluetooth/uC Module 2130 can include two modules: a microprocessor and a communication circuit which can be separated. While a Bluetooth communication circuit may be the easiest way to transmit data, data can also be transmitted through the mini-B USB connector 2100. Further, there is any number of possible wireless communication systems that could be used such as radio frequency, Wi-Fi, near field communication and other forms of electromagnetic or wired communication.

In some embodiments, the Master Out Serial In (MOSI) pin GPIO 2 2132 on the Bluetooth/uC Module 2130, the Data Clock (SCK) pin GPIO 4 2134, the Master In Serial Out (MISO) pin GPIO 3 2138, and the CS-MPU pin GPIO 5 2140 are electrically coupled to the nine-axis motion monitor 2142. The nine-axis motion monitor 2142 may, for example, be an IMU. The nine-axis motion monitor 2142 is configured to measure and transmit data about all of the positioning of the circuit board 2010 while in motion of any kind. In many examples, this can include a Tri-axis gyro up to 2000 dps, tri-axis accelerometer up to 16 g, a tri-axis compass up to 4800 uT, and programmable interrupt. This would typically consume 4 mA. For instance, the MPU-9250 provides this functionality. In many examples, this triparate functionality to monitors exact orientation and track where the firearm travels in terms of rotation, speed, and direction. In some cases, the tri-axis compass can be accomplished with a magnetometer. Recoil and/or shot count resulting from firearm discharge can be identified from the gathered data.

MISO pin GPIO 3 2138, SCK pin GPIO 4 2134 and MOSI pin GPIO 2 2132 are further electrically coupled to serial flash memory 2150. In many examples, the serial flash memory 2150 can operate in double transfer rate or DTR mode in some cases a gigabyte of memory formed by 256 MB die, with 100,000 erase cycles per sector. In these examples, such an arrangement can draw 6 mA. The serial flash memory 2150 can be further electrically coupled to CS-Flash pin GPIO 6 2152 on the Bluetooth/uC Module 2130. In these examples, the N25Q00AA flash memory meets this requirement.

MISO pin GPIO 3 2138, SCK pin GPIO 4 2134 and MOSI pin GPIO 2 2132 can be further electrically coupled to a GPS Module 2160. The GPS Module 2160 is further electrically coupled to CS-GPS pin GPIO 7 162 on the Bluetooth/uC Module 2130. The GPS module 2160 can be configured to determine position within 2.5 meters of accuracy with a 10 Hz update rate, internal real time clock, onboard read only memory, and −167 dBm sensitivity. In these examples, this can operate continuously with a draw of 30 mA continuous and 7 mA while in power save mode (1 Hz). For instance, The U-BLOX™ CAM-M8Q chip antenna module can meet this requirement. There are a lot of other kinds of GPS systems that could be equally acceptable including Glonass™, Beidou™, etc.

In some embodiments, the mini-B USB connector 100 is electrically coupled to the UART to USB controller 2104 for sending data D+ and receiving data D−, however, it need not operate on that voltage. Accordingly, circuit 2010 can be configured to have a system that both rapidly charges the battery 2012 and permits data exchange. In these examples, the mini-B USB connector is electrically coupled to a battery charger 2166. The battery charger 2166 is electrically coupled to battery 2012 with a switch 2168. The battery charger can be set to 500 mA and include a sense current, reverse discharge protection, and automatically power down. For instance, charger MCP73831 can meet these requirements.

FIG. 25 depicts embodiments with a lithium polymer battery, but other kinds of batteries can be used as well. One battery 2012 can provide 3.7 V and have an 850 mAh capacity. The battery 2012 can be electrically coupled to a low dropout (LDO) regulator 2170. The LDO regulator 2170 can step down the voltage from 3.7 V to 3.3V to provide power at a voltage that can be used by the UART to USB controller 2104 and the Bluetooth/uC Module 2130. The LDO regulator 170 can be configured to provide 300 mA output, 270 mV dropout, output fixed at 3.3 V, reverse battery protection with no reverse current, and overcurrent protection. For instance, LDO regulator LT1962 can meet these requirements. In these examples, the GPS module would typically operate at 3.7 V.

Figure 24:
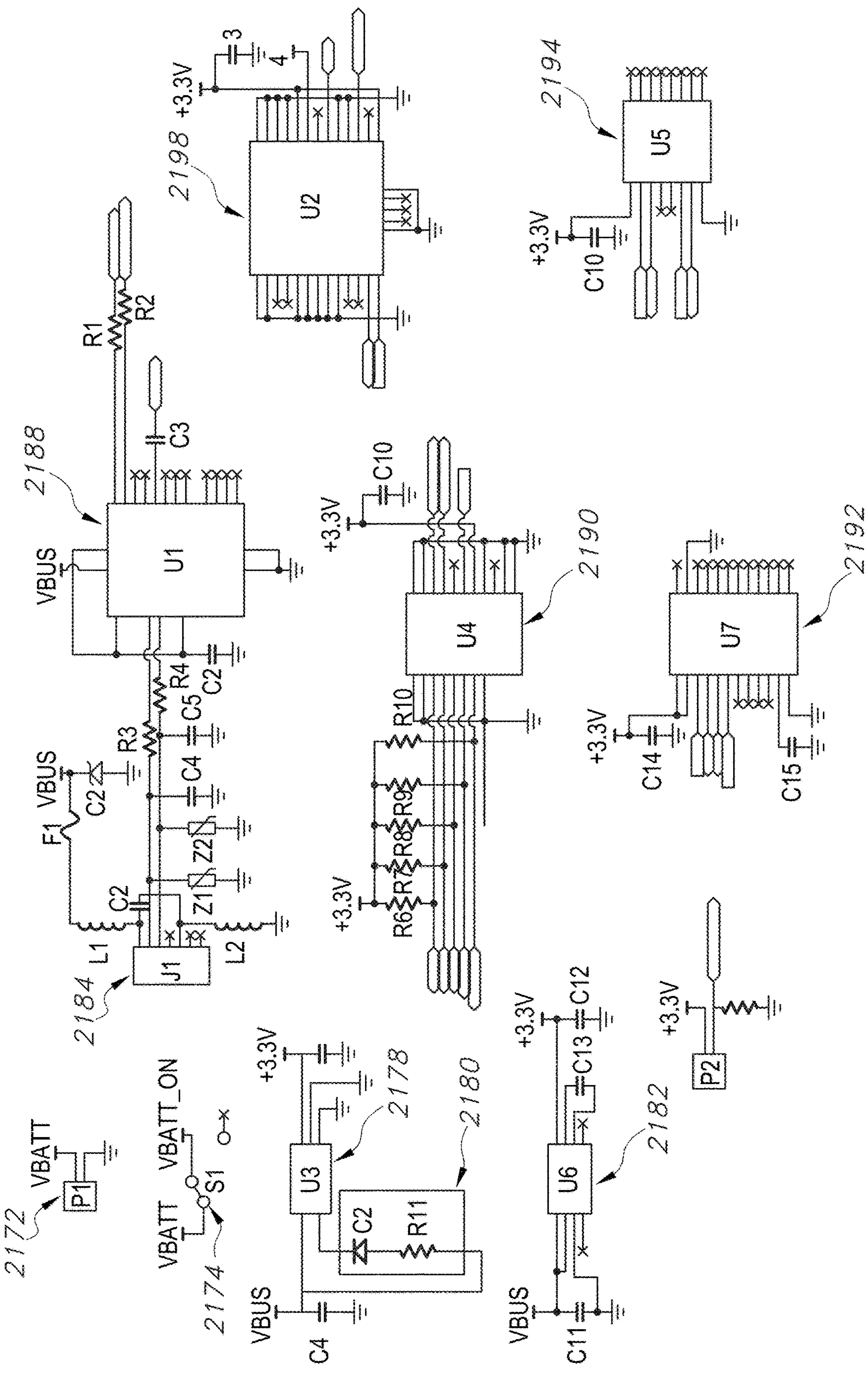
FIG. 24 is an electrical schematic view of the firearm usage monitoring system in accordance with embodiments of the present disclosure.

FIG. 24 provides examples of connecting these components. The battery connection PI 2172 provides a battery voltage and is attached to ground and the switch SI 2174 toggles whether the battery voltage is sent to the rest of the system. The battery charger U3 2178 is connected to the battery 2012, and a voltage source and, when charging engages LED C2 2180. The LDO regulator U6 2182 can drop the battery voltage to 3.3 V. The Mini-B USB connection J1 2184 can be joined for data purposes to UART to USB circuit U1 2188. The UART to USB Circuit U1 2188 can receive data from Bluetooth uC/Module U4 2190, which can receive data from the nine-axis motion monitor U7 2192, serial flash memory U5 2194 and the GPS Module U2 198.

Figure 26:
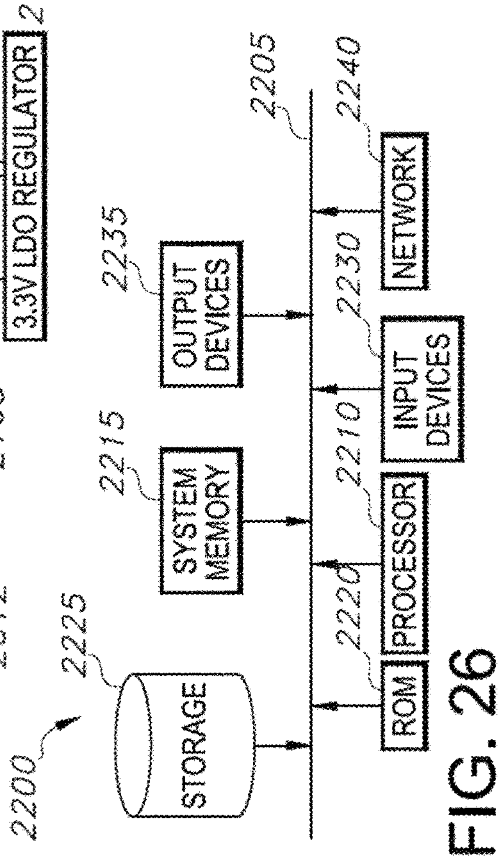

FIG. 26 depicts embodiments of an electronic system 2200 that may take the form of a computer, phone, PDA, or any other sort of electronic device. The electronic system 2200 can include various types of computer readable media and interfaces to read and write to various other types of computer readable media. The electronic system 2200 can include a bus 2205, processing unit(s) 2210, a system memory 2215, a read-only 2220, a permanent storage device 2225, input devices 2230, output devices 2235, and a network 2240.

Figure 27:
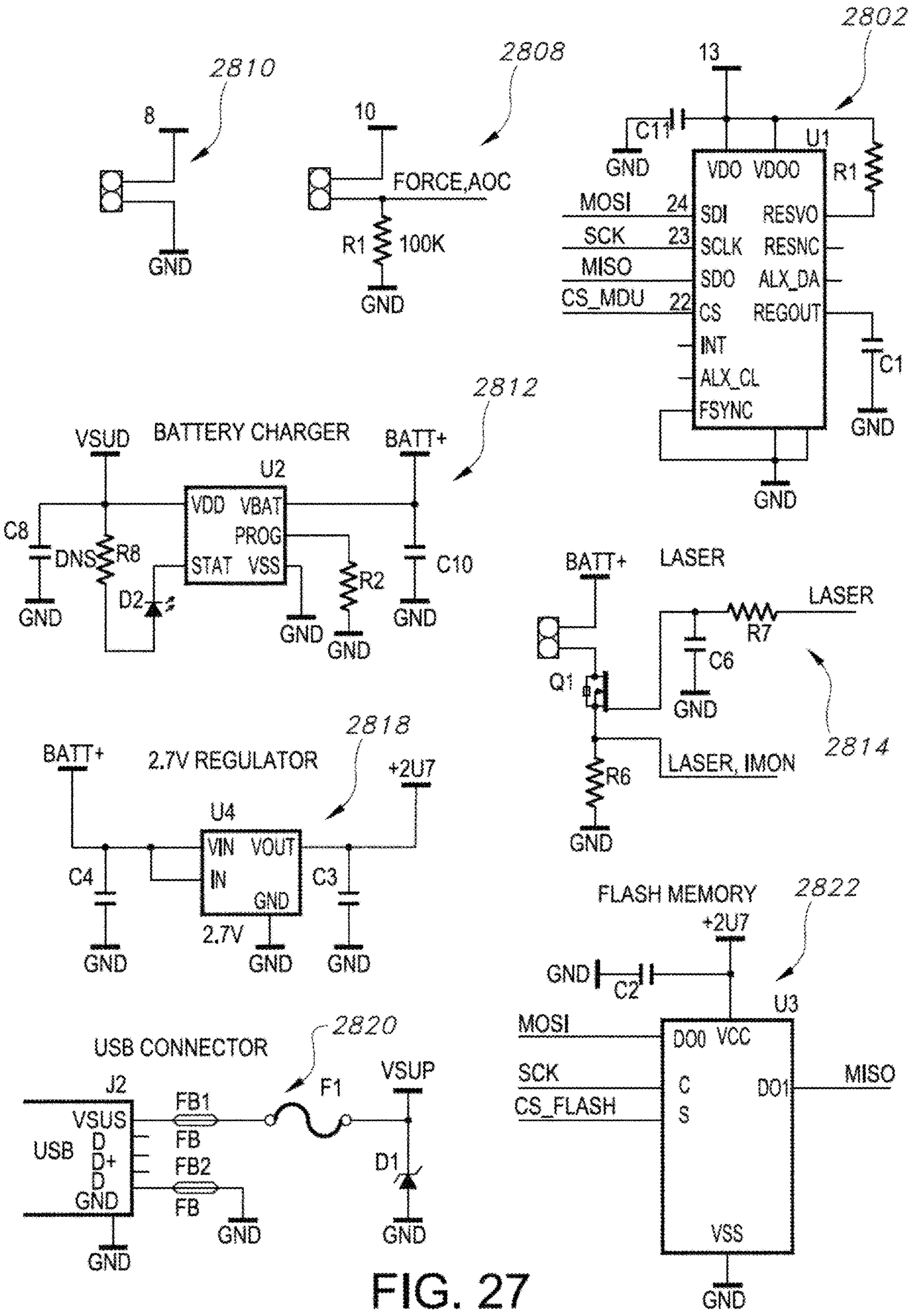
FIGS. 27, 28, 29 and 30 are diagrammatic views of various system sub-components for the firearm usage monitoring system in accordance with embodiments of the present disclosure.

FIG. 27 depicts embodiments of components for a firearm usage monitoring system 2800 including an IMU including gyro/accelerometer 2802, GPS 2804, force connector 2808, power input 2810, battery charger 2812, laser 2814, regulator 2818, USB connector 2820, flash memory 2822, Bluetooth™ 2824, programmable hardware 2828, and the like.

Figure 28:
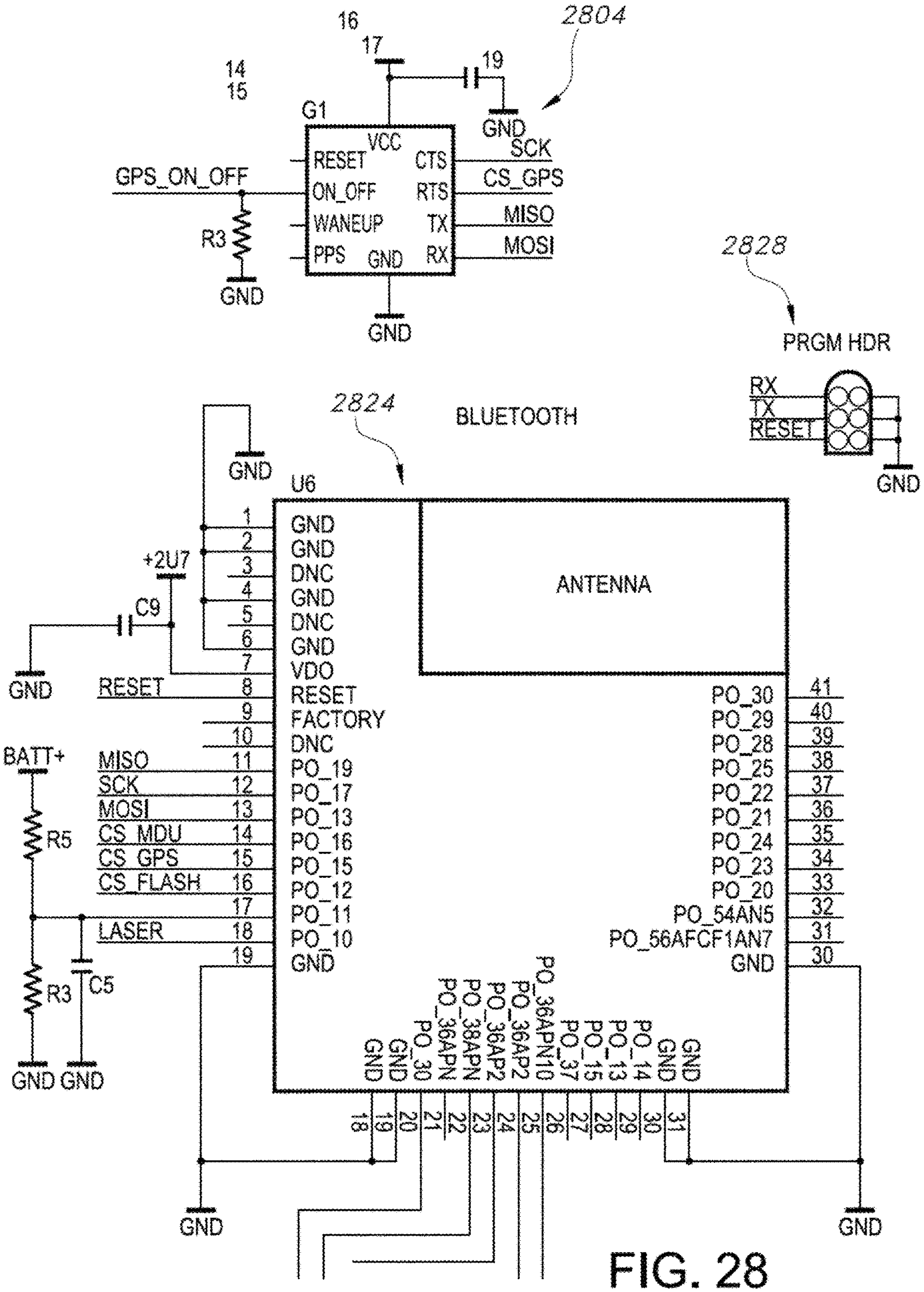

FIG. 28 depicts embodiments of the firearm usage monitoring system 2800 integrated into a grip 2900 of a weapon 2902. A circuit 2908 board having one or more of the combinations of the components illustrated in FIG. 27 can be disposed within the grip 2900 of the weapon 2902 and can be integrated so that it is almost invisible to the user other than the presence of USB ports 904 that can be covered by the hand of the user when the weapon is gripped or can be omitted altogether in some embodiments.

With reference to FIG. 26, the bus 2205 can collectively represent all system, peripheral, and chipset buses that communicatively connect the numerous internal devices of the electronic system 2200. For instance, the bus 2205 can communicatively connect the processing unit(s) 2210 with the read-only memory 2220, the system memory 2215, and the permanent storage device 2225. From these various memory units, the processing unit(s) 2210 can retrieve instructions to execute and data to process in order to execute the many processes disclosed herein. The processing unit(s) may be a single processor or a multi-core processor in different embodiments.

In embodiments, the bus 2205 also connects to the input and output devices 2230 and 2235. The input devices 2230 can enable the person to communicate information and select commands to the electronic system 2200. The input devices 2230 can include alphanumeric keyboards, pointing devices "cursor control devices", and the like. The output devices 2235 can display image generated by the electronic system 2200. The output devices 2235 can include various printers, display devices and touchscreens that can function as both input and output devices.

The bus 2205 also couple the electronic system 2200 to the network 2240 through a network adapter. In this manner, the computer can be a part of a network of computers (such as a local area network ("LAN"), a wide area network ("WAN"), or an intranet), or a network of networks (such as the Internet).

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks. Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

With reference to FIGS. 25 and 28, the hardware and software, in embodiments, can be activated using one or more of any form of user feed sensor 2840, force sensor 2842, wireless remote 2844, remote on/off switch 2848, and the like. Moreover, the hardware and software can be activated using one or more mobile device 2850, user wearables 2852, dedicated hardware token 2854 making a wireless or wired connection, or the like. In embodiments, the firearm usage monitoring system 2800 may operate with the following instructions: receiving a signal from a force sensor 2842 such as the force sensor 2120 (FIG. 25). If the signal is present, then the firearm usage monitoring system 2800 can engage, or the system 2800 can remain in a dormant or sleep mode with a low voltage draw as described herein. If the signal of the force sensor 2842 is on, then the Bluetooth UC/Module 2130 can receive a signal from the GPS module 2160 as to where the system 2800 is presently located. As noted above, one or more signals including those from the force sensor 2120, 2842 can activate the system 2800. Once the system 2800 is active, the IMU 802 (FIG. 27) can provide information as to how the firearm 2020 is oriented and moved in 3D space until, in some embodiments, pressure released on the grip 2024. The system 2800 can determine whether the firearm 2020 has been motionless for a preselected period, or the information is specifically queried. Information as to how the firearm 2020 is oriented and moved in 3D space can include analyzing the firearm 2020 for recoil and/or shot count when fired to discern orientation, direction, and position at the time of discharge. In examples, this data can be stored in the flash memory 2150 and can be transmitted through the Bluetooth uC/Module 2130 to another Bluetooth compatible device. The information including orientation, direction, and position can be also transmitted from the firearm 2020 at preselected time intervals, specific times, distances from certain locations (e.g., pre-defined geo-fencing locations or distances), at the time of discharge, at the time of reload of rounds 2030, when the safety 2034 (FIG. 21) is removed, and the like.

In embodiments, the firearm usage monitoring system 2800 may record the motion of the firearm 2020 and provide geolocation information 2858, which may be coordinated with other information, such as disclosed herein. In embodiments, the system 2800 may transmit data via the network connection 2240 (FIG. 26), such as a cellular network, to a remote server, which may be a secure server, or other remote processing components, such as the mobile device 2850, cloud platform 2860, or the like. In embodiments, the system 2800 may include efficient architecture and components for low power consumption including energy harvesting mechanisms 2862. In examples, the system 2800 can harvest the energy of motion of the firearm or energy from the recoil to provide power for storage and/or reporting of data. In embodiments, methods and systems provide rapid, efficient determination of location. The energy harvesting mechanisms 2862 may also be configured to harvest local energy in the radio frequency (RF) domain or other appropriate local electromagnetic signals of sufficient strength.

Figure 30:
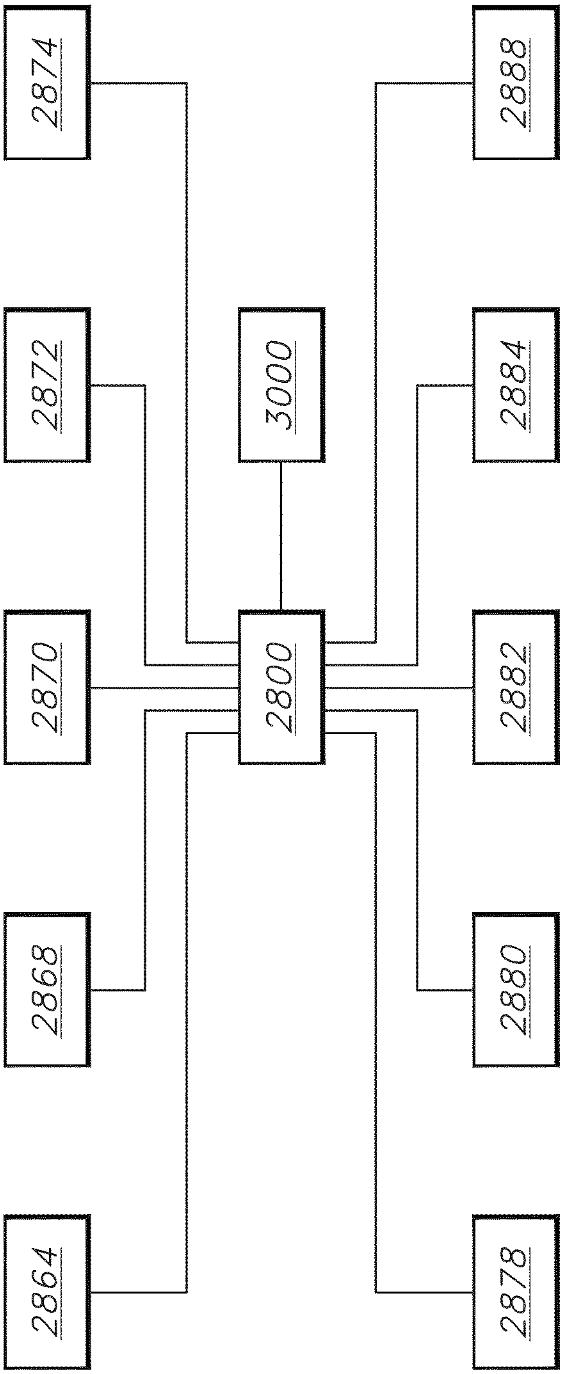

In embodiments, the network connection 2240 (FIG. 26) by which the system may communicate data may be a mesh network connection 2864. With reference to FIG. 30, the mesh network connection 2864 may be a connection to one or more other firearms or one or more other devices, such as a mobile robot 2868, an infrastructure device 2870, or the like. The mesh networking connection 2864 may form part of a large mesh network, allowing devices, such as firearms and mobile robots, to communicate directly with one another, rather than having to first connect through a centralized network communication hub, or as a supplement to communication by one or more devices to such a hub. Such devices may include self-disposing devices 2872, for example, self-disposing mobile robots. In embodiments, the mesh network 2864 may be a self-organizing and fluid mesh network that organizes and reorganizes itself based on specified data, including data filtered or weighted based on specified criteria, and/or the dynamic detection of other devices, for example with a geographic perimeter. Other devices may include deployable mesh network hubs 2872, also known as “pucks”, beacons, wireless access points, such as Wi-Fi access points, lighting systems, cameras, and the like. The mesh network 2864 may also include asset management systems, crowdsourced communications, frequency scanning networking, cellular mesh networking or other systems. In embodiments, devices on the mesh network 2864 may adjust location information based on the relative movement of each other within the mesh network 2864. In embodiments, the relative movement of devices may be reported by other devices within the mesh network 2864 over the mesh network 2864, such as to the self-disposing devices 2872. The relative movement of other devices may also be derived from IMUs disposed with the other devices within the mesh network 2864. Relative movement information may include speed, velocity, acceleration or position information, and/or event identification information 2874. Such information may include threat identification information, shot accuracy information and the like. Event identification information may include weapon information, information indicating a person is in an unauthorized area, soldier maneuver information (e.g., speed, direction, activity, or the like), in-position information (such as for an individual or a device), rate-of-fire information, alternating fire information, maintenance required information, stoppage event information, ammunition expenditure information, fight or struggle information and the like. In embodiments, authentication information may be received from radio frequency identification (RFID) implants, for example, implanted in the person. In embodiments, the relative movement, such as among devices in the mesh network 2864 like firearms 2020 and other equipment may be provided relative to at least one geographic location, such as through the use of data from the IMUs or from one or more other data sources. In embodiments, location may relate to relative locations of one or more other firearms or other devices connected to the mesh network 2864, such as the distance, direction, and/or movement of one or more other firearms 2020 or other devices relative to a given one. In such embodiments, geographic location and movement information 2858, whether relating to a location or to another firearm or other device may be communicated to a given firearm or other systems of an individual handling a firearm over the mesh network 2864. In embodiments, the geographic location may be an underground geographic location, where other geographic location detecting signals, such as GPS are not available. In embodiments, a combination of geographic location and relative location may be understood by the system, such as where at least one member of a mesh network has a detectable location (such as by GPS signal) and other members have locations that are determined relative to the known member, such as by detecting motion through the IMU 2802 or other non-GPS systems. It may be appreciated from these embodiments that using data from the IMU 2802 on the mesh network 2864 may allow the firearm usage monitoring system 2800 to provide discharge location information in geographic locations that may not otherwise be covered by geographic location detecting signals.

In embodiments, the mesh network 2864 connection may be a wireless mesh network connection and may be configured based on radio communication frequencies. In some situations, radio communication frequencies may be subject to interference or jamming, either intentionally or otherwise, making communication difficult or impossible when attempting to establish a connection over the compromised frequency. Interference or jamming may include radio frequency interference or jamming, optical jamming, noise, and the like. Because of the risk of jamming, and because communication reliability may be critical for user of the firearm usage monitoring system 2800, the firearm usage monitoring system 2800 may detect such jamming of one or more frequencies and automatically adjust the frequency of the mesh network 2864 to avoid using the compromised frequency, such as by selecting a frequency not currently subject to interference or jamming. The firearm usage monitoring system 2800 may then establish a wireless mesh network connection with another device using the selected frequency. Jamming or interference detection may include detecting attempted signal interception and scrambling transmitted information to avoid the detected signal interception.

In embodiments, the firearm usage monitoring system 2800 may determine discharge information 2878 related to the firing of the firearm 2020 connected to the mesh network 2864. The discharge information 2878 may include discharge location, direction of the discharge, a motion path of the firearm preceding discharge and/or orientation of the firearm at discharge. Orientation information 2880 may be provided by the IMU 2802 and may include enemy area location and size information, unsafe act information, line of fire information, shift fire information, sectors of fire information, interlocking fire information, 360 degree perimeter security information and the like. The discharge information 2878 may be determined from motion and location information, such as provided by devices connected to the mesh network. For example, the discharge location may be determined from geographic location data of one or more firearms connected to the mesh network 2864 and may use relative movement data provided by the other devices connected to the mesh network 2864, for example by analyzing relative movement data that is based on resident IMU data from other firearms connected to the mesh network 2864. In embodiments, methods, systems and components are provided for a small-footprint firearms tracking system 2882, such as one of the dimensions less than 25 mm×25 mm×4.55 mm). In embodiments, the firearm tracking system 2882 may identify movements and actions while in sleep mode such as to trigger transmission of alert codes. In embodiments, the firearm tracking system 2882 may be adapted for integration with various gun platforms, such as to interface with different grips, handles, and other internal and external firearm components and accessories, including being integrated entirely into the grip of the firearm. In embodiments, the system may use over-the-air updates, may act as or integrate with a beacon 2884, such as a BLE Beacon, which may be charged by wireless charging and may record data (such as IMU data) when in the active or inactive mode (such as to flash memory) and may enable a sleep/hibernation mode. In embodiments, components are provided for a small-footprint firearms tracking system 2882 may include Simblee (Bluetooth Low Energy, Microcontroller Unit), Micron N25Q256A13EF840E (256 Mbit Flash Memory), MPU9250 (9 axis accelerometer, gyroscope, and magnetometer IMU), ORG1411-PM04 (Origin GPS Nano Hornet, 2.7 V), FSR-400 (Force Sensor), 800 mAh LiPo Battery, Battery Charger (MCP73831), 2.7 V Regulator (MIC5365), 3 V Laser, and/or UB-MC5BR3 (Waterproof USB connector).

In embodiments, the system may function in active modes, sleep modes and/or hibernation modes. In the active mode, the device may be in full power mode, such as using power for collecting readings from the IMU and GPS and transmitting them via a local protocol like BLE to an edge device. The laser module 2814 may also be activated. In embodiments, data can be sent in this format at relatively high data rates, such as at 30 messages/second, 50 messages/second, 100 messages/second, or the like. A sample string may include AB-FC-22-CC-B3-00-00-00-00-00-00-00-00-00-00-00-00-5E-89-5A-C0-71-3E-E6-C0-FA-18-9C-C0-00-20-75-3F-00-80-52-3E-00-00-19-3E-00-00-B4-40-67-66-00-C 1-34-33-6B-C0-01-B A. The guide may be as follows: AB (header), FC-22-CC-B3-00 (millisecond timestamp), 00-00-00-00 (latitude), 00-00-00-00 (longitude), 00-00 (altitude in meters), 00 (horizontal accuracy in meters), 5E-89-5A-C0 (gyro x), 71-3E-E6-C0 (gyro y), FA-18-9C-C0 (gyro z), 00-20-75-3F (accel x), 00-80-52-3E (accel y), 00-00-19-3E (accel z), 00-00-B4-40 (mag x), 67-66-00-CI (mag y), 34-33-6B-C0 (mag z), 01 (unit status), BA (footer). A millisecond timestamp may be used, such as in a modified Unix timestamp, e.g., for milliseconds after 01-01-16. If BLE is unavailable or a message is not sent, this may be stored in the flash memory 2150, 2822 to be sent when the device enters sleep mode. The Active mode may be triggered when force is applied to the force sensor 2120, 2822. Depending on the configuration, the system 2800 may remain in the active mode for a specified time, such as two minutes after the force is no longer applied, for five minutes, for ten minutes, or the like. This timer may be reset when force is reapplied. In embodiments, the laser module 2814 may be turned on at limited times, such as when the force applied to the force sensor (optionally based on the mode or regardless of the mode). This mode may consume, for example, around 70 mAh of energy. The unit may also power down into a "sleep" mode, such as when there is no longer force applied to the unit and the timer has gone down (indicating expiration of active mode). In such a sleep mode, one message may be sent at a defined period, such as once per second, such as containing the timestamp, location data, and current orientation data 2880. The GPS module 2160, 2804 may enter an ATP (adaptive trickle power) state where it cycles between full power and ATP to minimize power consumption while maintaining a fix on its location. In embodiments, a location fix may be maintained consistently, regardless of power mode. In embodiments, the IMU may be polled at a low rate, such as to monitor movement. If no movement is sensed for a given time, such as five minutes, then the unit may go into another even lower power mode, referred to herein as a hibernation mode. In such as hibernation mode, the unit may continue to send messages (e.g., one per second), such as containing the timestamp, location data, and current orientation data. The GPS module 2160, 2804 may enter hibernation where it consumes, for example, under 1 mA of power. The IMU 2802 may still be polled at a low rate. If movement exceeds a certain threshold, the unit may go into sleep mode and the GPS module 2160, 2804 may wake up to maintain a location fix. This mode may consume, for example, under 7 mAh.

In embodiments, the firearm usage monitoring system 2800 may communicate with external systems, such as by delivering reports, events, location information, and the like. In one such embodiment, a signal may be provided to a camera system 2880, such as a body camera worn by an individual, to initiate recording by the camera, such as recording video of a scene involving the individual. For example, the camera system 2888 may initiate recording upon receiving a signal indicating that a weapon has been raised into an aiming position so that the situation in which that activity occurred is recorded. By triggering the camera system 2888 to activate one or more body cameras upon such events, use of the body cameras may be limited to key situations, potentially reducing the storage and data transmissions requirements for capturing, storing and transmitting video data over networks, which can be very expensive if large amounts of video are captured for normal daily activities for which there is little use for recorded video. In these examples, the information obtained from the camera can be with permission and only in certain geographic zones to support privacy requirements for various situations. In these examples, the information obtained from the camera can support facial recognition functionality. In further examples, the information obtained from the camera be of reduced quality to support faster capture but otherwise not support facial recognition functionality or other post-processing requiring substantially high resolution. Thus, the firearm usage monitoring system 800 may enable a much more efficient overall monitoring system, including one that records video involving the user of the firearm 2020.

In embodiments, data, such as various firearm usage events (such as gripping the firearm, raising the firearm, discharging the firearm, moving around with the firearm, entering defined locations with the firearm, and the like) may be stored, analyzed, and provided, either in raw form or in various packaged feeds, such as analytic feeds, to external systems. With reference to FIG. 28, one class of system that may consume such data and/or analytics is an insurance system 1050, where such data may be used for various purposes, such as for underwriting and pricing insurance contracts (such as for liability insurance, accident and hazard insurance, health insurance, life insurance, and others) involving one or more individuals or groups for whom firearm-related activity is monitored by the methods and systems disclosed herein. This data may be used for actuarial purposes (such as to predict the likelihood of adverse events involving firearms, such as accidents or other problems), as well as to compare the relative safety of a given group as compared to one or more cohorts. For example, a security firm that wishes to obtain liability insurance can be compared to other security firms in the same industry or area, and the extent to which weapons are gripped, raised, or discharged can be considered in determining whether to issue insurance and at what price insurance should be issued. This may include data related to on-the-job events as well as data related to training (such as where consistent usage in training situations may serve as a favorable indicator for underwriting).

Methods and systems are provided herein for identifying discharges and counting shots, discharges, etc. Conventional technologies for doing so typically require a spring in the magazine and a system for detecting where the spring is positioned. For example, as another bullet went into the chamber of the weapon, the spring position helped measure rounds in a magazine. By contrast, the present disclosure provides an external solid-state device that can be attached to the firearm 2020 to register when one or more shots are fired. The discharge has a unique, detectable, physical profile (i.e., a discharge has recoil that has a particular motion profile, sound profile, and the like). A recoil measuring system 3052 may use an IMU, including or combined with motion-detecting/sensing elements, including one or more accelerometers, gyros, magnetometers, and the like. In embodiments, a map is developed based on analyses of discharge events to the map the entire motion sequence caused by a typical discharge. That motion profile, which may be unique to each weapon platform and user, can be stored and used as a basis for comparing future sensed data to determine whether a discharge event has occurred. Similar profiling can be used for each weapon type to determine whether the firearm has been raised to an aiming position or out of the holster position.

In embodiments, a firearm usage monitoring system 2800 may allow a user to validate a threat, for example in a combat situation. A firearm usage monitoring system 2800 may establish a pressure signature 3054 to validate the threat. The threat may be validated by the firearm usage monitoring system 2800 by comparing the pressure signature against a range of pressure signatures, for example from no pressure to extreme pressure.

In embodiments, the pressure signature 3054 may be established by collecting information, from sensors, on or around the firearms and the like. In embodiments, sensors may be wearable sensors 3058, such as from an armband, a watch, a wrist band, glasses, a helmet or other headgear, an earpiece, or the like, or may be combined with other sensors, including multi-modal sensors 3060. Sensors may also include other wearable sensors, firearm motion sensors, firearm orientation sensors, firearm discharge sensors and combinations of sensors. Combinations of sensors may include combinations of wearable and firearm sensors, combinations of firearms and fixed sensors, for example, Internet of Things (IoT) sensors, and the like. A sensor-equipped firearm may include a pressure sensor, for example, to determine a grip profile using information such as threat ID, shot accuracy, engagement, alert information and tactical information. Information collected from a sensor-equipped firearm may include discharge information, motion information, rate of motion information, orientation information and the like. The rate of motion information may include movement information related to speed, threat identification and shot accuracy. Movement information may also be related to an event identifier for events, such as events associated with weapons and people. Events associated with firearms may include events indicating the firearm has fallen, is outside of a pre-designated distance from its owner, in an unauthorized area and the like. Events associated with people may include events indicating a person is in an unauthorized area, the maneuvering speed of the person and the like. Determining the pressure signature 1054 may also include determining a firearm-specific candidate action of a first firearm user, from at least a portion of the collected information. The candidate action may be compared with other firearm users, for example, other firearm users proximal to the first firearm user or other firearm users associated with the first firearm user. The collected information, candidate action or actions, and action comparison result may then be stored in a data structure that represents the pressure signature 3054. The collected information, candidate action or actions, and action comparison result may also be filtered or weighted based on specified criteria, prior to being stored in the data structure that represents the pressure signature 3054.

In embodiments, the firearm usage monitoring system 2800 can provide alternatives for monitoring discharges, such as cameras, or augments those other monitoring systems. The methods and systems disclosed herein may include image recognition, which can identify the flash of a muzzle or for the slide rocking back. The system may also have acoustic abilities and may provide sound recognition.

In embodiments, the firearm usage monitoring system 2800 can include an infrared gate in front of the ejection port. This gate 3062 can track a disconnect when the weapon is fired, such as when the shell is engaged and breaks the gate 3062. In embodiments, the firearm usage monitoring system 2800 may include a hall effect sensor 3064 to measure the motion of an internal part. In embodiments, the firearm usage monitoring system 2800 can capture the discharge profile of a given weapon by using an IMU. The discharge profile may have unique inertial characteristics when a weapon is discharged, such as based on the geometry, distribution of weight, specified ammunition, and the like, so that a discharge can be profiled and identified based on a series of movements that are measured by the IMU. In embodiments, the firearm usage monitoring system 2800 may track with a global positioning system (GPS). In embodiments, the firearm usage monitoring system 2800 includes network reporting facility, such as through a Bluetooth discharge report to a centralized server. In embodiments, the firearm usage monitoring system 2800 can also measure when a hand is on the grip of the weapon indicating a threatening situation. This sensor, button, or switch can provide valuable data, such as by alerting others to a potentially dangerous situation.

In embodiments, the firearm usage monitoring system 2800 can include an activity monitor which will indicate events such as when the gun is elevated and being pointed.

In embodiments, the firearm usage monitoring system 2800 can include a slim profile, waterproof enclosure to house the electronics and housing. In embodiments, the firearm usage monitoring system 2800 includes a grip-integrated reporting device including GPS technology. In embodiments, the firearm usage monitoring system 2800 can be customized with various grip configurations and textures, such as to fit any kind of weapon with a familiar, comfortable type of grip that is typical for that weapon.

In embodiments, the system 2800 can be integrated with other systems and accessories. For example, a visible light (such as green or red) or infrared laser pointing module 2814 can be integrated with the grip, such as to help with target acquisition, a flashlight to improve visibility, or a range finder also for target acquisition.

In embodiments, the firearm usage monitoring system 2800 contains a wireless charging system for the firearm discharge device to facilitate greater ease of use.

In embodiments, the firearm usage monitoring system 2800 can allow for manual or automatic calibration of the laser designator. In embodiments, the firearm usage monitoring system 800 can detect alternative tracking systems when in a denied GPS location; for example, the system can triangulate with cellular to provide an initial location to increase the speed recognition of location or the system can triangulate with Wi-Fi or other beacon technologies. In embodiments, the firearm usage monitoring system 2800 can augment GPS with IMU to maintain relative position over time. The system can then provide better accuracy on physical location within a building that cannot support GPS tracking. In embodiments, the firearm usage monitoring system 2800 integrates with GPS-denied navigation systems.

In embodiments, the firearm usage monitoring system 2800 can augment the physical location detection with depth sensors and camera systems to gather data.

In embodiments, the firearm usage monitoring system 2800 can provide data storage. The system gathers data when the device is gripped through minutes after the device is disengaged. If the device cannot transmit to the edge device on the network (e.g., not available, out of range), it may store (e.g., for up to 30 days) in onboard memory (e.g., through high data rate memory). Once available, the system may restart the transmission process, so that the data is sent over.

In embodiments, the firearm usage monitoring system 2800 has an ecosystem for data. In embodiments, data may be aggregated, such as to create an aggregate database for firearms data, with various metrics that can be applied to that kind of data, such as indicating groups or locations that use weapons with varying frequency, that undertake more or less training, and many others.

In embodiments, the firearm usage monitoring system 2800 can provide power management capabilities. If the device is in motion but not in use, the low power mode (e.g., with occasional pinging) may be implemented to maintain general awareness of the location of the user. The device transmits a location every one second. If not used for a period of time, (e.g., for ½ hour) the device may send one message at a defined interval, such as every second, every minute, every one-half hour, every hour, or at other intervals.

In embodiments, the firearm usage monitoring system 2800 can provide inventory control. With monitoring, an alert can be sent and the weapon can be tracked. Thus, for a manager, the system may provide locations of all weapons of a given force at any given time.

In embodiments, the firearm usage monitoring system 2800 can provide firearm maintenance. With monitoring, the system may provide data on the number of rounds discharged and which gun components need maintenance or replacement.

In embodiments, the firearm usage monitoring system 2800 can provide real-time tracking of users when in motion. This can identify where the device and users are at any time and when the weapon is in motion.

In embodiments, the firearm usage monitoring system 2800 can integrate with the body camera systems 2888 and automatically activates when the device is gripped or in motion. The body camera data can then be streamed in real-time when in use. In embodiments, the firearm usage monitoring system 2800 can be activated when motion is detected from the body camera system 2888.

In embodiments, the firearm usage monitoring system 2800 can integrate with wearable devices 1058, such as activity monitors. It can integrate with mobile devices and the Emergency Response Data communications architecture.

In embodiments, the firearm usage monitoring system 2800 can include geofence-based alerts. The geofence capability can be implemented around a warehouse where weapons are stored to track weapons for inventory control or threatening situations.

In embodiments, the firearm usage monitoring system 2800 can include personnel information including home addresses for location-based reaction when granted permission where applicable.

In embodiments, the firearm usage monitoring system 2800 includes a dashboard user interface 3068. Views available on the interface 3068 can include maps and can be populated with icons showing exact locations of weapons. Each of the icons can include all personnel information for the weapon, status, and includes a button to zoom in on that location (and drill down on the data). In embodiments, the firearm usage monitoring system 2800 provides aggregating units in the dashboard user interface 3068. When the views on the inter-face 3068 become too dense with overlapping icons, the map may adjust to include a new icon symbolizing multiple units within the specific area.

In embodiments, the firearm usage monitoring system 2800 provides software-aided dispatch integration. The software used for monitoring firearms can replace or augment the current computer-aided dispatch system to gain efficiency in call response and have one program to be more effective.

In embodiments, the firearm usage monitoring system 2800 can integrate with Police Evidence Collection Systems, such as providing a centralized software suite that gathers the evidence information and can also allow certain users to view and upload the information, creating efficiencies across departments.

In embodiments, the firearm usage monitoring system 2800 can allow individuals to review and replay firearm data as part of evidence collection, training, and/or auditing purposes.

In embodiments, the firearm usage monitoring system 2800 can integrate with shooting ranges and retail point of sale (POS) inventory and maintenance systems 3070.

In embodiments, the firearm usage monitoring system 2800 can integrate with the flight deck of an airplane and otherwise not be included in a firearm or system. The system 2800 may provide an IMU in the plane's steering wheel for further tracking purposes.

In embodiments, the firearm usage monitoring system 2800 can integrate with the controls of cargo ships, and the like. The system may provide an IMU in the ship's steering wheel for further tracking purposes. In embodiments, the system 2800 may be deployed to provide tracking within shipping containers.

In embodiments, the firearm usage monitoring system 2800 can integrate with various vehicles and inventory to provide fleet and/or inventory management.

In embodiments, the firearm usage monitoring system 2800 can adapt to a large variety of firearms with various grip options.

In embodiments, the firearm usage monitoring system 2800 provides over the air (OTA) updates for software upgrades.

In embodiments, the firearm usage monitoring system 2800 can integrate with original equipment manufacturer (OEM) components such as IMU, GPS, and Bluetooth.

In embodiments, the firearm usage monitoring system 2800 provide, integrate with, or connect to the machine control system 3000 and machine-learning systems 3072 including custom algorithms for determining recoil of the firearm and other behaviors or characteristics of the system. For example, in embodiments, the firearm usage monitoring system 2800 can include one or more machine learning systems 3072 with one or more identification methodologies to determine the complex motion associated with the discharge of a particular type of weapon. Embodiments may include feeding IMU data collected upon gripping, movement, and discharge of weapons into the machine learning system 3072, so that the system can learn the parameters of each with respect to enough training events that it can rapidly and accurately identify new events based on new IMU data, such as collected in real time. In embodiments, the system 3072 can be trained to learn to identify a threatening situation when the grip is engaged and the firearm is pointed, when the motion has increased indicating a pursuit, and when it is not in motion (e.g., placed in sleep mode). More complex patterns can be learned, such as determining what patterns tend to lead to accidents, dangerous incidents, higher quality training, and the like.

In an example of learning and utilization of a complex pattern, a firearm usage monitoring system 2800 may use the machine learning system 3072 to determine firearm movements that may indicate a discharge from the firearm is imminent. In this example, the machine learning system 3072 may, for example, detect motion and orientation data from sensors, such as from sensors on the firearm 2020, sensors in the mesh network 864 (including other firearms) or wearable sensors (e.g., multi-modal sensors) of the human user of the firearm, which in turn may be used by the machine learning system 3072 to facilitate a threat response. In embodiments, a threat response may include an automatic threat response, such as by one or more machines that are teamed with the human user of the firearm 2020.

In embodiments, the machine learning system 3072 may determine combinations of data, such as motion, orientation and multi-modal sensor data that are indicative of imminent discharge of the firearm.

The machine learning system 3072 may also receive other inputs or generate information to combine with the sensor data, such as an indication of a firearm state. Firearm states may include combat states, training states, wartime states, peacetime states, civilian states, military states, first responder states, incident response states, emergency states, on-call states, and the like. Firearm states may be states from one or more than one firearm, for example, a set of firearms associated with a group of soldiers in the same section of a battlefield or a set of police officers in a region.

Combinations of data may allow the machine learning system to recognize, determine, classify, or predict information, such as about environments, objects, image content, whether a person is friendly or adversary, structures, landscapes, human and human gestures, facial indicators, voices, and locations, among others. Example combinations may include combinations of data from topography and physiological monitors, ISR, and structure recognition combinations, as well as combinations of human and machine physical states. Combinations of data may also be tactical combinations. Tactical combinations may combine data from devices on a battlefield, information about other sectors of fire, and the like and may include firearms and other weapons, vehicles, body armor and other wearable elements, and the like (collectively referred to herein as "battlefield of things") devices including, for example, remotely operated units such as Common Remotely Operated Weapon Stations (CROWS) or other remote controlled firearms that may be configured with heavier calibers and higher lethality.

Objects that may be recognized by machine learning may include weapons, man-made objects, natural objects, and the like. Structures may include doors, stairs, walls, drop-offs, and the like. Human gestures may be detected, interpreted and understood by the machine learning system, while facial indicators could be indicators of mood, intent, and the like. The machine learning system 3072 may use thresholds to assist with determination and recognition process. For example, combinations of data exceeding specified levels may provide a high degree of confidence that the recognition process is accurate.

In embodiments, the machine learning system 3072 teamed with the human user of the firearm 2020 may be operated autonomously, for example, in response to a determined intent of the human user of the firearm 2020 teamed with the machine learning system 3072. The firearm usage monitoring system 2800 may detect gestures of the human firearm user, such as by capturing and analyzing data from sensors that detect conditions of the human, as well as firearm sensors. Sensors that detect conditions of the human may include multi-modal sensors and multi-modal wearable sensors. Gestures may include pointing gestures, threat identification gestures, target acquisition gestures, signaling gestures and the like.

In embodiments, conditions recognized by the machine learning systems 3072 or sensed in order to facilitate the training of the machine learning system 3072 may include conditions indicative of human states, such as stress and other physiological states. Conditions indicative of human states 3074 and captured by sensors for analysis by the firearm usage monitoring system may include heart rate conditions, for example, physical state relationships, blood pressure conditions, body temperature, galvanic skin response, heat flux, moisture, chemistry (for example glucose levels), muscle states and neurological states. Various biological conditions or biosensors may be indicative of threats, such as heart rate conditions, body temperature, moisture (such as indicating excessive perspiration), blood pressure, galvanic skin response, and others. Firearm sensors may be multi-modal firearm sensors and may include sensors that detect motion, orientation and discharge state of the firearm 2020.

Analyzing the data by the firearm usage monitoring system 2800 may produce a set of candidate intents 3080 of the human firearm user or of another individual in proximity to the firearm user (such as where camera information, voice information, and the like is available). The candidate intents 3080 may, in embodiments, be combined with physical and operation machine state information to select one or more action plans 3082. The machine teamed with the human user of the firearm 2020 may then execute and adjust the selected action plan 3082 based on updated intents, machine states, and environmental factors. Machine state factors may include physical factors, operational factors, orientation factors, tactile/force factors, and the like.

Environmental factors 3084 may include weather factors, location data factors, altitude factors, topography factors, video factors and the like. Weather factors may include temperature, humidity, wind speed, wind direction and precipitation factors, among others. Location data factors may include streaming data, as well as data acquired from global positioning systems (GPS) and beacons, access points or the like, as well as through cellular triangulation. Topography factors may include data and observations, while video factors may include both live and archived video feeds. The action plan 3082 may also be formed from a set of predetermined action steps, for example, action steps that each satisfy human teaming criteria selected to coordinate with at least one of the candidate intents 3080. Actions steps may also be arranged into action plans by sets of rules.

Figure 31:
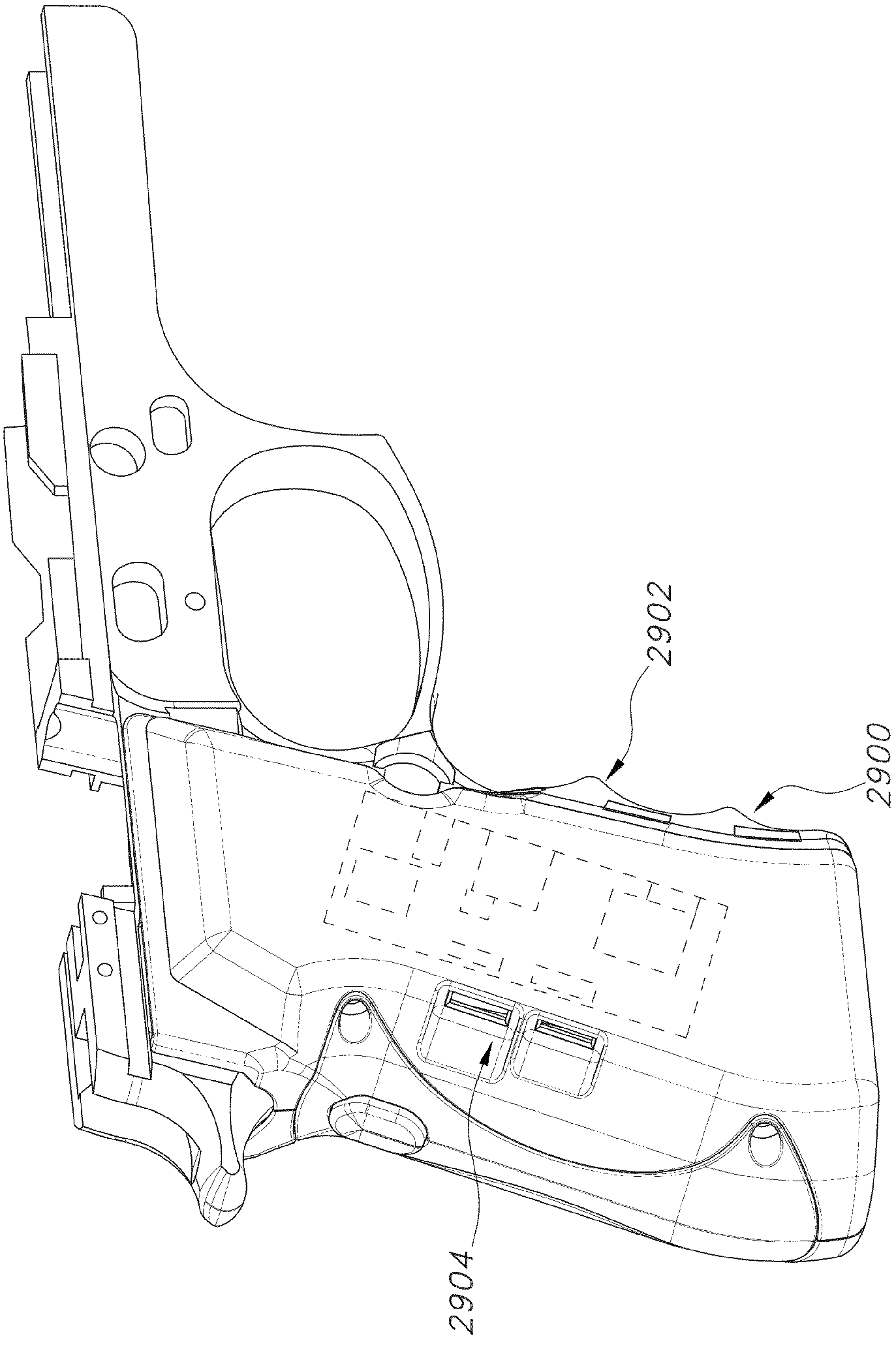
FIG. 31 is a partial perspective view of a firearm including the firearm usage monitoring system in accordance with embodiments of the present disclosure.
Figure 32:
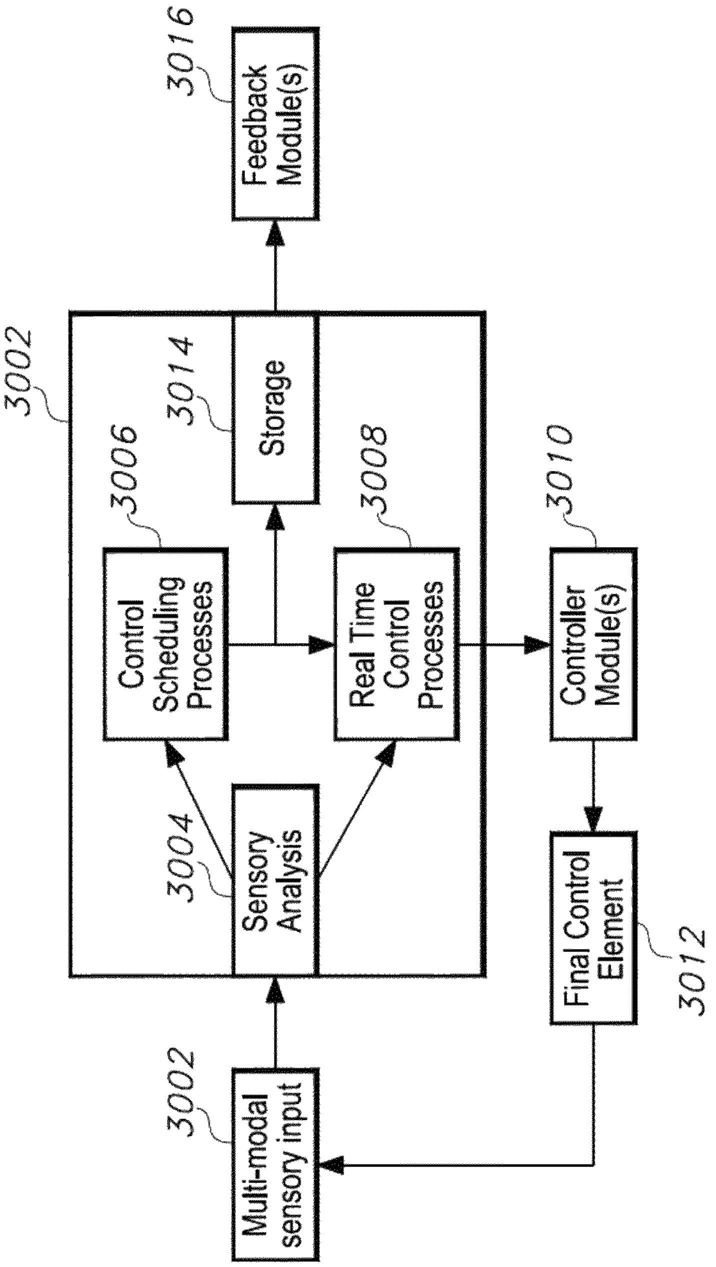
FIG. 32 is a process view of a machine control system of the firearm usage monitoring system in accordance with embodiments of the present disclosure.

With reference to FIG. 31, the machine learning system 3072 may include the machine control system 3000 that may team with a human user of a firearm. In embodiments, the machine control system 3000 may receive multi-modal sensory input 3002 from multi-modal sensors. The multi-modal sensory input 3002 may send sensed data to a sensory analysis module 1004. The sensory analysis module 3004 may forward an actionable representation of the sensed data to a control scheduling process module 3006 and a real-time control process module 3008 for further processing.

Figure 33:
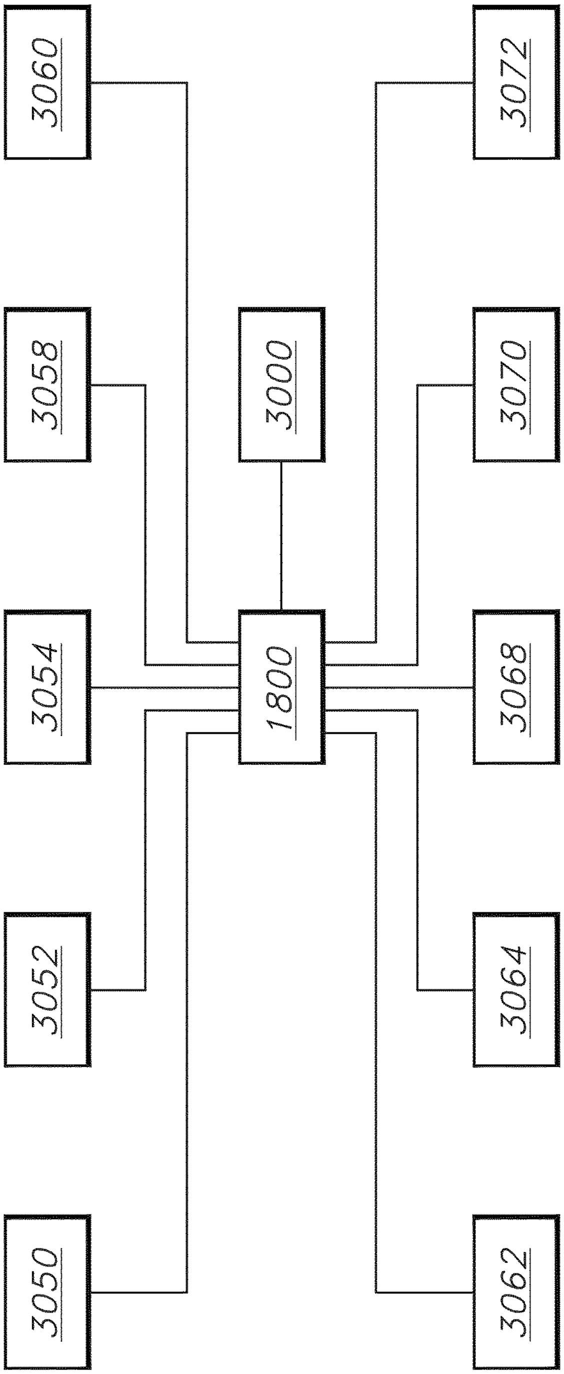
FIGS. 33 and 34 are diagrammatic views of various system sub-components for the firearm usage monitoring system in accordance with embodiments of the present disclosure.
Figure 34:
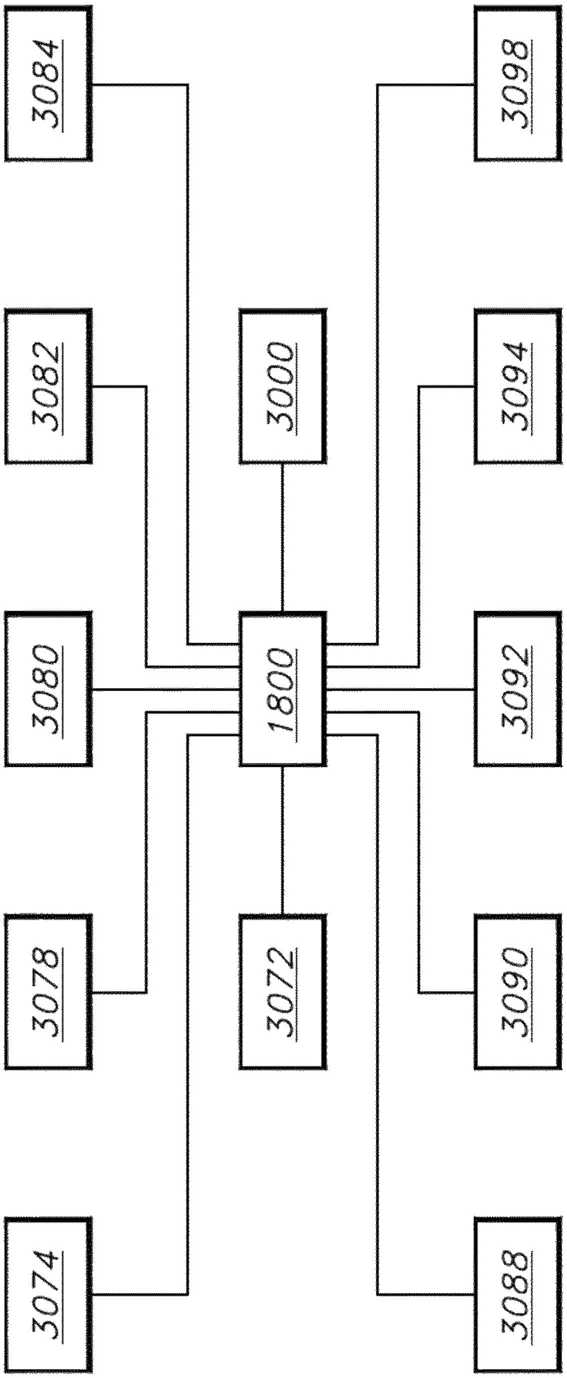

The control scheduling process module 3006 may provide scheduling control information to the real-time control process module 3008 that may issue machine control scenarios to machine controller modules 3010. The machine control modules 3010 may affect the machine control scenarios, for example, by mechanization of the machine through a final control element module 3012. Machine control scenarios may include recognition of celebratory situations such as dancing scenarios and fist bump scenarios separate from other human machine learning scenarios in much more threatening and complex environments. In many examples, the machine learning system 3072 may identify celebratory fire over threatening fire. In embodiments, one or more analysis-schedule-real-time modules 3088 (FIG. 33) may store information in a storage module 3014 for use as feedback/input to the machine learning system, such as feedback provided through feedback modules 3016, that then may adjust parameters for teaming. It will be appreciated in light of the disclosure that it may not be practical to hard code every combination of movement and therefore the machine learning system 3072 may be configured to identify one or more series of movements after being shown by one or more human users of other machine learning systems. By way of these examples, the machine learning system 3072 may learn the movements of the its users by translating and detecting their motion and comparing the identified motions in context with the environment in comparison with trained examples, confidence in those examples, corrections to past activity, and the like to assist, anticipate, protect, support, and facilitate the needs of the users in the theater more quickly and more safely.

In many examples, social interactions between human users and machines deployed with them must be learned by both parties. It will be appreciated that early stage robots (i.e., those incapable of expressing "feelings") could improve the psyche of their human counterpart even with little mutual social interaction. With that said, many situations arise where mutually beneficial social interactions between the users and the machine learning system 3072 may improve the ability of the machine learning system 3072 to assist, anticipate, protect, support, and facilitate the needs of the users in the theater more quickly and more safely. Many situations are additionally good candidates to train the machine learning system 3072 to understand friendly environments over threatening situations. In these environments and situations, the machine learning system 3072 may need to learn how to interact more with human users in order to better produce a more intuitive experience. In much the same way as our homes may be associated with a certain smell or feeling, the machine learning system 3072 may need to understand and relate sensory inputs with other inputs and schedule specific actions and processes. If a human user and robotic machine counterpart enter the mess hall which is not a combat zone, the machine learning system 3072 would need to understand that a different set of actions or scheduling processes occurs in this environment when instructing its robotic machine counterparts (or other assets) in the area.

In embodiments, the machine learning system 3072 may manage a coordinated team of human users of firearms and at least one machine. In this embodiment, the machine learning system 3072 may receive as inputs at least one sensory input about a human and at least one sensory input about a machine that is part of the team coordinated with the human. The machine learning system 3072 may then automatically, using machine learning, determine the occurrence of an event, such as a pre-discharge event, a discharge event, a post-discharge event (including a post-discharge adverse event) or other events. The post-discharge adverse events may include injury to the human or occurrence of damage to the machine, such as subsequent to the detection of a firearm discharge event by the system.

In embodiments, the firearm usage monitoring system 2800 may be or include an all-in-one communication device 3090. The system may integrate with a variety of other communication devices, such as camera systems 2888 including body cameras, helmet cameras, heart rate monitors, physiological monitors, and messaging.

In embodiments, the firearm usage monitoring system 2800 may integrate with physiological monitors. A heart rate band or monitor can be an indicator of a distressed situation creating a notification.

In embodiments, the firearm usage monitoring system 2800 can integrate with mobile phone technology. The system can send critical messages in a timely manner, such as through an app that may be directly connected to dispatchers, such as allowing the caller to request assistance.

In embodiments, the firearm usage monitoring system 2800 may provide a dashboard for the dispatcher. The dashboard may include communication and mapping features, such as to track the location of all weapons in real-time, to highlight relevant events (such as weapons being gripped, weapons being raised, or weapons that have been discharged). The dashboard may provide access information from other systems, such as making available camera views, such as ones that are triggered by activation of body cameras or on-site cameras from the firearm monitoring system or from the dashboard. In embodiments, the firearm usage monitoring system 2800 provides a dashboard for the supervisor. In embodiments, the dashboard includes the communication system and mapping technology to track the location of all weapons in real-time. In embodiments, the firearm usage monitoring system 2800 separates users into groups/echelons with designated permissions. In embodiments, the firearm usage monitoring system 2800 provides a dashboard for one or more of ground units, officers, military personnel, an investigator/compliance officer, and the like. The dashboard may include the communication system and mapping technology to track the location of all weapons in real-time.

In embodiments, the firearm usage monitoring system 2800 measures the parameters of the recoil and parameters of pre-shot movement. This allows an analysis of changes overtime to determine the status of the weapon. The system can also capture movements and determine whether the user is handling the weapon properly.

In embodiments, the firearm usage monitoring system 2800 may alert the user should the weapon be pointed at another person with a tracking system. The firearm usage monitoring system 800 may also alert the user should the weapon be pointed at another weapon, another deployed asset, another predefined target, raised quickly in a geo-defined zone, or the like. This may help avoid friendly fire (fratricide) situations.

In embodiments, the firearm usage monitoring system 2800 integrates with a virtual, augmented, or heads-up display (HUD) reality system 3092 including virtual, augmented reality, or HUD glasses. This integration can provide the user with vital information, including how many rounds of ammunition are left, such as based on tracking discharges over time and comparing to known characteristics of a weapon, such as the size of a magazine.

In embodiments, the firearm usage monitoring system 2800 includes predictive maintenance, such as determined by the number of shots taken. The system can alert when components need to be maintained or replaced.

In embodiments, the firearm usage monitoring system 2800 allows the number of shots fired to influence the resale value of the firearm.

In embodiments, the firearm usage monitoring system 2800 includes predictive maintenance based on recoil parameters (e.g., showing a degradation of performance as recoil patterns shift over time).

In embodiments, the firearm usage monitoring system 2800 includes a predictive resupply module 3094 based on the number of shots taken. In embodiments, the firearm usage monitoring system 2800 indicates when ammunition needs to be re-supplied.

In embodiments, the firearm usage monitoring system 2800 accounts for an inventory of rounds used with the predictive resupply module 3094 that tracks the amount of ammunition used and alerts when the inventory and shots fired do not match indicating a loss of ammunition.

Methods and systems are provided for the installation of grips. The fireguards can be removed to install the tracking system on to the rails. Firearm grips have many ornamental features separate and distinct from their many functional features.

In embodiments, the firearm usage tracking system integrates an IMU into a smart weapon (e.g., one with user authentication, such as based on a password or other code, or a biometric authentication system).

In embodiments, the firearm usage monitoring system 2800 can include a grip-located IMU for a connected firearms platform.

In embodiments, the firearm usage monitoring system 2800 can integrate with artificial intelligence (AI) and Machine Learning. For example, AI can provide predictive ammunition re-supply, such as measuring fire rates and accounting for the delivery time of new ammunition.

In embodiments, the firearm usage monitoring system 2800 can integrate with virtual reality (VR) or augmented reality (AR) using, for example, a Microsoft® HoloLens® for training purposes. A virtual command center for a battlefield training session can be created.

In embodiments, the firearm usage monitoring system 2800 can provide VR and AR grip installation. VR video can be used to identify the platform and provide instruction on the removal and installation of grips and or other firearm parts.

In embodiments, the firearm usage monitoring system 2800 can supply data to an AR/VR system 1098 that included VR and AR headsets. This may allow users to monitor inventory, rounds left in the magazine, and other relevant data including a map of the environment and surrounding units and objective markers.

In embodiments, the firearm usage monitoring system 2800 can have customizable grips provided through 3D printing or other manufacturing processes. Each individual can customize a style, color, texture, portions of shapes, concavity and convexity to better fit in the hand, changing knurled surfaces, combinations of textures and colors and purposely different designs and configurations, etc. on one side the grip relative to the other or make them mirror images of each other.

In embodiments, the methods and systems disclosed herein provide benefits to a wide number of users, including without limitation private and commercial gun users. One such set of users comprises of managers of first responder and law enforcement personnel, such as police chiefs and elected officials that manage officers and dispatchers.

A firearm which implements or otherwise integrates one or more of the methods and systems disclosed herein (e.g., one or more of the firearm usage monitoring system 2800, the firearm tracking system 2882, the machine learning system 3072, or another system) includes one or more structures for performing or facilitating operations typical of a firearm, for example, for storing ammunition, firing one or more projectiles from the ammunition, controlling the storage and firing of ammunition, and more. In embodiments, a firearm which implements or otherwise integrates one or more of the methods and systems disclosed herein can include an action structure, a stock structure, and a barrel structure. In embodiments, a firearm which implements or otherwise integrates one or more of the methods and systems disclosed herein can include one or more rails. A rail may, for example, be located on one or more of, or proximate to one or more of, the action structure, the stock structure, or the barrel structure.

Figure 20:
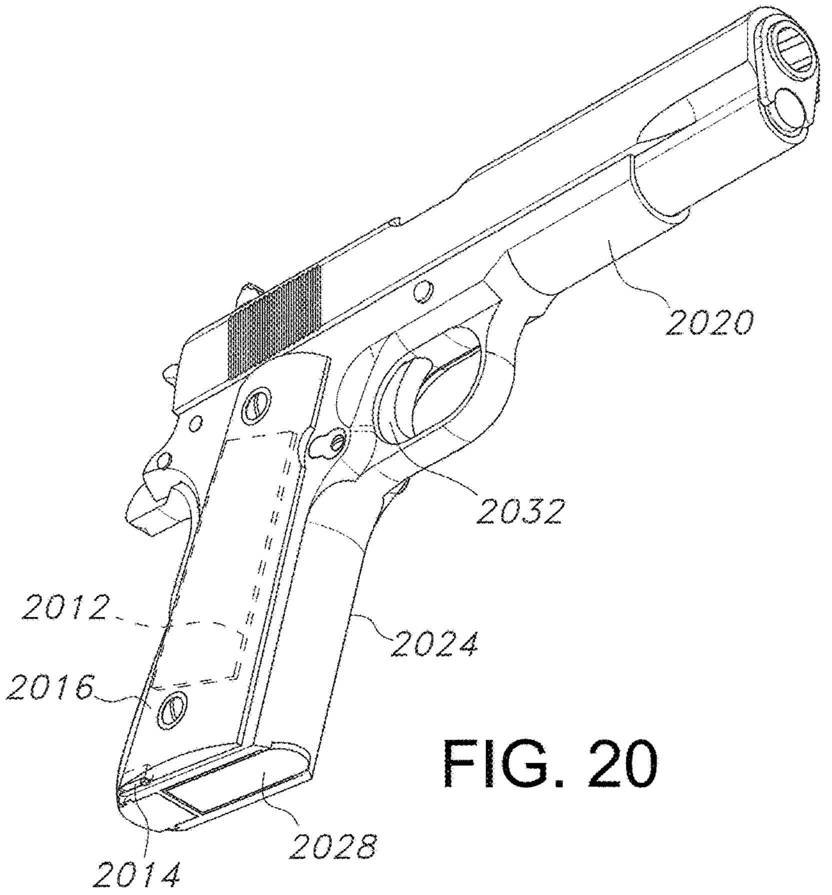
FIG. 20 is a bottom front perspective view of a firearm including a firearm usage monitoring system in accordance with the embodiments of the present disclosure.
Figure 21:
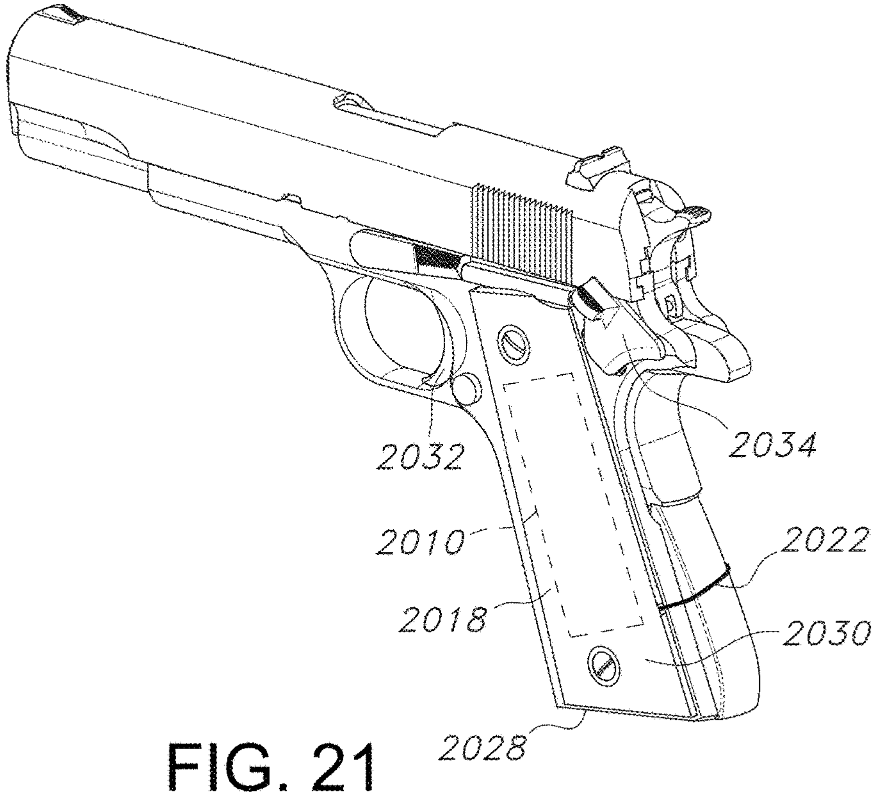
FIG. 21 is a top rear perspective view of the firearm of FIG. 20.
Figure 22:
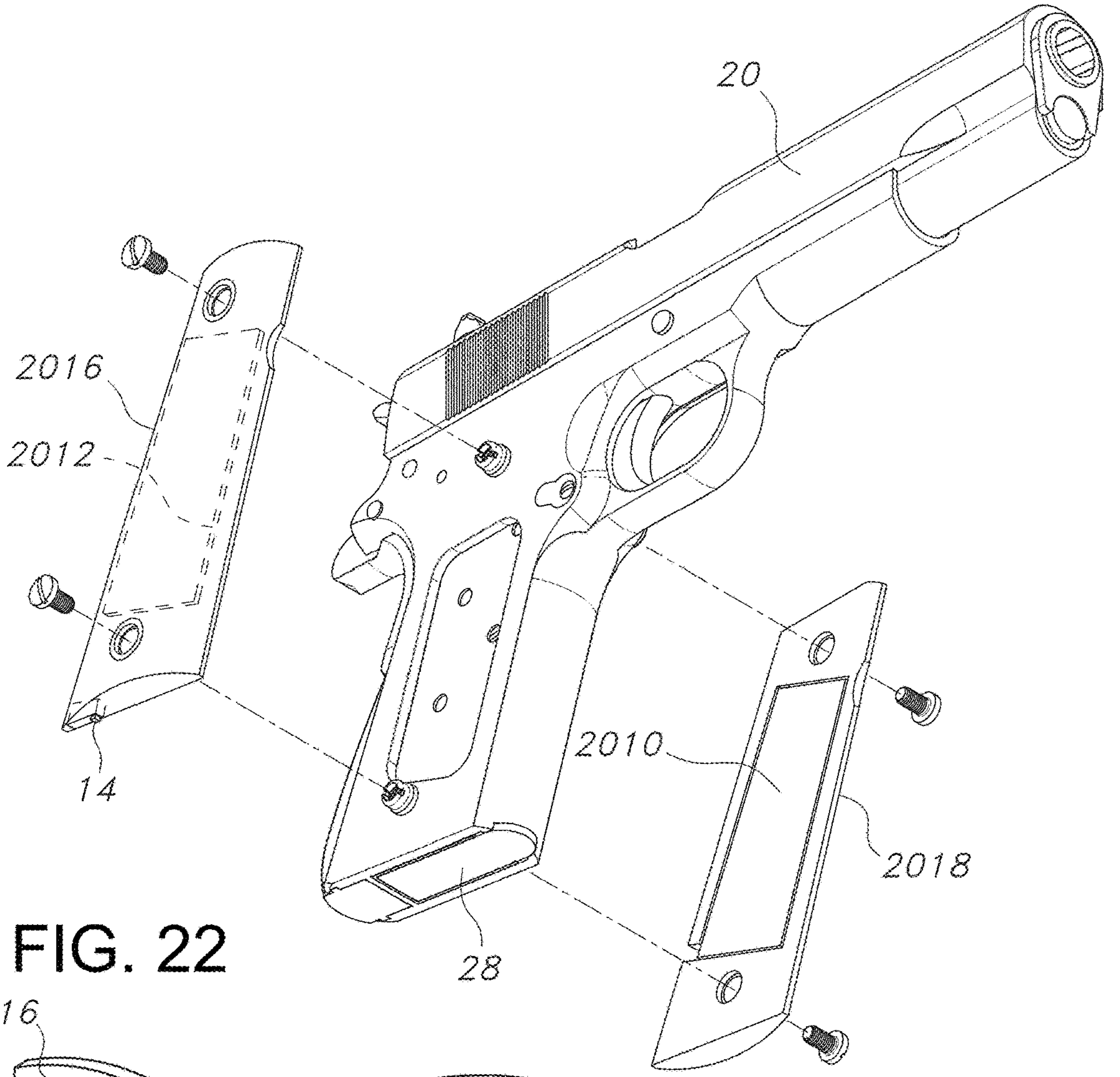
FIG. 22 is an exploded view of the firearm of FIG. 20.
Figure 23:
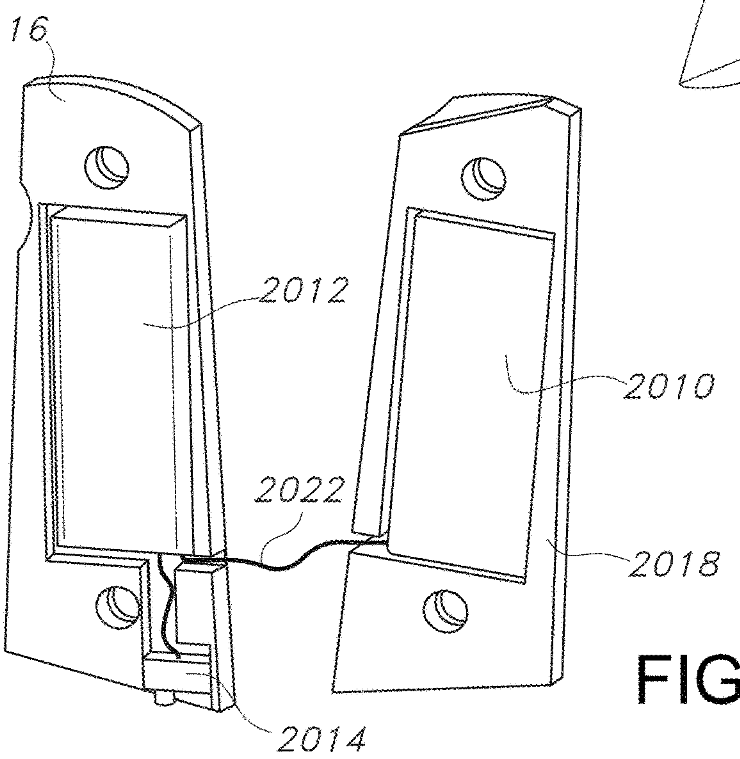
FIG. 23 is a perspective view of first and second grip panels of the firearm and the firearm usage monitor in accordance with embodiments of the present disclosure.

FIGS. 20, 21 and 22 show a first example of a firearm 2020 which implements or otherwise integrates one or more of the methods and systems disclosed herein (e.g., one or more of the firearm usage monitoring system 2800, the firearm tracking system 2882, the machine learning system 3072, or another system). However, the methods and systems disclosed herein may be implemented or otherwise integrated within other types of firearms or other firearm form factors.

In embodiments, a firearm which implements or otherwise integrates one or more of the systems disclosed herein (e.g., the firearm 2020, the firearm 3100, or another firearm) can include structures other than an action structure, a stock structure, a barrel structure, and/or one or more rails. For example, in embodiments, such a firearm can include a cylinder structure including multiple chambers for storing a projectile to be fired. For example, the firearm may be a revolver or another firearm with a structure for rotating multiple chambers into alignment with the bore of the barrel structure. In another example, in embodiments, such a firearm may omit the stock structure. For example, the firearm may be a pistol or other handgun in which components such as the grip and/or trigger are coupled to the rest of the firearm by a structure other than a stock structure. In another example, in embodiments, such a firearm may include a stock structure that omits the butt. For example, the firearm may be a pistol or other handgun which includes a stock structure that structurally supports the action structure and/or the barrel structure, but in which contact with the user is intended to be limited to the grip. It is to be understood that other firearm embodiments as are currently known or which are later developed may be used to implement or otherwise integrate one or more of the methods and systems disclosed herein.

In embodiments, the firearm 104 is a smart weapon configured to prevent discharge if predetermined criteria are not met. For example, the firearm 104 may be associated with a personal device, such as a mobile device, such that the firearm 104 will not discharge unless the mobile device is within a predetermined distance of the firearm. Beneficially, such coupling is also beneficial because the mobile device may be sent an alert if the firearm 104 is moved or otherwise altered while the mobile device is more than a predetermined distance away. Beneficially, the firearm usage monitoring system or a connected system may be used to send a temporary deactivation message to the firearm 104 (e.g., law enforcement deactivating the firearm of an active shooter) to prevent criminal usage of the firearm. Further, the firearm 104 may be geofenced out of areas where legal firearm 104 usage is unlikely or poses a danger to the user or others (e.g., public areas, crowded events, etc.).

The firearm may further include indicators on the weapon, such as a plurality of LEDs on the grip, that provide information to a user of the firearm 104, such as an operating condition, malfunction condition, maintenance condition, etc.

Components used by one or more of the methods and systems disclosed herein may be located or otherwise positioned with respect to certain structures and/or certain components of structures of a firearm (e.g., the firearm 2020, the firearm 3100, or another firearm). For example, an IMU used by one or more of the methods and systems disclosed herein may be coupled at one or more locations or positions of a firearm. In embodiments, the IMU may be coupled to or included in the charging handle. In embodiments, the IMU may be coupled to the forward assist component. In embodiments, the IMU may be coupled to the gas operating system. In embodiments, the IMU may be coupled to or included in the hammer. In embodiments, the IMU may be coupled to or included in a portion of the action structure other than as described above. In embodiments, the IMU may be coupled to or included in the butt. In embodiments, the IMU may be coupled to or included in the grip of the butt. In embodiments, the IMU may be coupled to or included in the comb of the butt. In embodiments, the IMU may be coupled to or included in the hook coupled to the butt. In embodiments, the IMU may be coupled to or included in the fore-end. In embodiments, the IMU may be coupled to or included in a handguard of the fore-end. In embodiments, the IMU may be coupled to or included in the trigger unit. In embodiments, the IMU may be coupled to or included in the magazine well. In embodiments, the IMU may be coupled to or included in the magazine received in the magazine well. In embodiments, the IMU may be coupled to or included in a portion of the stock structure other than as described above. In embodiments, the IMU may be coupled to the external surface of the chamber. In embodiments, the IMU may be coupled to the chamber at a location or position other than the external surface. In embodiments, the IMU may be coupled to an exterior surface of the bore. In embodiments, the IMU may be coupled to the bore at a location or position other than the external surface. In embodiments, the IMU may be coupled to an external surface of the muzzle. In embodiments, the IMU may be coupled to or included in an accessory device coupled to the muzzle, for example, in which the muzzle includes a coupling element (e.g., a threaded or other engagement) for coupling the accessory device to the muzzle. In embodiments, the accessory device may be coupled to a portion of an external surface of the barrel structure other than an external surface of the muzzle. In embodiments, the IMU may be coupled to or included in the muzzle at a location or position other than the external surface or the coupling element to which an accessory device may be coupled. In embodiments, the IMU may be coupled to or included in a portion of the barrel structure other than as described above. In embodiments, the IMU may be coupled to or included in a scope coupled to a rail of the firearm. In embodiments, the IMU may be coupled to or included in a sight coupled to the rail. In embodiments, the IMU may be coupled to or included in a tactical light coupled to the rail. In embodiments, the IMU may be coupled to or included in a vertical forward grip coupled to the rail. In embodiments, the IMU may be coupled to or included in a portion of a rail or an accessory coupled to a rail other than as described above. It is to be understood that examples particularly referring to the IMU do not limit the possible embodiments of other components used by one or more of the methods and systems disclosed herein being coupled at one or more locations or positions of a firearm.

In embodiments, components used by one or more of the methods and systems disclosed herein which may be located within or otherwise positioned with respect to the structures described above may, for example, include an IMU. In embodiments, the IMU may be coupled to or included in outerwear. In embodiments, the IMU may be coupled to or included in a helmet. In embodiments, the IMU may be coupled to or included in an earpiece. In embodiments, the IMU may be coupled to or included in glasses. In embodiments, the IMU may be coupled to or included in one or more wristbands or wristwatches. In embodiments, the IMU may be coupled to or included in other wearable items.

While examples of particular structures of a firearm and particular components of structures of a firearm are disclosed herein, such disclosure is not limiting as to the possible structures of components of structures of a firearm or as to the possible locations or positionings of components used by the methods and systems disclosed herein with respect to those structures or those components of structures. Accordingly, it is to be understood that components used by one or more of the methods and systems disclosed herein may be located or positioned in other locations or positions in or about a firearm, regardless of the particular structures disclosed herein by example.

With additional reference now to FIGS. 42A-49, multiple event detection modules configured for use with various types of firearms will be described. The event detection modules are further configured for mounting at different locations on a firearm such as on a grip, a rail and a barrel of a firearm as will be described. In additional examples, as mentioned above, an event detection module can be included on a wearable device, such as a wristband, wristwatch, or other article worn by the user. As shown in FIGS. 42A-44 an event detection module 4200A is provided within a grip housing 4202A. The event detection module 4200A and the grip housing 4202A are collectively referred to herein as a grip module 4204A. The grip housing 4202A can include an outer contoured body 4206A (FIGS. 43 and 44) configured for receiving a trigger hand of a user of the firearm. The event detection module 4200A is generally disposed in an event detection module housing 4207A. It will be appreciated that the event detection module 4200A and any of the other event detection modules disclosed herein can be provided alone or as a unit with an event detection module housing such as the event detection module housing 4207A. In examples, the event detection module 4200A can be provided as a standalone unit (with or without an event detection module housing 4207A) for mating with a particular firearm. As discussed, these standalone units can be adapted for receipt by a receiver of a firearm such as at a grip (e.g., grip housing), a rail, or other locations of a firearm (e.g., barrel housing). The event detection modules discussed herein can make determinations of a type of event (e.g., shot occurring) based on various sensor inputs (inputs from sensors 118 that can include an IMU and/or other sensors as described herein). The determinations can be made in real time and saved on internal circuitry and/or be communicated wirelessly to the server 112 (FIG. 1) such as for additional data analysis.

Figure 44:
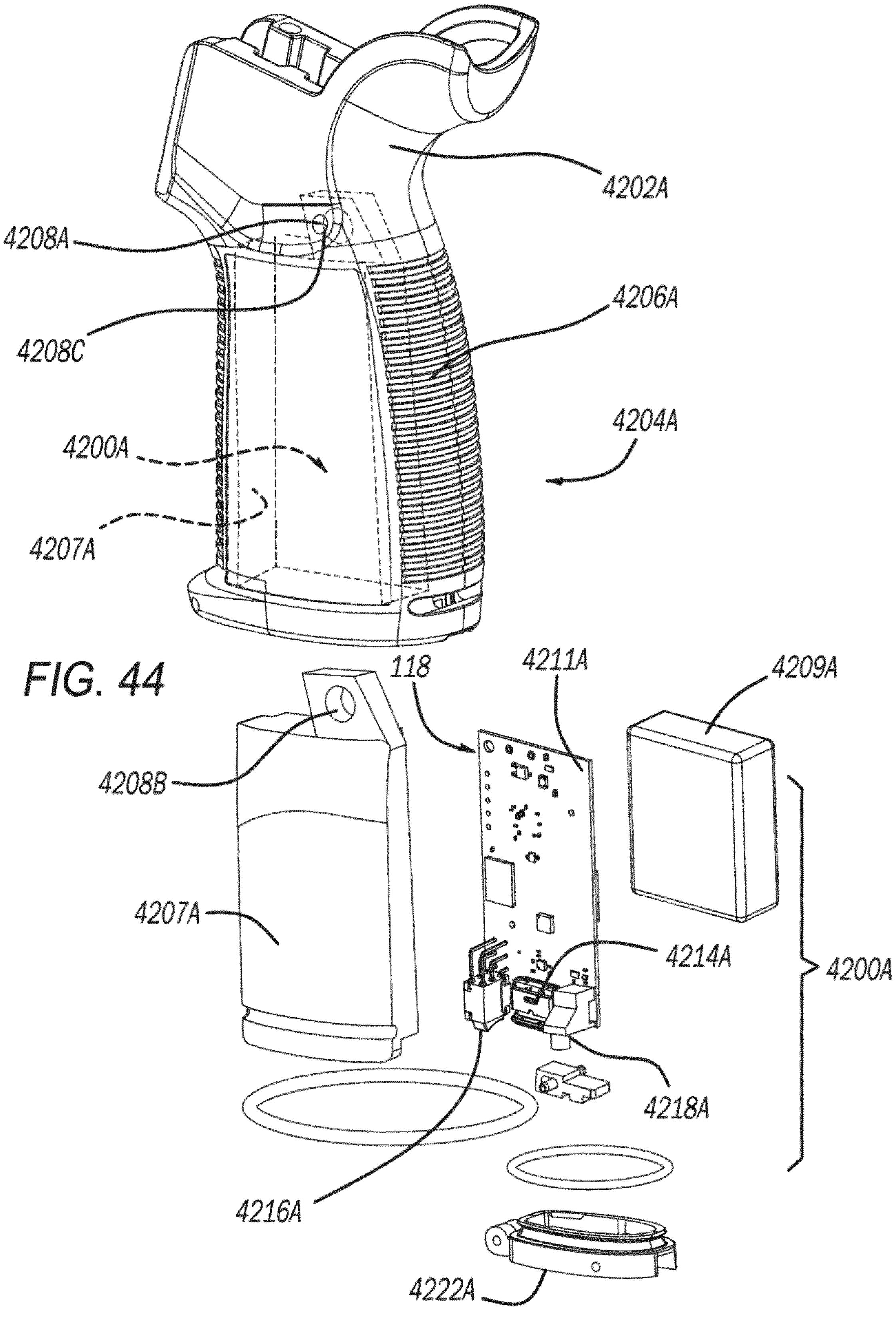
FIG. 44 is an exploded perspective view of the grip module of FIG. 43.

With reference to FIG. 44, the event detection module housing 4207A can be additionally mechanically coupled to the grip housing 4202A by a pin or fastener 4208A that extends through respective apertures 4208B and 4208C in the event detection module housing 4208A and the grip housing 4202A. Additional or alternative mechanical coupling configurations may be included on the event detection module housing 4207A such as a quick connect, magnetic coupling, screw coupling and press-fit coupling. A battery 4209A that provides power to the event detection module 4200E is generally housed in the event detection module housing 4207E. In examples, the event detection module 4200A can be easily removed and replaced with another event detection module 4200A from the grip housing 4202A.

In examples, the grip module 4204A is configured to be selectively coupled to various long guns 4210A-4210D (FIGS. 42A-42D). By way of example only, the long gun 4210A (FIG. 42A) can be an M5. The long gun 4210B (FIG. 42B) can be an M250. The long gun 4210C (FIG. 42C) can be a light machine gun (LMG). The long gun 4210D (FIG. 42D) can be a medium machine gun (MMG). It will be appreciated that the long guns 4210A-4210D are merely exemplary and the grip module 4204A may be configured for use in other firearms.

As will be described herein, the event detection module 4200A can comprise the sensors 118 (FIG. 1) such as one or more IMU's each including an accelerometer and a gyroscope, a magnetometer, and a geolocation sensor. In examples, two IMU's having distinct sensitivities can be included that provide acceleration and/or rotational inputs to the event detection module 4200A. Additional sensors of the sensors 118 can include a pressure sensor, an audio sensor, a thermal sensor, combinations thereof, and the like. The sensors 118 are generally provided on a circuit board 4211A. The event detection module 4200A can include a signal processing module (4430, FIG. 54C) that uses machine learning and/or digital signal processing techniques to determine a classification of an event detected such as a discharge event of the firearm. In additional examples, the event detection module 4200A can wirelessly communicate signals ultimately to the server device 112 for processing to make additional determinations based on the event. In examples, the server device 112 can collect signals from a plurality of event detection modules in the field from many weapons to make tactical and/or training decisions.

Figure 42A:
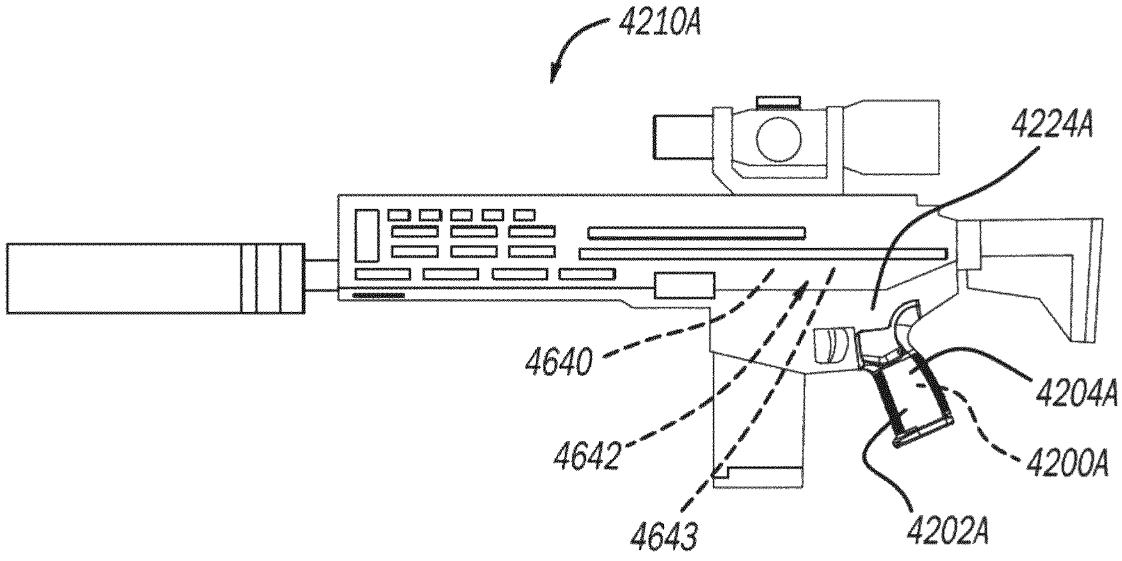
FIGS. 42A-42D are side views of exemplary firearms that include event detection modules in accordance with embodiments of the present disclosure.
Figure 42B:
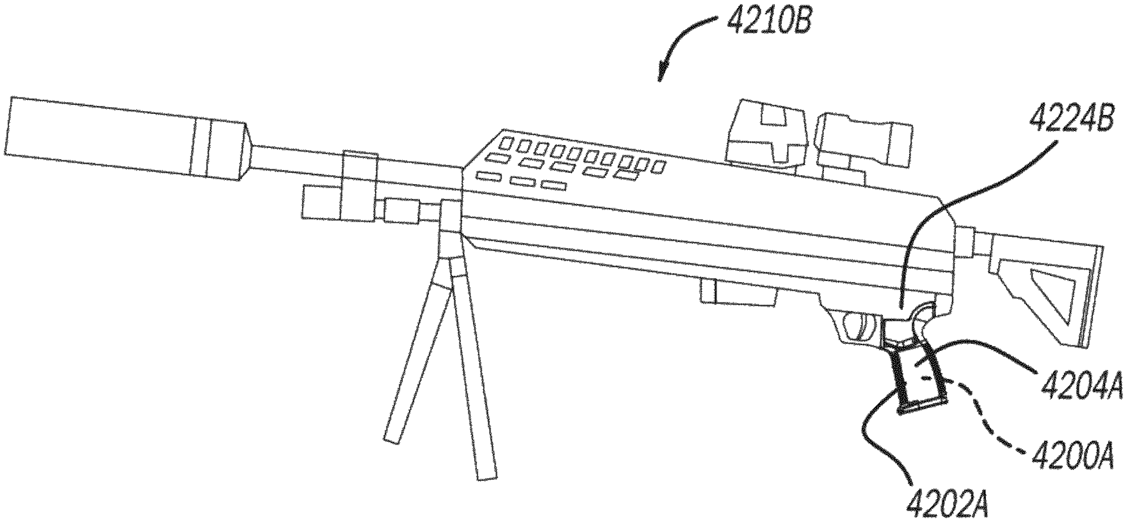
Figure 42C:
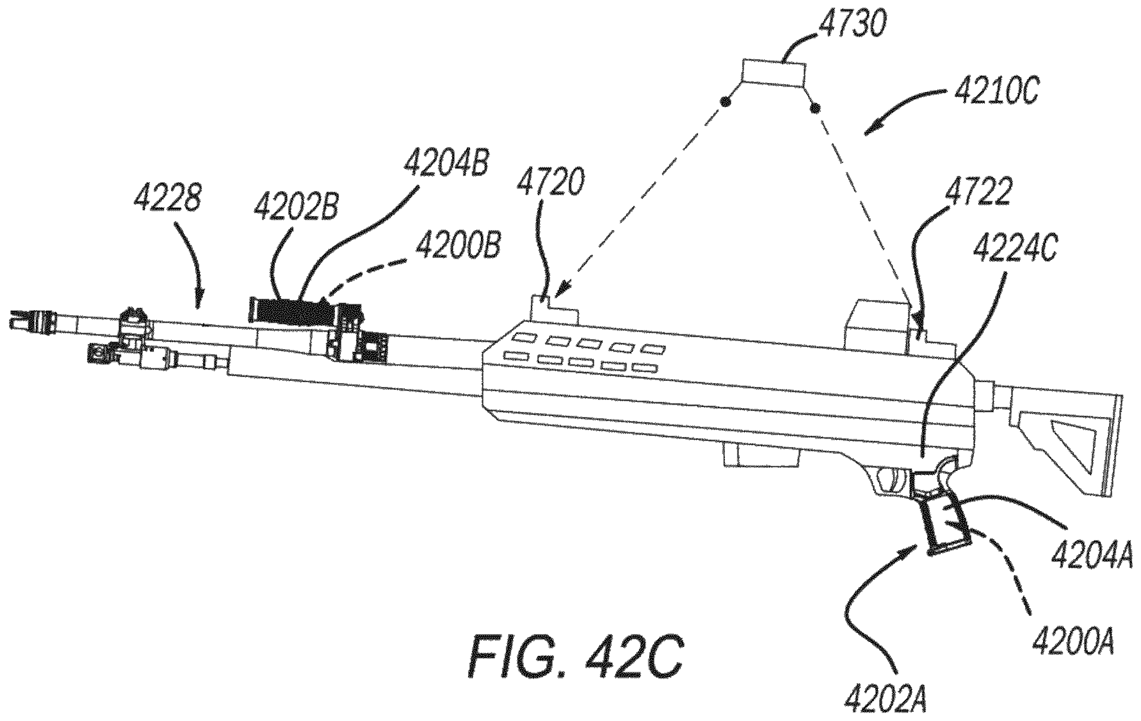
Figure 42D:
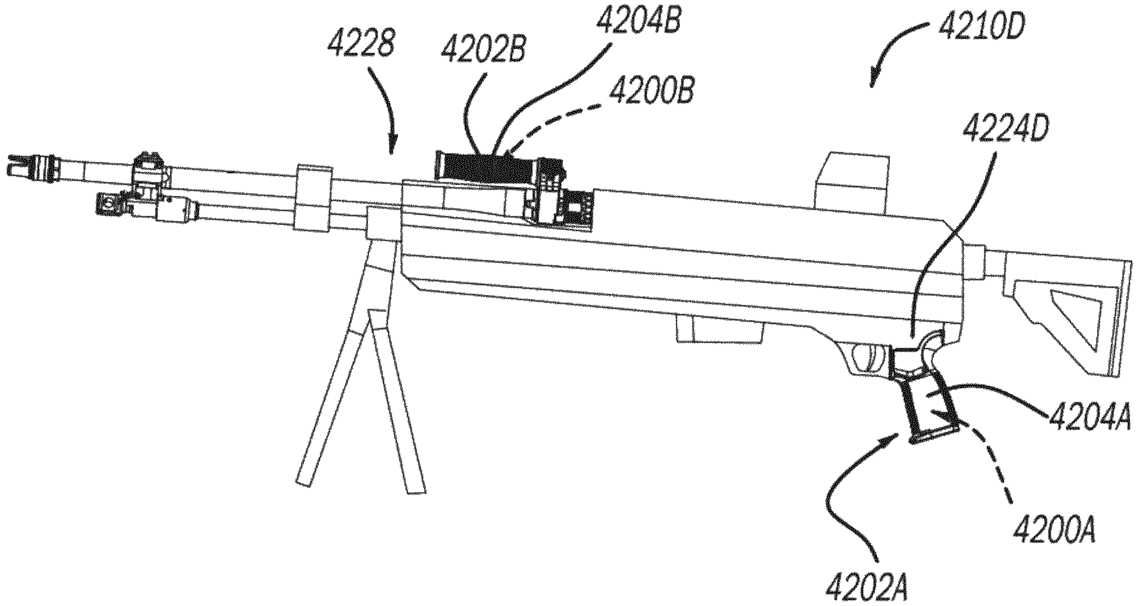
Figure 43:
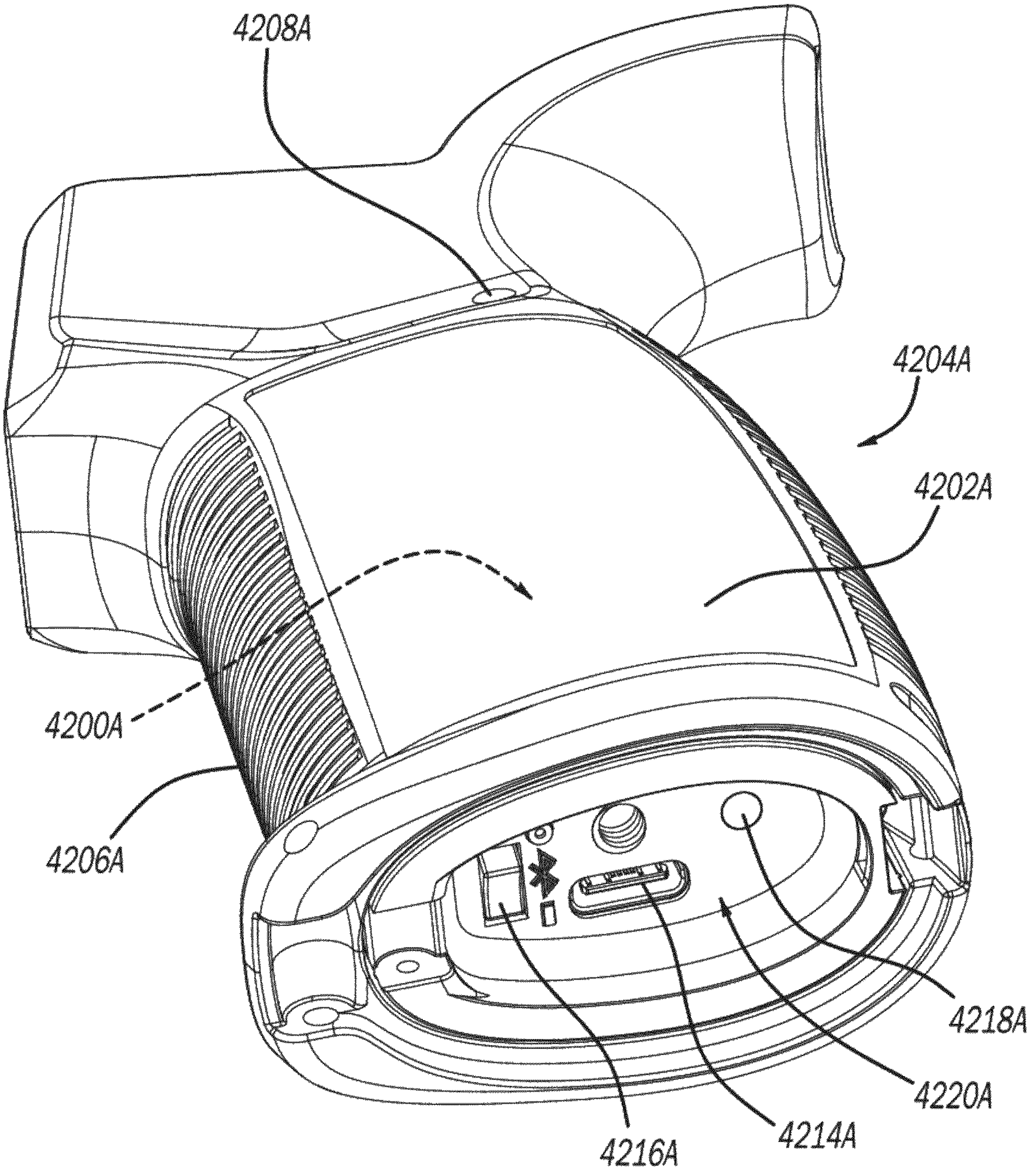
FIG. 43 is a bottom perspective view of a grip module that incorporates an event detection module used in the exemplary firearms shown in FIGS. 42A-42D.
Figure 45:
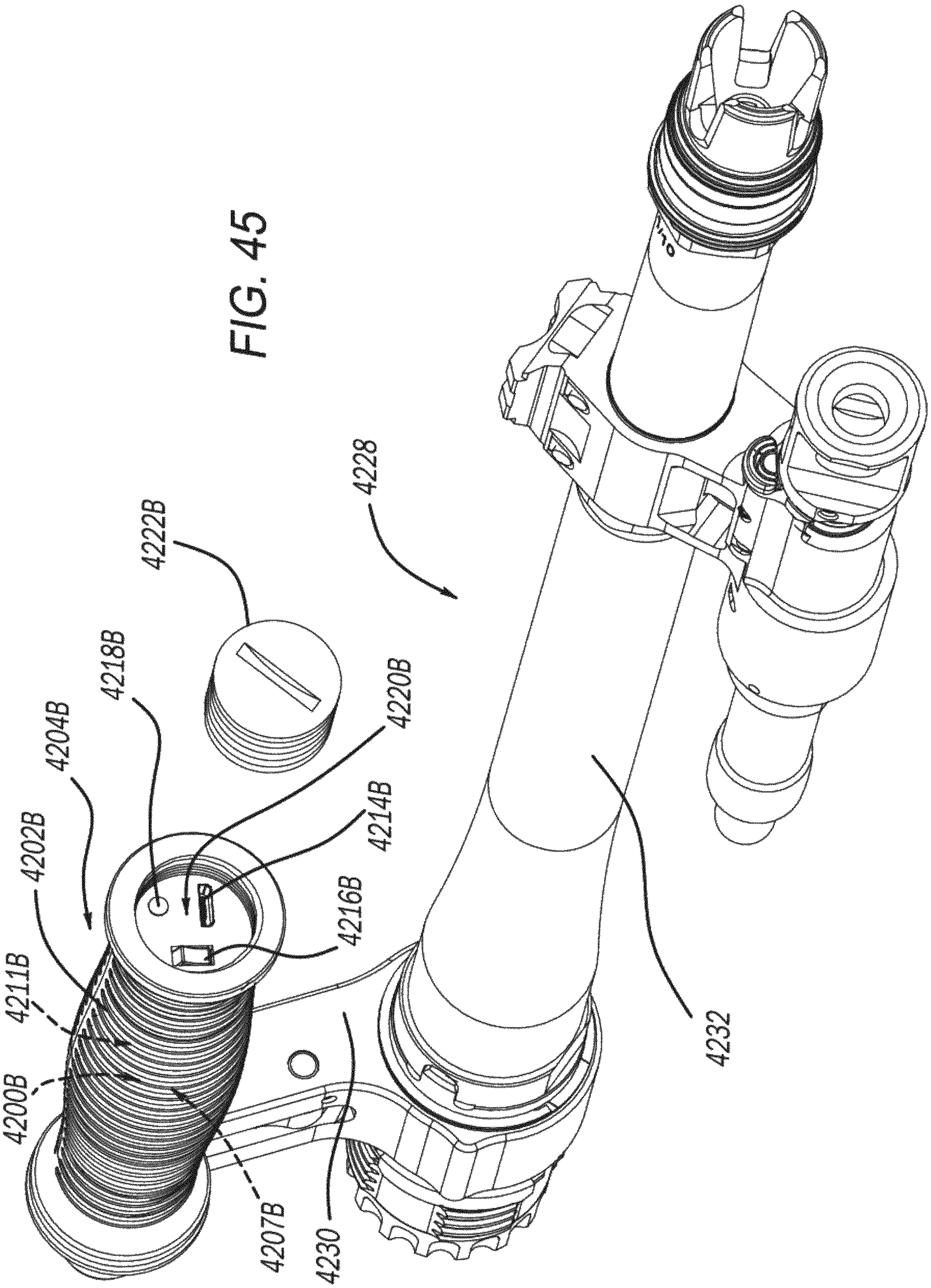
FIG. 45 is a front perspective view of a barrel assembly that incorporates an event detection module in accordance with further embodiments of the present disclosure.

Referring now to FIGS. 43 and 44, the event detection module 4200A includes a USB interface 4214A, a user-operated switch 4216A and a light emitting member 4218A all generally provided on a user interface panel 4220A. The user-operated switch 4216A can be moved between activated ("ON") positions and deactivated ("OFF") positions corresponding to a "use" position where signals are communicated from the event detection module 4200A and a "go dark" position where no signals (such as radio frequency signals) are communicated from the event detection module 4200A, resulting in zero detection. A cover 4222A (FIG. 44) can be rotatably coupled to the grip housing 4202A for moving between open and closed positions. The grip module 4204A is configured to be coupled to a respective receiver 4224A-4224B of each of the firearms 4210A-4210D. In use, a user may move the user-operated switch 4216A to the "OFF" position to preclude any signal emitting from the event detection module 4200A. Notably, however, with the user-operated switch in the "OFF" position, the event detection module 4200A still receives data from the sensors 118 and provides signal processing steps as described herein. In other words, the event detection module 4200A (and other event detection modules described herein) operates as normal to provide and locally store event detection information (shot detection, etc.), but do not send wireless transmissions of data and/or detection information such as to a network 114 (FIG. 1). As can be appreciated, a user, such as a soldier wishing to reduce their electromagnetic (EM) signature can move the switch 4216A to "OFF" while still conducting data acquisition and storing locally at the event detection module. In examples, when a user is in a situation where reduction of EM signature is no longer required, the switch 4216A may be moved back to the "ON" position and the event detection module will offload (e.g., send to the network 114) any data and/or event detection information collected while in the "OFF" position. It is appreciated that while the exemplary switch 4216A is shown as a rocker/toggle switch, it may be configured differently (e.g., a button, etc.). In other examples, radio transmission can be disabled and enabled differently. In some examples, radio frequency signals default to OFF but can be communicated post mission during an offloading of data event. In one example, radio frequency signals are communicated only upon connection to a power source such as a battery and/or to a USB interface 4214B post mission, such as during a charging event. In another example, the switch 4216A can be replaced by a firmware technique executed by processors in the event detection module 4200. With particular reference now to FIGS. 42C, 42D and 45, another event detection module 4200B is provided. The event detection module 4200B is configured to be coupled to a quick change barrel assembly 4228. The event detection module 4200B is provided within a grip housing 4202B. The event detection module 4200B and the grip housing 4202B are collectively referred to herein as a grip module 4204B. The grip housing 4202B can include an outer contoured body 4206B (FIG. 45) configured for receiving a hand of a user of the firearm. The grip housing 4202B is configured as a handle for generally carrying or maneuvering the firearm as a whole. The event detection module 4200B is generally disposed in an event detection module housing 4207B. The grip module 4204B can be generally mounted on an arm 4230 extending from a barrel 4232 of the quick change barrel assembly 4228.

In examples, the grip module 4204B is configured to be selectively coupled to the long guns 4210C and 4210D (FIGS. 42C and 42D). As with the event detection module 4200A, the event detection module 4200B can comprise the sensors 118. The sensors are provided on a circuit board 4211B. The event detection module 4200B can include a signal processing module that uses machine learning and/or digital signal processing techniques to determine a classification of the detected event such as whether an event detected is a discharge event of the firearm. In other examples, the event detection module 4200B can wirelessly communicate signals ultimately to the server device 112 for processing to make additional determinations based on the event.

The grip module 4204B is particularly advantageous in that shots can be counted specific to the barrel 4232. In this regard, maintenance information can be determined specific to the barrel 4232 (as opposed to the firearm as a whole). In examples, shot counts can be tallied by the event detection module 4200B and/or by the server device 112 and a determination can be made to replace the barrel 4232 for a new barrel 4232 such as when a shot count threshold has been reached. In examples, a barrel may have a reduced lifespan relative to the firearm as a whole. In this regard, a preventative maintenance item associated with such a firearm can include replacing a barrel in a quick change barrel assembly 4428 that has reached an expected shot count lifespan. Other information, discussed herein, can be determined specific to the health of the barrel 4232 based on signals communicated from the sensors 118 in the event detection module 4200B. Such additional information can include thermal readings detected by sensors 118 and communicated to the server device 112. In such examples, the sensors 118 can include a thermal sensor. The event detection module 4200B can generate an event detection signal based on the temperature sensed at the thermal sensor indicative of a temperature of the barrel 4232. Additionally or alternatively, calculations can be made by the event detection module 4200B at the server device 112 that estimate a temperature of the barrel 4232 based on environmental conditions including ambient temperature at the thermal sensor, the shot count, and the rate of shot discharge to estimate a temperature of the barrel 4232. In other examples, a number of shots can be determined in addition to the rate of shot discharges associated with the barrel 4232. In examples, each barrel can be associated with a specific barrel identification number. The event detection module 4200B can determine (and store and/or wirelessly communicate) shot counts and additional information (thermal readings) specific to a particular barrel of the firearm. In this regard, a common event detection module 4200B can collect and store information for multiple distinct barrels.

The event detection module 4200B includes a USB interface 4214B, a user-operated switch 4216B and a light emitting member 4218B (such as a light emitting diode) all generally provided on a user interface panel 4220B. The user-operated switch 4216B can be moved between activated ("ON") positions and deactivated ("OFF") positions corresponding to a use position where signals are communicated from the event detection module 4200B and a "go dark" position where no signals are communicated from the event detection module 4200B. A cover 4222B can be removably attached, such as threadably, to the grip housing 4202B. While the event detection module 4200B is described herein with respect to the quick change barrel assembly 4228, it is appreciated that the event detection module 4200B can be configured for use with other barrels of other firearms within the scope of this disclosure.

Figure 46A:
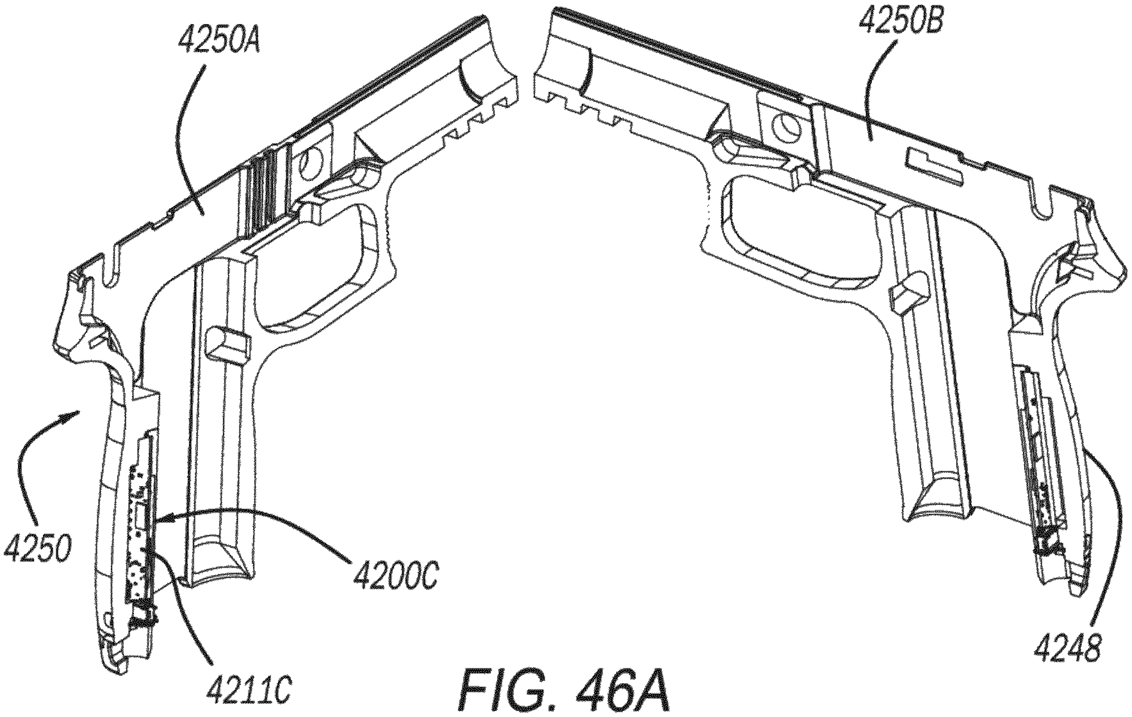
FIG. 46A is an exploded perspective view of another exemplary firearm that incorporates an event detection module in accordance with further embodiments of the present disclosure.
Figure 46B:
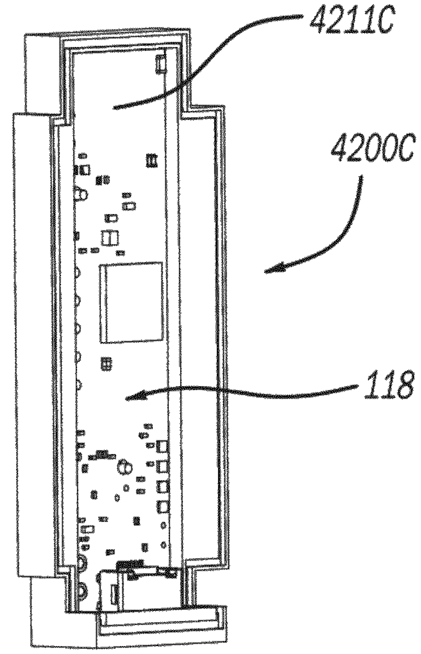
FIG. 46B is a front perspective view of the event detection module of FIG. 46A.

With reference now to FIGS. 46A and 46B, another event detection module 42000 is provided. The event detection module 42000 is configured to be disposed within a grip 4248 of a hand gun body 4250. In the example shown, the hand gun body 4250 is collectively defined by clam shell body portions 4250A and 4250B. As with the other event detection modules disclosed herein, the event detection module 42000 can comprise the sensors 118 (FIG. 1) such as an IMU including an accelerometer, a gyroscope, a magnetometer, a geolocation sensor, a pressure sensor, an audio sensor, combinations thereof, and the like. The sensors 118 are generally provided on a circuit board 4211C. The event detection module 42000 can include a signal processing module that uses machine learning and/or digital signal processing techniques to determine a classification of an event such as whether an event detected is a discharge event of the firearm. While not specifically identified, the event detection module 42000 can include additional features such as described above with respect to the event detection module 4200A such as a USB interface and a battery for powering the event detection module 42000. In examples, the event detection module 42000 can wirelessly communicate signals ultimately to the server device 112 for processing to make additional determinations based on the event as described above.

Figure 47:
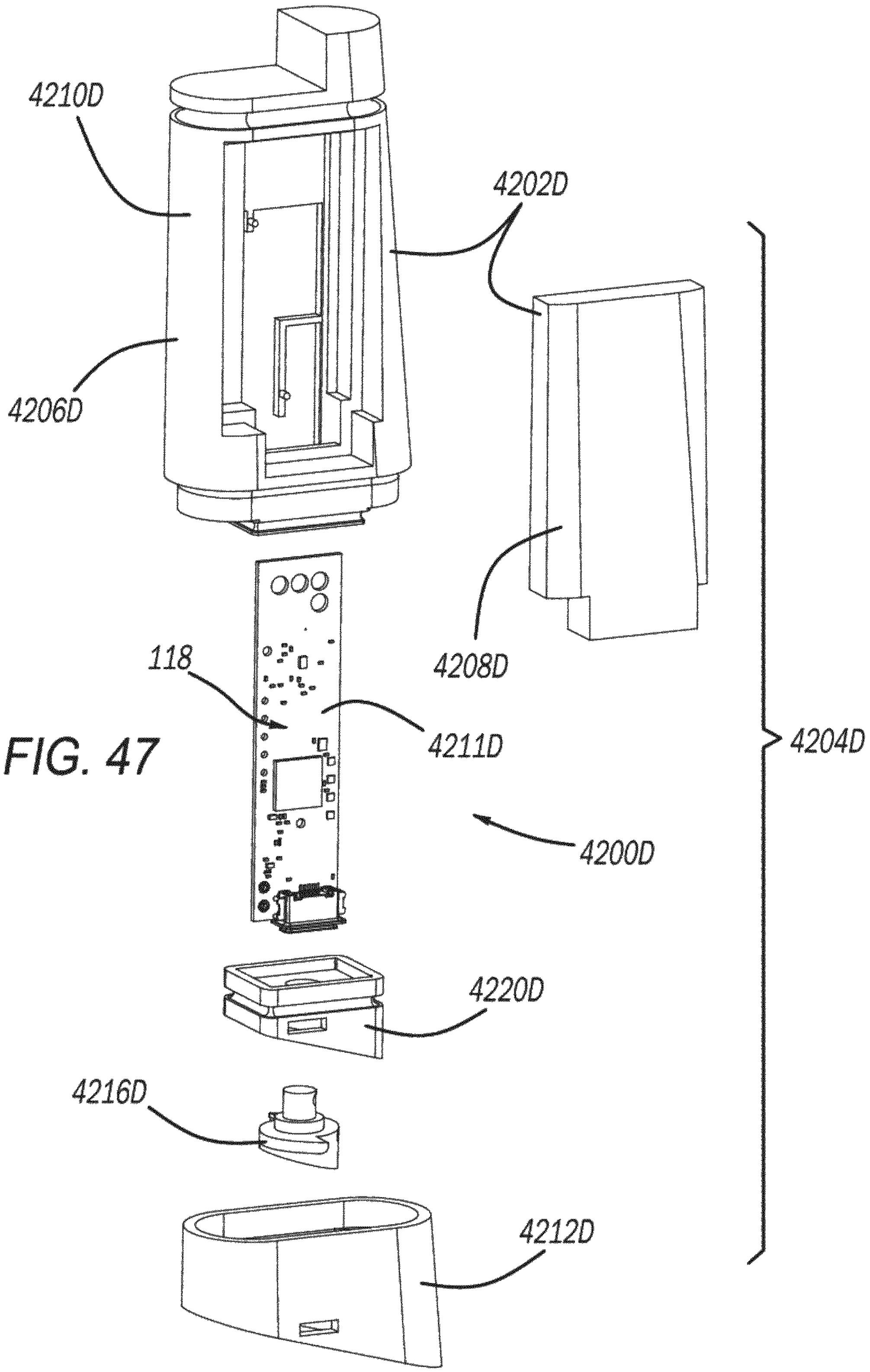
FIG. 47 is an exploded perspective view of another exemplary firearm that incorporates an event detection module in accordance with further embodiments of the present disclosure.

With particular reference now to FIG. 47, another event detection module 4200D is provided. The event detection module 4200D is provided within a grip housing 4202D. The grip housing 4202D includes a cover portion 4208D that is fixedly disposed on a main grip body 4210D. An end cap housing 4212D can be engaged to the main grip body 4210D. In examples fasteners can couple the grip housing 4202D and the end cap housing 4212D together. An O-ring (not shown) can additionally locate between the grip housing 4202D and the end cap housing 4212D. The event detection module 4200D and the grip housing 4202D are collectively referred to herein as a grip module 4204D. The grip module 4204D can be configured for use with rifles such as, but not limited to an M41 pulse rifle. The grip housing 4202D can include an outer contoured body 4206D configured for receiving a hand of a user of the firearm. The event detection module 4200D is generally disposed within the grip housing 4202D. A user-operated switch 4216D such as a toggle switch or button can be provided on a user interface panel 4220D. The user-operated switch 4216D can be moved between activated ("ON") positions and deactivated ("OFF") positions corresponding to a use position where signals are communicated from the event detection module 4200D and a "go dark" position where no signals are communicated from the event detection module 4200D.

As with the other event detection modules disclosed herein, the event detection module 4200D can comprise the sensors 118 (FIG. 1) such as an IMU including an accelerometer, a gyroscope, a magnetometer, a geolocation sensor, a pressure sensor, an audio sensor, combinations thereof, and the like. The sensors 118 are generally provided on a circuit board 4211D. The event detection module 4200D can include a signal processing module that uses machine learning and/or digital signal processing techniques to determine a classification on an event such as whether an event detected is a discharge event of the firearm. In examples, the event detection module 4200D can wirelessly communicate signals ultimately to the server device 112 for processing to make additional determinations based on the event.

Figure 48A:
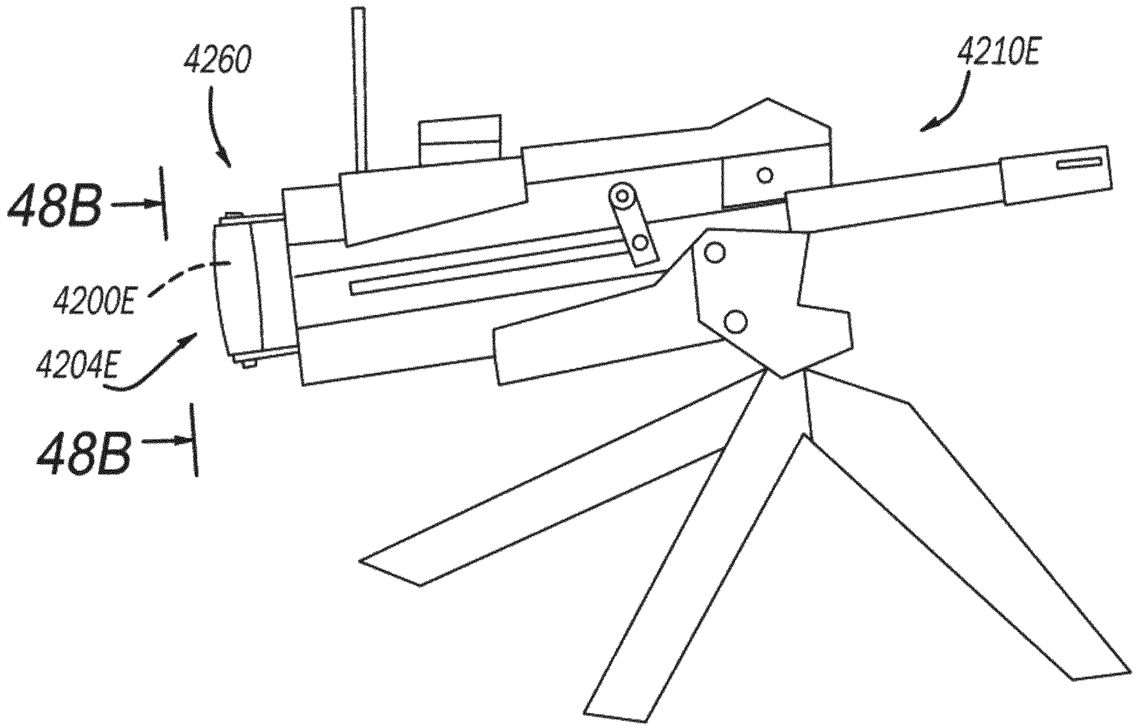
FIG. 48A is side view of another exemplary firearm that incorporates an event detection module in accordance with further embodiments of the present disclosure.
Figure 48B:
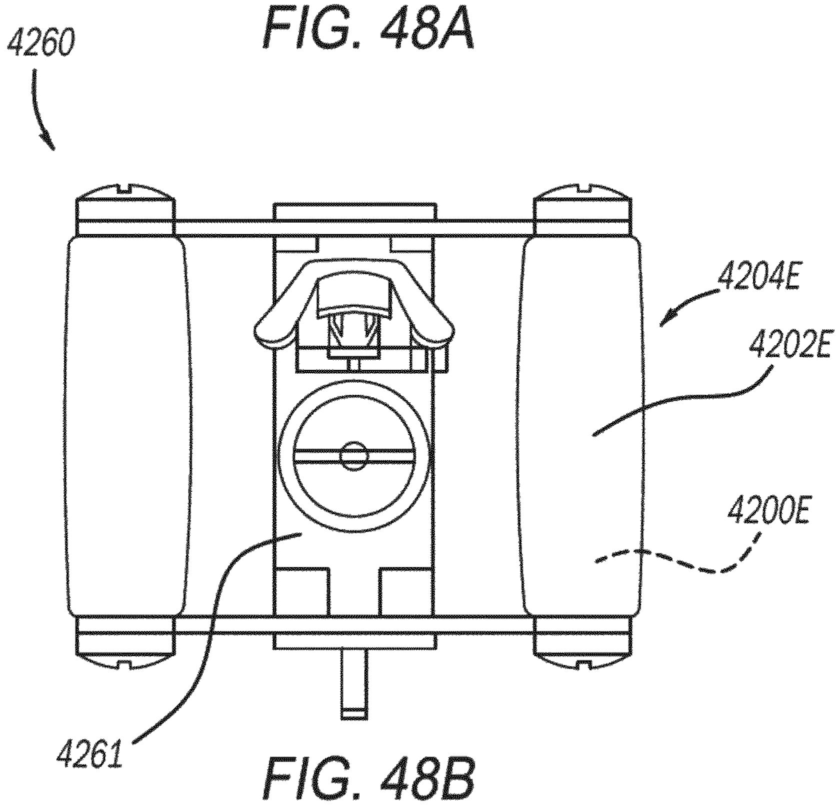
FIG. 48B is a front view of a spade grip of the exemplary firearm of FIG. 48A that incorporates the event detection module.
Figure 49:
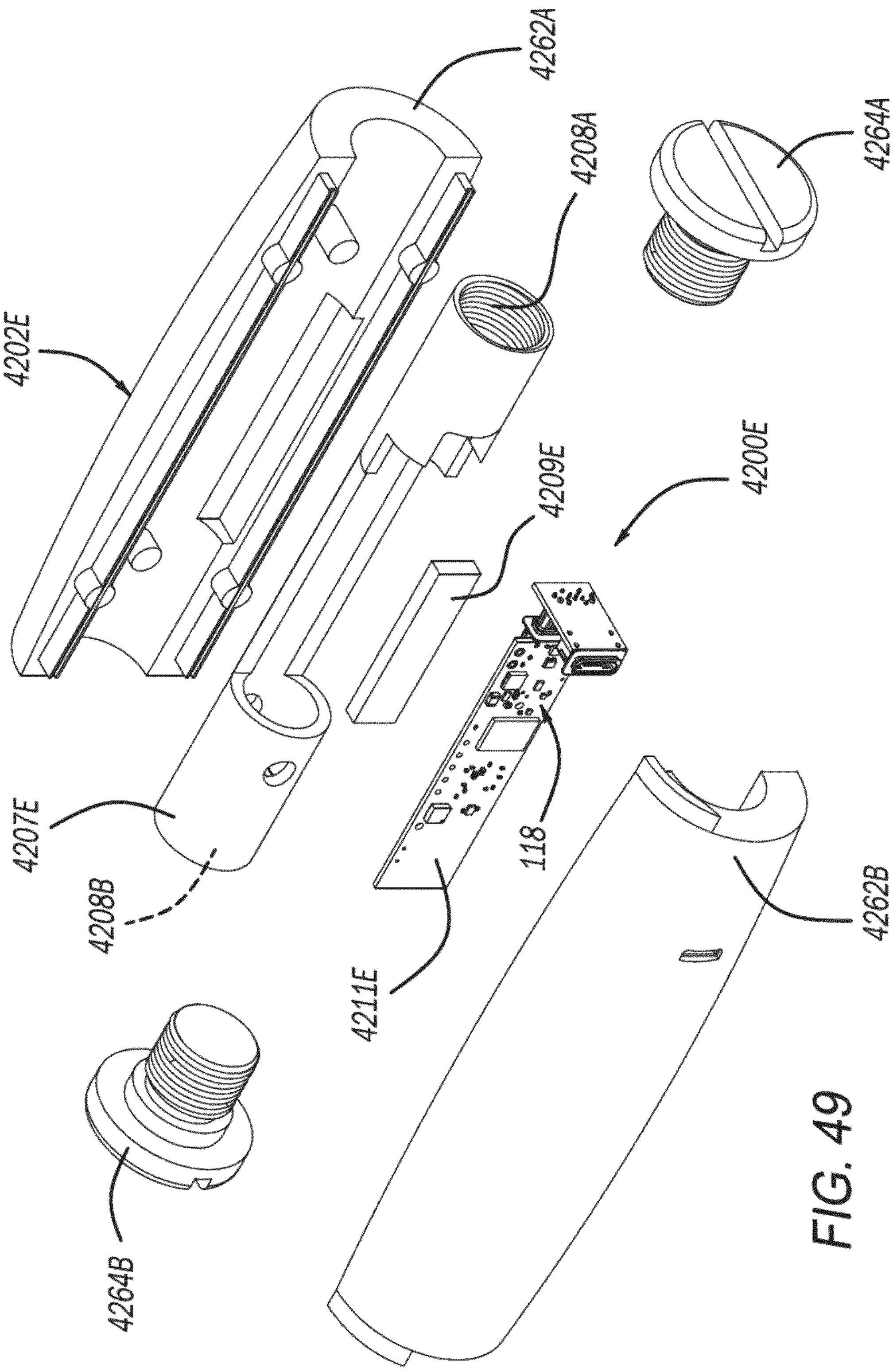
FIG. 49 is an exploded perspective view of a grip module of the event detection module incorporated on the firearm of FIG. 48A.
Figure 50:
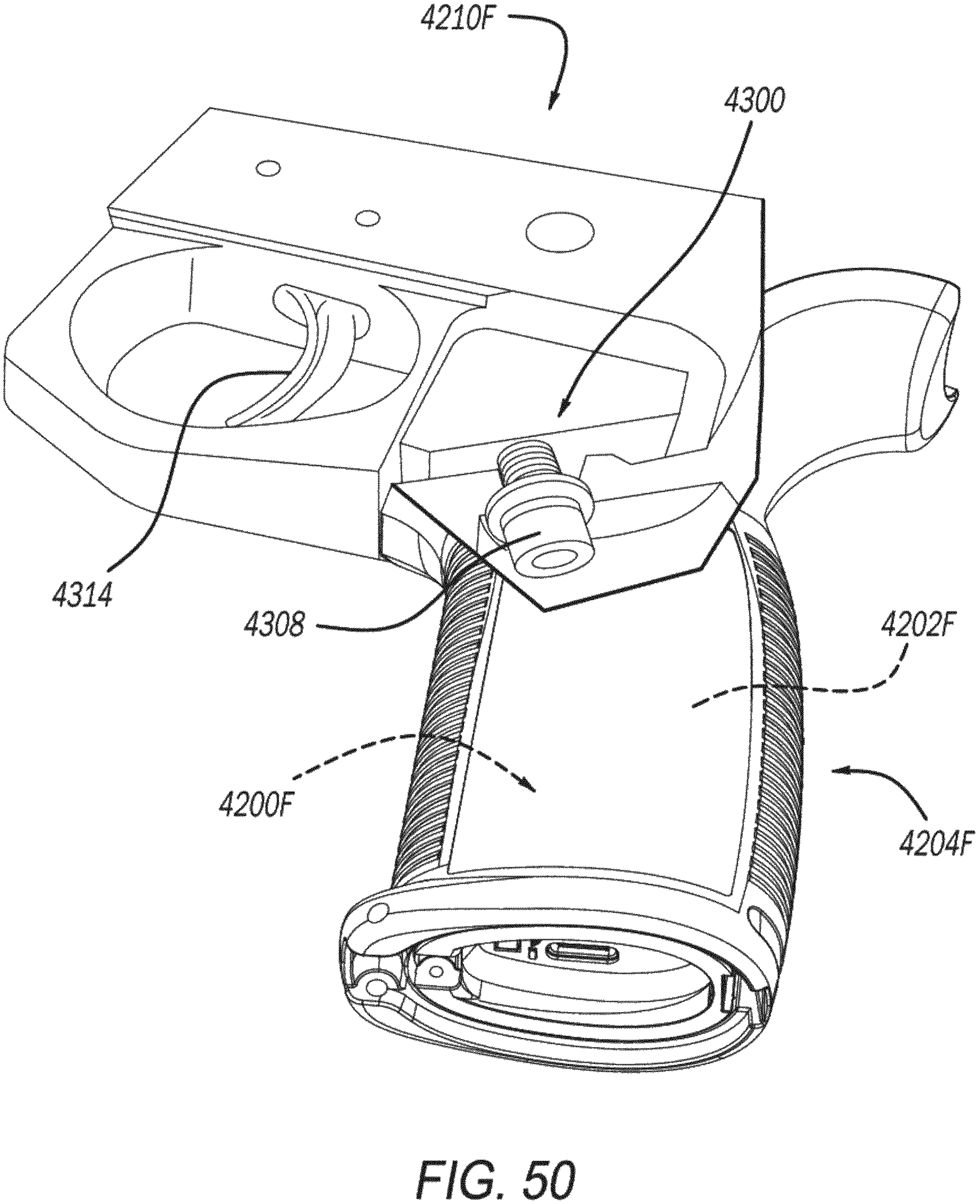
FIG. 50 is a partial cutaway bottom perspective view of an event detection module that incorporates a trigger pull sensor assembly in accordance with further embodiments of the present disclosure.
Figure 51A:
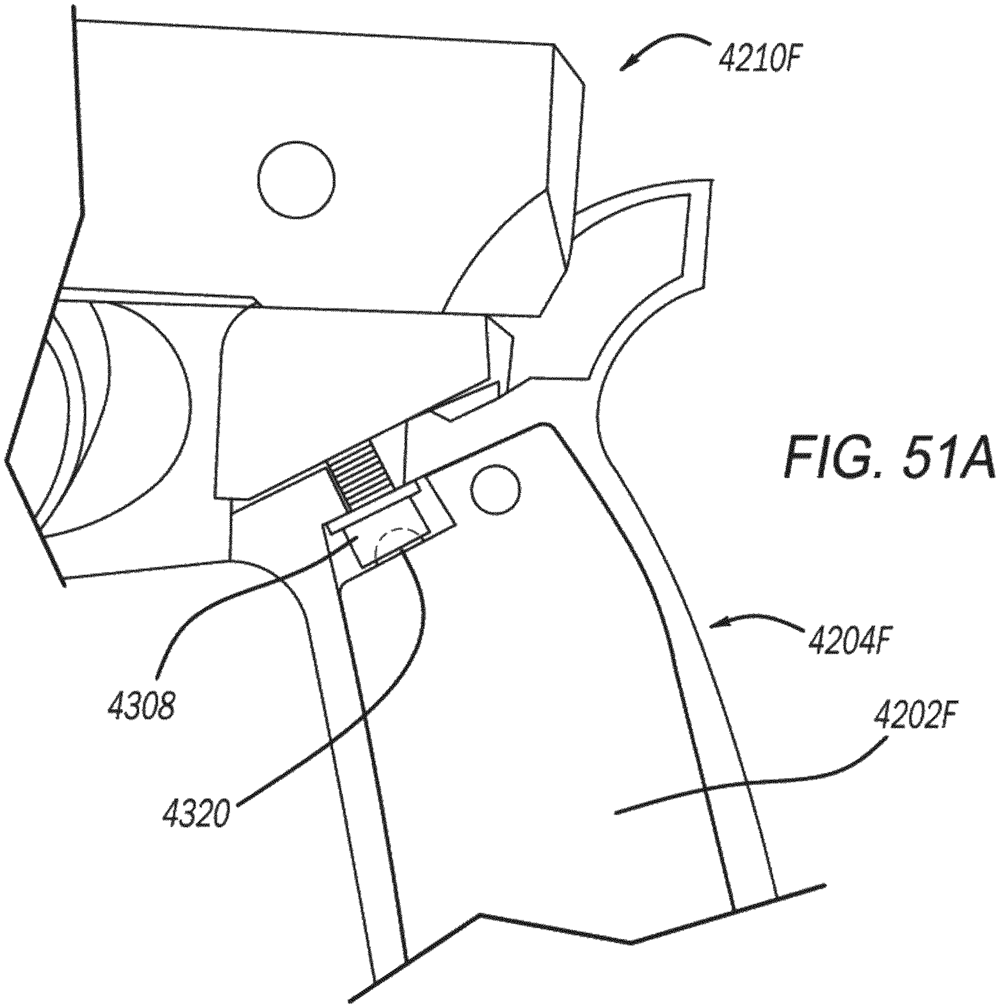
FIG. 51A is side view of the firearm shown in FIG. 50.
Figure 51B:
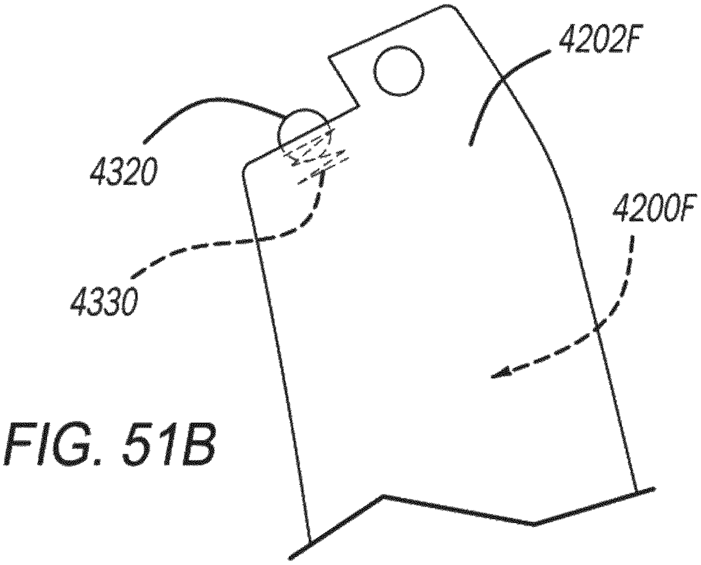
FIG. 51B is a side view of the event detection module and grip housing removed from the firearm.

With particular reference now to FIGS. 48A-49, another event detection module 4200E is provided. The event detection module 4200E is provided within a grip housing 4202E. The event detection module 4200E and the grip housing 4202E are collectively referred to herein as a grip module 4204E. The grip module 4204E is configured on a spade grip assembly 4260. While the spade grip assembly 4260 generally comprises two grip handles, it is contemplated that the grip module 4202E can be configured on one of the two grip handles. The spade grip assembly 4260 is shown on an exemplary firearm 4210E such as an MK19 however it is appreciated that the grip module 42024E can be used in other firearms. The spade grip assembly 4260 can be configured on a back plate assembly 4261 that couples to a proximal end of the firearm 4120E.

With particular reference to FIG. 49, the grip housing 4202E generally includes first and second clam shell housing portions 4262A and 4262B, and end screws 4264A and 4264B. The event detection module 4200E is generally disposed in an event detection module housing 4207E. In examples, the event detection module housing 4207E can define threaded bores 4208A and 4208B for receiving the end screws 4264A and 4264B, respectively. A battery 4209 that provides power to the event detection module 4200E is generally housed in the housing 4207E.

As with the other event detection modules disclosed herein, the event detection module 4200E can comprise the sensors 118 (FIG. 1) such as an IMU including an accelerometer, a gyroscope, a magnetometer, a geolocation sensor, a pressure sensor, an audio sensor, combinations thereof, and the like. The sensors 118 are generally provided on a circuit board 4211E. The event detection module 4200E can include a signal processing module that uses machine learning and/or digital signal processing techniques to determine a classification of the event such as whether an event detected is a discharge event of the firearm. In other examples, the event detection module 4200E can wirelessly communicate signals ultimately to the server device 112 for processing to make additional determinations based on the event as described above.

With particular reference now to FIGS. 50-53B, another event detection module 4200F is provided. The event detection module 4200F is provided within a grip housing 4202F. The event detection module 4200F and the grip housing 4202F are collectively referred to herein as a grip module 4204F. As will become appreciated, the grip module 4204F can be configured similarly to the grip module 4204A described above and shown at FIG. 44, but is also configured for cooperation with a trigger pull sensor assembly 4300. As shown in FIG. 2, an event detection module 4200G is integrated within a wearable device, such as a wristband (see wristband 226), a wristwatch, or other article worn by the user.

The trigger pull sensor assembly 4300 can provide an additional sensor input to the event detection module 4200 when detecting an event such as shot count. In this regard, information provided by the trigger pull sensor assembly 4300 can be combined with signals from other sensors (e.g., IMU) discussed herein to provide yet another layer of input to achieve a more robust determination of the existence of an event such as a discharge event. In other examples, while the trigger pull sensor assembly 4300 will provide a signal indicating that the trigger has been pulled, it may not necessarily indicate that the firearm has discharged. Explained further, if it is determined that the trigger pull sensor assembly 4300 has provided a first signal that satisfies a threshold indicative of the trigger being pulled in combination with the sensors 118 (e.g., IMU) providing a second signal indicative of a discharge event, a determination may be made that a discharge of the firearm has occurred. Conversely, if it is determined that the trigger pull sensor assembly 4300 has provided a first signal indicative of the trigger being pulled but the sensors 118 do not provide a signal indicative of a discharge event, a determination may be made that the firearm has one of malfunctioned, an ammunition status such as if the weapon is out of ammunition, or another failure is present. In examples, these determinations can be communicated to a user of the firearm in real-time, such as on a display (for example the AR/VR display 5400 described herein and show in FIG. 70). In yet further examples, a signature of the signal generated from the sensors 118 can be analyzed to correlate the event to a particular type of malfunction. In advantages, the incorporation of the trigger pull sensor assembly 4300 as an additional input to the event detection module 4200F improves accuracy of a discharge/shot count determination and reduces false positives. In examples, analyzing the second signal provided by the sensors 118 is only conducted based on the trigger pull sensor assembly 4300 initially providing the first signal indicative of the trigger being pulled. It is further contemplated that such discharge/shot count information can be provided in real time allowing the rapid use of collected information, such as for situational awareness and rapid response to critical situations. The information can be output to any of the GUI described herein (FIGS. 6-11) to generate, review and/or approve actions to take in response to the event detection.

Figure 53A:
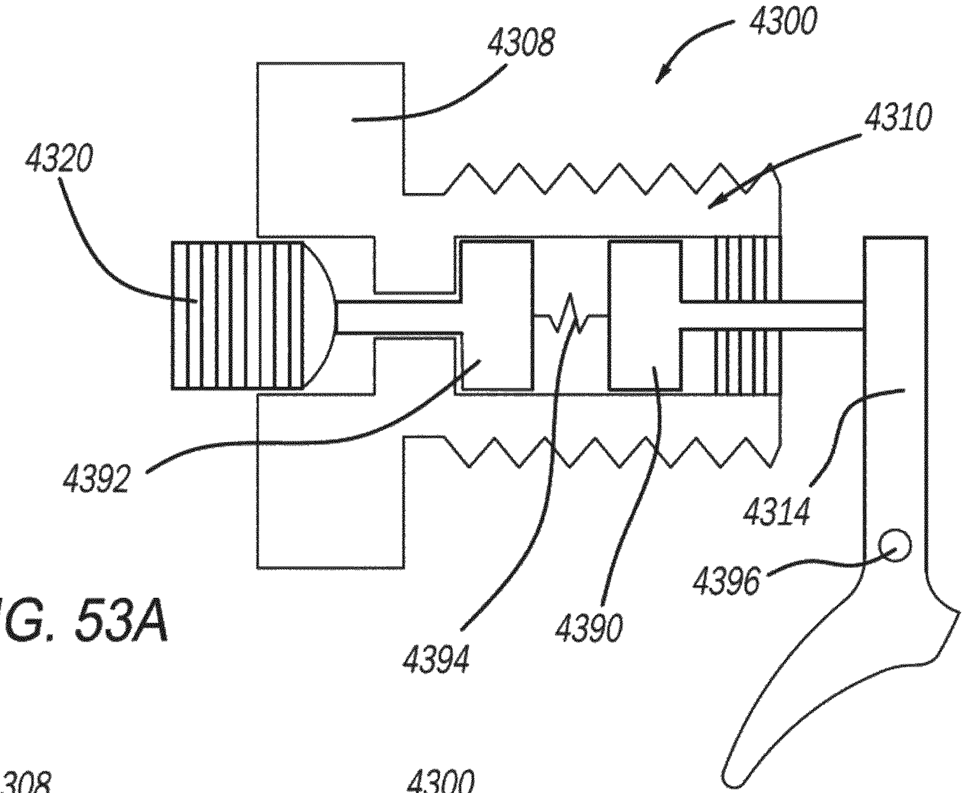
FIG. 53A is a schematic diagram of the trigger pull sensor assembly shown with a contact sensor in a depressed position corresponding to the trigger in a ready, not-pulled position.
Figure 53B:
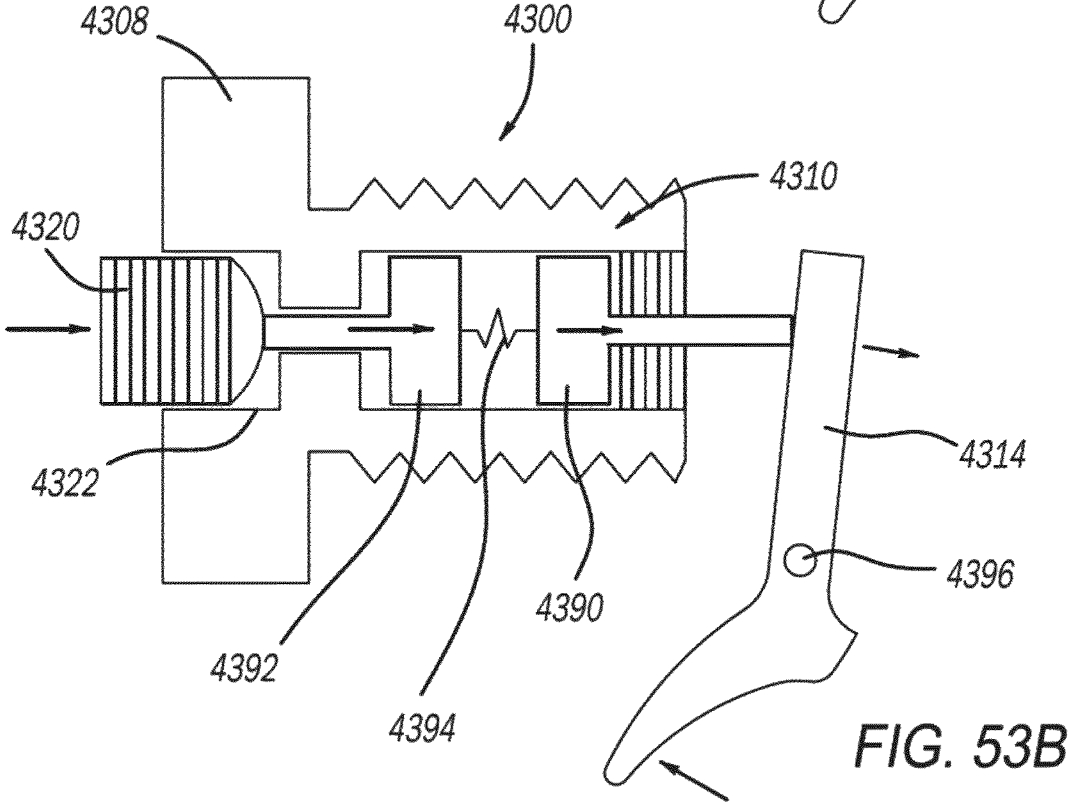
FIG. 53B is a schematic diagram of the trigger pull sensor assembly of FIG. 53A shown with the contact sensor in an extended position corresponding to the trigger in an actuated, pulled position.

The trigger pull sensor assembly 4300 generally comprises a grip screw 4308 that generally houses a plunger assembly 4310 (FIGS. 53A-53B). The plunger assembly 4310 mechanically communicates motion of a trigger 4314 to motion of a contact sensor 4320. The grip screw 4308 threadably connects to a body of a firearm 4210F. In examples, the grip screw 4308 defines a pocket 4322 (FIG. 53B) that accommodates a portion of the contact sensor 4320. As will be described, the trigger pull sensor assembly 4300 senses mechanical movement of the trigger 4314 and communicates a trigger actuation signal to the event detection module 4200F corresponding to a position of the trigger 4314. The event detection signal is further based on the trigger actuation signal.

The contact sensor 4320 is configured to move (e.g., translate) on the grip housing 4202F between a depressed position (FIG. 53A) and an extended position (FIG. 53B).

The contact sensor 4320 is normally biased outward by a contact sensor biasing member 4330 housed in the grip housing 4202F. When the grip housing 4202F is installed into the grip module 4202F, the depressed position (FIG. 53A) corresponds to the trigger 4314 in a ready (non-pulled) position. The extended position (FIG. 53B) corresponds to the trigger 4314 in an actuated (pulled) position. In the example provided, movement of the contact sensor 4320 from the depressed position (FIG. 53A) to the extended position (FIG. 54B) causes a circuit on the event detection module 4200F to open indicative of a shot being fired. It is appreciated that the circuit can be configured differently whereby the circuit can close indicative of a shot being fired. In other words, the contact sensor 4320 can change states on the circuit indicative of the trigger 4314 being pulled.

Figure 52:
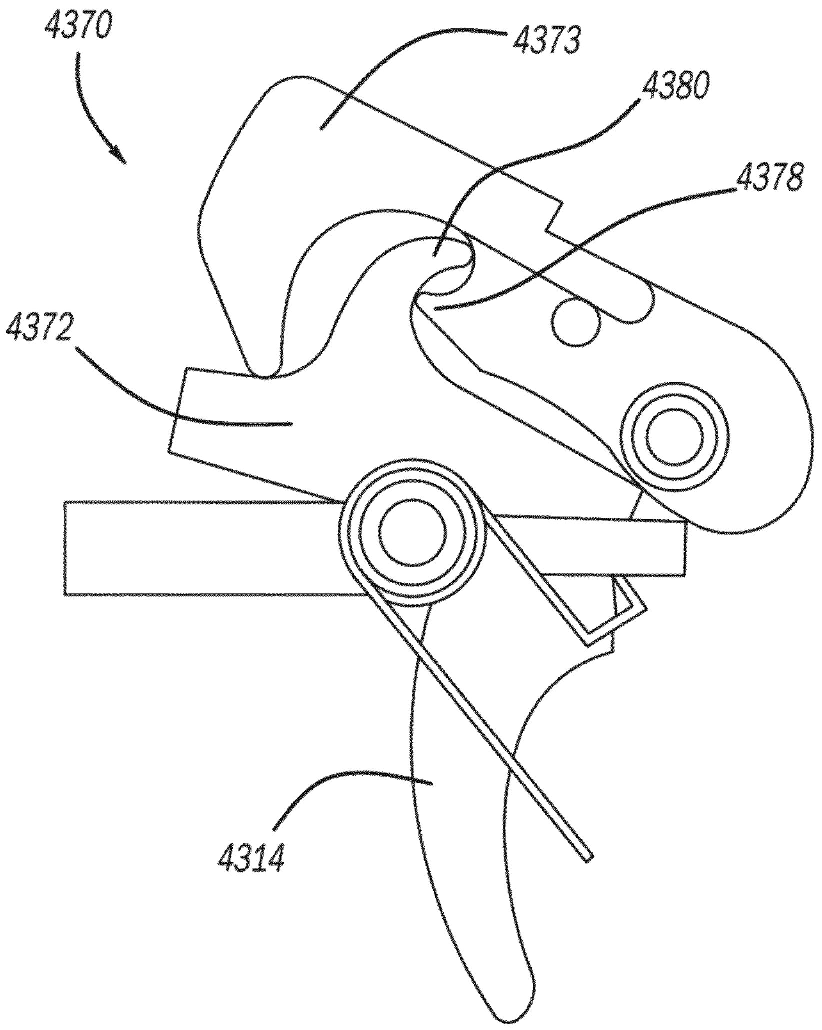
FIG. 52 is a side view of an exemplary trigger assembly.

Turning now to FIG. 52, an exemplary trigger assembly 4370 is shown. The trigger assembly 4370 generally comprises the trigger 4314, a disconnector 4372, and a hammer 4373. The hammer 4373 can define a sear 4378 for mechanically communicating with a hook 4380 on the disconnector 4372. With additional reference to FIGS. 53A and 53B, the plunger assembly 4310 will be further described. The plunger assembly 4310 includes a trigger side plunger 4390, a sensor side plunger 4392 and a plunger biasing member 4394. The trigger side plunger 4390 is configured to engage the trigger 4314 while the sensor side plunger 4392 is configured to engage the contact sensor 4320. When the trigger 4314 is in the ready (non-pulled) position, the plunger biasing member 4394 provides sufficient biasing force between the trigger side plunger 4390 and the sensor side plunger 4392 to urge the sensor side plunger 4392 toward the contact sensor 4320 (and overcome the bias from the contact sensor biasing member 4330, FIG. 51B) to maintain the contact sensor 4320 in the depressed position (FIG. 53A). When the trigger 4314 is pulled (FIG. 53B), effectively rotating around a pivot 4396, the plunger assembly 4310 collectively translates away from the contact sensor 4320 such that the contact sensor 4320 moves from the depressed position (FIG. 53A) to the extended position (FIG. 53B). In other words, the bias of the contact sensor biasing member 4330 overcomes the bias of the plunger biasing member 4394 to move the contact sensor 4320 to the extended position. It will be appreciated that during rotation of the trigger 4314 and movement of the plunger assembly 4310, the grip screw 4308 remains static relative to the body of the firearm 4210F.

Figure 54A:
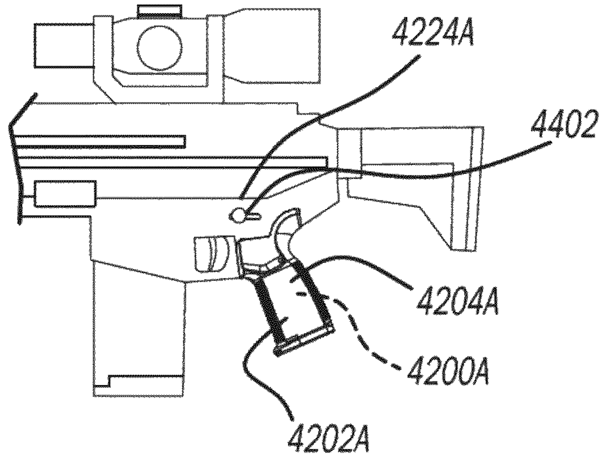
FIG. 54A is side view of an event detection module that incorporates a safety selector switch sensor and safety selector switch in accordance with further embodiments of the present disclosure, the safety selector switch shown in a safety position.
Figure 54B:
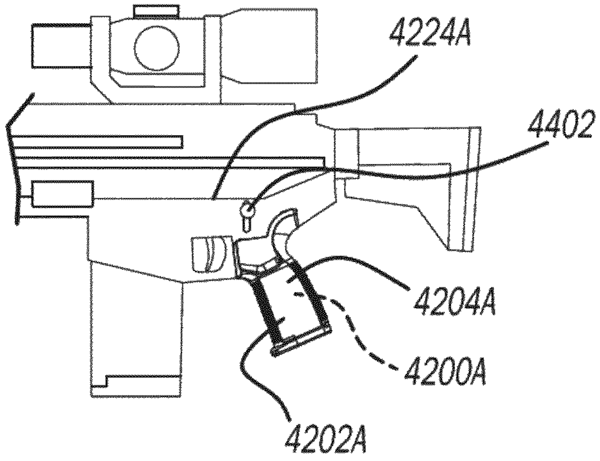
FIG. 54B is side view of the event detection module of FIG. 54A shown with the safety selector switch in a use position.
Figure 54C:
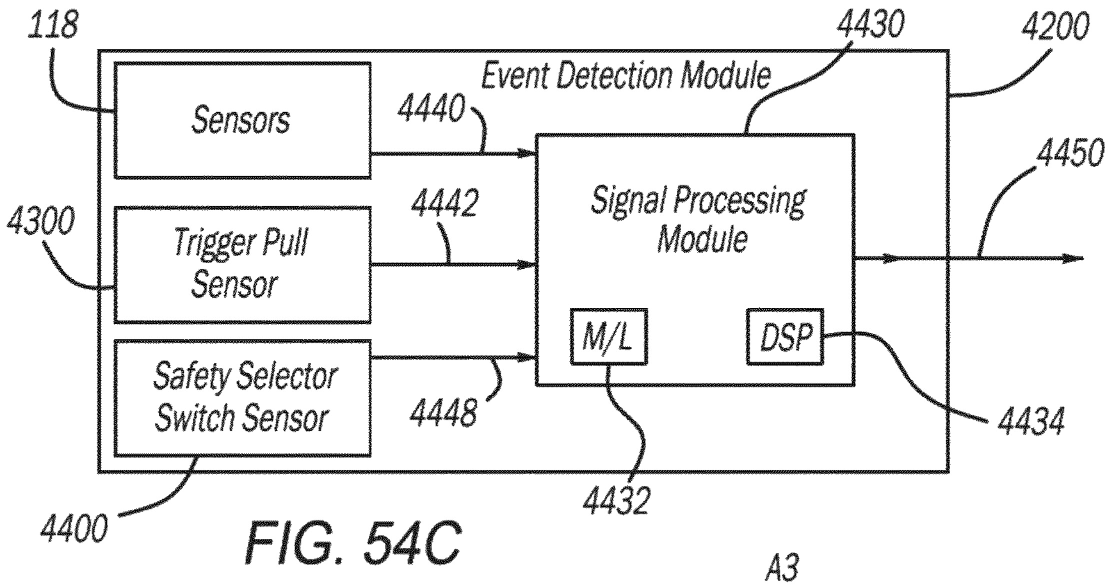
FIG. 54C is a diagrammatic view of an event detection module in accordance with embodiments of the present disclosure.

Turning now to FIGS. 54A-54C, a safety selector switch sensor 4400 constructed in accordance to additional examples will be described. The safety selector switch sensor 4400 communicates with a safety switch 4402 configured on the firearm. In the example shown, the safety switch 4402 is shown configured on the long gun 4210A. It is appreciated however that the safety selector switch sensor 4400 can be configured for use with any safety switch provided on any of the firearms discussed herein. In general, the safety switch 4402 is configured to move between a safety position wherein actuation of the trigger is precluded (FIG. 54A) and a first use position (FIG. 54B) wherein actuation of the trigger is permitted. In examples, the safety switch 4402 can additionally be configured to move to a second use position intermediate the positions shown in FIGS. 54A and 54B. In examples, the first use position shown in FIG. 54B can correspond to a fully automatic mode of operation of the firearm. An intermediate position can correspond to a semi-automatic mode of operation of the firearm. The configuration of the safety switch 4402 is merely exemplary and the safety selector switch sensor 4400 may be configured for use with any type of firearm safety switch. The safety selector switch sensor 4400 communicates a signal to the event detection module 4200A indicative of a position of the safety switch 4402. The event detection module 4200A can use the additional data from the safety selector switch sensor 4400 indicative of the position of the safety switch 4402 to make a more accurate determination of an event occurring (e.g., a shot being fired). In other examples, the event classification signal 4450 can include additional data related to a status of the safety switch 4402. In this regard, the detection module 4200 can communicate a status of the safety selector switch sensor 4400 in real-time to the server device 112 indicative of the safety switch 4402 being in the use or locked position. Such information can additionally be downloaded and reviewed at a later time in a post mission analysis event.

With reference to FIG. 54C, a diagrammatic view of an event detection module 4200 is shown. The event detection module 4200 represents any of the event detection modules 4200A-4200E described herein. The event detection module 4200 comprises a signal processing module 4430 having a machine learning module 4432 and a digital signal processing module 4434. The sensors 118 output various sensor signals collectively identified at 4440 to the signal processing module 4430. As discussed herein, the sensors 118 can include one or more IMU's each having at least one of an accelerometer a gyroscope, a magnetometer, and a geolocation sensor. Additional sensors can be provided by the sensors 118 and can include a pressure sensor, an audio sensor, a thermal sensor, combinations thereof, and the like. The trigger pull sensor 4300 outputs a trigger pull sensor signal 4442 to the signal processing module 4430 indicative of the contact sensor 4320 of the trigger pull sensor assembly 4300 actuated to the activated position. The safety selector switch sensor 4400 outputs a safety selector signal 4448 to the signal processing module 4430 indicative of the indicative of the safety switch 4402 in the use position. The signal processing module 4430 performs processing techniques to make decisions about an event based on the signals 4440, 4442, 4448 and outputs an event classification signal 4450. The event classification signal 4450 can be indicative of the type of event identified. The event classification signal 4450 can be stored locally on the event detection module and/or be communicated wirelessly such as the network 114. As explained herein, the type of event can include, but is not limited to, a shot being fired, a weapon maintenance threshold being satisfied, a weapon failure being detected, an ammunition type (live, blank) being detected or other event. Weapon maintenance and/or weapon failure items can include a barrel overheating, or a barrel exceeding a shot count allotment. As will become appreciated, the signal processing module 4430 can make determinations based on some or all of the inputs 4440, 4442, and 4448 indicative of the type of event identified. The more inputs that the signal processing module considers will provide another layer of confidence in the type of event identified. With each additional layer of input consideration, false positives (such as falsely identifying a shot) can be reduced. In particular, the signal processing module 4430 can use machine learning techniques and run algorithms that map a sensed event to known events to determine if particular characteristics of the sensed event match or closely match known event patterns. In this regard, various determinations about what exactly is occurring in the sample event can be made (e.g., a shot being fired, an ammunition type being fired, etc.). Machine learning technologies can train models executing the algorithms to continuously update known event signals to more accurately represent a desired classification pattern. In additional examples, determinations can be made about the health of the weapon, the health of a user of the weapon or other environmental condition. The machine learning techniques can make determinations based on analysis of one or more input signals. In this regard, the accuracy of event determination can be improved with each additional input layer considered (e.g., from additional sensors) by the model. In particular, the model can establish distinct thresholds that need to be met for each input layer for a given determination to be concluded (such as a shot being detected). In additional examples discussed herein, the event classification signals generated by the signal processing module can be additionally used in training and performance applications. It is appreciated that in some event detection module configurations, some or all components may be located on the firearm and/or on a wearable device. For example, the event detection module 4200G shown in FIG. 2 may incorporate the sensors 118 (including IMU) and signal processing module 4430 while the trigger pull sensor 4300 and safety selector switch sensor 4400 may be arranged on the firearm. In such examples, the components of the event detection module 4200 can be configured to wirelessly communicate as needed, such as by way of Bluetooth or other technology.

Figure 55:
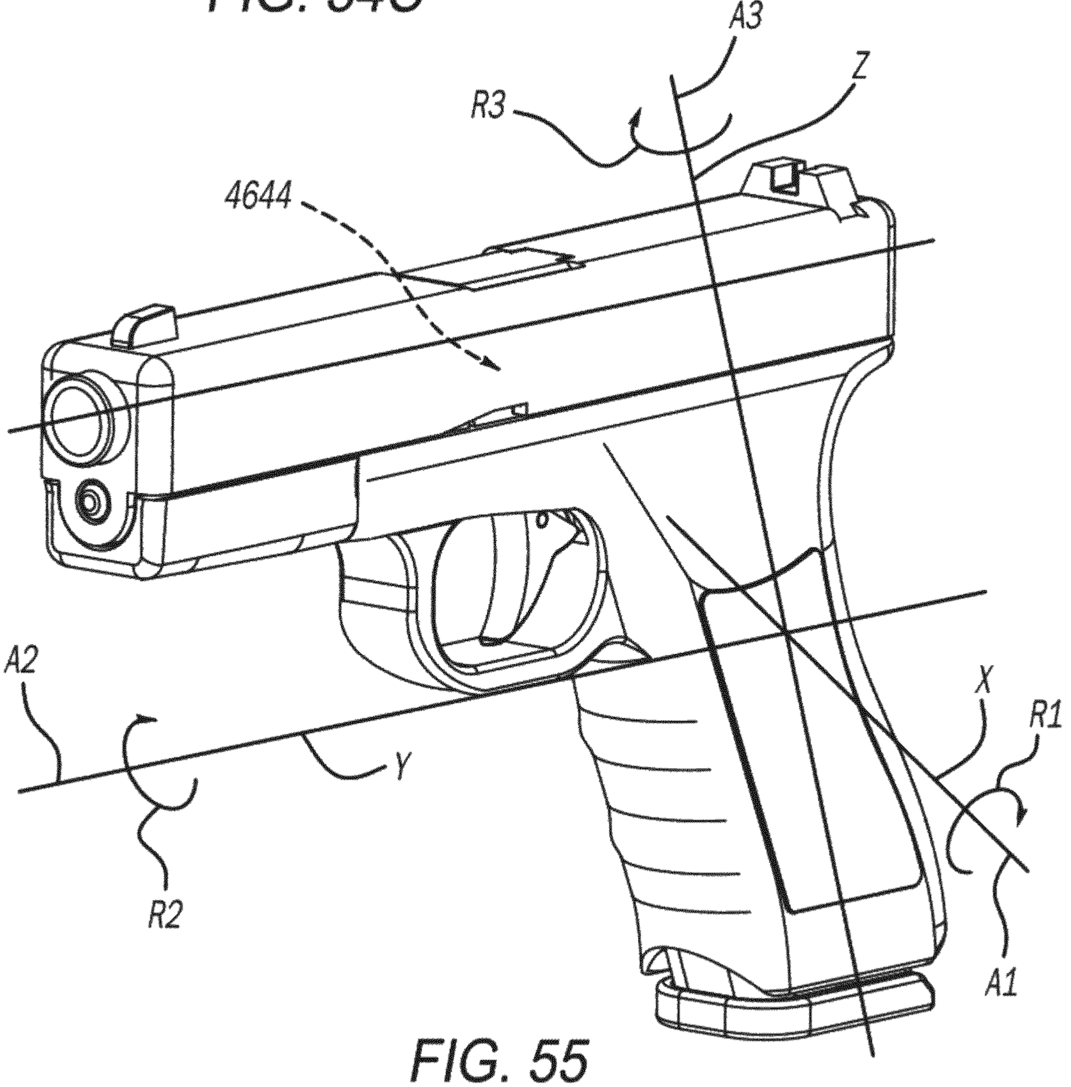
FIG. 55 is a front perspective view of an exemplary firearm illustrating various axes of inputs.
Figure 56A:
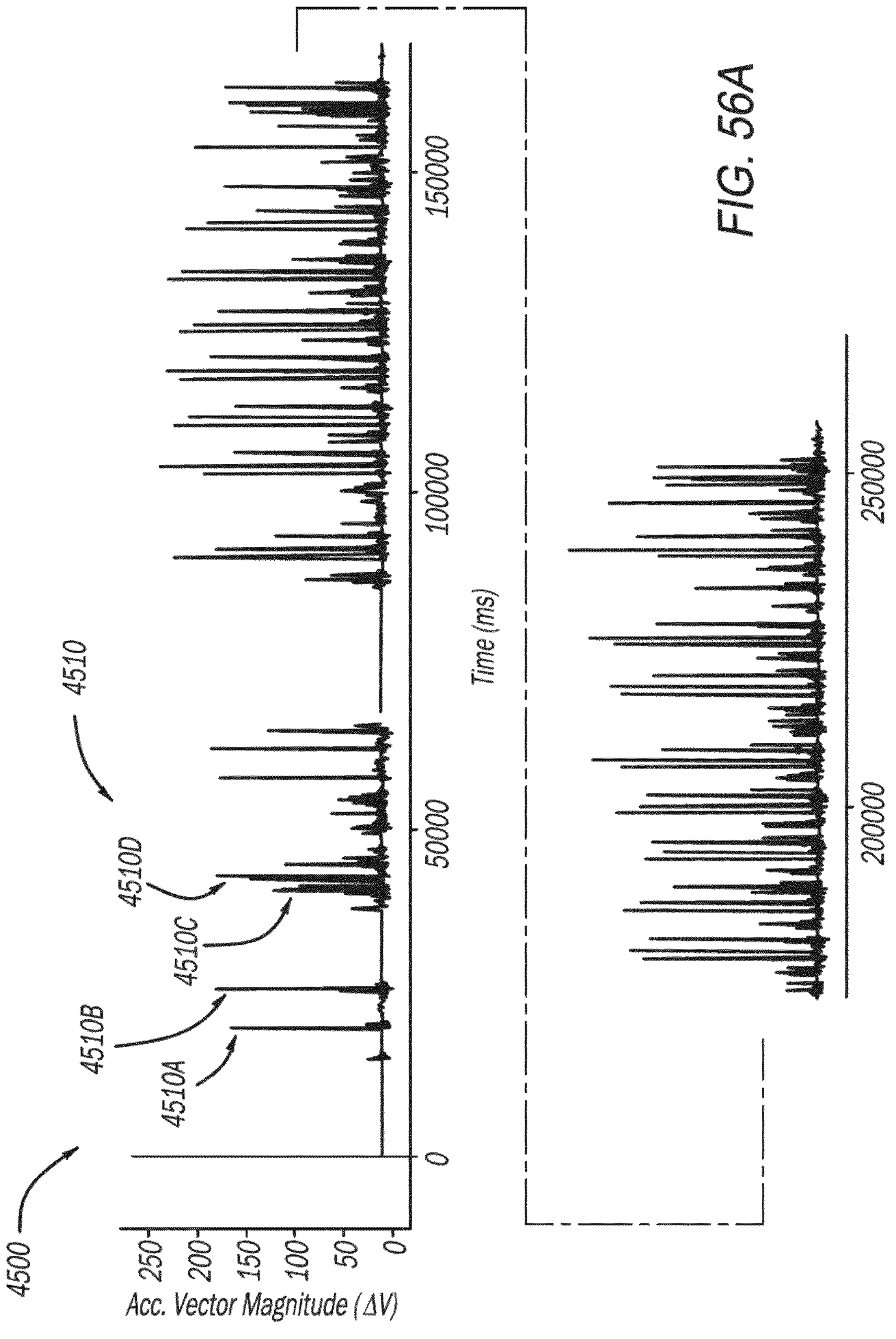
FIG. 56A is a first plot of various sample event candidates shown as acceleration vector magnitudes over time.
Figure 56B:
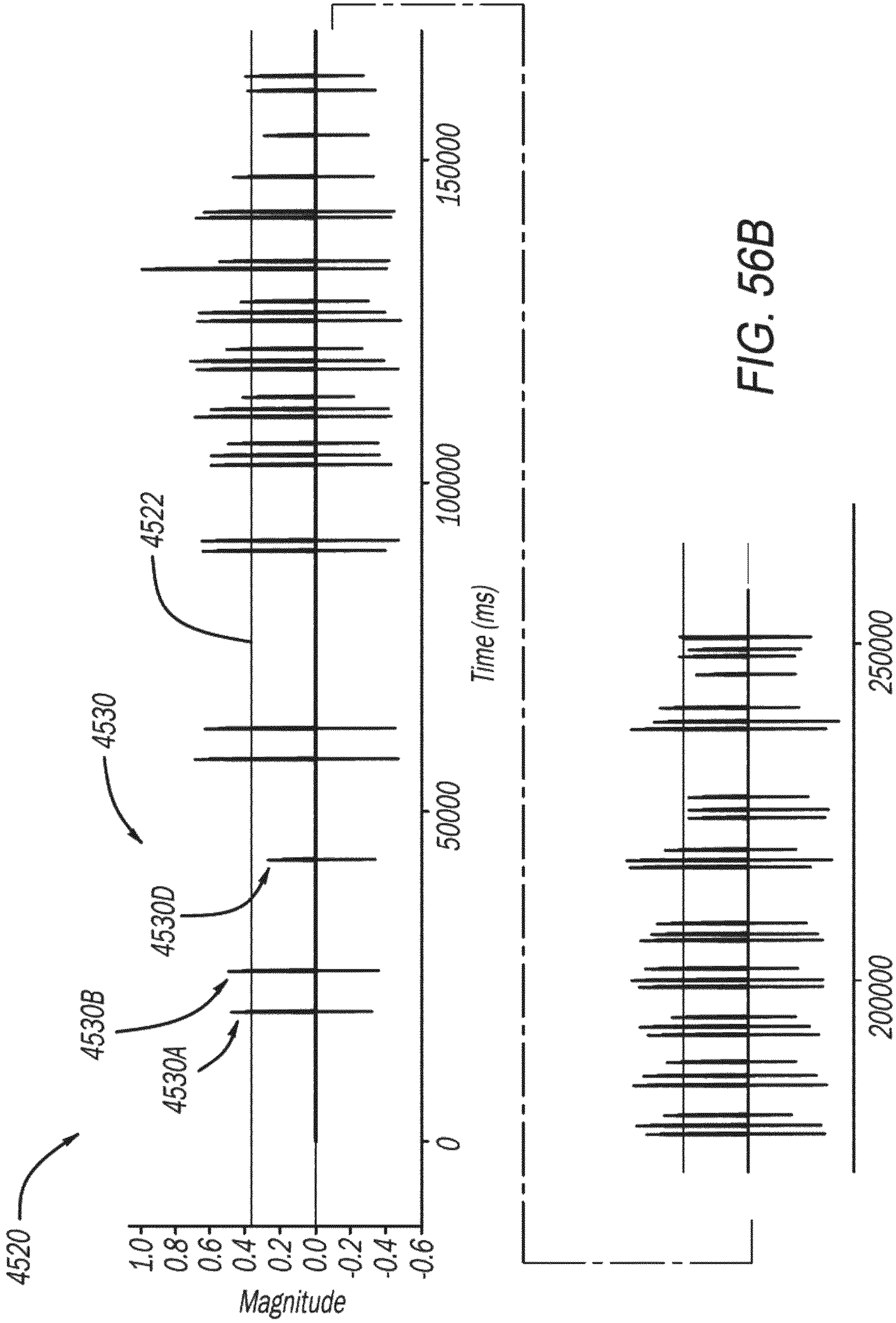
FIG. 56B is a second plot representing matches of selected sample event candidates to a discharge acceleration template.
Figure 56C:
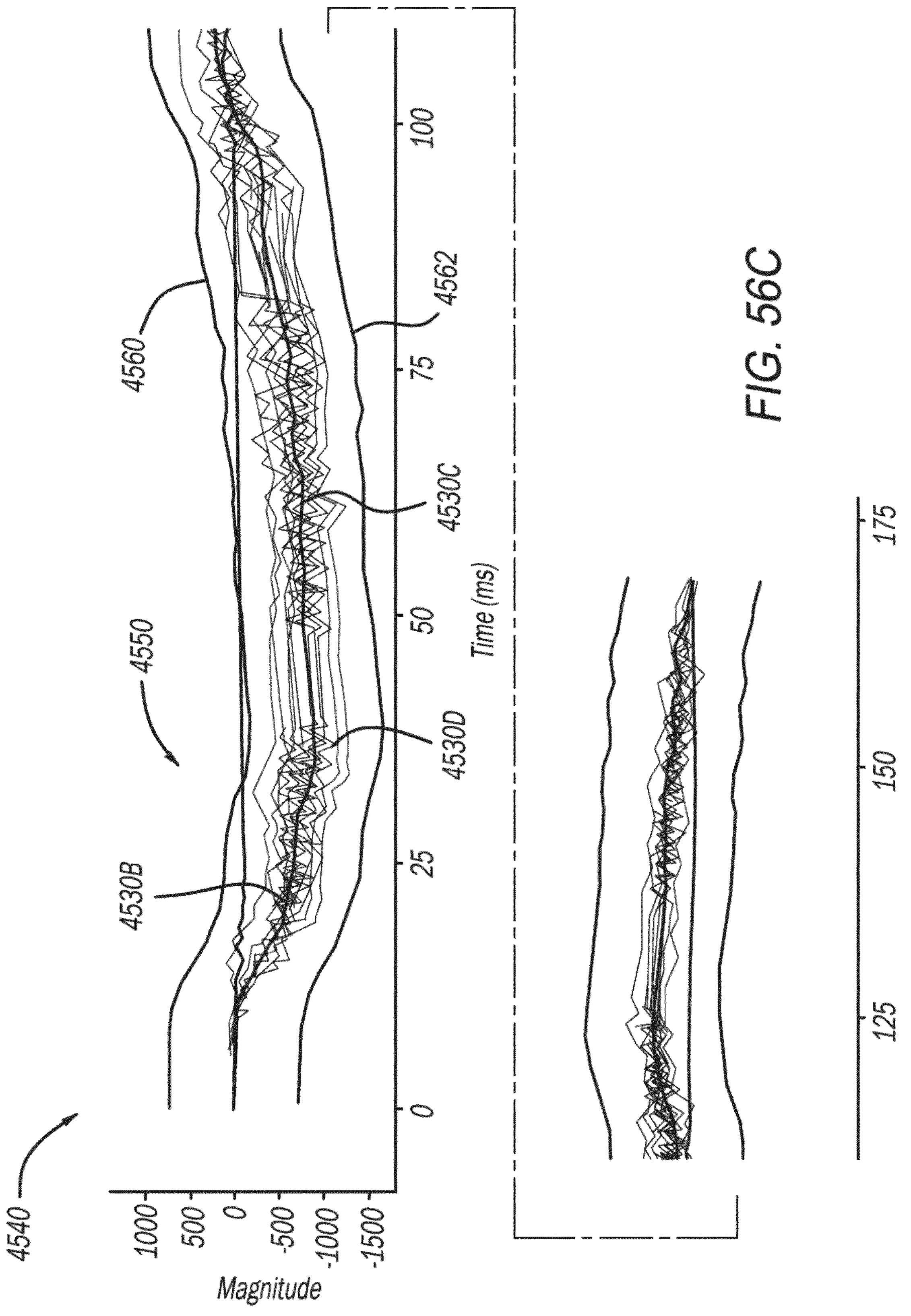
FIG. 56C is a third plot representing the matches of the second plot.

With reference now to FIGS. 55-56C, various methods and techniques for determining a classification of an event using digital signal processing techniques will be described. In this example, the event classification is a discharge event. In examples, the sensors 118 (e.g., an IMU) can provide six signal inputs including three acceleration inputs (such as from one or more accelerometers) and three rotation inputs (such as from one or more gyroscopes) measured on the firearm over a period of time. The inputs are diagrammatically shown relative to a firearm in FIG. 55. The acceleration inputs can be provided as three accelerations in three different directions. A first acceleration A1 is measured in a first direction along a first axis (labelled as x-axis), a second acceleration A2 is measured in a second direction along a second axis (labelled as a y-axis) and a third acceleration A3 is measured in a third direction along a third axis (Labelled as a z-axis). The angular velocity (rotation inputs from the gyrometer of the IMU) can be rotations around the respective axes. In particular, a first rotation R1 is measured around the x-axis, a second rotation R2 is measured around the y-axis and a third rotation is measured around the z-axis. In the example shown in FIG. 55, the x-axis is generally defined transverse to the barrel, the y-axis is generally parallel to the barrel and the z-axis is generally along the grip of the firearm.

The acceleration and rotation signals can be received by the event detection module associated with the firearm. The following example will be described in the context of the event detection module 4200A in the grip module 4204A however it will be appreciated that the signal processing techniques can be used on any event detection module and firearm such as those disclosed herein. The respective acceleration and rotation inputs A1, A2, A3 and R1, R2, R3 are received at the event detection module 4200A. The event detection module 4200A uses machine learning techniques that are trained on historical event determination data. The event detection module 4200A runs an identification algorithm using the inputs to identify discharge event candidates and filters the candidates to maintain only candidates having strongest likelihood to represent a discharge event. In the example described, once an acceleration threshold is crossed, the acceleration and rotation inputs A1, A2, A3 and R1, R2, R3 are passed to a machine learning algorithm that has trained on historical data. The machine learning algorithm creates and runs identification algorithms to make a prediction (e.g., shot detected) based on the similarity of the trained data (that is confirmed to satisfy an event occurrence) with the sample data collected. The machine learning models can be layered to map one or more sensed inputs 4440, 4442, 4448. As more models are satisfied by the sensed event a greater confidence can be made that the event classification output by the signal processing module 4430.

The methods and techniques described herein reduce the likelihood that the event classification signal 4450 is incorrect such as a false positive shot detection. In particular, while non-shot discharging events such as dropping a firearm or a firearm malfunctioning may experience acceleration and rotation inputs otherwise within predetermined thresholds that would classify as a shot being detected, the signal processing module 4430 can analyze additional signal input layers from the sensors 118 (such as from an audio sensor, pressure sensor and/or a thermal sensor, herein "other sensors"), the trigger pull sensor 4300 and the safety selector switch sensor 4400 to provide independent systems that overlap the acceleration and rotation inputs. In this regard, while the primary inputs used by the machine learning algorithms herein can be accelerations and angular velocities provided by the IMU of the sensors 118, the signal processing module 4430 can additionally consider signals 4440 from other sensors of the sensors 118, signals 4442 from the trigger pull sensor 4300 and/or signals from the safety selector switch sensor 4400 independently as supplemental layers of analysis. In examples, every machine learning system can exhibit holes where outputs can also include false positives. Complementary independent inputs, provided by additional sensors, can provide further checks and balances in the confidence level of the ultimate event classification signal 4450. By adding additional data inputs from systems independent from the acceleration and rotation inputs into the signal processing module 4430, these holes can be minimized and the confidence level of an accurate event classification can be improved, ultimately reducing false positives.

FIG. 56A is a first plot 4500 representing a combination of the acceleration inputs A1, A2 and A3 as a single directionless acceleration vector magnitude (y-axis) over time (x-axis, shown in milliseconds). The first plot 4500 provides a plurality of sample event candidates collectively identified at 4510 and individually identified at 4510A, 4510B, 4510C, 4510D, etc. Each sample event candidate 4510 is associated with a respective window of time. The first plot 4500 can be used by the signal processing module 4430 to classify events. In the first example discussed herein, signal processing module 4430 uses algorithms to classify the event (or events) as a discharge event (e.g. a shot occurring). The signal processing module 4430 can use algorithms to additionally or alternatively identify a gas setting or an ammunition type being fired. In other examples, the signal processing module 4430 can use algorithms to update a weapon status (e.g., maintenance required).

Each sample event candidate on the first plot 4500 is compared to a shot discharge match filter. The shot discharge match filter can be a standard signal processing algorithm that uses a discharge acceleration template that represents a confirmed weapon discharge event. Wherever a sample event candidate matches or closely matches the discharge acceleration template, the event is represented on a second signal plot 4520 of dimensionless magnitude (y-axis) over time (x-axis). Other filters having templates specific to known event characteristics can be additionally used to determine other event classifications.

The second signal plot 4520 can be generated that represents the matches as spikes collectively identified at 4530 and individually identified at 4530A, 4530B and 4530D. A confidence threshold line 4522 can be established where any spike that exceeds the confidence threshold line 4522 can be classified as a discharge. Any spike that does not exceed the confidence threshold line 4522 is eliminated as a candidate. Of note, in the example shown, the candidates 4510A, 4510B and 4510D all satisfied the discharge acceleration template of the match filter and proceeded as spikes 4530A, 4530B and 4530D representing stronger candidates than the candidates shown in FIG. 56A. The candidate 4510C did not satisfy the discharge acceleration template and is not shown in FIG. 56B. In this regard, candidate 4510C is eliminated as a candidate.

Once the subset of accepted accelerations from the sampled event candidates that satisfy the discharge acceleration template have been identified, the rotation inputs R1 and R2 are considered. In this regard, a first rotation input signal R1 from the sample window of time associated with each accepted acceleration is compared to a first rotation template that represents a confirmed weapon discharge event. In examples, the first rotation input signal represents a rotation of the firearm around the first axis x. As can be appreciated, during a typical discharge of a weapon, it is expected that the weapon will rotate generally around the first axis x (in the direction R1 shown in FIG. 55) followed by a reverse rotation around the first axis. In this regard a second signal processing step is conducted where the first rotation input signal is compared to a first rotation template. If the first rotation input signal is within the first rotation template, a determination can be made that the sampled event candidate satisfies a discharge event.

In additional examples, a second rotation input signal R2 from the sample window of time associated with each accepted acceleration is compared to a second rotation template that represents a confirmed weapon discharge event. In examples, the second rotation input signal represents a rotation of the firearm round the second axis y. As can be appreciated, during a typical discharge of a weapon, it is expected that the weapon will rotate generally in response to rotation of the bullet being fired. In particular, as the bullet rotates (from rifling of the barrel) while translating within the barrel during discharge, the firearm will have a resulting counter rotation. In this regard a third signal processing step is conducted where the second rotation input signal is compared to the second rotation template. If the second rotation input signal is within the second rotation template, a determination can be made that the sampled event candidate satisfies a discharge event. As can be appreciated, further confidence is established as more layers of input signals are analyzed.

A third plot 4540 represents velocity (y-axis) over time (x-axis) of the spikes 4530 of the second plot 4520 (that have satisfied the acceleration and rotation filters described above). In examples, the spikes can be shown as traces collectively identified at 4550 and individually identified at 4550A, 4550B, etc. within the sample window collapsed onto the third plot 4540. An upper threshold 4560 and lower threshold 4562 can be established by the signal processing module 4430 that signify an upper and lower boundary of a profile consistent with a shot being fired. In this regard, any trace 4550 that follows within the boundaries of the upper and lower thresholds 4560 and 4562 can be identified as a discharge event while any trace 4550 that goes outside either of the upper and lower thresholds 4560 and 4562 will be discarded.

Figure 57:
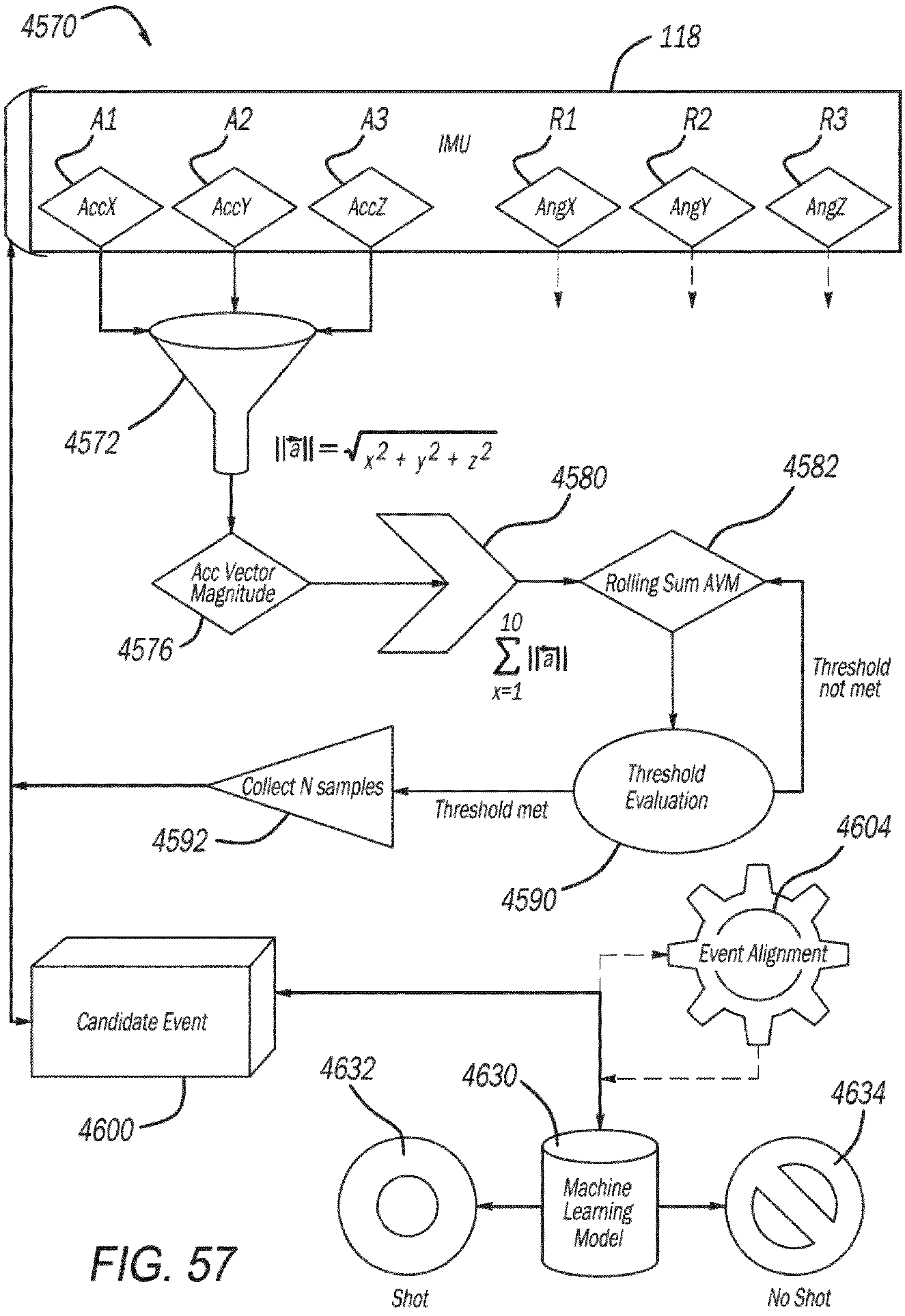
FIG. 57 is an example logic flow of a machine learning algorithm used by the event detection module.

With reference now to FIG. 57, various methods and techniques for detecting a shot and for determining a shot count using machine learning modeling techniques will be described. An exemplary logic flow of a machine learning technique for determining shot count is generally identified at reference numeral 4570. As described above, the sensors 118, such as disposed on the firearm at the grip module can include an IMU that provides first, second and third accelerations A1, A2 and A3, and rotations R1, R2 and R3, respectively. The accelerations are monitored constantly in real time and represent a plurality of sample event candidates. The first, second and third accelerations A1, A2 and A3 can be converted at convertor 4572 into an acceleration vector magnitude 4576. The acceleration vector magnitude 4576 is directionless and merely identifies a magnitude. In examples, the Pythagorean theorem can be used to calculate the acceleration vector magnitude 4576. A summer 4580 calculates a rolling sum of accelerations 4584 in a predetermined window of time. In the example shown, the summer 4580 uses ten sample vector magnitudes per window. By way of example, sampling can occur at 1125 Hertz (Hz) or slightly under a millisecond. As can be appreciated new windows having new samples are generated over time. A first new acceleration sample will be added to the summer 4580 while an oldest acceleration sample will drop off with each subsequent window sample. In other words, the exemplary summer 4580 considers a rolling total of accumulative accelerations for ten samples and continually updates to provide new sample windows each having at least some new sample accelerations.

The rolling sum output by the rolling sum module 4582 is compared to a threshold at a threshold evaluation module 4590. The threshold value will change for different weapon platforms. If the value of the rolling sum 4582 of the acceleration vector magnitude is below the threshold, the process loops to rolling sum module 4582 to obtain a new rolling sum for analysis. If the acceleration vector magnitude is over the threshold, the sample a candidate event is generated and passed to a sample collector 4592. The sample collector 4592 collects raw data including the accelerations A1-A3 and rotations R1-R3 from the IMU 118 from the point at which the tier one threshold was crossed for a predetermined duration which is unique to each weapon system based on the weapons cycle timing. In examples, for an M4, sixty samples are collected, for an M2, eighty samples are collected. Other samples for other weapons may be collected. This predetermined duration can be referred to as a candidate length.

Figure 58A:
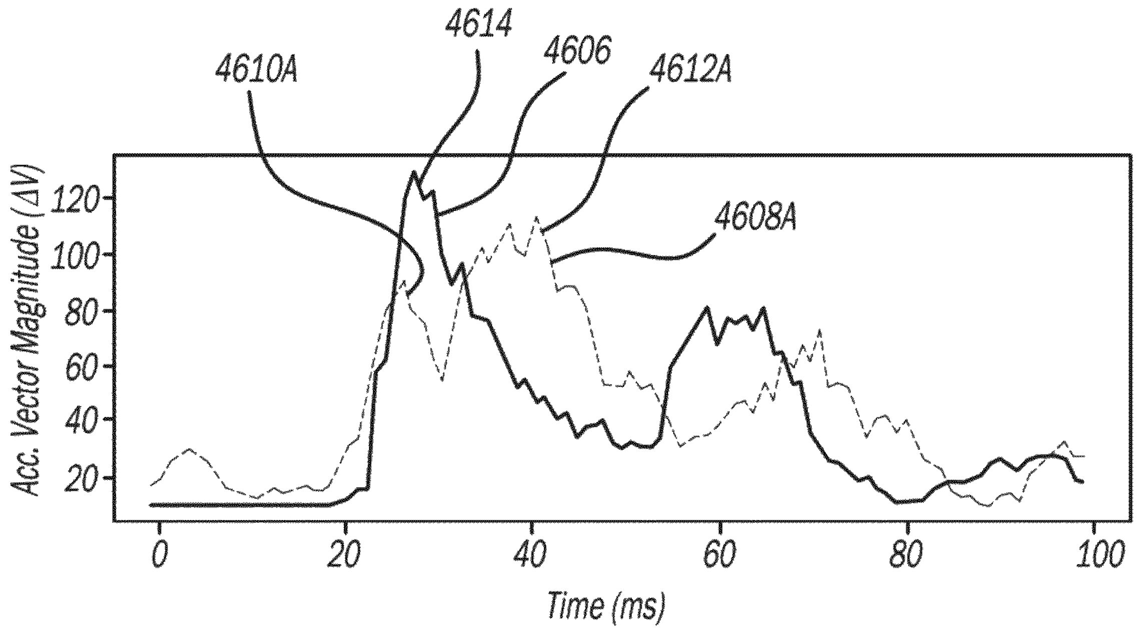
FIG. 58A is a plot illustrating a sample shot profile (dotted line) and a baseline shot profile (solid line) before alignment.

The data from the sample collector 4592 is collected at a candidate event module 4600. The candidate event module 4600 can assemble the acceleration and rotation data as candidate events over the amount of desired samples. In examples, the samples collected by the candidate event module 4600 can be provided to an event alignment module 4604. The event alignment module 4604 can smooth data that may have overlapping entries, such as due to shots fired from automatic weapons. In examples, before the sample event is passed to the algorithm provided in the machine learning module 4432, the event is “fitted” to a standardized acceptable waveshape for best match. This ensures that every shot event is being passed to the algorithm in the same “position in time” as other shot events. This waveshape fitting is shown graphically in FIG. 58A (before alignment) and 58B (after alignment) where an acceleration vector magnitude (Δv) measured by the IMU 118 is plotted over time (milliseconds). A baseline shot profile 4606 is shown having an acceleration vector magnitude Δv over time. The baseline shot profile 4606 represents an expected shot profile of a known weapons type. A sample shot profile 4608A represents the profile generated by the signal processing module 4430 based on the signals 4440 received by the sensors 118. The sample shot profile 4608A is shown also having an acceleration vector magnitude Δv over time. In the example shown, the baseline shot profile 4606 and the sample shot profile 4608A both represent a shot from a fully automatic weapon. Notably, a residual acceleration spike 4610A and a target acceleration spike 4612A are measured with the sample shot profile 4608A. Similarly, a baseline acceleration spike 4614 is represented on the baseline shot profile 4606. The residual acceleration spike 4610A represents a residual force resolving from a previous shot. In examples, the residual acceleration spike 4610A can be created when a bolt 4640 (FIG. 42A) from a bolt carrier group 4642 of the firearm returns to a forward position. The target acceleration spike 4612A represents the force from the target shot. In this regard, the residual acceleration spike 4610A can be misleading data when attempting to compare the sample shot profile 4608A with the baseline shot profile 4606.

Figure 58B:
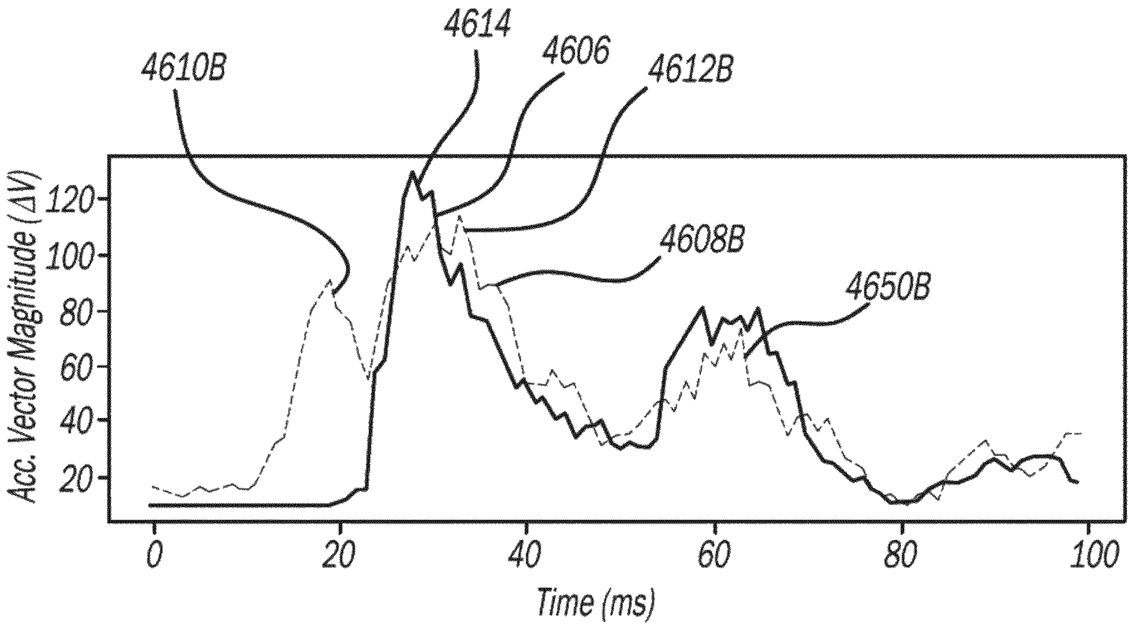
FIG. 58B is a plot illustrating the sample shot profile and the baseline shot profile of FIG. 58A and shown after alignment.

FIG. 58B illustrates the sample shot profile 4608B shifted or aligned with the standard shot profile 4606. In particular, the algorithm of the event alignment module 4604 shifts the sample shot profile 4608B to an earlier time such that the residual acceleration spike 4610B is moved out of alignment with the standard shot profile 4606. In this regard, the target acceleration spike 4612B is moved to an aligned position with the baseline acceleration spike 4614. In the aligned position, a more accurate event threshold comparison can be made between the sample shot profile 4608B and the baseline shot profile 4606. As such, thresholds that satisfy an event trigger are more accurately represented. Moreover, regardless of where an event is initially triggered based on these thresholds, the event alignment module 4604 can properly align characteristics of a sample shot with characteristics of a baseline shot thereby reducing error.

The accuracy of event detection is improved significantly as the algorithm in the event alignment module 4604 is seeing events in the same format for equal comparisons. Event alignment is particularly useful in weapons capable of automatic rate of fire such as, but not limited to, an M4. For such weapons, overlapping data can exist from a previous shot to a subsequent shot. In this regard, when using a cumulative acceleration force threshold to trigger an event, the trigger for an event can undesirably occur too soon because of an improperly calculated cumulative force (considering force inputs outside of the proper window).

Referring to FIG. 57, the samples are provided to a machine learning model 4630. The machine learning model 4630 receives the candidates as inputs and make determinations whether the sample candidate represents a shot occurring. In examples, the machine learning model 4630 can be a convolutional neural network (CNN). The CNN can receive the candidate data and predict whether the event is a shot or not. If the machine learning model 4630 determines that a candidate satisfies the criteria, the candidate is output as a shot 4632. Conversely, if the machine learning model 4630 determines that a candidate does not satisfy the criteria, the candidate is output as no-shot 4634.

In examples, the CNN can be trained by a supervised training process. The CNN can be a traditional binary classification network where the data from the sensors (such as the IMU) 118 is the input, and a target is whether the data represents a shot. The training data can be collected on an as-needed basis to support model development. In examples, a model can generate predictions to form preliminary labels. The labels can in turn be reviewed, approved and/or modified by a user (human). In examples, a multiclass classification model can be used that distinguishes between ammunition types (blank vs. live rounds) or identifying other key actions (such as reloading or a weapon malfunction). The overall process of threshold-based event generation passing to a CNN will remain similar to described above, however, the CNN will be multiclass and trained on more diverse data.

In still other examples, the sensors 118 can be configured to provide additional sensors such as, but not limited to, a pressure sensor, a high-G sensor, a piezoelectric sensor, a resistivity sensor, and an audio sensor. Such sensor inputs would be paired with the IMU data and packaged into the input to the CNN. In one configuration two IMU's can be incorporated having calibrations for different gravity sensitivities. For example, a first IMU can be configured to measure lower gravity ranges such as +/−16G (32G's measured in 65536 steps). A second IMU can be configured as a high-G accelerometer that can measure higher gravity ranges such as +/−200G (400G's measured in 65536 steps). Other accelerometers can be incorporated that measure different ranges such as +/−400G. As can be appreciated, the high G IMU can be used to differentiate weapon handling from weapon discharge. In other words, the dropping of a weapon or bumping the weapon on an object may create a 16G signal, but would be very difficult to also create a signal that is satisfied by the high-G sensor. When additionally incorporating an input from a high-G sensor, an additional check and balance in the confidence level of the event classification signal 4450 is gained. Using the examples described above, while non-shot discharging events such as dropping a firearm may experience acceleration and rotation inputs from a single low-G sensor within predetermined threshold that would otherwise classify as a shot being detected, the signal processing module 4430 can also consider another input layer such as acceleration and rotation inputs from a second high-G sensor. In this way, an event such as dropping the weapon that would otherwise satisfy a threshold provided by the low-G sensor would not satisfy a threshold by the high-G sensor. Such events can be rejected from further analysis improving the confidence in the classification of the event. By way of example only, it may be easy to create a 16G signal from weapon handling, but difficult to create a 150G signal from weapon handling. Similarly, it may be easy to create a 150G signal from weapon discharge. In such example, the 150G acceleration can be either a discharge or a very hard impact. The acceleration profile of the low-G IMU can used to determine whether a discharge occurred.

In examples where the sensors 118 include a pressure sensor, a pressure is sensed in the immediate area of the firearm. As is known, when a round is fired through the barrel of the firearm, the air pressure in the immediate area changes. In examples, acceleration inputs from an IMU can be analyzed as a first input layer and localized air pressure from a pressure sensor can be analyzed as a second input layer. In examples where acceleration signals resulting from a firearm being dropped or bumped that may otherwise (undesirably) reach a threshold indicative of a shot being fired, a second input layer provided by a pressure sensor would negate such false positive. In other words, even though an acceleration threshold has been met, a corresponding pressure threshold would not be met preventing a false positive shot detection.

In other examples where the sensors 118 include a pressure sensor and the user of the firearm is a soldier, useful battlefield information can be collected and acted on based on sensed pressures. In particular, explosions and other environmental pressure changes can be tracked and acted upon using information obtained from a pressure sensor. Pressure data can be used for injury causation purposes, for example mild traumatic brain injury (mTBI) or other blast reaction injuries may be traced back to a particular event where excessive pressure was measured. In other examples, situational awareness can be improved by collecting pressure sensor data from multiple users (soldiers in this example). For example, if multiple pressure signals indicative of a large blast is measured from a group of soldiers and received over the network 114, various responses can be deployed, such as by the responsive infrastructure 110 (FIG. 1).

With reference now to FIG. 42C, the sensors 118 can further include position sensors 4720 and 4722. In one example, the position sensors include real time kinematics global positioning system (RTK GPS) sensors or receivers 4720 and 4722. The receivers 4720 and 4722 can be disposed at locations creating a line that is axially parallel relative to a barrel (such as barrel 208, FIG. 2) of the weapon. The receivers 4720 and 4722 can also be configured for use with global navigation satellite system GNSS using an international multi-constellation satellite system. In the example shown, the sensors 4720 and 4722 are generally disposed at offset locations on long gun 4210C. In examples, one sensor can be disposed on the rail and the other sensor disposed on the butt stock of the firearm. It is appreciated that offset RTK GPS sensors can be similarly positioned at spaced out locations relative to each other on other firearms. As is known, RTK GPS can be used to enhance the position accuracy of the Global Navigation Satellite Systems (GNSS). A first RTK GPS receiver can be configured as a "base" while the second RTK GPS can be configured as a "rover". The base receiver can transmit its position and observed satellites data to the rover receiver. The rover can use this information to exclude atmospheric errors. In examples, location accuracy to the centimeter can be achieved. Explained further, each sensor 4720 and 4722 can use external signals (GPS, ultra-wideband as described below, etc.) to determine its own location relative to the external emitter's location (GPS satellite, UWB beacon, etc.). For instance, with GPS, one sensor may determine its own position on Earth. One sensor, or both sensors 4720, 4722 can communicate their derived position to the other. Now both sensors 4720, 4722 know both locations and can determine orientation. The sensors 4720 and 4722 can communicate with each other in wired or wireless formats. A sample use case will now be described with a first sensor ("rear sensor") 4722 disposed closer to the buttstock and a second sensor ("forward sensor") 4720 disposed closer to the muzzle. The first sensor 4722 can determine its own location using GPS. The second sensor 4720 can also determine its own location using GPS. One of the first or second sensors can send its location to the other of the first and second sensors over wired or wireless connection. The first sensor 4722 now has two points on Earth and it knows the firearm 4210C is anchored between them. If the first sensor 4722 looks at the second sensor's 4720 position and sees that it is 1 ft North and 1 ft East of the second sensor 4720, then it can be determined that the firearm 4210C is oriented at 45 degrees East of North. In examples, the location and orientation information determined by the sensors 4720 and 4722 can be communicated to the event detection module 4200 and communicated to the network 114. Various parameters can be tracked such as soldier weapon orientation, line of fire, thread location and situational awareness. In other examples, the weapon heading can be determined using the sensors 4720 and 4722 to determine launch angle of a long gun such as those described herein. In addition, the sensors 4720 and 4722 can be disposed on larger firearms including missile launching weapons for determining launch angles of larger projectiles including missiles.

The sensors 4720 and 4722 communicate with a transmitter 4730 to provide enhanced positional data and heading orientation. In examples where the sensors 4720 and 4722 are configured as RTK GPS sensors, the transmitter 4730 can be a satellite in orbit. In other examples, the sensors 4720 and 4722 can be configured for communication with a ground based transmitter such as a beacon (such as beacon 2884, FIG. 30). In examples, the sensors 4720 and 4722 can additionally or alternatively communicate with ground based transmitters such as beacons inside of a training facility. By way of example only, the beacons can be configured to communicate signals in ultra-wideband format. In examples, the beacons can be located at known static locations throughout the training facility. In this regard, in such a soldier training environment, when a soldier enters the training facility, satellite tracking may be lost. The training facility can have beacons that can communicate with the sensors 4720 and 4722 to determine weapon orientation while inside the training facility. In examples, the sensors can dynamically switch from communication to a satellite to communication to one or more local beacons. The configuration of RTK GPS sensors 4720 and 4722 on a firearm provides improved heading orientation determination over conventional sensors such as magnetometers. It is contemplated that the sensors 118 can include both RTK GPS sensors and a magnetometer. The event detection module can be configured to alternate between using RTK GPS sensor data and magnetometer data to determine an orientation of a weapon depending upon the availability of an RTK signal.

In other examples, the CNN can be self-retraining for user customization. In such a system, a user begins with a generic model trained for their weapon system. The user populates the CNN with user-specific shot data. The system would periodically retrain the CNN based on their user-specific data to personalize the shot detection to be best fitted to their individual firing technique. Improved insights can be achieved into anomalous firing (user error, poor technique) compared to user baseline, which may provide the firer with more relevant feedback. It is contemplated that a semi-supervised learning cycle where training data for a user-specific child model is initially labeled by the parent model, as the child model is fine-tuning the core shot detection capability.

In other applications where the sensors 118 include an IMU, the signals 4440 can include first, second and third accelerations A1-A3 and first, second and third rotations R1-R3 (see also FIGS. 54C and 55), the signal processing module 4430 can be configured to make additional determinations related to the mental and/or physical state of the user (e.g., user has fatigue, user is stationary, user is moving at a slow rate such as walking, user is moving at a fast rate such as running, user is moving at a very fast rate such as in a vehicle). In such an integration, a machine learning algorithm can be trained on categorized data known to satisfy various states of the user. A sample data collection over a period of time (also referred to herein as a sample event candidate), from the IMU in this example, would be compared or mapped to corresponding stored data associated with known or baseline events. The signal processing module 4430 can make conclusions as to what the current state of the user is based on the comparisons. In some examples, the corresponding stored data can be generic to a collection of users. In other examples, the corresponding stored data can be specific to the user. In this regard, each user may have different habits or situational deployments that influence different data sets of known events. For example, a first user may have a first data set known to represent running for the first user whereas, a second user may have a second data set known to represent running for the second user.

In yet additional examples, subsequent to making a determination of the mental and/or physical state of the user, additional analysis can be made related to shot performance. In other words, the accuracy of a shot can be evaluated against a determined state of the user. Shot accuracy can be determined in any suitable manner such as post analysis of shot location relative to a target. In other examples, the event detection module may receive feedback on shot location and subsequently evaluate shot performance based on the feedback. As such, further determinations can be inferred as to whether a reduction in shot accuracy is related to a user's state (e.g., poor shot accuracy following high user fatigue). Various correlations can be made associating shot accuracy with the state of the user firing the weapon. In additional examples, the sensors 118 can additionally include data from sensors 120 of wearable devices disclosed herein. In examples, the sensors 120 can be one or more biometric sensors that sense a biometric parameter of the user and send a biometric signal based on the sensed biometric parameter to the signal processing module 4430. The event detection module 4200 can determine the state of the user based on the biometric signal. Biometric feedback of the user (heartrate, temperature, etc.) can also be paired with the sensor output signal 4440 to add an additional layer of data analysis.

Returning now to FIGS. 58A and 58B, the algorithms provided in the signal processing module 4430 can make additional determinations based on the sample shot profile 4608B. The sample shot profile 4608 can represent actuation of a moving member in the firearm. By way of example, the moving member can include the bolt 4640 (FIG. 42A) from a bolt carrier group 4642 of the firearm or a slide 4644 on a handgun (FIG. 55). While the following discussion is directed generally to a bolt and bolt carrier group for a rifle the same principles can be applied to other moving components on other weapons.

The acceleration spike 4612B can represent the bolt 4640 moving from a ready position backwards when a round is initially fired (in a direction along the second axis Y, FIG. 55) and an acceleration spike 4650B can represent the bolt 4640 subsequently moving forward and returning into the ready position. In examples, the sample shot profile 4608B can represent a speed of the bolt carrier group 4642 during a discharge. By taking a large sample of multiple shots, a sample shot separation or spacing between subsequent shots for an automatic weapon can be determined and a resulting speed of the bolt carrier group 4642, and more specifically a rate of fire can be determined.

Figure 58C:
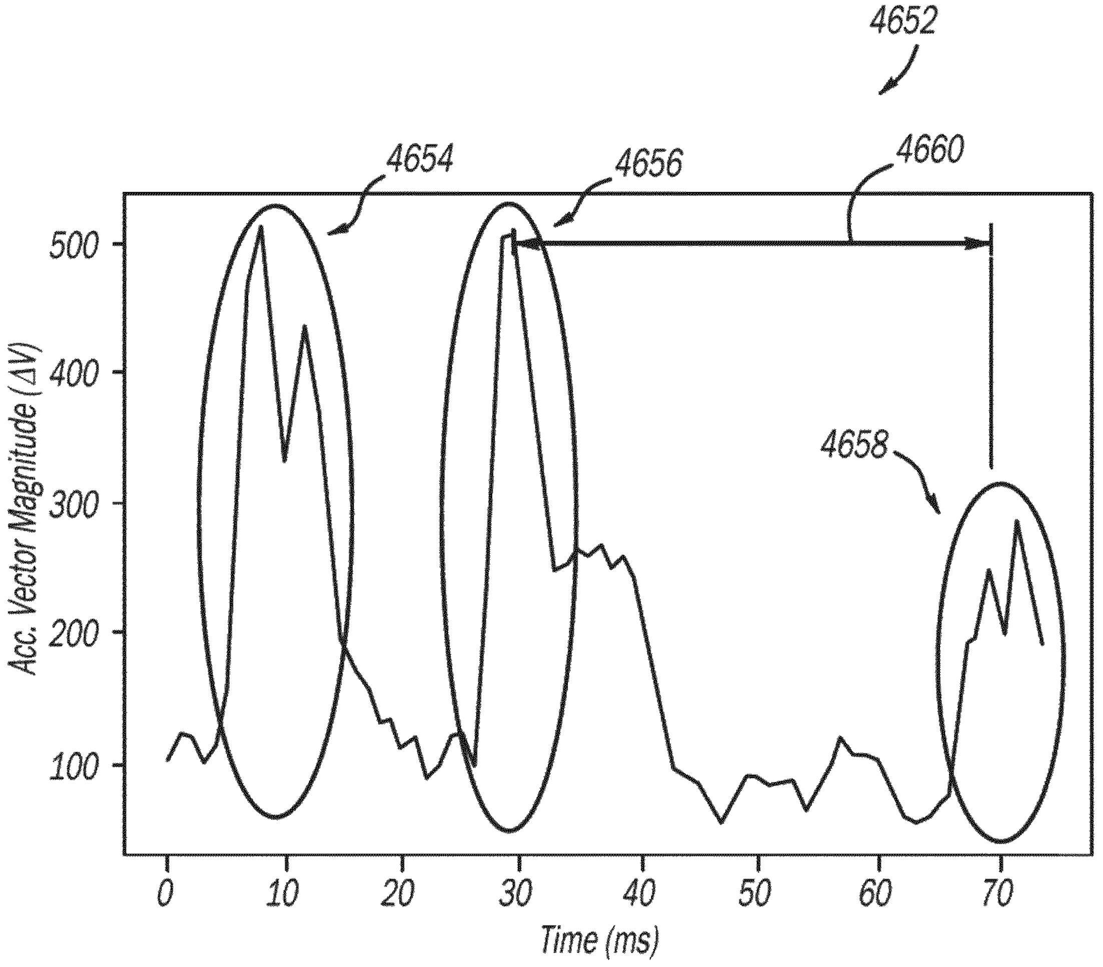
FIG. 58C is a plot illustrating a signal or sample shot profile over a time window having three identifiable acceleration peaks including a first peak, a second peak and a third peak 4658.

FIG. 58C illustrates a signal or sample shot profile 4652 over a time window having three identifiable acceleration peaks including a first peak 4654, a second peak 4656 and a third peak 4658. The first peak 4654 represents a shot fired event or when the shot is initially fired. The second peak 4656 represents the bolt to rear buffer event or when the bolt 4640 hits the back of the buffer 4643 (FIG. 42A). The third peak 4658 represents a bolt return event or when the bolt 4640 returns to the forward position. Explained further, the first peak 4654 represents an acceleration of the weapon measured by the sensors 118, in particular an acceleration along the A2 axis (FIG. 55) in a backwards direction (opposite a path of the bullet), caused by initial discharge of the bullet. The second peak 4656 represents an acceleration of the weapon measured by the sensors 118, in particular an acceleration along the A2 axis in a backward direction caused by the bolt 4640 engaging the back of the buffer 4643. The third peak 4658 represents an acceleration of the weapon measured by the sensors 118, in particular an acceleration along the A2 axis in a forward direction when the bolt 4640 returns to a forward, ready position.

A time between the second peak 4656 and the third peak 4658 represents bolt speed 4660. As can be appreciated, bolt speed 4660 is variable between shots and weapon platforms and is indicative of various weapon parameters such as gas pressure, part life and cycle speed. Such weapon parameters relate to an overall health of a weapon. The algorithms provided in the signal processing module 4430 can be trained with information that represents baseline bolt speed for any given weapon. In this regard, the machine learning and digital signal processing modules 4432 and 4434 can make comparisons of any shot profile, such as the shot profile 4652, with known/expected shot profiles and make determinations related to weapon health. For example, if a measured bolt speed 4660 is longer than an expected bolt speed (such as beyond a predetermined threshold time), the signal processing module 4430 can output an event classification signal 4450 indicative of an insufficient bolt speed that requires a maintenance action. In examples, a notification can be sent to the user 202 such as to a wearable device of the user 202 (e.g., the earpiece 222, the eyeglasses 224).

The algorithms provided in the signal processing module 4430 can make additional determinations related to weapon operational status based on the sample shot profile 4652. In particular, the signal processing module 4430 can determine an operational status of the firearm based on analysis of the first, second and third peaks 4654, 4656 and 4658. In some examples, the second and/or third peak 4656, 4658 may be missing or undetected from a sample shot profile 4652 indicating a failed weapon or failed shot operational status. In examples, the sample shot profile 4652 can be compared to a baseline shot profile representative of a properly functioning firearm. The baseline shot profile can include a first peak at a first time representing initial discharge of the firearm, a second peak at a second time representing a bolt engaging a rear buffer of the firearm, and a third peak representing the bolt returning to the forward position, as discussed above.

In one example, if the firearm is under gassed or not enough of the expanding gasses are passed back to the bolt assembly 4642, the rearward momentum of the bolt assembly 4642 is insufficient to overcome the pushback from friction and the buffer spring, so the bolt assembly 4642 never reaches the full rearward position. In such a scenario, the second peak 4656 is marginalized, absent entirely, or otherwise insufficient from the sample shot profile 4652. An event classification signal 4450 can be sent indicative of an undergassed weapon that requires a maintenance action. In examples, a notification can be sent to the user 202 such as to a wearable device of the user 202 (e.g., the earpiece 222, the eyeglasses 224).

In another example, if the last round in a magazine is discharged, the bolt 4640 can be jammed or lock to the rear at the buffer 4643. In this scenario, because the bolt assembly 4642 never returns to the forward, ready position, the third peak 4658 is insufficient or absent entirely. An event classification signal 4450 can be sent indicative of a jammed weapon that requires a maintenance action. In examples, a notification can be sent to the user 202 such as to a wearable device of the user 202 (e.g., the earpiece 222, the eyeglasses 224). Notably, absence of the third peak 4658 does not represent the absence of a discharge event as the third peak 4658 is not an inextricable trait of a shot event.

Figure 59A:
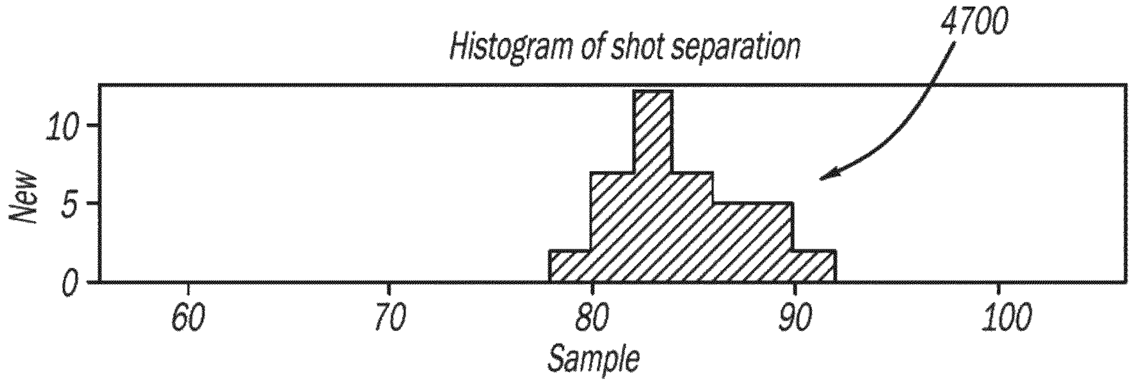
FIGS. 59A-59C illustrate histograms of shot separation for a new firearm, a medium firearm and an old firearm, respectively.
Figure 59B:
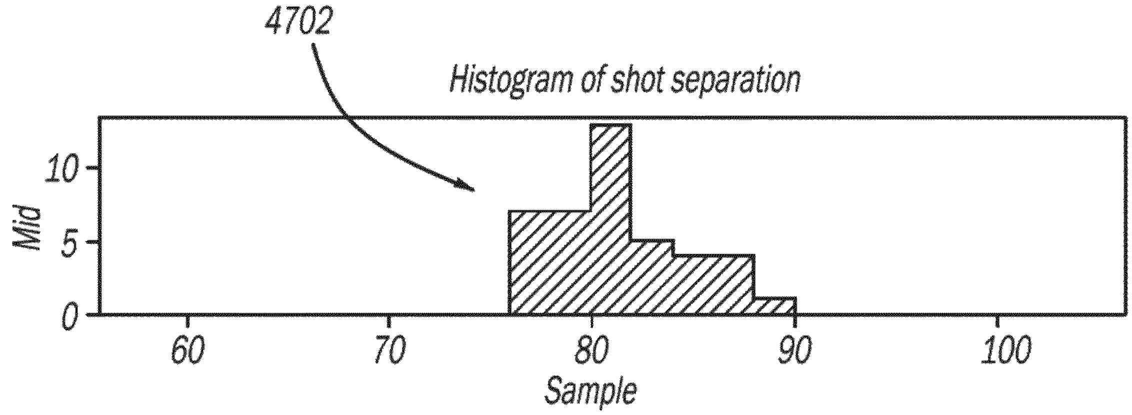
Figure 59C:
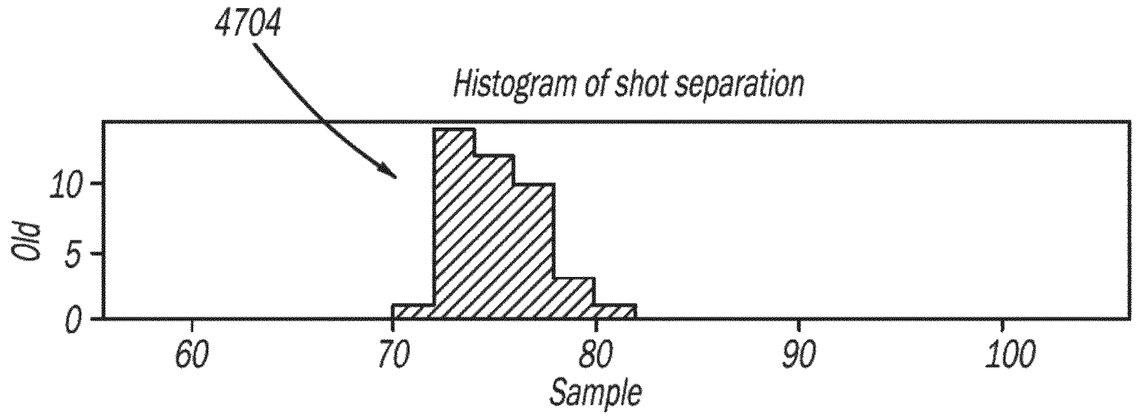

FIGS. 59A-59C represent baseline shot separations 4700, 4702 and 4704 for new, medium and old firearms, respectively. The algorithms in the signal processing module 4430 can have predefined ranges for shot counts consistent with shot counts indicative of a new firearm, a medium firearm and an old firearm.

As shown, as a firearm is used over its life, it will have a progressively faster rate of fire. In this way, a medium aged firearm will have a faster rate of fire compared to a new age firearm. Similarly, an old age firearm will have a faster rate of fire compared to a medium and new age firearm. As a fully automatic weapon ages and experiences more use, its rate of cycling through rounds becomes faster. Rate of fire can be used to track and monitor weapon performance. In FIGS. 59A-59C, an event window is 60 samples long meaning the shots cannot be less than 60 samples apart. The example shown is for an M4 rifle having a cycle rate of about 700-950 rounds per minute. At absolute maximum rate of 950 rounds per minute, each shot should take 63 milliseconds. As the samples are taken at 1125 Hz, 71 samples are represented. At minimum rate of acceptable fire, 96 samples are collected between rounds.

In examples, the algorithms in the signal processing module 4430 can compare the measured shot separation of a sample shot profile 4608B to the baseline shot separations 4700, 4702 and 4704 to determine an operational status of the firearm. In examples, a shot separation can be defined as a distance between like events in subsequent shots. In examples, a shot separation can be defined as a time between a first peak 4654 of the sample shot profile 4652 and a subsequent first peak of a subsequent sample shot profile. In additional examples, maintenance status can be determined. It is contemplated that any sample shot profile that is outside of an acceptable shot separation from any of the baseline shot separations 4700, 4702 and 4704 can be flagged for preventative maintenance (e.g., service and/or replacement of a component such as a barrel), or a determination can be made that the firearm has reached a target lifespan and needs to be replaced entirely. In examples, a preventative maintenance alert or message can be output by the event detection module 4200 with the event classification signal 4450 for consumption by the user. It is contemplated that such preventative maintenance steps can be conveyed in real time or post operation after an event has completed.

In other examples, the algorithms in the signal processing module 4430 can compare the measured shot separation of a sample shot profile 4608B to the baseline shot separations 4700, 4702 and 4704 to determine gas settings on a firearm. As is known, in a gas-operated rifle, a portion of high-pressure gas from the cartridge being fired is used to power a mechanism to dispose of the spent case and subsequently reload a new cartridge into the chamber. Improper gas settings can degrade the health and performance of a weapon. It is contemplated that any sample shot profile that is outside of an acceptable shot separation from any of the baseline shot separations 4700, 4702 and 4704 can be flagged for maintenance of the gas setting.

As mentioned above, the shot detection techniques can be further leveraged for subsequent training and performance analytics. The signal processing module 4430 can be configured as a shot timer for determining user performance such as split times between discharges. The split times can be used toward qualifying metrics for performance accuracy. In examples, split times from multiple users (law enforcement, military, etc.) having event detection modules 4200 configured on their firearm are determined and compared with each other. For example, in some instances, training exercises or drills can be carried out where participants may be all engaged concurrently.

Each event detection module 4200 detects discharge and split times on shots distributed across multiple users all engaged at once. In examples, the shot times can be aggregated for an entire squad participating in a particular drill. In other examples, the split times can be analyzed and compared to rank how each user of the squad is performing compared to other users of the squad in the drill. In further examples, split times can be linked to a set of scenario parameters (e.g., target location relative to shooter, shooter mobility between shots (a distance calculated between a first location the user is at when the first shot is detected and a second location the user is at when the second shot is detected), presence of other shooter). Conclusions may be made that may tie split times to the scenario parameters to determine whether a particular parameter or parameters may be influencing split times.

In traditional training settings where multiple individuals (police officers, soldiers, etc.) are participating concurrently it can be difficult to accurately access individual performance and make any correlations between results and a particular individual. An overall assessment can be made to compare how certain individuals are performing in comparison to other individuals participating in the same training exercise or drill. Additionally, an overall aggregated assessment can be made on a group (squad, a platoon, a company group etc.) as a whole whereby the collective performance of an entire group may be compared to another group conducting similar drills. Additional performance metrics beside split times can be determined by the event detection module 4200 using the shot detection techniques described herein. Such metrics can include transitions and elapsed time. Transitions can be a duration between shots on distinct targets. Elapsed time can be a time from a start signal and the final shot. A start signal can be input by one of the sensors 118 that detect an external signal indicative of a start of an event.

Figure 60:
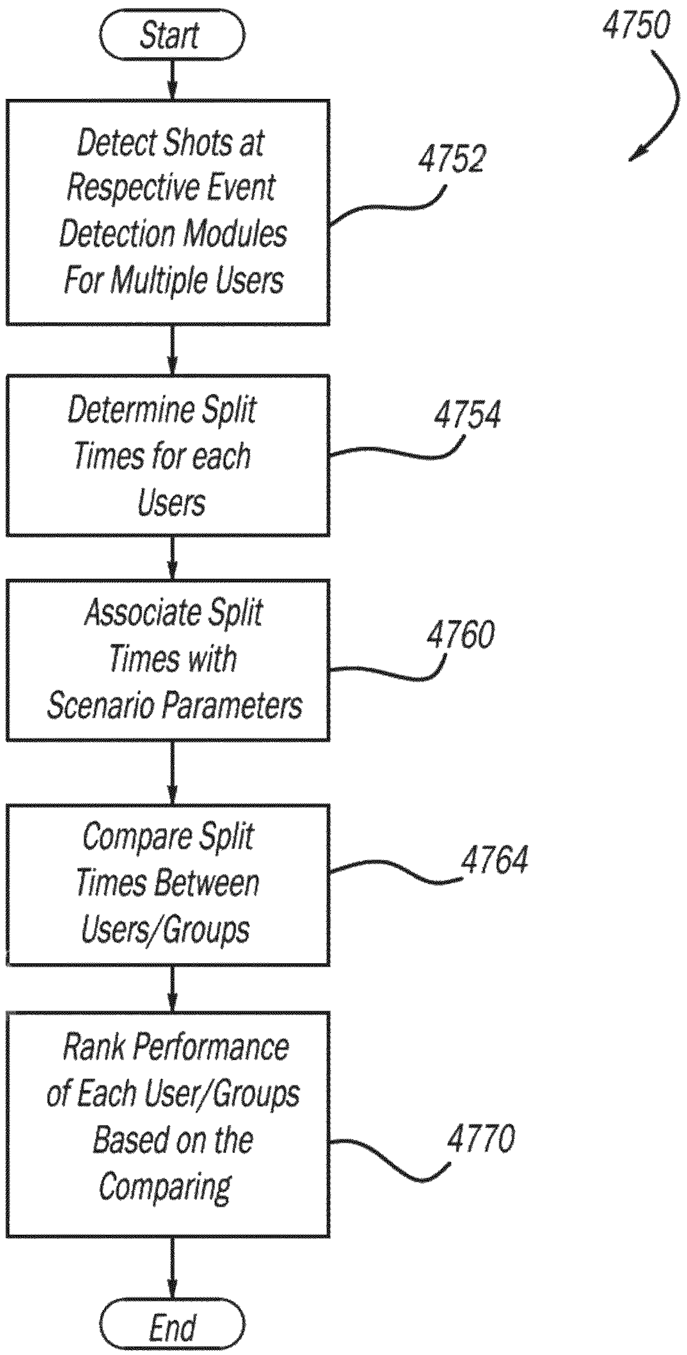
FIG. 60 is an example logic flow of a method of tracking a split time of a firearm.

Referring now to FIG. 60, an exemplary method determining performance metrics using the shot detection techniques of the event detection module 4200 is shown and generally identified at reference numeral 4750. At 4752, shots are detected at multiple event detection modules for multiple users. At 4754, split times are determined for each user based on a time lapse between subsequent shot detections of each user. In other words, for a single user, a first shot discharge is detected at a first time, a second shot discharge is detected at a second time and a difference in time is determined as a split time. This same strategy is carried out for multiple users in the event that comparisons between users and/or groups of users are being made. At 4760, split times are associated with various scenario parameters. By way of example, scenario parameters can include target location relative to shooter, shooter mobility between shots, and presence of another shooter. At 4764, split times are compared between users or groups of users. In examples, split times can be averaged by group and compared with corresponding split times averaged by other groups. At 4770, a performance score or ranking for each user or group is determined based on the comparing. In examples, split times determined for various event detection modules can be communicated to each other where comparisons are determined. In other examples, split times can be communicated wirelessly to the network 114 where application 102 can execute and output the calculations and comparisons/rankings.

Figure 61:
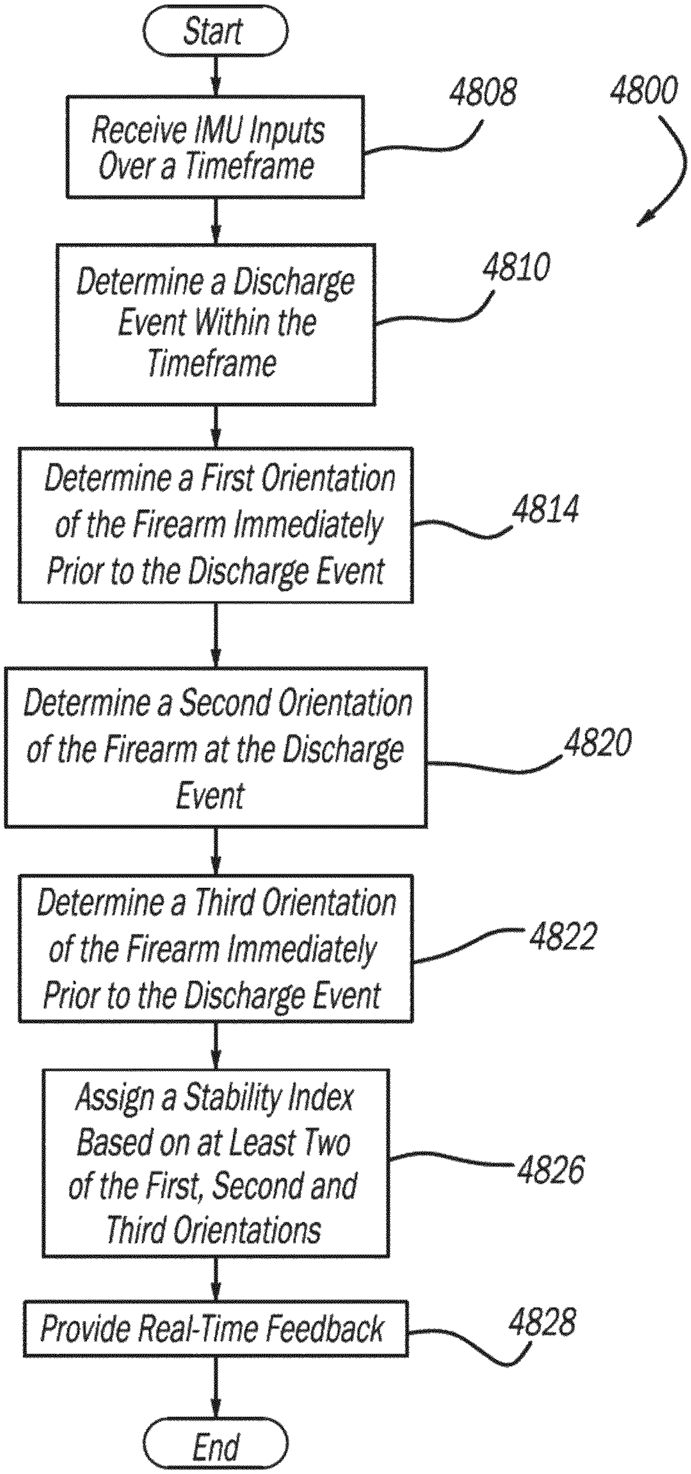
FIG. 61 is an example logic flow of a method of tracking a stability of a firearm during a discharge event.

In additional examples, a stability index can be determined based on a user's weapon orientation before, at, and subsequent to discharge detection. With additional reference to FIG. 61, a method of tracking a stability of a firearm during a discharge event is shown generally at reference numeral 4800. At 4808, the event detection module 4200 receives IMU inputs over a timeframe. At 4810, the event detection module 4200 determines a discharge event within the timeframe. Discharge detection may be determined by any of the methods described herein such as, but not limited to, the signal processing and machine learning algorithms associated with FIGS. 56A-58B.

A stability index can be determined based on how stable a shooter is holding the weapon immediately before and immediately after a shot. Weapon stability can be determined using the signals from the IMU including the rotation inputs R1, R2 and R3. As can be appreciated, a stability index can provide insight as to a user's ability to control weapon behavior surrounding a shot (recoil, etc.). A stability index has implications toward barrel tracing for a particular shot. Barrel tracing can be generally defined as a first orientation of a barrel (R1, R2, R3 inputs at the first time) immediately prior to pulling of the trigger compared with a second orientation of the barrel (R1, R2, R3 inputs at a second time) and immediately after pulling the trigger (R1, R2, R3 inputs at the third time). Insights can be made to determine how a user is anticipating a shot and reacting to a recoil subsequent to the shot being fired. In other words, barrel tracing can track the movement of the weapon in space at a timeframe taken from a first time immediately prior to a shot detection, at a second time at the instant of shot detection, to a third time immediately subsequent to a shot detection. At 4814, a first orientation of the firearm immediately prior to the discharge event is determined. At 4820, a second orientation of the firearm at the discharge event is determined. The orientation of the weapon at the first time (prior to discharge) can be compared to the orientation of the weapon at a second time (at discharge, also referred to as target or dead-center orientation). This first comparison can give insights as to how the user may be compensating weapon orientation anticipating the shot. At 4822, a third orientation of the firearm immediately after the discharge event is determined. The orientation of the weapon at the second time (at discharge) can be compared to the orientation of the weapon at a third time (after discharge). This second comparison can give insights as to how the user has reacted to a shot occurring. At 4826 a stability index is assigned based on at least two of the first, second and third orientations.

In examples, barrel tracking data can be converted into a number representing the stability index. The stability index can be a simple integer that is easily comparable between various weapon users. Furthermore, shot accuracy can be correlated to a corresponding stability index to make associations between the shot accuracy and the stability index. As can be appreciated, the IMU data may show a user with less control of their weapon leaning into a shot or undesirably compensating for a shot leading to a lower score stability index and a reduced shot accuracy. Real time feedback can be provided to the user at 4828.

Figure 29:
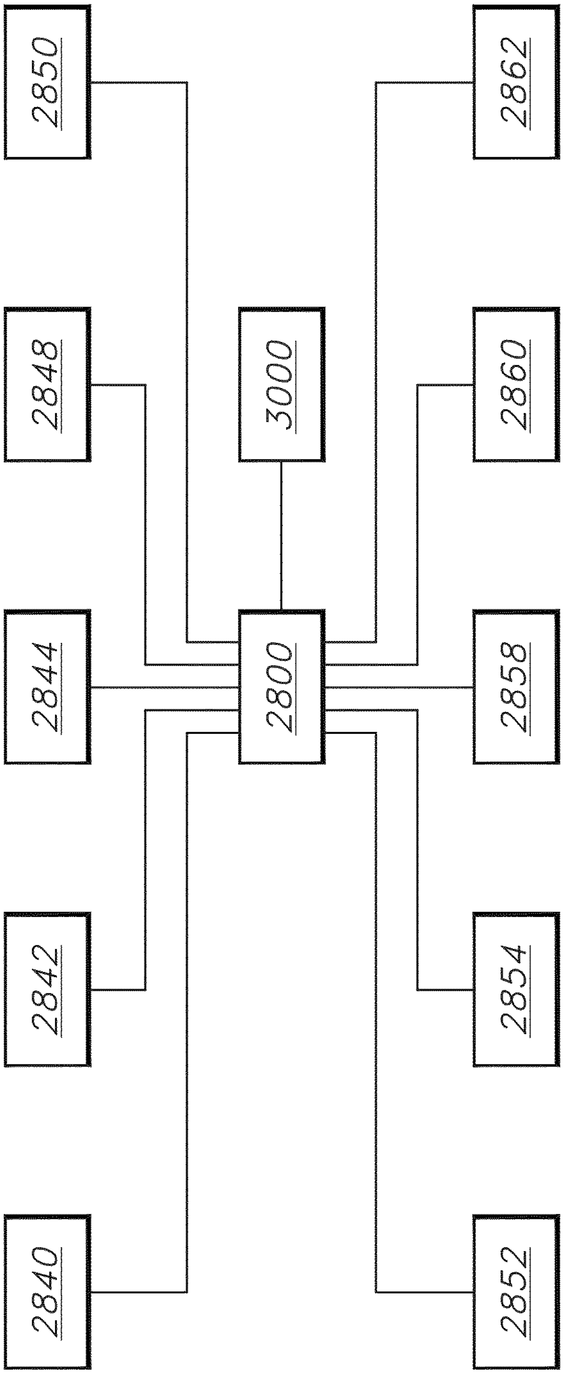

The event detection module 4200 can determine barrel tracing and a stability index using inputs from the sensors 118 including an IMU. For example, and as described above an IMU can provide first, second and third accelerations A1, A2 and A3, and rotations R1, R2 and R3, respectively (see also FIG. 55). Movement and orientation information of the barrel before, during and after pulling the trigger can be measured. Determinations can be made of how a user (law enforcement, soldier, etc.) is anticipating a shot (IMU measurements taken immediately prior to a shot detection) and how the user is reacting to the shot (IMU measurements taken immediately after a shot detection). This information can be communicated back to the user such as through the usage monitoring system 2800 (FIG. 29) including augmented reality (AR) or virtual reality (VR) headset or goggles (described in more detail herein). In this regard, real time updates can be provided in an integrated visual display that would show exactly how and to what degree the user is moving (leaning, etc.) that may adversely impact stability before or after a shot. Using this information and feedback can allow for subsequent and quick correction and improvement of lethality metrics. In particular, by providing real-time feedback to the user, a user can make corrections immediately upon learning of their barrel tracking data. In this regard, corrections can be implemented immediately, such as after one to ten shots rather than after an entire training exercise or other mission where more than ten, or hundreds of shots have been fired. Corrections can therefore be implemented by the user in real-time improving shot accuracy and lethality metrics as a whole.

It is contemplated that orientation data for a particular user can be tracked over time and be used in various algorithms at the machine learning module 4432 or digital signal processing module 4434 to establish user profiles and tendencies as they relate to performance evaluation. In examples, a historical baseline stability index of a particular user can be established based on collected historical stability index information about the first user. Progress of shot tendencies can be tracked to give the user an understanding of performance improvement (or decline). In other words, a particular user can have plurality of historical shot data stored at the signal processing module 4430 where the machine learning module 4432 can establish a baseline of that user. In this regard, any subsequent shot can be compared to a user's established historical baseline performance to determine how the evaluated shot compares to a user's typical (baseline) shot. In examples, more tailored recommendations can be made specific to a particular user rather than an evaluation that could otherwise yield a generic predetermined recommendation based on a large database of other shooters. Such comparisons can be displayed to the user in real-time or post mission during subsequent analysis.

Recommendations can include any suggested action that may improve weapon stability. For example, signal analysis may reveal that a user is tipping the barrel of the weapon downward just before shot detection. A recommendation may be made to level the barrel prior to pulling the trigger. Similarly, a signal analysis may reveal that the barrel of the weapon is tipping upward just after shot detection. A recommendation may be made to hold the weapon steadier to compensate for recoil. As is known, allowing the weapon to rotate upwardly due to recoil can have adverse consequences such as, but not limited to, an inability to be ready for a subsequent shot. Recommendations can be communicated (video, audio, haptics) to a user such as at the usage monitoring system 2800 including audio and visual headsets, computer displays, etc. In examples, live recommendations can be communicated as recommendations (for example displayed on an AR/VR display 5400 disclosed herein with respect to FIG. 70) to the user during use (such as a training exercise). By making real-time feedback and/or suggestions a user can quickly make adjustments to improve any performance or lethality metrics. In additional examples, the systems described herein can be configured to communicate a shot metric related to shot accuracy. In one example, smart targets can be included that provide feedback of shot accuracy. Smart targets can have sensors that determine a location of a discharge on the target (e.g., impact location of the projectile). Other smart targets can be configured to utilize computer visual analysis (such as on a paper target) to determine location of projectile impact and correlate the determined impact location with an accuracy metric. In examples, the smart targets can communicate a shot accuracy metric signal based on an accuracy of the shot wirelessly (Bluetooth, Wi-Fi, etc.) to an event detection module 4200.

It is contemplated that any user feedback related to any performance metric may additionally include information related to where the shot went relative to a target. Such results may be incorporated in any real-time feedback examples or subsequent review such as on a computer display. In other examples, an image can be taken of holes on a paper target that has been shot through during a training exercise. The holes can be identified such as by computer imaging processes. In examples, the image can be pushed to the network 114 where calculations and analysis can take place such as at application 102. Distances between a central target and the holes can be measured to comparatively assess shot accuracy. In still other arrangements, by using the accelerations and rotations from the IMU, and various environmental conditions, the signal processing module 4430 can calculate a projected bullet ("virtual bullet") path and destination. In examples where indoor shooting exercises are carried out UWB emitters 4730 cooperating with the sensors 4720 and 4722 can provide precise weapon orientation whereby bullet trajectory and final destination can be estimated. It is contemplated that many variables can be included for the environmental conditions that may impact bullet trajectory and destination. Furthermore, it is contemplated that a projected bullet path and destination can be estimated based on either live fire or blanks.

Shot accuracy can be communicated back to the user to assess performance. In this regard, the techniques described herein can determine performance metrics such as split times, barrel tracing and stability indexes. These performance metrics can be mapped to shot accuracy metrics to provide a full picture of how such performance metrics may influence shot accuracy.

Figure 62:
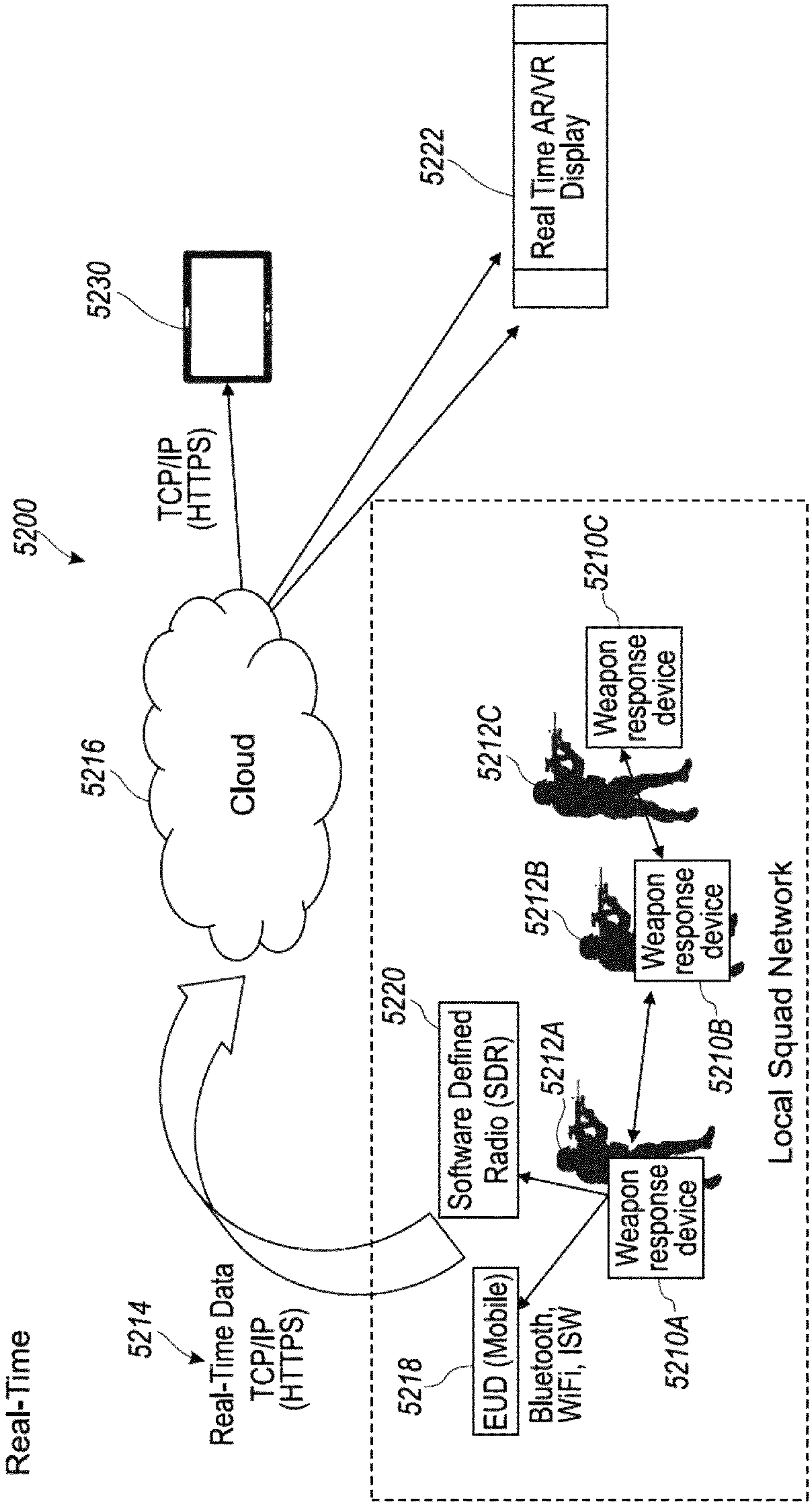
FIGS. 62, 63, and 64 depict real-time data processing of weapon response device data from a deployment location.

Referring to FIG. 62, a weapon usage monitoring system according to additional embodiments is shown and generally identified at reference numeral 5200. The weapon usage monitoring system 5200 generally includes various weapon response devices associated with users or soldiers. As used herein "weapon response device" can include at least the event detection module 4200 described above. In the example shown, a first weapon response device 5210A is associated with a first user or soldier 5212A, a second weapon response device 5210B is associated with a second user or soldier 5212B and a third weapon response device 5210C is associated with a third user or soldier 5212C. It will be appreciated that fewer or additional weapon response devices may be provided with whatever quantity of users is necessary. In embodiments, each weapon response device may produce a weapon heading, discharge detection, and/or a gesture detection based on at least an IMU/motion sensor as described herein. Weapon response data 5214 associated with all of the weapon response devices 5210A, 5210B and 5210C can be communicated to the cloud 5216 in real time through a communication device or network hub (such as an EUD 5218 or software defined radio (SDR) 5220) such as by Transmission Control Protocol/Internet Protocol (TCP/IP). It is appreciated that the network hub (SDR 5220) can communicate by any suitable method. As used herein the cloud 5216 can be a cloud based computing interface device that can aggregate and interpret weapon response data. A weapon response device may be 'local' (~2 m) to the area register with each other via intra-soldier wireless (ISW) handshake authentication. A weapon response device may communicate user and weapon data to other registered weapon response devices in the area via ISW. Weapon response device measurements may be pushed to local visualizations 5222 (e.g., AR/VR or EUD) or to the cloud 5216 through a single TX point such as an SDR or EUD (mobile phone) 5218. Additionally or alternatively, the user and weapon data may be communicated to a secondary device 5230 by way of TCP/IP. In examples, the secondary device 5230 can aggregate the weapon response device data from the respective weapon response devices 5210A, 5210B and 5210C.

In examples, the AR/VR display 5222 can be a wearable device that a user in the field (soldier or other field personnel) can visualize actions (and/or directional engagement information from other soldiers) from the weapon data. In some embodiments a user wearing such AR/VR display 5222 can see through obstacles (walls, etc.) to understand the layout of a room or space (e.g., including potential enemies and threats). The firings of rounds of weapons will be viewable by the AR/VR display. It is further contemplated that such scenarios may be used in training exercises to simulate various battle circumstances.

Figure 63:
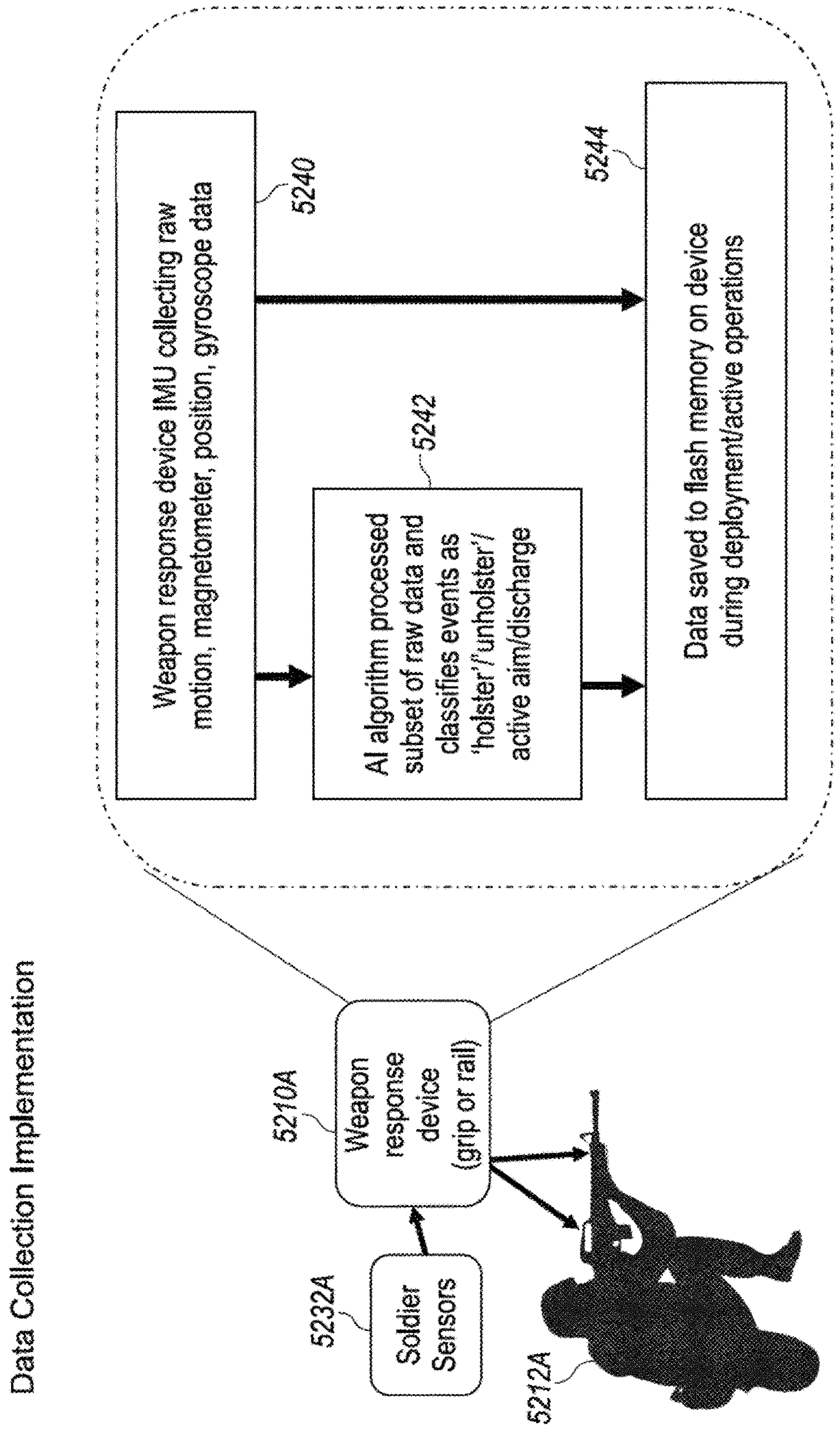
Figure 64:
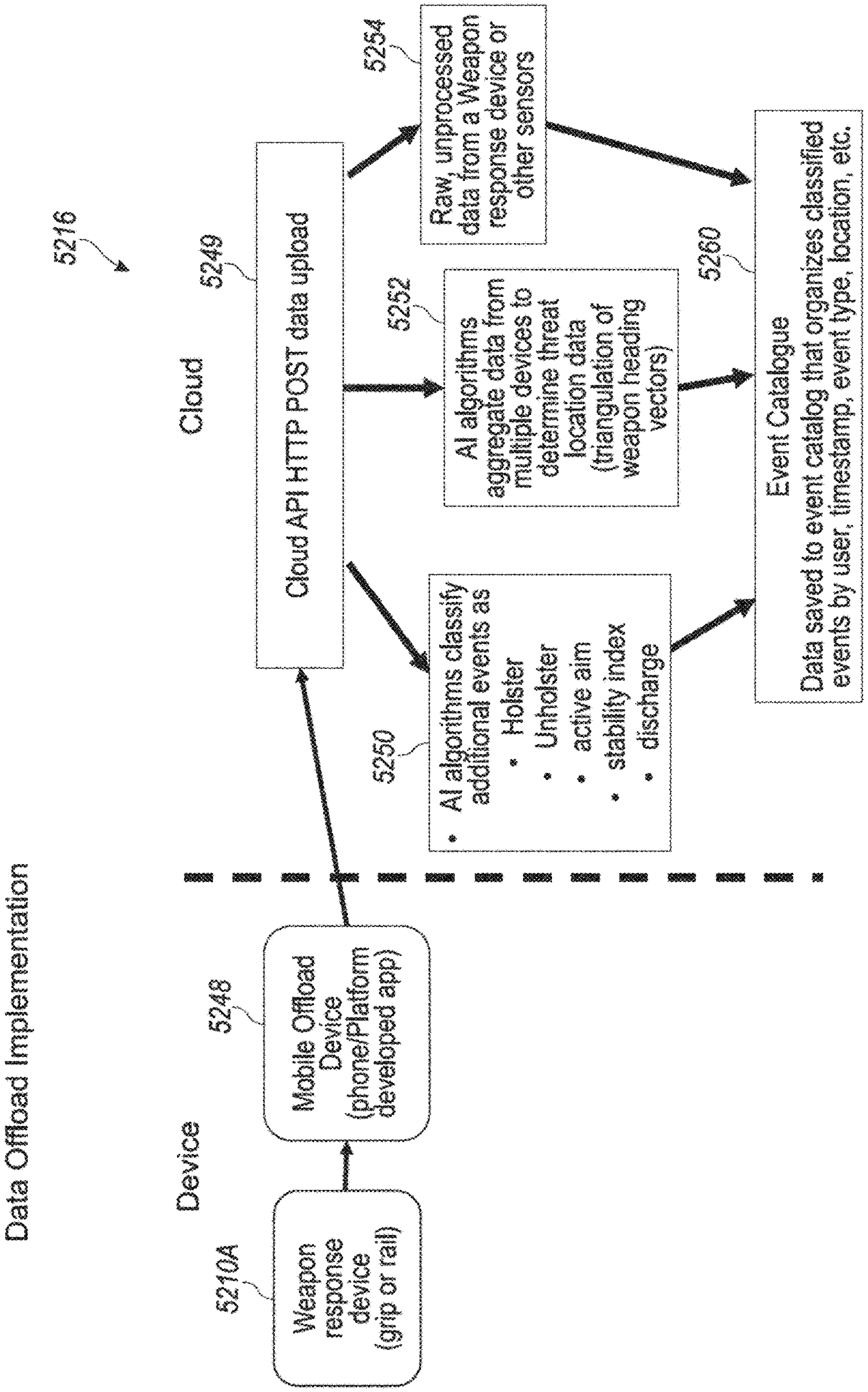
Figure 65:
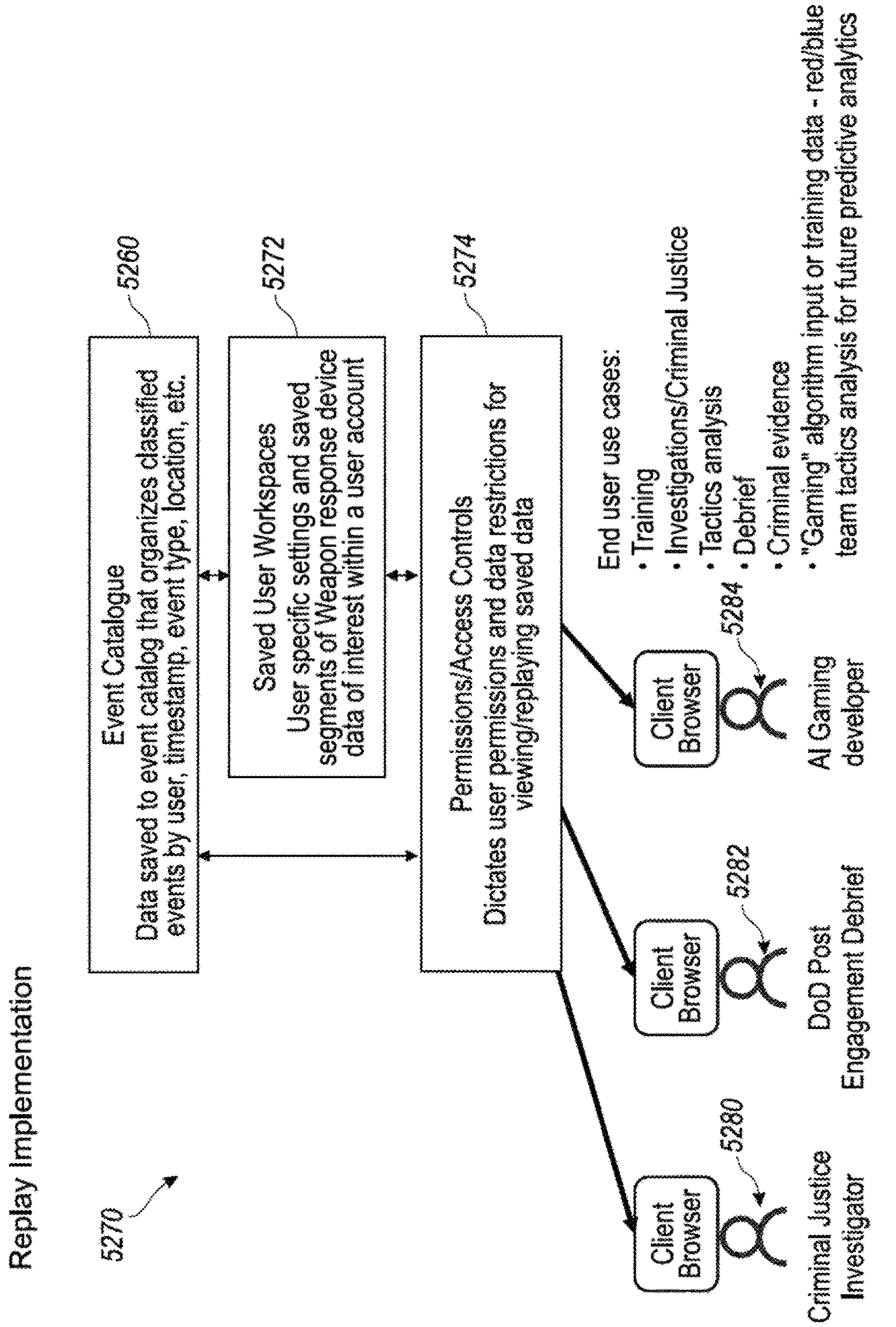
FIGS. 65 and 66 depict the replaying of weapon response device data from a deployment location.

Referring to FIGS. 63-65, in embodiments a weapon response device sensor 5232A of the weapon response device 5210A may be integrated into the grip or rail of a rifle, or the grip of a pistol (e.g., a Glock 17/22), or some other weapon location. While one weapon response device sensor 5232A is shown associated with the weapon response device 5210A used by the soldier 5212A, it will be appreciated that all weapon response devices disclosed herein will include an associated sensor. A weapon response device sensor 5232A may collect time-series IMU data 5240 from a weapon's usage. IMU data may be saved as raw data as well as processed 'events' that are classified, for example, by AI algorithms 5242 on hardware. Data 5244 may be saved in flash memory on the weapon response device, with no RF broadcasted and no network connection required. Data may be batch offloaded back at a central location, such as an armory/headquarters via Bluetooth connection to a mobile device 5248, which may upload to the cloud 5216 such as by way of a cloud API HTTP POST data upload 5249. Data may be reviewed by an end user, for example, via a web browser to 'recreate/replay' the engagement from the collected/recorded data. Backends and user interfaces may be designed for large scale engagements (e.g., 60+ users of viewable data). In examples, at 5250, AI algorithms classify additional events as holster, unholster, active aim, stability index and discharge. At 5252, AI algorithms aggregate data from multiple devices to determine threat location data (triangulation of weapon heading vectors). At 5254, raw, unprocessed data from a weapon response device or other sensors is collated. At 5260 an event catalogue is produced. The event catalogue can include data saved to event catalog that organizes classified events by user, timestamp, event type, location, etc.

Referring to FIG. 65, an exemplary replay implementation system and method according to various embodiments is shown and generally identified at reference numeral 5270. A saved user workspaces module 5272 can include user specific settings and saved segments of weapon response device data of interest within a user account. A permissions and access controls module 5274 can dictate user permissions and data restrictions for viewing and replaying saved data. Various end users are contemplated such as a criminal justice investigator 5280, a department of defense engagement personnel 5282 and an AI gaming developer 5284. End user cases can include training, investigations for criminal justice, tactics analysis, debrief, criminal evidence, and gaming algorithm input or training data.

Figure 66:
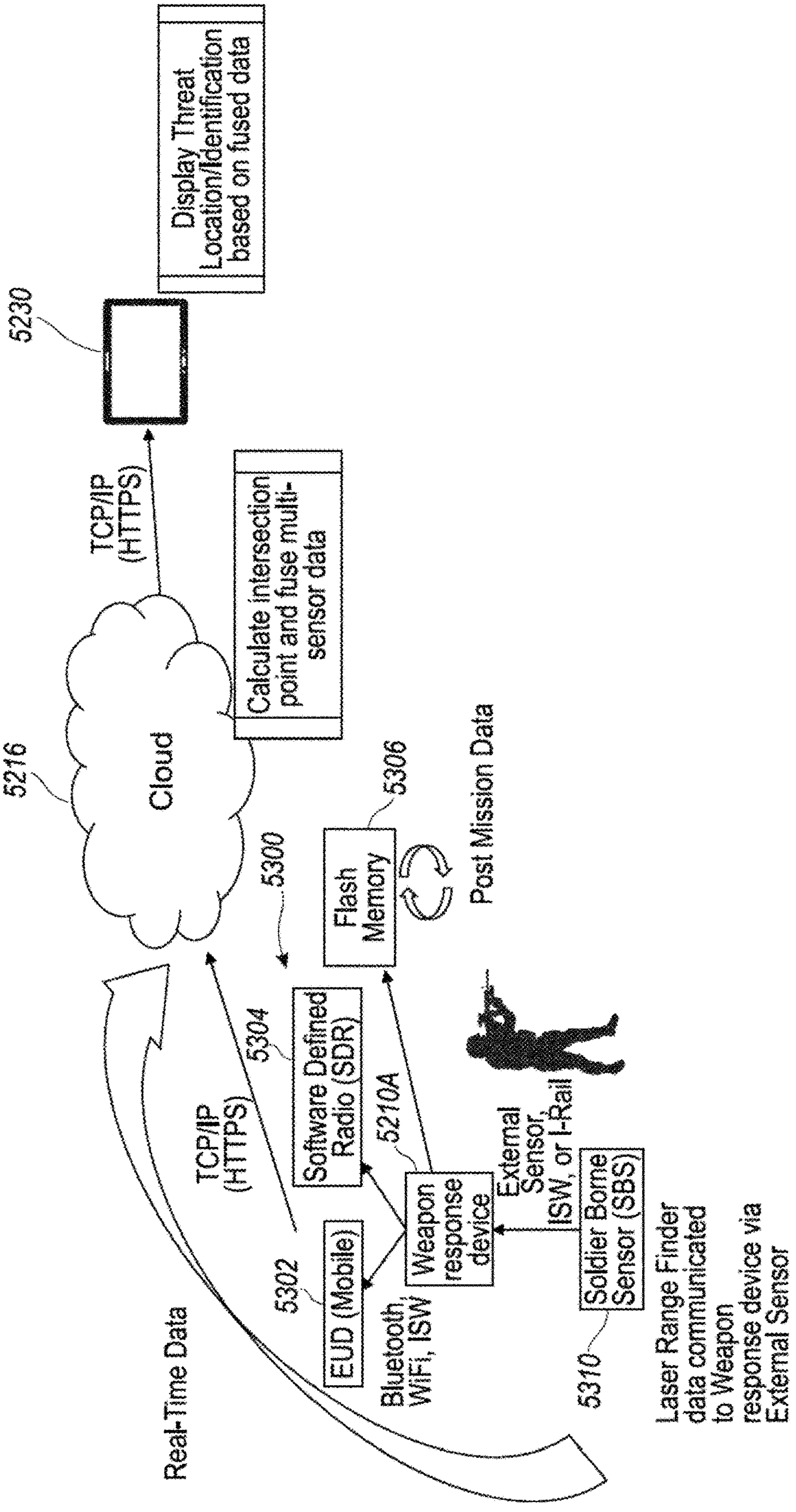

Referring to FIG. 66, in embodiments a weapon response device 5210A may implement STANAG 5740 and AEP-90 interface (Standard I-Rail™ interface), mounted on a TWORX™ I-Rail™. A weapon response device 5210A may produce weapon heading, discharge detection, gesture detection, or some other datum, based on, for example, IMU/motion sensor. Measurements may be pushed from the rail mounted weapon response device through an intermediate hop 5300 (e.g., Bluetooth/phone 5302, Intra-soldier wireless ISW/software defined radio (SDR) 5304, ISW/I-Rail™). Measurements may also be saved locally to the device, such as in flash memory 5306 in RF denied/sensitive environments. Weapon response device measurements (and other sensors, such as soldier borne sensor SBS 5310 that communicate to/through the weapon response device 5210A) may be pushed to the cloud 5216 (e.g., a cloud associated with the weapon usage monitoring system) for aggregation, analytics, or some other processing. Processed results may be pushed back to the mobile device 5230 or browser, or other facility, for viewing/reviewing in real-time, near-real time, and/or post-mission debrief.

Figure 67:
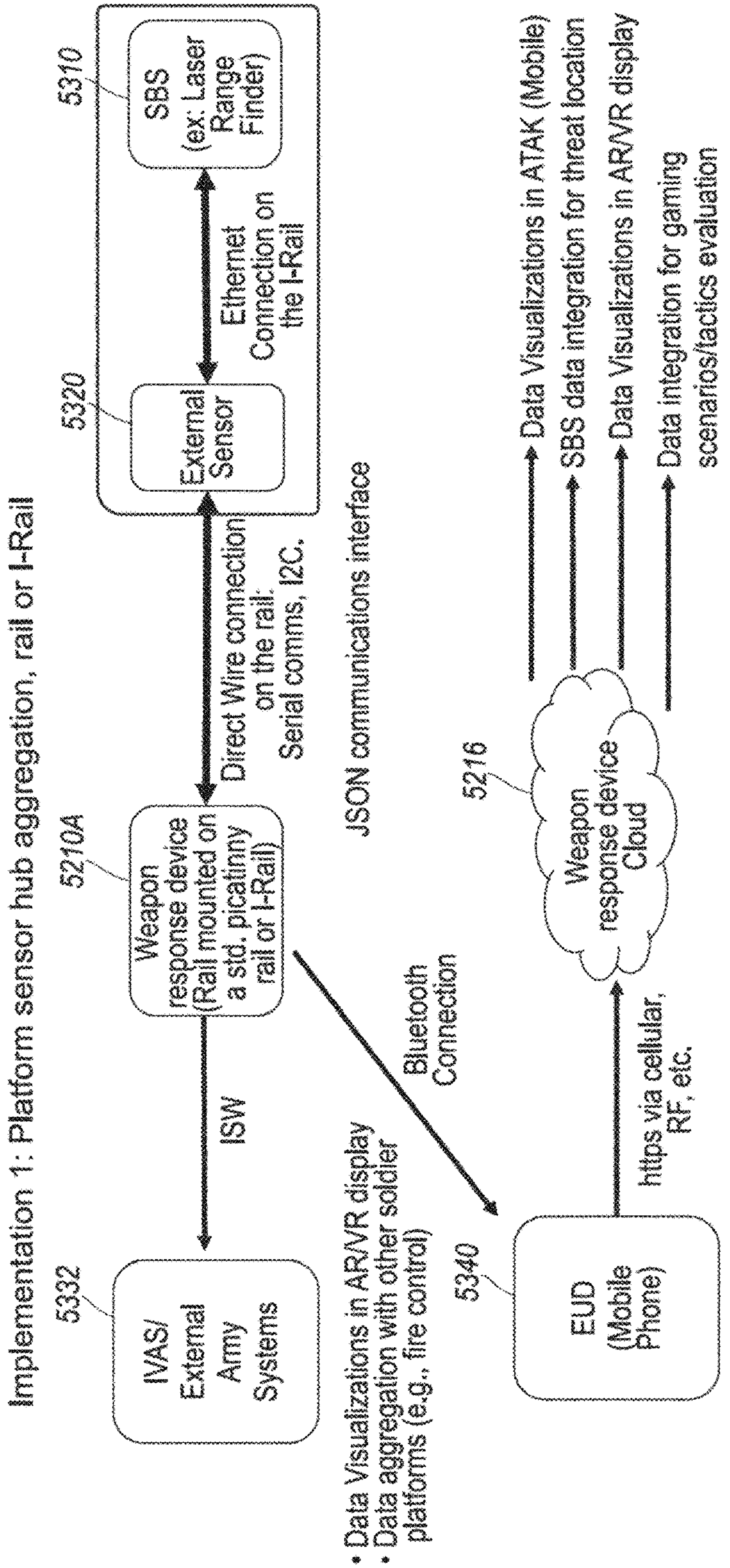
FIGS. 67 and 68 depict sensor hub aggregation within the weapon monitoring system.
Figure 68:
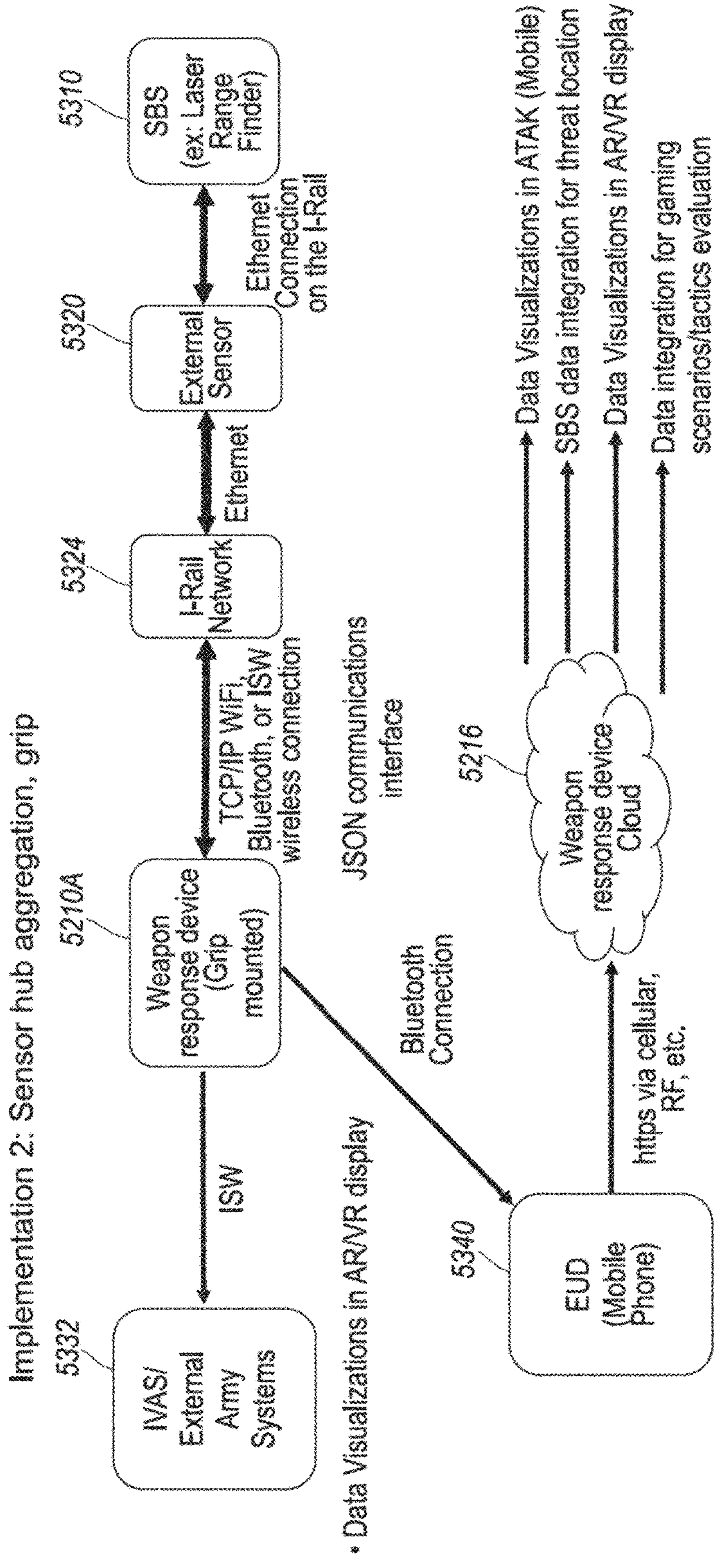

Referring to FIGS. 67 and 68, sensor hub aggregation examples are shown. FIG. 67 illustrates a first implementation including a platform sensor hub aggregation, rail or I-Rail™. FIG. 48 illustrates a second implementation including a grip mounted sensor hub aggregation. In embodiments soldier borne sensors (SBS) 5310 may send information to the external sensor 5320 such as a Rail Control Module (RCM) via ethernet, on the Intelligent Rail (I-Rail™)/Power Data Rail, and/or of some other type of power rail, data rail, or power/data rail combination. A weapon response device 5210A may interface with, for example, an external sensor 5320 (such as an RCM module) through at least one of the following methods: direct Connection via serial connection or data wire/I2C; I-Rail™ 5324 such as an I-Rail™ wired network connection via ethernet; I-Rail™ wireless network connection: through the I-Rail™ via ethernet, ISW, WIFI, or Bluetooth connection. The weapon response device 5210A may receive SBS information through the external sensor 5320 interface connection. The weapon response device 5210A may aggregate the additional SBS information into threat location modeling and data visualizations in ATAK or AR/VR. The weapon response device 5210A may pass additional SBS information to other intelligent systems on the soldier via ISW wireless link. The weapon response device 5210A can communicate measurements and/or data to an integrated visual augmentation system (IVAS) 5332. Further to the above examples, the IVAS 5332 can display information live metrics in real-time related to performance metrics including barrel tracing, stability index information, split times, ranking versus other individuals or squads, comparisons of recent shot activity to a user's own baseline shot profile. Additionally, the weapon response device 5210A can communicate measurements and/or data to an end user device EUD 5340, such as a mobile phone. The EUD 5340 can then communicate the measurements and/or data to the cloud 5216.

In embodiments, data relating to weapon heading and/or discharge from multiple users may be pushed to the cloud (e.g., a cloud associated with the firearm usage monitoring system). The intersection of multiple weapon heading vectors may be calculated in the cloud (e.g., a cloud associated with the weapon usage monitoring system). Additional sensor data may be fused with weapon heading vector intersection point for a combined multi-sensor fused solution. Error across a plurality of sensors and weapon heading(s) may be combined using filtering/sensor fusion to produce an estimated error ellipsis that contains the target. An intersection point may be provided through the cloud (e.g., a cloud associated with the weapon usage monitoring system) API to various visualizations.

Figure 69:
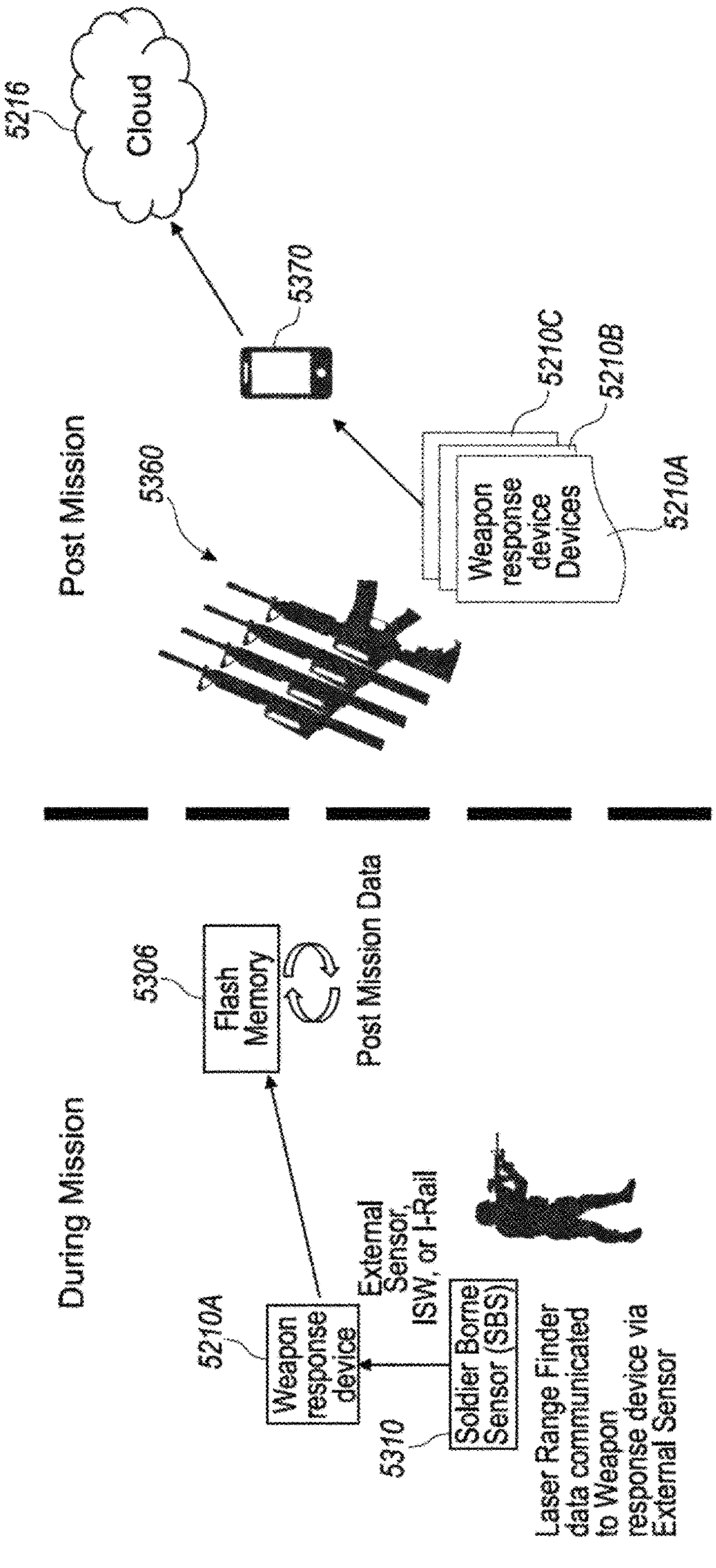
FIG. 69 depicts mission monitoring within the weapon monitoring system.
Figure 70:
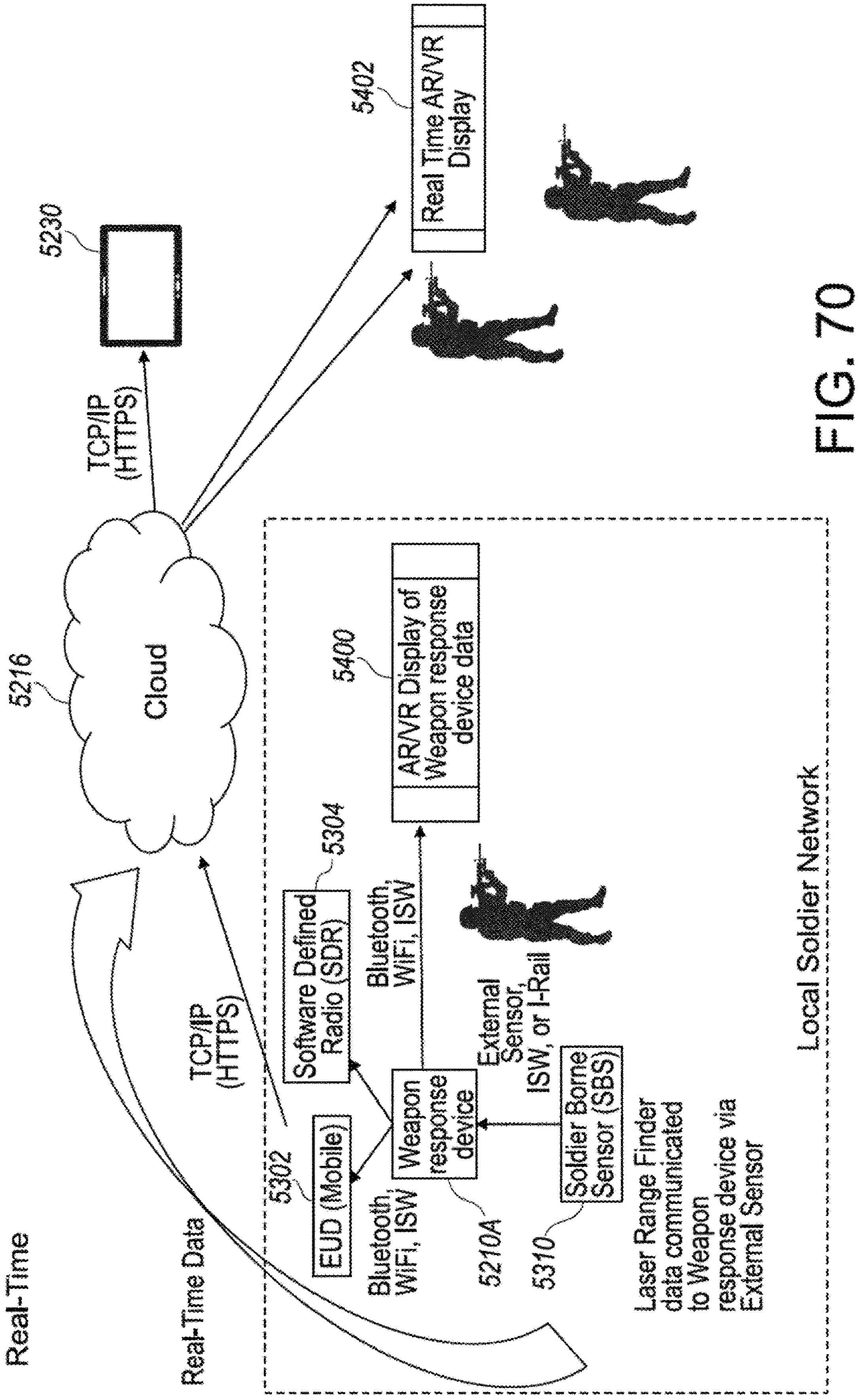
FIG. 70 depicts deployment of augmented reality and virtual reality systems within the weapon monitoring system.

Referring to FIGS. 69 and 70, in embodiments a weapon response device 5210A may produce weapon heading, discharge detection, gesture detection, or some other data, based at least in part on IMU/motion sensor. A weapon response device 5210A may be trained to recognize discharges vs. "false positives" such as malfunctions/explosions/dropping and the like as described herein. Measurements may be saved to flash memory 5306 local to the device. Power may be optimized to survive long time periods (e.g., 60 days; 72 hours with GPS) in certain configurations. Upon return to a central location 5360, such as an armory, the weapon/weapon response device (such as weapon response devices 5210A, 5210B, and 5210C) may be 'checked-in' and scanned. Scanning may offload all saved information on the respective weapon response devices 5210A, 5210B and 5210C. Data may be used for training, replay, simulation, weapons maintenance, or some other purpose. In examples, the data may be offloaded onto a personal computing device 5370 and uploaded to the cloud 5216.

Figure 71:
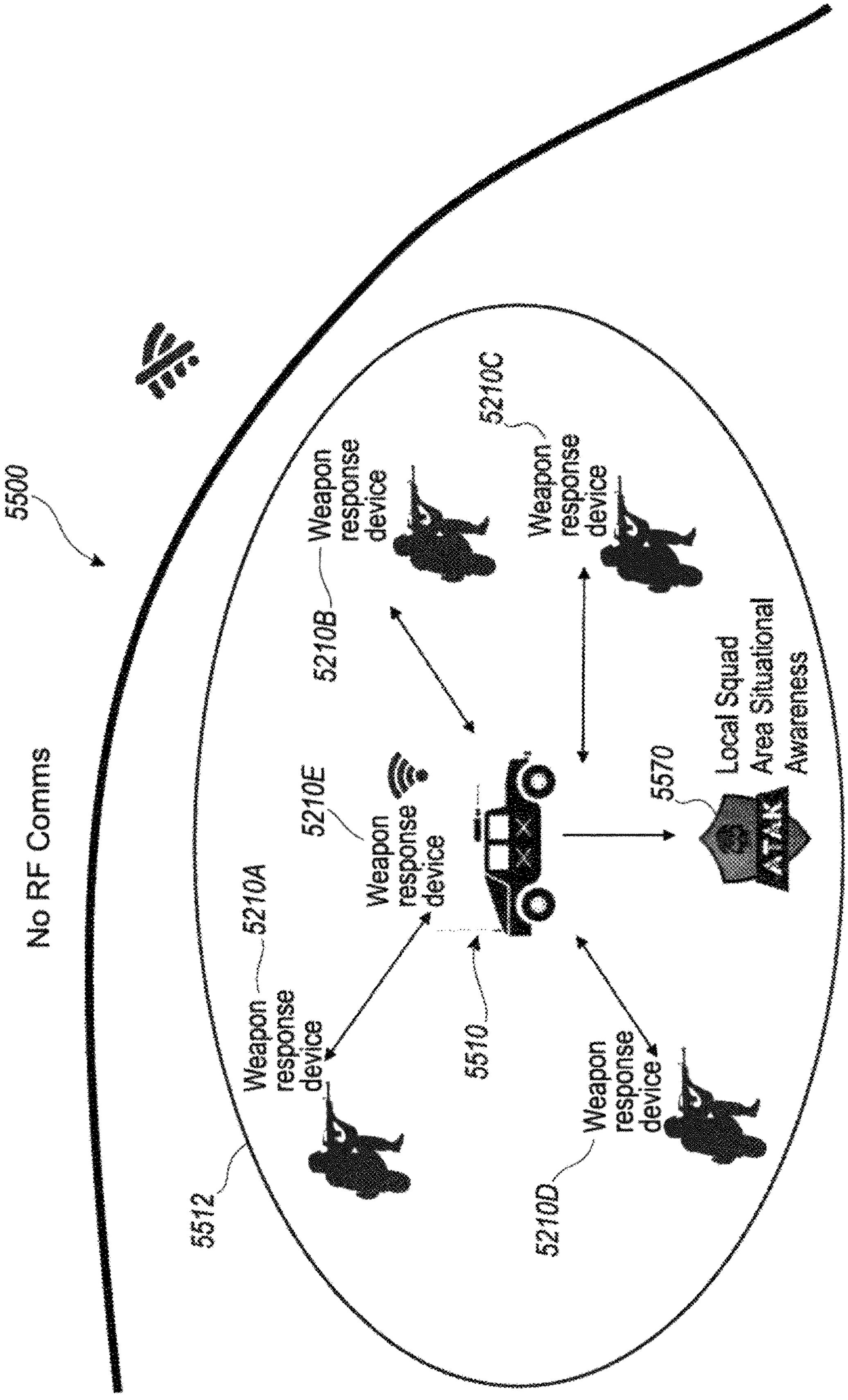
FIG. 71 depicts an example of a disconnected networking solution that provides near-real time situational awareness data on a local area network.
Figure 72:
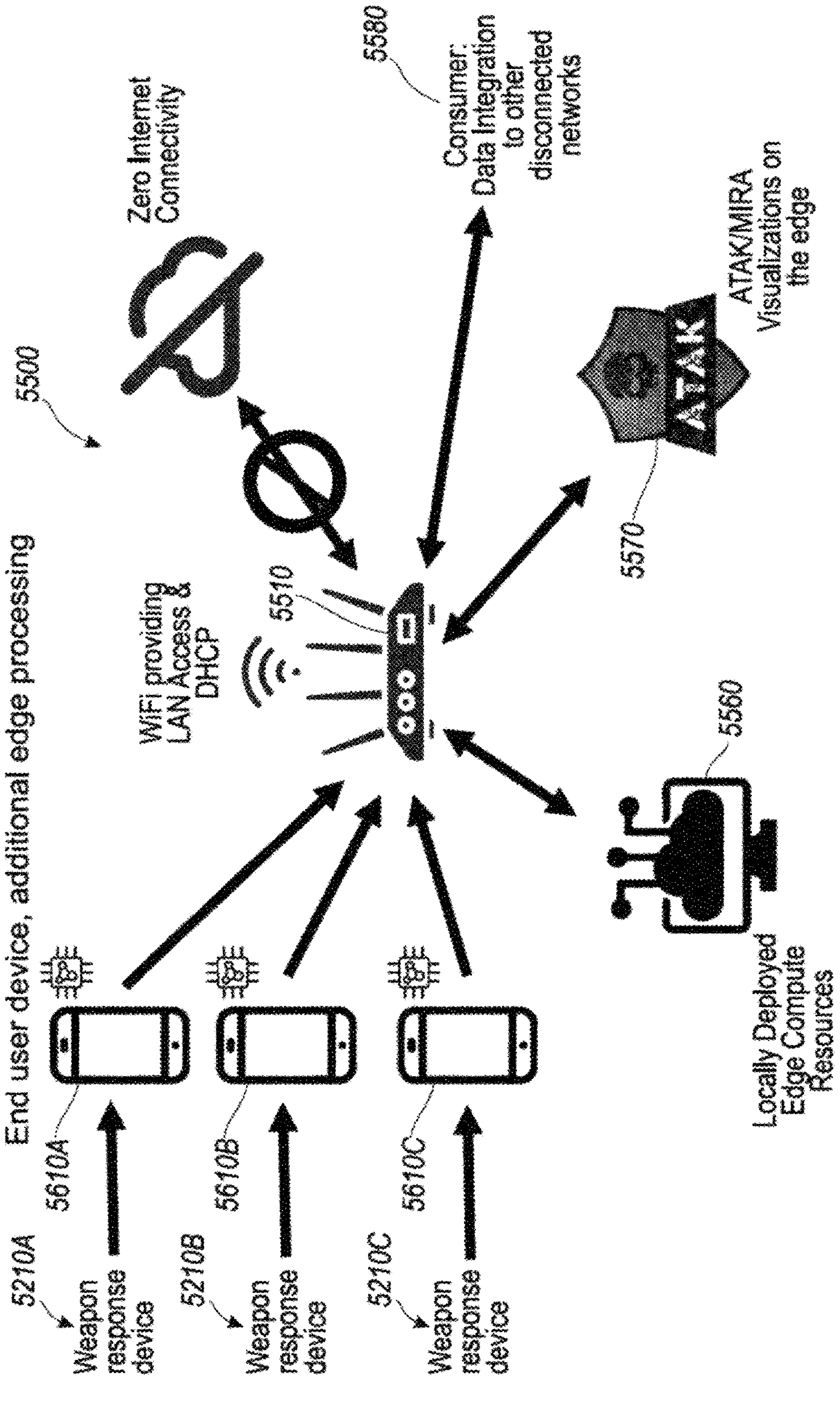
FIG. 72 depicts an example of an edge networking system providing situational awareness of deployed assets in communication with edge computing resources.

Referring to FIGS. 70 and 71, in embodiments a weapon response device 5210A may produce weapon heading, discharge detection, gesture detection, or some other data, based on an IMU/motion sensor. Measurements may be pushed from the rail mounted weapon response device through an intermediate hop (Bluetooth/phone, ISW/software defined radio, ISW/I-Rail™). Measurements may also be saved locally to the device in RF denied/sensitive environments. Weapon response device measurements (and other sensors that communicate to/through the weapon response device) may be pushed to the cloud 5216 (e.g., a cloud associated with the weapon usage monitoring system 5200) for aggregation or analytics in either real time, near real-time or post mission during, for example, a batch offload process that may be initiated by the user.

In additional examples, the event detection module 4200 (FIG. 54C) of the weapon response device 5210A can be configured to include a tipping signal with the event classification signal 4450. A tipping signal or notification can be used to tip-off or alert other infrastructure or systems (e.g., other resources such as orbital resources including a satellite, UAV or other manned aircraft, etc.) to perform a response or an action based on an input received by the sensors 118 (acceleration and rotation signals generated from IMU's as discussed herein). In this regard, the event classification signal 4450 acting as a tipping signal can be indicative of any operational status of the firearm as discussed herein such as shot detection, weapon heading, threat detection, soldier health status, etc.

To this end, the tipping signal 4450 may be pushed to the cloud 5216 for aggregation in real time where a responsive action from the responsive infrastructure 110 (FIG. 1) can be initiated (e.g., a UAV deployed to the deployment location such as to provide enemy engagement support and/or replenish ammunition and/or replenish manpower) based on receipt of the tipping signal. As discussed further herein, the tipping signal 4450 can be received initially by a Local Area Network (LAN) 5512 provided by the mobile networking hub 5510 (e.g., a Wi-Fi router) or a user-provided short- to mid-range network when direct communication with the cloud is unavailable. The tipping signal 4450 can be any operational status event of the firearm such as, but not limited to, a discharge event.

The UAVs or other aircraft may be configured to drop ammunition re-supplies within the deployment location, for example, in response to the tipping signal 4450 and/or the application 102 determining that current ammunition supplies of one or more users of firearms 104 are running low or depleted before, during, or after an engagement with a detected threat. In another example, response infrastructure 110 may be or include transport vehicles used to transport reinforcements within the deployment location, for example, in response to application 102 determining that additional manpower is required or would be beneficial for engaging the detected threat based in part by the tipping signal 4450.

In embodiments, response infrastructure 110 may refer to components, assets, or other matter rather than to specific infrastructure used to transport or otherwise deploy those components, assets, or other matter within the deployment location. For example, response infrastructure 110 may refer to firearms, ammunition, medical equipment, or other assets which can be deployed using a UAV, another aircraft, or another delivery mechanism. In embodiments, response infrastructure 110 may refer to locations, components, assets, or other matter which may not travel to the deployment location. For example, response infrastructure 110 may include or otherwise refer to one or more locations at which asset inventories (e.g., firearm, ammunition, medical, or other inventory stocks) are stored and/or to hardware or other machinery or assets at those locations.

In additional examples, the weapon response device measurements can be communicated to the soldier by way of augmented reality/virtual reality (AR/VR) 5400. Weapon response device data from a plurality of users may be visualized for: individual users for real time feedback and situational awareness (e.g., round count, friendly location, weapon heading, and the like); and weapon response device data may be captured and provided back to a user in augmented reality/virtual reality (AR/VR) 5402 for training, simulation of scenarios, or some other purpose.

In embodiments, a weapon usage monitoring system 5500 may include a weapon response device that is deployed to a variety of environments with a plurality of RF characteristics, requirements, and profiles. In the example shown in FIG. 71, weapon response devices 5212A, 5212B, 5212C, 5212D and 5212E are illustrated in an environment without internet connectivity. A mobile networking hub 5510 provides a local area network 5512. Each of the weapon response devices 5212A, 5212B, 5212C, 5212D are configured to communicate respective weapon response data (such as described above) to the mobile networking hub 5510. In embodiments, long range RF communications that provide connectivity to the general cloud or internet might not be feasible, possible, or are not desirable in certain deployment conditions. In cases such as these, the weapon usage monitoring system 5500, as described herein, may provide a disconnected networking solution that provides near-real time situational awareness data on a local area network with no internet connectivity required. This network may provide communications within a squad or within a local area network via mid- or short-range network communications, allowing streaming data from weapon response device sensors, as described herein, to be processed and consumed on air-gapped or disconnected networks with no internet connectivity, as shown in FIG. 71.

In embodiments, a weapon usage monitoring system 5500 may include a weapon response device such as any of the weapon response devices 5212A, 5212B, 5212C, 5212D that is within the grip of a weapon, the picatinny (or similar) rail, or the power data rail of a weapon. The weapon response device may collect data from the IMU, or other sensor, and provide machine learning classifications of the data running locally on the weapon response device. Classified events, as well as the full data stream, may be pushed via Bluetooth, ISW, or similar wireless format to an end user device such as respective end user devices 5610A, 5610B and 5610C. The end user device can be a mobile phone, or other client device, paired with the weapon response device, for example in a 1:1 mapping. The mobile phone, mobile computing device, or other client device may run additional services that ingest this data. The services running on the mobile phone or other client device may process the data and produce additional machine learning event classifications from the data that may have been too computationally intensive to run on the weapon response device itself locally.

In embodiments, events that were provided by the weapon usage monitoring system's machine learning algorithms running on the weapon response device and the end user device may be combined with the raw IMU, or other sensor data produced by the weapon response device and pushed onto the Local Area Network (LAN) 5512 provided by the mobile networking hub 5510 (e.g., a Wi-Fi router) or a user-provided short- to mid-range network. The mobile networking hub 5510 may travel with a squad of users, and may be deployed within a vehicle, personnel (such as for example on a backpack or other wearable), autonomous vehicle (drone, etc.), or other mobile resources localized within the squad. The networking hub may provide networking required administrative operations such as discovery protocol, dynamic host configuration protocol (DHCP), or other protocols. The networking hub may also provide connectivity to locally deployed edge compute resources 5560.

In embodiments, the weapon usage monitoring system 5500 may include edge compute resources 5560 that consist of, at least in part, squad deployable or wearable compute resources that provide additional, centralized and localized processing power for a final layer of machine learning, squad-based insights on aggregated data. In examples, the edge compute resources 5560 aggregates weapon response data from the mobile networking hub 5510 into aggregated weapon response data from all of the weapon response devices (5210A, 5210B, 4210C, etc.) It is appreciated that all of the communications between all of the weapon response devices to and from the mobile networking hub 5510 and the edge compute resources 5560 occurs on-site and within the (self-contained) LAN 5512 where no traditional internet connectivity is available (or desirable to connect with). In an example, edge compute resources 5560 may physically consist of one or more AWS snowball instances, but may also be deployed to a variety of edge deployment infrastructures that support virtualization. The edge compute resources 5560 of the weapon usage monitoring system 5500 may allow for a localized, edge based virtual cloud/cluster infrastructure that aggregates data from weapon usage monitoring system-based and/or weapon response device-based sensors and edge compute resources to provide a cohesive situational awareness viewpoint from local squad data. As weapon response device-based data is provided, the edge compute resource clusters may process streaming data into squad member locations, headings, gesture detections, threat locations, and discharge/line of fire information. The edge compute resources may also provide an interface for consumers on the LAN 5512 to ingest data from the edge compute resources 5560.

In embodiments, some or all of the weapon response devices 5210A, 5210B and 5210C and the user devices 5610A, 5610B and 5610C can operate on a mesh network. In this regard, when one weapon response device may be out of range from connecting directly to the mobile networking hub 5510, some or all of the weapon response devices can communicate and relay data between each other such that the data can eventually reach the mobile networking hub 5510. Further, such data is buffered on each soldier having the respective weapon response device. Additionally, data may be stored locally (temporarily) on the user devices 5610A, 5610B and 5610C in the event that some or all of the soldiers are out of range of the mobile networking hub 5510 and offloaded once within range. In examples, the data may be stored in flash memory 5306 or other storage device.

In embodiments user systems and devices and the like may be applications such as Android Team Awareness Kit (ATAK) 4570 or other systems directly connected to the LAN network 4512, as shown in FIG. 62. These may be provided data through, for example, a streaming API available from an edge compute resource cluster. Authentication may occur between a user application and an edge compute resource on connect, which then may enables edge compute resources' available data to be viewed or ingested into the user application. In an example, this activity may be used by a squad leader using the ATAK/MIRA visualization to view a near-real time squad-based situational awareness data provided by the edge compute resources. Data may be further communicated to a consumer 5580 to provide date integration to other disconnected networks.

Detailed embodiments of the present disclosure are disclosed herein; however, it is to be understood that the disclosed embodiments are merely exemplary of the present disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for the execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more locations without deviating from the scope of the present disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more locations without deviating from the scope of the present disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of SaaS products, PaaS products, and/or infrastructure as a service (IaaS) products.

The methods, program codes, and instructions described herein and elsewhere may be implemented on a cellular network having multiple cells. The cellular network may either be FDMA network or CDMA network. The cellular network may include mobile devices, cell sites, base stations, repeaters, antennas, towers, and the like. The cell network may be a GSM, GPRS, 3G, 4G, 5G, EVDO, mesh, or other networks types.

The methods, program codes, and instructions described herein and elsewhere may be implemented on or through mobile devices. The mobile devices may include navigation devices, cell phones, mobile phones, PDAs, laptops, palmtops, netbooks, pagers, electronic book readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as RAM; mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, PDAs, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a," "an," "the," and/or similar referents in the context of describing the present disclosure (especially in the context of the following claims) is to be construed to cover both the singular and the plural unless otherwise indicated herein or clearly contradicted by context. The terms "comprising," "having," "including," and/or "containing" are to be construed as open-ended terms (i.e., meaning "including, but not limited to") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the present disclosure and does not pose a limitation on the scope of the present disclosure unless otherwise claimed. No language in the specification should be construed as indicating any non-claimed element as essential to the practice of the present disclosure.

While the foregoing written description enables one skilled in the art to make and use what is considered presently to be the best mode thereof, those skill in the art will understand and appreciate the existence of variations, combinations, and equivalents of the specific embodiment, method, and examples herein. The present disclosure should therefore not be limited by the above-described embodiment, method, and examples, but by all embodiments and methods within the scope and spirit of the present disclosure.

Any element in a claim that does not explicitly state "means for" performing a specified function, or "step for" performing a specified function, is not to be interpreted as a "means" or "step" clause as specified in 35 U.S.C. § 112 (f). In particular, any use of "step of in the claims is not intended to invoke the provision of 35 U.S.C. § 112 (f).

Persons skilled in the art may appreciate that numerous design configurations may be possible to enjoy the functional benefits of the inventive systems. Thus, given the wide variety of configurations and arrangements of embodiments of the present disclosure the scope of the inventions are reflected by the breadth of the claims below rather than narrowed by the embodiments described above.

What is claimed is:

1. A method for determining a discharge event of a firearm, the method comprising:

receiving, by an event detection module, a plurality of input signals over a sample window of time from a first inertial measurement unit (IMU) configured on the firearm;

receiving, by the event detection module, a second plurality of input signals over the sample window of time from a second IMU configured on the firearm, wherein the first IMU is configured for a first gravity sensitivity and the second IMU is configured for a second gravity sensitivity, wherein the first and second sensitivities are distinct;

assigning the plurality of input signals to sample event candidates at respective windows of time;

creating and running an identification algorithm at a machine learning module of the event detection module using the plurality of input signals; and identifying an occurrence of a shot discharge at the machine learning module based on an output of the identification algorithm.

2. The method of claim 1, further comprising:

receiving, by the event detection module, a safety selector switch signal from a safety selector switch sensor configured on the firearm, the safety selector switch signal corresponding to a position of the safety switch; and wherein the identifying is further based on the safety selector switch signal.

3. The method of claim 2, further comprising:

receiving, by the event detection module, a trigger actuation signal from a trigger pull sensor assembly configured on the firearm, the trigger pull sensor signal corresponding to a position of a trigger of the firearm.

4. The method of claim 3, further comprising:

receiving, by the event detection module, an audio input signal from an audio sensor configured on the firearm; and wherein the identifying is further based on the audio input signal.

5. The method of claim 4, further comprising:

receiving, by the event detection module, a pressure input signal from a pressure sensor configured on the firearm; and wherein the identifying is further based on the pressure input signal.

6. The method of claim 5, further comprising:

receiving, by the event detection module, a magnetic field signal from a magnetometer configured on the firearm; and wherein the identifying is further based on the magnetic field signal.

7. The method of claim 1 wherein receiving the plurality of input signals further comprises:

receiving a thermal input signal from a thermal sensor configured on the firearm wherein the identification algorithm is further configured to:

determine whether a temperature threshold has been exceeded based on the thermal input signal and generate an alert indicative of the temperature threshold being exceeded.

8. The method of claim 1 wherein the first gravity sensitivity is +/−16G and the second gravity sensitivity is +/−200G.

9. The method of claim 1 wherein the plurality of input signals include acceleration and rotation input signals from the first IMU, the method further comprising:

assigning respective acceleration and rotation input signals to sample event candidates at respective windows of time of the sample window of time;

comparing the acceleration signals of the sampled event candidates to a discharge acceleration template that represents a confirmed weapon discharge event;

identifying a subset of accepted accelerations from the sampled event candidates that satisfy the discharge acceleration template;

comparing a first rotation input signal from the sample window of time associated with each accepted acceleration in the subset to a first rotation template that represents a confirmed weapon discharge event;

determining whether the sampled event candidate is a discharge event based on satisfying both the discharge acceleration template and the first rotation template.

10. The method of claim 9 wherein receiving the plurality of input signals comprises:

receiving a first acceleration input signal along a first axis, a second acceleration input signal along a second axis and a third acceleration input signal along a third axis; and receiving a first rotation input signal around the first axis, a second rotation input signal around the second axis and a third acceleration input signal around the third axis.

11. The method of claim 10, further comprising:

generating a combined acceleration plot representing a combination of the first, second and third acceleration input signals, wherein the discharge acceleration template is compared to the combined acceleration plot.

12. The method of claim 11 wherein the first rotation input signal corresponds to a first rotation of the firearm around the first axis.

13. The method of claim 12 wherein the first axis is generally transverse to an axis of a barrel of the firearm, wherein the first rotation around the first axis corresponds to a barrel of the firearm rotating initially (i) in a first direction around the first axis resulting from a shot being fired; and subsequently (ii) in a second opposite direction around the first axis resulting from rebound of the firearm after the shot is fired.

14. The method of claim 13, further comprising comparing a second rotation input signal with a second rotation template, distinct from the first rotation template and that represents a confirmed weapon discharge event, the second rotation input signal taken from the sample window of time associated with each accepted acceleration, wherein the second rotation input signal corresponds to a second rotation of the firearm around the second axis.

15. The method of claim 14 wherein the second axis is generally parallel to an axis of the barrel of the firearm, wherein the second rotation around the second axis corresponds to a barrel of the firearm rotating as a result from a bullet rotating while translating within the barrel during discharge.

16. The method of claim 15 wherein the determining is further based on satisfying the second rotation template.

17. A system for providing discharge monitoring of a firearm, the system comprising:

an inertial measurement unit (IMU) disposed on the firearm that senses accelerations;

a safety selector switch that sends a safety selector switch signal indicative of a position of a safety selector on the firearm;

a trigger pull sensor assembly that senses mechanical movement of a trigger of the firearm, and communicates a trigger actuation signal to a signal processing module corresponding to a position of the trigger sends a trigger actuation signal indicative of a position of a trigger on the firearm, wherein the trigger pull sensor assembly further comprises:

a contact sensor disposed on the grip housing configured to move between a depressed position and an extended position;

a grip screw that threadably mates to a body of the firearm, the grip screw defining a pocket that at least partially receives the contact sensor; and a plunger assembly disposed in the grip screw and that mechanically communicates motion of the trigger into motion of the contact sensor;

an event detection module that receives a plurality of input signals from the IMU indicative of the accelerations and that is configured to:

assign the plurality of input signals to sample event candidates at respective windows of time;

create and run an identification algorithm at a machine learning module of the event detection module using the plurality of input signals; and identify an occurrence of a shot discharge at the machine learning module based on an output of the identification algorithm, the safety selector switch signal, and the trigger actuation signal.

18. The system of claim 17 wherein movement of the contact sensor between the depressed position and the extended position causes a circuit in the event detection module to change status indicative of actuation of the trigger.

19. The system of claim 18 wherein the contact sensor is biased toward the extended position by a contact sensor biasing member.

20. The system of claim 19 wherein the plunger assembly further comprises:

a trigger side plunger that engages the trigger;

a sensor side plunger that engages the contact sensor; and a plunger biasing member disposed intermediate the trigger side plunger and the sensor side plunger and that biases the trigger side plunger toward the plunger and biases the sensor side plunger toward the contact sensor.

21. The system of claim 20 wherein rotation of the trigger causes the plunger assembly to translate away from the contact sensor such that the bias of the contact sensor biasing member overcomes the bias of the plunger biasing member such that the contact sensor moves from the depressed position to the extended position.

22. A method for determining a discharge event of a firearm, the method comprising:

receiving, by an event detection module, a plurality of input signals over a sample window of time from a first inertial measurement unit (IMU) configured on the firearm, the plurality of input signals including acceleration and rotation input signals from the first IMU;

assigning the plurality of input signals to sample event candidates at respective windows of time;

creating and running an identification algorithm at a machine learning module of the event detection module using the plurality of input signals, wherein running the identification algorithm includes;

assigning respective acceleration and rotation input signals to sample event candidates at respective windows of time of the sample window of time;

comparing the acceleration signals of the sampled event candidates to a discharge acceleration template that represents a confirmed weapon discharge event;

identifying a subset of accepted accelerations from the sampled event candidates that satisfy the discharge acceleration template; and comparing a first rotation input signal from the sample window of time associated with each accepted acceleration in the subset to a first rotation template that represents a confirmed weapon discharge event; and determining whether the sampled event candidate is a discharge event based on satisfying both the discharge acceleration template and the first rotation template; and identifying an occurrence of a shot discharge at the machine learning module based on an output of the identification algorithm.

23. The method of claim 22 wherein receiving the plurality of input signals comprises:

receiving a first acceleration input signal along a first axis, a second acceleration input signal along a second axis and a third acceleration input signal along a third axis; and receiving a first rotation input signal around the first axis, a second rotation input signal around the second axis and a third acceleration input signal around the third axis.

24. The method of claim 23, further comprising:

generating a combined acceleration plot representing a combination of the first, second and third acceleration input signals, wherein the discharge acceleration template is compared to the combined acceleration plot.

* * * * *